United States Patent
Taira et al.

(10) Patent No.: US 12,540,203 B2
(45) Date of Patent: *Feb. 3, 2026

(54) METHOD FOR PRODUCING PURIFIED POLYTETRAFLUOROETHYLENE AQUEOUS DISPERSION LIQUID, METHOD FOR PRODUCING MODIFIED POLYTETRAFLUOROETHYLENE POWDER, METHOD FOR PRODUCING POLYTETRAFLUOROETHYLENE MOLDED BODY, AND COMPOSITION

(71) Applicant: DAIKIN INDUSTRIES, LTD., Osaka (JP)

(72) Inventors: Takahiro Taira, Osaka (JP); Kazuhiro Mishima, Osaka (JP); Chiaki Okui, Osaka (JP); Tadao Hayashi, Osaka (JP); Hirotoshi Yoshida, Osaka (JP); Yuuji Tanaka, Osaka (JP); Masayoshi Miyamoto, Osaka (JP); Taku Yamanaka, Osaka (JP); Taketo Kato, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,843

(22) Filed: Nov. 7, 2023

(65) Prior Publication Data
US 2024/0117077 A1    Apr. 11, 2024

Related U.S. Application Data

(62) Division of application No. 16/637,601, filed as application No. PCT/JP2018/030161 on Aug. 10, 2018, now Pat. No. 11,851,519.

(60) Provisional application No. 62/543,499, filed on Aug. 10, 2017.

(30) Foreign Application Priority Data

Dec. 25, 2017  (JP) .................. 2017-248553
Feb. 7, 2018   (JP) .................. 2018-020460

(51) Int. Cl.
C08F 6/06   (2006.01)
C08F 6/16   (2006.01)
C08F 6/24   (2006.01)

(52) U.S. Cl.
CPC .......... C08F 6/06 (2013.01); C08F 6/16 (2013.01); C08F 6/24 (2013.01)

(58) Field of Classification Search
None
See application file for complete search history.

(56) References Cited

U.S. PATENT DOCUMENTS

| | | |
|---|---|---|
| 4,369,266 A | 1/1983 | Kuhls |
| 5,391,709 A | 2/1995 | Egres, Jr. |
| 6,833,403 B1 | 12/2004 | Bladel et al. |
| 6,841,616 B2 | 1/2005 | Wille et al. |
| 2002/0161149 A1 | 10/2002 | Kobayashi et al. |
| 2003/0125421 A1 | 7/2003 | Bladel et al. |
| 2003/0130393 A1 | 7/2003 | Cavanaugh et al. |
| 2005/0107518 A1 | 5/2005 | Zipplies et al. |
| 2005/0113507 A1 | 5/2005 | Bladel et al. |
| 2006/0128872 A1 | 6/2006 | Zipplies et al. |
| 2006/0175261 A1 | 8/2006 | Noelke et al. |
| 2006/0178472 A1 | 8/2006 | Johnson |
| 2006/0183842 A1 | 8/2006 | Johnson |
| 2006/0276574 A1 | 12/2006 | Hoshikawa et al. |
| 2007/0043164 A1 | 2/2007 | Hoshikawa et al. |
| 2007/0135558 A1 | 6/2007 | Tsuda et al. |
| 2007/0149695 A1 | 6/2007 | Hintzer et al. |
| 2008/0114121 A1 | 5/2008 | Brothers et al. |
| 2008/0207859 A1 | 8/2008 | Matsuoka et al. |
| 2009/0239994 A1 | 9/2009 | Tsuda et al. |
| 2010/0204345 A1 | 8/2010 | Yamanaka et al. |
| 2012/0116003 A1 | 5/2012 | Brothers et al. |
| 2012/0116015 A1 | 5/2012 | Brothers et al. |
| 2012/0116017 A1 | 5/2012 | Brothers et al. |
| 2013/0122302 A1 | 5/2013 | Miyamoto et al. |
| 2013/0303701 A1 | 11/2013 | Brothers et al. |
| 2013/0303715 A1 | 11/2013 | Brothers et al. |
| 2013/0303717 A1 | 11/2013 | Brothers et al. |

(Continued)

FOREIGN PATENT DOCUMENTS

| | | |
|---|---|---|
| CN | 1875035 A | 12/2006 |
| CN | 101341179 A | 1/2009 |

(Continued)

OTHER PUBLICATIONS

Extended European Search Report dated Apr. 22, 2021 in European Application No. 18845249.4.
International Preliminary Report on Patentability dated Feb. 11, 2020 from the International Bureau in International Application No. PCT/JP2018/030161.

(Continued)

Primary Examiner — Tae H Yoon
(74) Attorney, Agent, or Firm — Sughrue Mion, PLLC

(57) ABSTRACT

A composition containing polytetrafluoroethylene and substantially free from a compound represented by Formula (3):

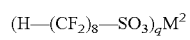

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2. Also disclosed is a molded boy including the composition.

22 Claims, No Drawings

(56) References Cited

U.S. PATENT DOCUMENTS

| | | |
|---|---|---|
| 2013/0303718 A1 | 11/2013 | Brothers et al. |
| 2014/0018499 A1 | 1/2014 | Brothers et al. |
| 2015/0183898 A1 | 7/2015 | Yamanaka et al. |
| 2015/0299341 A1 | 10/2015 | Nanba |
| 2015/0322237 A1 | 11/2015 | Nanba |
| 2015/0344592 A1 | 12/2015 | Brothers et al. |
| 2016/0122509 A1 | 5/2016 | Brothers et al. |
| 2017/0073435 A1 | 3/2017 | Brothers et al. |

FOREIGN PATENT DOCUMENTS

| | | |
|---|---|---|
| CN | 101605826 A | 12/2009 |
| CN | 101772520 A | 7/2010 |
| CN | 101333269 B | 5/2012 |
| CN | 104395356 A | 3/2015 |
| CN | 104884476 A | 9/2015 |
| EP | 1 538 177 B1 | 6/2008 |
| EP | 2 918 613 A1 | 9/2015 |
| JP | 40-21438 B | 9/1963 |
| JP | 01078823 A | 3/1989 |
| JP | 2002-201217 A | 7/2002 |
| JP | 2002-532583 A | 10/2002 |
| JP | 2005-527652 A | 9/2005 |
| JP | 2005-325327 A | 11/2005 |
| JP | 2007-511657 A | 5/2007 |
| JP | 2008-530314 A | 8/2008 |
| JP | 2013-528663 A | 7/2013 |
| JP | 2013-542308 A | 11/2013 |
| JP | 2013-542309 A | 11/2013 |
| JP | 2013-542310 A | 11/2013 |
| JP | 2015-516024 A | 6/2015 |
| JP | 2015-516025 A | 6/2015 |
| WO | 2005/007709 A1 | 1/2005 |
| WO | 2009/020187 A1 | 2/2009 |
| WO | 2014/084399 A1 | 6/2014 |
| WO | 2007/049517 A1 | 5/2017 |

OTHER PUBLICATIONS

International Search Report issued Oct. 9, 2018 in International Application No. PCT/JP2018/030161.

Office Action issued Feb. 9, 2021 in Japanese Application No. 2019-535735.

METHOD FOR PRODUCING PURIFIED POLYTETRAFLUOROETHYLENE AQUEOUS DISPERSION LIQUID, METHOD FOR PRODUCING MODIFIED POLYTETRAFLUOROETHYLENE POWDER, METHOD FOR PRODUCING POLYTETRAFLUOROETHYLENE MOLDED BODY, AND COMPOSITION

CROSS-REFERENCE TO RELATED APPLICATIONS

This application is a Rule 53 (b) Divisional of U.S. application Ser. No. 16/637,601 filed Feb. 7, 2020 (now U.S. Pat. No. 11,851,519), which is a National Stage of International Application No. PCT/JP2018/030161 filed Aug. 10, 2018, claiming priority based on U.S. Provisional Application No. 62/543,499 filed Aug. 10, 2017, Japanese Patent Application No. 2017-248553 filed Dec. 25, 2017 and Japanese Patent Application No. 2018-020460 filed Feb. 7, 2018. The respective disclosures of each of the above applications are incorporated herein by reference in their entirety.

TECHNICAL FIELD

The present invention relates to a method for producing an aqueous dispersion of purified polytetrafluoroethylene, a method for producing powder of refined polytetrafluoroethylene, and a method for producing a molded body of polytetrafluoroethylene.

BACKGROUND ART

Conventionally, a method for producing polytetrafluoroethylene using a hydrocarbon surfactant is known (see, for example, Patent Document 1).

RELATED ART

Patent Document

Patent Document 1: National Publication of International Patent Application No. 2013-542309

SUMMARY OF THE INVENTION

Problem to be Solved by the Invention

It has been found that a specific compound containing fluorine is generated when polytetrafluoroethylene is produced using a hydrocarbon surfactant.

It is an object of the present invention to obtain an aqueous dispersion of polytetrafluoroethylene and polytetrafluoroethylene powder, with such a compound containing fluorine removed or reduced. Further, it is an object of the present invention to produce a molded body of polytetrafluoroethylene, with the compound containing fluorine removed or reduced, using polytetrafluoroethylene that is obtained using a hydrocarbon surfactant. Further, it is an object of the present invention to provide a composition containing polytetrafluoroethylene, with the compound containing fluorine removed or reduced.

Means for Solving the Problem

The present invention is a method for producing an aqueous dispersion of purified polytetrafluoroethylene, the method comprising: removing or reducing a compound represented by Formula (1) or (2) below from an aqueous dispersion of polytetrafluoroethylene obtained using a hydrocarbon surfactant:

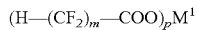
$$(H-(CF_2)_m-COO)_p M^1 \qquad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or

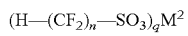
$$(H-(CF_2)_n-SO_3)_q M^2 \qquad \text{Formula (2):}$$

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The removal or reduction of a compound represented by Formula (1) or (2) above preferably comprises ion-exchanging and/or concentrating the aqueous dispersion of polytetrafluoroethylene.

The present invention is also a method for producing powder of refined polytetrafluoroethylene, the method comprising: removing or reducing a compound represented by Formula (1) or (2) below from polytetrafluoroethylene powder obtained using a hydrocarbon surfactant:

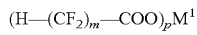
$$(H-(CF_2)_m-COO)_p M^1 \qquad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or

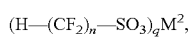
$$(H-(CF_2)_n-SO_3)_q M^2, \qquad \text{Formula (2):}$$

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The removal or reduction of a compound represented by Formula (1) or (2) above preferably comprises heating the polytetrafluoroethylene powder obtained using a hydrocarbon surfactant at a temperature of 160° C. or more.

The present invention is further a method for producing a molded body of polytetrafluoroethylene from polytetrafluoroethylene that is produced using a hydrocarbon surfactant, the method comprising: removing or reducing a compound represented by Formula (1) or (2) below:

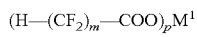
$$(H-(CF_2)_m-COO)_p M^1 \qquad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or

$$(H-(CF_2)_n-SO_3)_q M^2 \qquad \text{Formula (2):}$$

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The removal or reduction of a compound represented by Formula (1) or (2) above preferably comprises heating at a temperature of 160° C. or more.

The present invention is also a method for producing refined polytetrafluoroethylene, the method comprising: removing or reducing a compound represented by Formula (1) or (2) below by bringing a fluorine radical source into contact with polytetrafluoroethylene obtained using a hydrocarbon surfactant at a temperature over 100° C.:

$$(H-(CF_2)_m-COO)_pM^1 \quad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or $$(H-(CF_2)_n-SO_3)_qM^2 \quad \text{Formula (2):}$$

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The present invention is also a method for producing polytetrafluoroethylene, the method comprising: removing or reducing a compound represented by Formula (1) or (2) below by bringing a fluorine radical source into contact with polytetrafluoroethylene obtained using a hydrocarbon surfactant, wherein the amount of the fluorine radical source added is 0.5 parts by weight or more per 100 parts by weight of polytetrafluoroethylene in terms of fluorine atoms:

$$(H-(CF_2)_m-COO)_pM^1 \quad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or $$(H-(CF_2)_n-SO_3)_qM^2 \quad \text{Formula (2):}$$

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The present invention is also a composition comprising polytetrafluoroethylene and substantially free from a compound represented by Formula (3) below:

$$(H-(CF_2)_8-SO_3)_qM^2 \quad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The content of the compound represented by Formula (3) above is preferably 1000 ppb or less, more preferably 25 ppb or less, with respect to polytetrafluoroethylene.

One aspect of the present invention is a composition comprising: a compound represented by Formula (4) below in an amount of 1000 ppb or less with respect to polytetrafluoroethylene; and a nonionic surfactant in an amount of 1%/polytetrafluoroethylene or more:

$$(H-(CF_2)_7-COO)_pM^1 \quad \text{Formula (4):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition comprising: at least any one of the compound represented by Formula (4) above and a compound represented by Formula (4') below, wherein the content of the compound represented by Formula (4) above is 1000 ppb or less with respect to polytetrafluoroethylene, and the content of the compound represented by Formula (4') below is 1000 ppb or less with respect to polytetrafluoroethylene; and a nonionic surfactant in an amount of 1%/polytetrafluoroethylene or more:

$$(H-(CF_2)_8-COO)_pM^1 \quad \text{Formula (4'):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition comprising: a compound represented by Formula (5) below in an amount of 1000 ppb or less with respect to polytetrafluoroethylene; and a nonionic surfactant in an amount of 1%/polytetrafluoroethylene or more:

$$(H-(CF_2)_{13}-COO)_pM^1 \quad \text{Formula (5):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition comprising: at least any one of the compound represented by Formula (5) above and a compound represented by Formula (5') below, wherein the content of the compound represented by Formula (5) above is 1000 ppb or less with respect to polytetrafluoroethylene, and the content of the compound represented by Formula (5') below is 1000 ppb or less with respect to polytetrafluoroethylene; and a nonionic surfactant in an amount of 1%/polytetrafluoroethylene or more:

$$(H-(CF_2)_{14}-COO)_pM^1 \quad \text{Formula (5'):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

Such an aspect of the present invention is a composition in the form of an aqueous dispersion.

One aspect of the present invention is a composition comprising: the compound represented by Formula (4) above in an amount of 1000 ppb or less with respect to polytetrafluoroethylene. Further, one aspect of the present invention is a composition comprising: at least any one of the compound represented by Formula (4) above and the compound represented by Formula (4') above, wherein the content of the compound represented by Formula (4) above is 1000 ppb or less with respect to polytetrafluoroethylene, and the content of the compound represented by Formula (4') above is 1000 ppb or less with respect to polytetrafluoroethylene. Further, one aspect of the present invention is a composition comprising: the compound represented by Formula (5) above in an amount of 1000 ppb or less with respect to polytetrafluoroethylene. One aspect of the present invention is a composition comprising: at least any one of the compound represented by Formula (5) above and the compound represented by Formula (5') above, wherein the content of the compound represented by Formula (5) above is 1000 ppb or less with respect to polytetrafluoroethylene, and the content of the compound represented by Formula (5') above is 1000 ppb or less with respect to polytetrafluoroethylene.

Further, one aspect of the present invention is a composition comprising: the compound represented by Formula (4) above in an amount of 25 ppb or less with respect to polytetrafluoroethylene. One aspect of the present invention is a composition comprising: at least any one of the compound represented by Formula (4) above and the compound represented by Formula (4') above, wherein the content of the compound represented by Formula (4) above is 25 ppb or less with respect to polytetrafluoroethylene, and the content of the compound represented by Formula (4') above is 25 ppb or less with respect to polytetrafluoroethylene. One aspect of the present invention is a composition comprising: a compound represented by Formula (5) above in an amount of 25 ppb or less with respect to polytetrafluoroethylene. One aspect of the present invention is a composition comprising: at least any one of the compound represented by Formula (5) above and the compound represented by Formula (5') above, wherein the content of the compound represented by Formula (5) above is 25 ppb or less with respect to polytetrafluoroethylene, and the content of the compound represented by Formula (5') above is 25 ppb or less with respect to polytetrafluoroethylene.

The aforementioned composition may further comprise: a compound represented by Formula (7) below in an amount of 1000 ppb or less with respect to polytetrafluoroethylene:

Formula (7):
$(F-(CF_2)_7-COO)_p M^1$ wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

Such an aspect of the present invention is in the form of a powder composition.

Further, the polytetrafluoroethylene in the composition of the present invention is preferably obtained by polymerization using a hydrocarbon surfactant.

The present invention is also a molded body comprising the aforementioned composition. The molded body of the present invention is also preferably a stretched body.

Effects of Invention

The method for producing an aqueous dispersion of purified polytetrafluoroethylene of the present invention can remove or reduce the compound represented by Formula (1) or (2) present in the aqueous dispersion of purified PTFE to be obtained. The method for producing powder of refined polytetrafluoroethylene of the present invention can remove or reduce the compound represented by Formula (1) or (2) present in the powder of refined polytetrafluoroethylene to be obtained.

The method for producing a molded body of polytetrafluoroethylene of the present invention can remove or reduce the compound represented by Formula (1) or (2) present in the molded body of polytetrafluoroethylene to be obtained.

In the composition of the present invention, the compound represented by Formula (3) is removed or reduced.

DESCRIPTION OF EMBODIMENTS

The method for producing an aqueous dispersion of purified PTFE of the present invention comprises a step (hereinafter, referred to also as "removal step") of removing or reducing a compound represented by Formula (1) or (2) from an aqueous dispersion of polytetrafluoroethylene (which may be hereinafter referred to also as "PTFE") that is obtained using a hydrocarbon surfactant:

Formula (1):
$(H-(CF_2)_m-COO)_p M^1$ wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or

Formula (2):
$(H-(CF_2)_n-SO_3)_q M^2$ wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

Examples of the metal atom include monovalent or divalent metal atoms such as alkali metals (Group 1) and alkaline earth metals (Group 2), specifically Na, K, or Li.

Four $R^5$s may be the same as or different from each other. $R^5$s are each preferably H or an organic group having 1 to 10 carbon atoms, more preferably H or an organic group having 1 to 4 carbon atoms. Further, $R^5$s are each preferably an alkyl group having 1 to 10 carbon atoms, further preferably an alkyl group having 1 to 4 carbon atoms. The aforementioned definition is applicable to all $R^5$s below.

In Formula (1), m may be 5 to 11.

In Formula (2), n may be 6 to 12.

In this description, the "organic group" means a group containing one or more carbon atoms, or a group formed by removing one hydrogen atom from an organic compound, unless otherwise mentioned.

Examples of the "organic group" include:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents, a non-aromatic heterocyclic group optionally having one or more substituents,
a heteroaryl group optionally having one or more substituents,
a cyano group,
a formyl group,
RaO—,
RaCO—,
RaSO$_2$—,
RaCOO—,
RaNRaCO—,
RaCONRa—,
RaOCO—, and
RaOSO$_2$—,
wherein Ras are each independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents.

The organic group is preferably an alkyl group optionally having one or more substituents.

Further, examples of the organic group also include the examples of the substituent described above and below.

In this description, the "substituent" means a substitutable group, unless otherwise mentioned. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoylamino group, a halogen atom, a sulfamoylcarbamoyl group, a carbamoylsulfamoyl group, a dialiphatic oxyphosphinyl group, or a diaromatic oxyphosphinyl group.

The aliphatic group may be saturated or unsaturated and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include an alkyl group having a total of 1 to 8, preferably 1 to 4, carbon atoms, such as a methyl group, an ethyl group, a vinyl group, a cyclohexyl group, and a carbamoylmethyl group.

The aromatic group, for example, may have a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include an aryl group having 6 to 12 carbon atoms, preferably a total of 6 to 10 carbon atoms, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include a 5 to 6-membered heterocyclic having a total of 2 to 12, preferably 2 to 10, carbon atoms, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include an acyl group having a total of 2 to 8, preferably 2 to 4, carbon atoms, such as an acetyl group, a propanoyl group, a benzoyl group, and a 3-pyridine carbonyl group.

The acylamino group may have an aliphatic group, an aromatic group, a heterocyclic group, or the like, such as an acetylamino group, a benzoylamino group, a 2-pyridine carbonylamino group, and a propanoylamino group. Examples of the acylamino group include an acylamino group having a total of 2 to 12, preferably 2 to 8, carbon atoms, and an alkylcarbonylamino group having a total of 2 to 8 carbon atoms, such as an acetylamino group, a benzoylamino group, a 2-pyridinecarbonylamino group, and a propanoylamino group.

The aliphatic oxycarbonyl group may be saturated or unsaturated and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include an alkoxycarbonyl group having a total of 2 to 8, preferably 2 to 4, carbon atoms, such as a methoxycarbonyl, ethoxycarbonyl, or (t)-butoxycarbonyl group.

The carbamoyl group may have an aliphatic group, an aromatic group, a heterocyclic group, or the like. Examples of the carbamoyl group include an unsubstituted carbamoyl group, and an alkylcarbamoyl group having a total of 2 to 9 carbon atoms, preferably an unsubstituted carbamoyl group or an alkylcarbamoyl group having a total of 2 to 5 carbon atoms, such as a N-methylcarbamoyl group, a N,N-dimethylcarbamoyl group, and a N-phenylcarbamoyl group.

The aliphatic sulfonyl group may be saturated or unsaturated and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include an alkylsulfonyl group having a total of 1 to 6 carbon atoms, preferably a total of 1 to 4 carbon atoms, such as methanesulfonyl.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include an aryl sulfonyl group having a total of 6 to 10 carbon atoms, such as benzenesulfonyl.

The amino group may have an aliphatic group, an aromatic group, a heterocyclic group, or the like.

The acylamino group, for example, may have an acetylamino group, a benzoylamino group, a 2-pyridine carbonylamino group, a propanoylamino group, or the like. Examples of the acylamino group include an acylamino group having a total of 2 to 12 carbon atoms, preferably a total of 2 to 8 carbon atoms, more preferably an alkylcarbonylamino group having a total of 2 to 8 carbon atoms, such as an acetylamino group, a benzoylamino group, a 2-pyridine carbonylamino group, and a propanoylamino group.

The aliphatic sulfonamide group may be an aromatic sulfonamide group, and the heterocyclic sulfonamide group, for example, may be a methanesulfonamide group, a benzenesulfonamide group, a 2-pyridine sulfonamide group, or the like.

The sulfamoyl group may have an aliphatic group, an aromatic group, a heterocyclic group, or the like. Examples of the sulfamoyl group include a sulfamoyl group, an alkylsulfamoyl group having a total of 1 to 9 carbon atoms, a dialkylsulfamoyl group having a total of 2 to 10 carbon atoms, an arylsulfamoyl group having a total of 7 to 13 carbon atoms, and a heterocyclic sulfamoyl group having a total of 2 to 12 carbon atoms, more preferably a sulfamoyl group, an alkylsulfamoyl group having a total of 1 to 7 carbon atoms, a dialkylsulfamoyl group having a total of 3 to 6 carbon atoms, an arylsulfamoyl group having a total of 6 to 11 carbon atoms, and a heterocyclic sulfamoyl group having a total of 2 to 10 carbon atoms, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated and may have a methoxy group, an ethoxy group, an i-propyloxy group, a cyclohexyloxy group, a methoxyethoxy group, or the like. Examples of the aliphatic oxy group include an alkoxy group having a total of 1 to 8, preferably 1 to 6, carbon atoms, such as a methoxy group, an ethoxy group, an i-propyloxy group, a cyclohexyloxy group, and a methoxyethoxy group.

The aromatic amino group and the heterocyclic amino group may have an aliphatic group, an aliphatic oxy group, a halogen atom, a carbamoyl group, a heterocyclic group annelated with the aryl group, or an aliphatic oxycarbonyl group, preferably an aliphatic group having a total of 1 to 4 carbon atoms, an aliphatic oxy group having a total of 1 to 4 carbon atoms, a halogen atom, a carbamoyl group having a total of 1 to 4 carbon atoms, a nitro group, or an aliphatic oxycarbonyl group having a total of 2 to 4 carbon atoms.

The aliphatic thio group may be saturated or unsaturated and examples thereof include an alkylthio group having a total of 1 to 8 carbon atoms, more preferably a total of 1 to 6 carbon atoms, such as a methylthio group, an ethylthio group, a carbamoylmethylthio group, and a t-butylthio group.

The carbamoylamino group may have an aliphatic group, an aryl group, a heterocyclic group, or the like. Examples of the carbamoylamino group include a carbamoylamino group, an alkylcarbamoylamino group having a total of 2 to 9 carbon atoms, a dialkylcarbamoylamino group having a total of 3 to 10 carbon atoms, an arylcarbamoylamino group having a total of 7 to 13 carbon atoms, and a heterocyclic carbamoylamino group having a total of 3 to 12 carbon atoms, preferably a carbamoylamino group, an alkylcarbamoylamino group having a total of 2 to 7 carbon atoms, a dialkylcarbamoylamino group having a total of 3 to 6 carbon atoms, an arylcarbamoylamino group having a total of 7 to 11 carbon atoms, and a heterocyclic carbamoylamino group having a total of 3 to 10 carbon atoms, such as a carbamoylamino group, a methylcarbamoylamino group, a N,N-dimethylcarbamoylamino group, a phenylcarbamoylamino group, and a 4-pyridine carbamoylamino group.

The PTFE may be homo PTFE or modified PTFE. The modified PTFE contains a TFE unit and a modifying monomer unit based on a modifying monomer copolymerizable with TFE. Further, the PTFE may be a high-molecular weight PTFE that is non melt-processible and fibrillatable or may be a low-molecular weight PTFE that is melt-processible and non-fibrillatable. The standard specific gravity (SSG) and the melt viscosity (MV) used as indices of the molecular weight of the PTFE are not limited.

The modifying monomer is not limited as long as it is copolymerizable with TFE, and examples thereof include perfluoroolefins such as hexafluoropropylene [HFP]; chlorofluoroolefins such as chlorotrifluoroethylene [CTFE]; hydrogen-containing fluoroolefins such as trifluoroethylene and vinylidene fluoride [VDF]; perfluorovinyl ethers; perfluoroalkyl ethylenes; ethylenes; and fluorine-containing vinyl ethers having a nitrile group. Further, one of such modifying monomers may be used, or a plurality of types thereof may be used.

The perfluorovinyl ethers are not limited, and examples thereof include an unsaturated perfluoro compound represented by Formula (X) below:

$$CF_2=CF-ORf \qquad (X)$$

wherein Rf represents a perfluoroorganic group. In this description, the "perfluoroorganic group" means an organic group in which all hydrogen atoms bonded to carbon atoms are substituted with fluorine atoms. The perfluoroorganic group may have ether oxygen.

Examples of the perfluorovinyl ethers include perfluoro (alkyl vinyl ether) [PAVE] with Rf representing a perfluoroalkyl group having 1 to 10 carbon atoms in Formula (X) above. The perfluoroalkyl group preferably has 1 to 5 carbon atoms.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. Perfluoromethyl vinyl ether [PMVE] in which the perfluoroalkyl group is a perfluoromethyl group and perfluoropropyl vinyl ether [PPVE] in which the perfluoroalkyl group is a perfluoropropyl group are preferable.

The perfluoroalkyl ethylenes are not limited, and examples thereof include perfluorobutyl ethylene (PFBE), perfluorohexyl ethylene (PFHE), and perfluorooctyl ethylene (PFOE).

The modifying monomer in the modified PTFE is preferably at least one selected from the group consisting of HFP, CTFE, VDF, PMVE, PPVE, PFBE, PFHE, CNVE, and ethylenes.

The modified PTFE preferably has a modifying monomer unit in the range of 0.0001 to 2 mol %, more preferably 0.0001 or more and less than 1 mol %, further preferably in the range of 0.0001 to 0.5 mol %, particularly preferably in the range of 0.001 to 0.2 mol %.

The average primary particle size of the PTFE is preferably 150 nm or more, more preferably 180 nm or more. A larger average primary particle size of the PTFE composition suppresses the increase of the paste extrusion pressure more and allows more excellent film-forming properties during paste extrusion molding using the powder. The upper limit is not limited but may be 500 nm. In view of the productivity in the polymerization step, the upper limit is preferably 350 nm. The average primary particle size is determined from the actual transmittance of projected light at 550 nm through each sample using a calibration curve. The calibration curve is plotted by diluting a PTFE aqueous dispersion with water to a solid content of 0.15 mass % to measure the transmittance of projected light at 550 nm with respect to the unit length of the diluted latex obtained, and measuring the particle size of PTFE along a specified direction in a transmission electron micrograph to determine the number-based, length-average particle size.

The PTFE may have a core-shell structure. Examples of the PTFE having a core-shell structure include a modified PTFE containing a core of a high-molecular weight PTFE and a shell of a lower-molecular weight PTFE or a modified PTFE in a particle.

Examples of such a modified PTFE include the PTFE described in National Publication of International Patent Application No. 2005-527652.

In this description, the content of each monomer constituting the PTFE can be calculated by appropriately combining NMR, FT-IR, the elemental analysis, and the X-ray fluorescence analysis, depending on the monomer type.

A method for obtaining a PTFE aqueous dispersion using a hydrocarbon surfactant will be described later. The PTFE aqueous dispersion obtained using a hydrocarbon surfactant contains the compound represented by Formula (1) or (2) above.

Examples of the method for removing or reducing the compound represented by Formula (1) or (2) from the PTFE aqueous dispersion include adsorption and concentration.

Further, a method for removing or reducing the compound represented by Formula (1) or (2) by drying and vaporizing the PTFE aqueous dispersion also can be employed. The drying temperature to be employed can be the later-described heating temperature, for example.

Further, a method of gasifying the PTFE aqueous dispersion and allowing an aqueous solution to absorb the compound represented by Formula (1) or (2) in the gas using a droplet-type absorption device and/or a liquid film-type absorption device. The temperature of the aqueous solution is, for example, preferably 10 to 60° C.

Examples of the aforementioned adsorption include methods of using an adsorbent such as an ion-exchange resin (IER), an activated carbon, and zeolite. Specifically, the compound represented by Formula (1) or (2) above can be removed or reduced by bringing the compound represented by Formula (1) or (2) above contained in the PTFE aqueous dispersion into contact with such an adsorbent. The adsorption can be performed by adding an ion-exchange resin to the PTFE aqueous dispersion, followed by stirring, as required. The ion exchange is preferably performed by adding 1 g or more of the ion-exchange resin per 100 g of the PTFE. The amount of the ion-exchange resin added is more preferably 10 g or more and is preferably 200 g or less, more preferably 100 g or less.

Examples of the aforementioned concentration include phase separation concentration, electric concentration, filtration with an ultrafiltration membrane, filtration with a reverse osmosis membrane (RO film), and nanofiltration. Examples of the concentration include a method of adding 1%/PTFE or more of a nonionic surfactant to the PTFE aqueous dispersion, followed by standing.

The amount of the nonionic surfactant added is preferably 40%/PTFE or less, more preferably 30%/PTFE or less, further preferably 20%/PTFE or less.

The standing temperature is not limited but may be, for example, 20° C. or more and 80° C. or less. The standing time is not limited but may be, for example, 1 minute or more and 24 hours or less.

The removal step preferably includes a step of adsorbing and/or concentrating the PTFE aqueous dispersion, more preferably a step of ion-exchanging and/or concentrating the PTFE aqueous dispersion.

The ion exchange and/or concentration step may be an ion exchange step, a concentration step, or an ion exchange and concentration step, and each step may be performed multiple times. In the case of performing ion exchange and concentration, the order of ion exchange and concentration may be random, or ion exchange and concentration may be alternately performed.

The ion exchange and/or concentration step is particularly preferably an ion exchange and concentration step. In the ion exchange and/or concentration step, it is more preferable that concentration is performed after ion exchange.

The adsorption and the concentration each may be performed multiple times. For example, the adsorption or concentration may be performed twice, 3 times, 4 times, 5 times, 6 times, 7 times, 8 times, 9 times, or 10 times. Further, the adsorption and the concentration may be performed in combination.

When the PTFE aqueous dispersion is obtained using a hydrocarbon surfactant, the compounds represented by Formulas (1) and (2) are generally generated in an amount of 1 to 200 ppm with respect to PTFE.

The removal step removes or reduces the compound represented by Formula (1) or (2) in the PTFE aqueous dispersion, so that a purified PTFE aqueous dispersion can be obtained.

The removal step preferably removes 80 mass % or more, more preferably 85 mass % or more, further preferably 90 mass % or more, furthermore preferably 95 mass % or more, even more preferably 97 mass % or more, particularly preferably 98 mass % or more, most preferably 99 mass % or more, of the compounds represented by Formulas (1) and (2) in the PTFE aqueous dispersion.

The removal step preferably reduces the content of each of the compounds represented by Formulas (1) and (2) in the aqueous dispersion of purified PTFE to be obtained to 500 ppb or less, more preferably 200 ppb or less, further preferably 100 ppb or less, particularly preferably 50 ppb or less, most preferably 25 ppb or less, with respect to PTFE.

The PTFE aqueous dispersion can be obtained by a production method including a step of performing emulsion polymerization of tetrafluoroethylene in an aqueous medium in the presence of a hydrocarbon surfactant. The emulsion polymerization can be performed by a conventionally known method. The aqueous medium is not limited as long as it is a liquid containing water, and may contain an organic solvent such as alcohols, ethers, ketones, and paraffin waxes in addition to water.

Examples of the hydrocarbon surfactant that can be used include those described in National Publication of International Patent Application No. 2013-542308, National Publication of International Patent Application No. 2013-

542309, and National Publication of International Patent Application No. 2013-542310. The detail of the hydrocarbon surfactant will be described later.

The present invention is also a method for producing refined PTFE powder, the method comprising: removing a compound represented by Formula (1) or (2) below from PTFE powder obtained using a hydrocarbon surfactant:

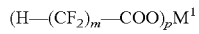
$$(H-(CF_2)_m-COO)_p M^1 \qquad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or

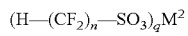
$$(H-(CF_2)_n-SO_3)_q M^2 \qquad \text{Formula (2):}$$

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

Examples of the metal atom include monovalent or divalent metal atoms such as alkali metals (Group 1) and alkaline earth metals (Group 2), specifically Na, K, or Li.

Four $R^5$s may be the same as or different from each other. $R^5$s are each preferably H or an organic group having 1 to 10 carbon atoms, more preferably H or an organic group having 1 to 4 carbon atoms.

In Formula (1), m may be 5 to 11.

In Formula (2), n may be 6 to 12.

The PTFE powder to be obtained using a hydrocarbon surfactant can be obtained, for example, by coagulation of the PTFE aqueous dispersion that is obtained using a hydrocarbon surfactant. The PTFE in the PTFE powder can be the PTFE such as homo PTFE and modified PTFE described in the method for producing an aqueous dispersion of purified PTFE.

Examples of the method for removing or reducing the compound represented by Formula (1) or (2) from the PTFE powder include heating, fluorination, and washing with water or an organic solvent.

Examples of the organic solvent include ethers, halogenated hydrocarbons, aromatic hydrocarbons, pyridines, nitriles, nitrogen-containing polar organic compounds, dimethylsulfoxides, and alcohols.

Examples of the ethers include diethyl ether, tetrahydrofuran, dioxane, and diethylene glycol diethyl ether.

Examples of the halogenated hydrocarbons include dichloromethane, dichloroethane, chloroform, chlorobenzene, and o-dichlorobenzene.

Examples of the aromatic hydrocarbons include benzene, toluene, and xylenes.

Examples of the nitriles include acetonitrile, propionitrile, butyronitrile, isobutyronitrile, and benzonitrile.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone.

Examples of the alcohols include methanol, ethanol, 1-propanol, and isopropanol.

Such organic solvents may be used in combination.

The heating method is not limited and may be a conventionally known method. The heating temperature is preferably 150° C. or more. Further, for removing or reducing the compound represented by Formula (1) or (2), the heating temperature is more preferably 160° C. or more. That is, the removal step preferably includes a step of heating the PTFE powder obtained using a hydrocarbon surfactant at a temperature of 160° C. or more.

The heating temperature is more preferably 170° C. or more, further preferably 180° C. or more, furthermore preferably 200° C. or more, even more preferably 210° C. or more, particularly preferably 220° C. or more, most preferably 230° C. or more.

Further, the heating temperature is preferably 310° C. or less, more preferably 300° C. or less, further preferably 290° C. or less, furthermore preferably 280° C. or less, even more preferably 270° C. or less. The heating may be accompanied by drying of moisture.

That is, the heating may include drying the wet PTFE powder containing moisture obtained by coagulation of the PTFE dispersion after polymerization obtained using a hydrocarbon surfactant. During the drying, the compound represented by Formula (1) or (2) and the compound represented by Formula (7), which will be described below, are reduced.

Further, the PTFE powder free from moisture after the drying is preferably heated again. Specifically, the heating may be performed, after drying the wet PTFE powder to remove moisture, by further increasing the temperature continuously to the aforementioned temperature range. In this case, the drying may be performed at a temperature less than the aforementioned temperature range, for example, less than 150° C.

The method for producing refined PTFE powder of the present invention may include a step of obtaining wet PTFE powder containing moisture by coagulation of the PTFE dispersion that is obtained using a hydrocarbon surfactant.

The fluorination method may be a conventionally known method. Examples thereof include a method of exposing the PTFE powder to a fluorine radical source that generates fluorine radicals under fluorination conditions. Examples of the fluorine radical source include $CoF_3$, $AgF_2$, $UF_6$, $OF_2$, $N_2F_2$, $CF_3OF$, halogen fluorides (such as $IF_n$ (where n is 1 to 7) including IF, $IF_3$, $IF_5$, and $IF_7$; ClF, $ClF_3$, and $BrF_3$), rare gas fluorides (such as $XeF_2$, $XeF_4$, and $KrF_2$), and nitrogen-containing fluorine compounds (such as $NF_3$ and $NF_2$) other than fluorine gas. Among these, fluorine gas is most preferable from the viewpoints of the handleability, the cost, the ability of removing the compounds represented by Formulas (1) and (2) with high efficiency, and the difficulty of causing new impurities such as iodine.

Since the reaction with the fluorine radical source is extremely exothermic, the fluorine radical source may be diluted with an inert gas such as nitrogen.

The level of the fluorine radical source in the fluorine radical source/inert gas mixture can be 1 to 100 vol % but is preferably about 5 to about 25 vol % due to the high risk of operation with pure fluorine. In the case of fluorinated polymer resins with severe heat-induced discoloration, the fluorine radical source/inert gas mixture may be sufficiently diluted for preventing the overheating of fluorinated polymers and the risk of associated fire.

The fluorination method is not limited and may be a conventionally known method. The fluorination temperature is preferably over 100° C. The fluorination temperature is more preferably 110° C. or more, further preferably 120° C. or more, furthermore preferably 130° C. or more, even more preferably 150° C. or more. Further, the fluorination temperature is particularly preferably 170° C. or more, further preferably 180° C. or more, furthermore preferably 200° C. or more, even more preferably 210° C. or more, particularly preferably 220° C. or more, most preferably 230° C. or more. Further, the fluorination temperature is preferably 310° C. or less, more preferably 300° C. or less, further preferably 290° C. or less, furthermore preferably 280° C. or less, even more preferably 270° C. or less, particularly preferably 250° C. or less, most preferably 240° C. or less. An excessively low temperature may allow the compound represented by Formula (7), which will be described below, to remain in an amount of over 1000 ppb with respect to PTFE. An excessively high temperature may reduce the paste extrusion performance, since even a small shear force easily causes fibrillation due to the friction between the particles of the PTFE powder, and the original state of the particle structure is easily lost.

The fluorination temperature is preferably 110 to 270° C., more preferably 120 to 270° C., further preferably 150 to 270° C., particularly preferably 200 to 270° C.

In the fluorination, the amount of the fluorine radical source added is preferably 0.5 parts by weight or more per 100 parts by weight of the PTFE as a raw material in terms of fluorine atoms. The amount of the fluorine radical source added is more preferably 0.8 parts by weight or more, further preferably 1.0 part by weight or more, more preferably 1.6 parts by weight or more, further preferably 2.0 parts by weight or more, furthermore preferably 2.5 parts by weight or more, particularly preferably 3.0 parts by weight or more, particularly preferably 5.0 parts by weight or more. Further, the amount of the fluorine radical source added is preferably 35.0 parts by weight or less, more preferably 26.0 parts by weight or less, further preferably 20.0 parts by weight or less, particularly preferably 15.0 parts by weight or less. An excessively small amount of the fluorine radical source added may result in insufficient removal or reduction of the compound represented by Formula (1) or (2). Further, the removal or reduction of compounds that cannot be identified may be insufficient. An excessively large amount of the fluorine radical source added does not improve the effects of fluorination and thus may be uneconomical.

A suitable combination of the fluorination temperature and the amount of the fluorine radical source added is, for example, a heating temperature of over 100° C. and an amount of the fluorine radical source added of 0.5 parts by weight or more per 100 parts by weight of the PTFE as a raw material in terms of fluorine atoms.

The combination is preferably over 100° C. and 1.0 part by weight or more, more preferably over 100° C. and 1.6 parts by weight or more, further preferably over 100° C. and 2.0 parts by weight or more, furthermore preferably over 100° C. and 2.5 parts by weight or more, even more preferably over 100° C. and 3.0 parts by weight or more, particularly preferably over 100° C. and 5.0 parts by weight or more.

Further, the combination is preferably 110° C. or more and 0.5 parts by weight or more, more preferably 110° C. or more and 1.0 part by weight or more, further preferably 110° C. or more and 1.6 parts by weight or more, furthermore preferably 110° C. or more and 2.0 parts by weight or more, even more preferably 110° C. or more and 2.5 parts by weight or more, particularly preferably 110° C. or more and 3.0 parts by weight or more, most preferably 110° C. or more and 5.0 parts by weight or more. Further, the combination is preferably 120° C. or more and 0.5 parts by weight or more, more preferably 120° C. or more and 1.0 part by weight or more, further preferably 120° C. or more and 1.6 parts by weight or more, furthermore preferably 120° C. or more and 2.0 parts by weight or more, even more preferably 120° C. or more and 2.5 parts by weight or more, particularly preferably 120° C. or more and 3.0 parts by weight or more, most preferably 120° C. or more and 5.0 parts by weight or more. Further, the combination is preferably 130° C. or more and 0.5 parts by weight or more, more preferably 130° C. or more and 1.0 part by weight or more, further preferably 130° C. or more and 1.6 parts by weight or more, furthermore preferably 130° C. or more and 2.0 parts by weight or more, even more preferably 130° C. or more and 2.5 parts by weight or more, particularly preferably 130° C. or more and 3.0 parts by weight or more, most preferably 130° C. or more and 5.0 parts by weight or more. Further, the combination is preferably 150° C. or more and 0.5 parts by weight or more, more preferably 150° C. or more and 1.0 part by weight or more, further preferably 150° C. or more and 1.6 parts by weight or more, furthermore preferably 150° C. or more and 2.0 parts by weight or more, even more preferably 150° C. or more and 2.5 parts by weight or more, particularly preferably 150° C. or more and 3.0 parts by weight or more, most preferably 150° C. or more and 5.0 parts by weight or more. Further, the combination is preferably 170° C. or more and 0.5 parts by weight or more, more preferably 170° C. or more and 1.0 part by weight or more, further preferably 170° C. or more and 1.6 parts by weight or more, furthermore preferably 170° C. or more and 2.0 parts by weight or more, even more preferably 170° C. or more and 2.5 parts by weight or more, particularly preferably 170° C. or more and 3.0 parts by weight or more, most preferably 170° C. or more and 5.0 parts by weight or more. Further, the combination is preferably 180° C. or more and 0.5 parts by weight or more, more preferably 180° C. or more and 1.0 part by weight or more, further preferably 180° C. or more and 1.6 parts by weight or more, furthermore preferably 180° C. or more and 2.0 parts by weight or more, even more preferably 180° C. or more and 2.5 parts by weight or more, particularly preferably 180° C. or more and 3.0 parts by weight or more, most preferably 180° C. or more and 5.0 parts by weight or more. Further, the combination is preferably 200° C. or more and 0.5 parts by weight or more, more preferably 200° C. or more and 1.0 part by weight or more, further preferably 200° C. or more and 1.6 parts by weight or more, furthermore preferably 200° C. or more and 2.0 parts by weight or more, even more preferably 200° C. or more and 2.5 parts by weight or more, particularly preferably 200° C. or more and 3.0 parts by weight or more, most preferably 200° C. or more and 5.0 parts by weight or more. Further, the combination is preferably 210° C. or more and 0.5 parts by weight or more, more preferably 210° C. or more and 1.0 part by weight or more, further preferably 210° C. or more and 1.6 parts by weight or more, furthermore preferably 210° C. or more and 2.0 parts by weight or more, even more preferably 210° C. or more and 2.5 parts by weight or more, particularly preferably 210° C. or more and 3.0 parts by weight or more, most preferably 210° C. or more and 5.0 parts by weight or more. Further, the combination is preferably 220° C. or more and 0.5 parts by weight or more, more preferably 220° C. or more and 1.0 part by weight or more, further preferably 220° C. or more and 1.6 parts by weight or more, furthermore preferably 220° C. or more and 2.0 parts by weight or more, even more preferably 220° C. or more and 2.5 parts by weight or more, particularly preferably 220° C. or more and 3.0 parts by weight or more, most preferably 220° C. or more and 5.0 parts by weight or more. Further, the combination is preferably 230° C. or more and 0.5 parts by weight or more, more preferably 230° C. or more and 1.0 part by weight or more, further preferably 230° C. or more and 1.6 parts by weight or more, furthermore preferably 230° C. or more and 2.0 parts by weight or more, even more preferably 230° C. or more and 2.5 parts by weight or more, particularly preferably 230° C. or more and 3.0 parts by weight or more, most preferably 230° C. or more and 5.0 parts by weight or more.

The heating temperature in the combination is preferably 310° C. or less, more preferably 300° C. or less, further preferably 290° C. or less, furthermore preferably 280° C. or less, even more preferably 270° C. or less, particularly preferably 250° C. or less, most preferably 240° C. or less.

The amount of the fluorine radical source added in the combination is preferably 35.0 parts by weight or less, more preferably 26.0 parts by weight or less, further preferably 20.0 parts by weight or less, particularly preferably 15.0 parts by weight or less, per 100 parts by weight of the PTFE as a raw material in terms of fluorine atoms.

Further, the combination of the upper limits of the heating temperature and the amount of the fluorine radical source is preferably 240° C. or less and 35.0 parts by weight or less, more preferably 240° C. or less and 26.0 parts by weight or less, further preferably 240° C. or less and 20.0 parts by weight or less, particularly preferably 240° C. or less and 15.0 parts by weight or less.

The amount (parts by weight) of the fluorine radical source added per 100 parts by weight of PTFE was calculated according to the following formulas.

$$A=(B/F) \times 100$$

$$B=C \times D \times E$$

$$C=\{P/(RT \times 1000)\} \times G \times H$$

A: Amount (parts by weight) of fluorine radical source added per 100 parts by weight of PTFE
B: Total amount (g) of fluorine radical source added
C: Concentration (g/mL) of fluorine radical source in mixed gas
D: Flow rate (mL/min) of mixed gas
E: Fluorination time (min)
F: Amount (g) of sample loaded
G: Molecular weight (g/mol) of fluorine radical source
H: Proportion of fluorine radical source in mixed gas P, R, and T used in the above formula are defined as follows.
P=Pressure (atm)
R=0.082 (atm·L/K·mol)
T=Temperature (K)

Any reactor provided with a heating device and capable of making sufficient solid-gas contact can be used for fluorination without problems. Specifically, examples thereof include solid-gas contact reactors of fluidized bed type and shelf type.

In the method for producing refined PTFE powder, the removal step may be performed multiple times. The removal step may be performed twice, 3 times, 4 times, 5 times, 6 times, 7 times, 8 times, 9 times, or 10 times, for example. The heating and the fluorination may be performed in combination and may be performed simultaneously.

The washing method with water or an organic solvent is not limited and may be a conventionally known method.

When PTFE powder is obtained using a hydrocarbon surfactant, 1 to 200 ppm of the compounds represented by Formulas (1) and (2) with respect to PTFE may be generated.

The removal step removes or reduces the compound represented by Formula (1) or (2) in the PTFE aqueous dispersion, thereby allowing refined PTFE powder to be obtained.

The removal step preferably removes 80 mass % or more, more preferably 85 mass % or more, further preferably 90 mass % or more, furthermore preferably 95 mass % or more, even more preferably 97 mass % or more, particularly preferably 98 mass % or more, most preferably 99 mass % or more, of the compounds represented by Formulas (1) and (2) in the PTFE powder.

The removal step reduces the content of each of the compounds represented by Formulas (1) and (2) in the refined PTFE powder to be obtained preferably to 500 ppb or less, more preferably 200 ppb or less, further preferably 100 ppb or less, particularly preferably 50 ppb or less, most preferably 25 ppb or less, with respect to PTFE.

The present invention is a method for producing a molded body using PTFE that is produced using a hydrocarbon surfactant, the method comprising: removing or reducing a compound represented by Formula (1) or (2) below:

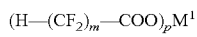    Formula (1):

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or

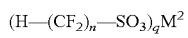    Formula (2):

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

Examples of the metal atom include monovalent or divalent metal atoms such as alkali metals (Group 1) and alkaline earth metals (Group 2), specifically Na, K, or Li.

Four $R^5$s may be the same as or different from each other. $R^5$s are each preferably H or an organic group having 1 to 10 carbon atoms, more preferably H or an organic group having 1 to 4 carbon atoms.

In Formula (1), m may be 5 to 11.
In Formula (2), n may be 6 to 12.

The PTFE that is produced using a hydrocarbon surfactant may be PTFE powder obtained using a hydrocarbon surfactant.

The PTFE can be the PTFE such as homo PTFE and modified PTFE described in the method for producing an aqueous dispersion of purified PTFE.

In the method for producing a molded body of the present invention, examples of the method for removing or reducing the compound represented by Formula (1) or (2) include heating and fluorination.

The heating method is not limited and may be a conventionally known method. The heating temperature is preferably 150° C. or more. The heating temperature is more preferably 160° C. or more. That is, the removal step preferably comprises heating at a temperature of 160° C. or more. The heating temperature is more preferably 170° C. or more, further preferably 180° C. or more, furthermore preferably 200° C. or more, even more preferably 210° C. or more, particularly preferably 220° C. or more, most preferably 230° C. or more.

Further, the heating temperature is preferably 310° C. or less, more preferably 300° C. or less, further preferably 290° C. or less, furthermore preferably 280° C. or less, even more preferably 270° C. or less.

The heating time is not limited but is, for example, 1 minute or more and 24 hours or less.

The heating may be accompanied by drying. The compound represented by Formula (1) or (2) or the compound represented by Formula (7), which will be described below, is reduced during the drying.

The fluorination method may be a conventionally known method. Examples thereof include a method of exposing the PTFE powder to a fluorine radical source that generates fluorine radicals under fluorination conditions. Examples of the fluorine radical source include $CoF_3$, $AgF_2$, $UF_6$, $OF_2$, $N_2F_2$, $CF_3OF$, and halogen fluorides, such as $IF_5$, $ClF_3$, and $BrF_3$ other than fluorine gas. Since the reaction with the fluorine radical source is extremely exothermic, the fluorine radical source may be diluted with an inert gas such as nitrogen.

The level of the fluorine radical source in the fluorine radical source/inert gas mixture can be 1 to 100 vol % but is preferably about 5 to about 25 vol % due to the high risk of operation with pure fluorine. In the case of fluorinated polymer resins with severe heat-induced discoloration, the fluorine radical source/inert gas mixture may be sufficiently diluted for preventing the overheating of fluorinated polymers and the risk of associated fire.

The heating and the fluorination may be performed in combination and may be performed simultaneously.

The compound represented by Formula (1) or (2) or the compound represented by Formula (7), which will be described below, is reduced by the fluorination.

The fluorination method is not limited and may be a conventionally known method. The fluorination temperature is preferably over 100° C. The fluorination temperature is more preferably 110° C. or more, further preferably 120° C. or more, furthermore preferably 130° C. or more, even more preferably 150° C. or more. Further, the fluorination temperature is particularly preferably 170° C. or more, further preferably 180° C. or more, furthermore preferably 200° C. or more, even more preferably 210° C. or more, particularly preferably 220° C. or more, most preferably 230° C. or more. Further, the fluorination temperature is preferably 310° C. or less, more preferably 300° C. or less, further preferably 290° C. or less, furthermore preferably 280° C. or less, even more preferably 270° C. or less, particularly preferably 250° C. or less, most preferably 240° C. or less.

The fluorination time is not limited but is, for example, 1 minute or more and 24 hours or less.

The amount of the fluorine radical source added in the fluorination is preferably 0.5 parts by weight or more, more preferably 0.8 parts by weight or more, further preferably 1.0 parts by weight or more, per 100 parts by weight of the PTFE as a raw material in terms of fluorine atoms. Further, the amount of the fluorine radical source added is more preferably 1.6 parts by weight or more, further preferably 2.0 parts by weight or more, furthermore preferably 2.5 parts by weight or more, particularly preferably 3.0 parts by weight or more, particularly preferably 5.0 parts by weight or more. Further, the amount of the fluorine radical source added is preferably 35.0 parts by weight or less, more preferably 26.0 parts by weight or less, further preferably 20.0 parts by weight or less, particularly preferably 15.0 parts by weight or less. An excessively small amount of the fluorine radical source added may result in insufficient removal or reduction of the compound represented by Formula (1) or (2). Further, the removal or reduction of compounds that cannot be identified may be insufficient. An excessively large amount of the fluorine radical source added does not improve the effects of fluorination and thus may be uneconomical.

All the combinations of the fluorination temperature and the content of the fluorine radical source in the aforementioned method for producing PTFE powder can be employed also in the fluorination in the method for producing a molded body.

Any reactor provided with a heating device and capable of making sufficient solid-gas contact can be used for fluorination without problems. Specifically, examples thereof include solid-gas contact reactors of fluidized bed type or shelf type.

The method for producing a molded body of the present invention needs only to comprise the removal step.

The method for producing a molded body of the present invention may further comprise step (1a) of mixing the PTFE powder obtained using a hydrocarbon surfactant with an extrusion aid, step (1b) of subjecting the mixture obtained to paste extrusion molding, step (1c) of drying the extrudate obtained by the extrusion molding, and step (1d) of obtaining a molded body by firing the extrudate after drying, in addition to the removal step. The removal step may be performed after step (1a) and before step (1b), after step (1b) and before step (1c), or after step (1d). In the case of performing heating as the removal step after step (1d), the heating temperature can be over 310° C. and is preferably 500° C. or less.

Further, the removal step may be performed during step (1b), step (1c), or step (1d). The removal step may be performed multiple times. The removal step may be performed twice, 3 times, 4 times, 5 times, 6 times, 7 times, 8 times, 9 times, or 10 times, for example. The heating and the fluorination may be performed in combination and may be performed simultaneously.

In this way, the removal step may remove or reduce the compound represented by Formula (1) or (2) from the PTFE powder obtained using a hydrocarbon surfactant or may remove or reduce the compound represented by Formula (1) or (2) from the molded body formed using the PTFE powder that is obtained using a hydrocarbon surfactant, in the method for producing a molded body of the present invention.

The paste extrusion molding can be performed by a conventionally known method, and the molding conditions can be selected corresponding to the desired shape and size. The paste extrusion molding can be performed while adding conventionally known additives such as pigments and fillers to the PTFE powder.

The method for producing a molded body of the present invention may further comprise step (2a) of mixing the PTFE powder obtained using a hydrocarbon surfactant with an extrusion aid, step (2b) of extruding and rolling the mixture obtained, step (2c) of drying the extrudate obtained by extruding and rolling, step (2d) of uniaxially stretching the extrudate after drying, step (2e) of biaxially stretching the uniaxially stretched material, step (2f) of firing the stretched material after biaxial stretching, and step (2g) of laminating the fired product to another material, in addition to the removal step. In this case, the removal step may be performed after step (2a) and before step (2b), after step (2b) and before step (2c), after step (2c) and before step (2d), after step (2d) and before step (2e), after step (2e) and before step (2f), or after step (2f) and before step (2g).

Further, the removal step may be performed during step (2a), (2b), (2c), (2d), (2e), (2f), or (2g). The removal step may be performed multiple times. The heating and the fluorination may be performed in combination or may be performed simultaneously.

The extrusion aid is not limited, and a generally known extrusion aid can be used. Examples thereof include hydrocarbon oils.

The method for producing a molded body of the present invention may comprise step of compression-molding the PTFE powder obtained using a hydrocarbon surfactant, in addition to the removal step. In such a case, the removal step may be performed during the compression-molding step or after the compression-molding step. The removal step may be performed multiple times. The heating and the fluorination may be performed in combination.

In the method for producing a molded body of the present invention, the removal step preferably removes 80 mass % or more, more preferably 85 mass % or more, further preferably 90 mass % or more, furthermore preferably 95 mass % or more, even more preferably 97 mass % or more, particularly preferably 98 mass % or more, most preferably 99 mass % or more, of the compounds represented by Formulas (1) and (2) between before and after the removal step.

The removal step preferably reduces the content of each of the compounds represented by Formulas (1) and (2) in the PTFE molded body to be obtained to 500 ppb or less, more preferably 200 ppb or less, further preferably 100 ppb or less, particularly preferably 50 ppb or less, most preferably 25 ppb or less, with respect to PTFE.

As described above, the fluorination at a specific temperature is one of the preferable embodiments of the method for removing or reducing the compound represented by Formula (1) or (2).

That is, the present invention is also a method for producing refined PTFE, the method comprising: removing or reducing a compound represented by Formula (1) or (2) below by bringing a fluorine radical source into contact with a PTFE obtained using a hydrocarbon surfactant at a temperature over 100° C.:

$$(H-(CF_2)_m-COO)_p M^1 \quad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or

$$(H-(CF_2)_n-SO_3)_q M^2 \quad \text{Formula (2):}$$

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The compound represented by Formula (1) or (2) can be efficiently removed by bringing the fluorine radical source into contact (fluorination) at a specific temperature as described above.

Further, the PTFE obtained using a hydrocarbon surfactant may contain impurities such as degradation products of materials used in the polymerization of the PTFE other than the compound represented by Formula (1) or (2) in some cases, but such impurities can also be removed by bringing the fluorine radical source into contact at a specific temperature as described above.

The temperature at which the fluorine radical source is brought into contact is over 100° C. The temperature at which the fluorine radical source is brought into contact can be adjusted by a conventionally known method and is preferably 110° C. or more, more preferably 120° C. or more, further preferably 130° C. or more, furthermore preferably 150° C. or more, even more preferably 170° C. or more, more preferably 180° C. or more, particularly preferably 200° C. or more. Further, the temperature is further preferably 210° C. or more, particularly preferably 220° C. or more, most preferably 230° C. or more. Further, the temperature is preferably 310° C. or less, more preferably 300° C. or less, further preferably 290° C. or less, furthermore preferably 280° C. or less, even more preferably 270° C. or less, particularly preferably 250° C. or less, most preferably 240° C. or less.

In this production method, all the amounts of the fluorine radical source added and all the combinations of temperature and amount added described above can be employed.

When bringing the fluorine radical source into contact in the method for producing refined PTFE, various fluorination conditions (such as the type of the fluorine radical source, the amount of the fluorine radical source added, and the timing and the number of times of fluorination) described in the method for producing refined PTFE powder and the method for producing a molded body can be appropriately employed. Further, in addition to the method of bringing the fluorine radical source into contact, the removal methods such as heating and washing with water or an organic solvent described in the removal step may be combined. In particular, a heating step may be performed after the step of bringing the fluorine radical source into contact to remove or reduce the compound represented by Formula (1) or (2). The heating step can further reduce the content of each of the compounds represented by Formulas (1) and (2). The heating step can also further reduce the content of the compound represented by Formula (7). The heating temperature and time falling within the aforementioned ranges can be employed in the heating step. In the method for producing refined PTFE, the PTFE obtained using a hydrocarbon surfactant may be in the form of powder or a molded body.

As described above, fluorination using a specific amount of the fluorine radical source is also one of the preferable embodiments of the method for removing or reducing the compound represented by Formula (1) or (2).

That is, the present invention is also a method for producing PTFE, the method comprising: removing or reducing a compound represented by Formula (1) or (2) below by bringing a PTFE obtained using a hydrocarbon surfactant into contact with a fluorine radical source, wherein the amount of the fluorine radical source added is 0.5 parts by weight or more per 100 parts by weight of PTFE in terms of fluorine atoms:

$$(H-(CF_2)_m-COO)_p M^1 \quad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; or

$$(H-(CF_2)_n-SO_3)_q M^2 \quad \text{Formula (2):}$$

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The compound represented by Formula (1) or (2) can be efficiently removed by bringing the fluorine radical source into contact (fluorination) in the specific amount added.

Further, the PTFE obtained using a hydrocarbon surfactant may contain impurities such as degradation products of materials used in the polymerization of the PTFE other than the compound represented by Formula (1) or (2) in some cases, but such impurities can also be removed by bringing the fluorine radical source into contact in the specific amount added.

The amount of the fluorine radical source added is 0.5 parts by weight or more per 100 parts by weight of the PTFE as a raw material in terms of fluorine atoms. The amount of the fluorine radical source added is preferably 0.8 parts by weight or more, more preferably 1.0 part by weight or more, further preferably 1.6 parts by weight or more, more preferably 2.0 parts by weight or more, further preferably 2.5 parts by weight or more, furthermore preferably, 3.0 parts by weight or more, particularly preferably 5.0 parts by weight or more. Further, the amount of the fluorine radical source added is preferably 35.0 parts by weight or less, more preferably 26.0 parts by weight or less, further preferably 20.0 parts by weight or less, particularly preferably 15.0 parts by weight or less. An excessively small amount of the fluorine radical source added may result in insufficient removal or reduction of the compound represented by Formula (1) or (2). Further, the removal or reduction of compounds that cannot be identified may be insufficient. An excessively large amount of the fluorine radical source added does not improve the effects of fluorination and thus tends to be uneconomical. In this production method, all the fluorination temperatures and all the combinations of the temperature and the amount added described above can be employed.

When bringing the fluorine radical source into contact in the method for producing refined PTFE, various conditions (such as the type of the fluorine radical source, the fluorination temperature, and the timing and the number of times of fluorination) described in the method for producing refined PTFE powder and the method for producing a molded body can be appropriately employed. Further, in addition to the method of bringing the fluorine radical source into contact, the removal methods such as heating and washing with water or an organic solvent described in the removal step may be combined. In particular, a heating step may be performed after the step of bringing the fluorine radical source into contact to remove or reduce the compound represented by Formula (1) or (2). The heating step can further reduce the content of each of the compounds represented by Formulas (1) and (2). The heating step can also further reduce the content of the compound represented by Formula (7). The heating temperature and the time falling within the aforementioned ranges can be employed in the heating step.

In the method for producing refined PTFE, the PTFE obtained using a hydrocarbon surfactant may be in the form of powder or a molded body.

Hereinafter, the hydrocarbon surfactant will be specifically described.

The hydrocarbon surfactant has a hydrophilic part and a hydrophobic part in the same molecule. These may be cationic, nonionic, or anionic.

A cationic surfactant generally has a positively charged hydrophilic part such as alkylated ammonium halides including alkylated ammonium bromide, and a hydrophobic part such as long-chain fatty acids.

An anionic surfactant generally has a hydrophilic part such as carboxylate, sulfonate, or sulfate, and a hydrophobic part composed of long-chain hydrocarbons such as alkyls.

A nonionic surfactant is generally free from charged groups and has a hydrophobic part composed of long-chain hydrocarbons. The hydrophilic part of the nonionic surfactant contains water-soluble functional groups such as ethylene ether chains derived from polymerization with ethylene oxide.

Examples of the nonionic hydrocarbon surfactant include polyoxyethylene alkyl ether, polyoxyethylene alkylphenyl ether, polyoxyethylene alkyl ester, sorbitan alkyl ester, polyoxyethylene sorbitan alkyl ester, glycerol ester, and derivatives thereof.

Specific examples of the polyoxyethylene alkyl ether include polyoxyethylene lauryl ether, polyoxyethylene cetyl ether, polyoxyethylene stearyl ether, polyoxyethylene oleyl ether, and polyoxyethylene behenyl ether.

Specific examples of the polyoxyethylene alkylphenyl ether include polyoxyethylene nonylphenyl ether and polyoxyethylene octylphenyl ether.

Specific examples of the polyoxyethylene alkyl ester include polyethylene glycol monolaurate, polyethylene glycol monooleate, and polyethylene glycol monostearate.

Specific examples of the sorbitan alkyl ester include polyoxyethylene sorbitan monolaurate, polyoxyethylene sorbitan monopalmitate, polyoxyethylene sorbitan monostearate, and polyoxyethylene sorbitan monooleate.

Specific examples of the polyoxyethylene sorbitan alkyl ester include polyoxyethylene sorbitan monolaurate, polyoxyethylene sorbitan monopalmitate, and polyoxyethylene sorbitan monostearate.

Specific examples of the glycerol ester include glycerol monomyristate, glycerol monostearate, and glycerol monooleate.

Specific examples of the derivatives include polyoxyethylene alkylamine, polyoxyethylene alkylphenyl-formaldehyde condensate, and polyoxyethylene alkyl ether phosphate.

Such ethers and esters may have an HLB value of 10 to 18.

Examples of the nonionic hydrocarbon surfactant include Triton®, Triton® X Series (such as X15, X45, and X100), Tergitol® 15-S Series, Tergitol® TMN Series (such as TMN-6, TMN-10, and TMN-100), and Tergitol® L Series, which are manufactured by Dow Chemical Company, and Pluronic® R Series (such as 31R1, 17R2, 10R5, and 25R4 (m up to 22 and n up to 23), T-Det Series (A138), and Iconol® TDA Series (such as TDA-6, TDA-9, and TDA-10), which are manufactured by BASF SE.

Examples of the anionic hydrocarbon surfactant include Versatic® 10, available from Resolution Performance Products, and Avanel S Series (such as S-70 and S-74), manufactured by BASF SE.

Examples of the hydrocarbon surfactant include an anionic surfactant represented by $R-L-M^1$, wherein R is a linear or branched alkyl group optionally having a substituent and having one or more carbon atoms or a cyclic alkyl group optionally having a substituent and having three or more carbon atoms and may contain a monovalent or divalent heterocycle or may form a ring in the case of having three or more carbon atoms, L is $—ArSO_3^-$, $—SO_3^-$, $—SO_4^-$, $—PO_3^-$, or $—COO^-$, $M^1$ is H, a metal atom, $NR^5{}_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and —$ArSO_3^-$ is aryl sulfonate.

Specifically, examples thereof include an anionic surfactant represented by $CH_3$—$(CH_2)_n$-L-$M^1$, wherein n is an integer of 6 to 17, and L and M are as described above.

An anionic surfactant mixture wherein R is an alkyl group having 12 to 16 carbon atoms, and L is sulfate or sodium dodecyl sulfate (SDS) also can be used.

Examples of the hydrocarbon surfactant also include an anionic surfactant represented by $R^6$ (-L-$M^1$)$_2$, wherein $R^6$ is a linear or branched alkylene group optionally having a substituent and having one or more carbon atoms or a cyclic alkylene group optionally having a substituent and having three or more carbon atoms and may contain a monovalent or divalent heterocycle or may form a ring in the case of having three or more carbon atoms, L is —$ArSO_3^-$, —$SO_3^-$, —$SO_4^-$, —$PO_3^-$, or —$COO^-$, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and —$ArSO_3^-$ is aryl sulfonate.

Examples of the hydrocarbon surfactant also include an anionic surfactant represented by $R^7$ (-L-$M^1$)$_3$, wherein $R^7$ is a linear or branched alkylidyne group optionally having a substituent and having one or more carbon atoms or a cyclic alkylidyne group optionally having a substituent and having three or more carbon atoms and may contain a monovalent or divalent heterocycle or may form a ring in the case of having three or more carbon atoms, L is —$ArSO_3^-$, —$SO_3^-$, —$SO_4^-$, —$PO_3^-$, or —$COO^-$, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and —$ArSO_3^-$ is aryl sulfonate.

An example of the siloxane hydrocarbon surfactant is described in Silicone Surfactants, R. M. Hill, Marcel Dekker, Inc., ISBN:0-8247-00104. The structure of the siloxane surfactant includes a clear hydrophobic part and a hydrophilic part. The hydrophobic part contains one or more dihydrocarbyl siloxane units, where the substituents on the silicone atom are completely hydrocarbons.

These siloxane surfactants can be regarded as hydrocarbon surfactants in the meaning that, when the carbon atoms of the hydrocarbyl group can be substituted with halogens such as fluorine, the carbon atoms are completely substituted with hydrogen atoms, that is, monovalent substituents on the carbon atoms of the hydrocarbyl group are hydrogens.

The hydrophilic part of such a siloxane surfactant may include one or more polar parts containing an ionic group such as sulfate, sulfonate, phosphonate, phosphate ester, carboxylate, carbonate, sulfosuccinate, taurate (as a free acid, a salt, or an ester), phosphine oxide, betaine, betaine copolyol, and quaternary ammonium salts. The ionic hydrophobic part can contain an ionically functionalized siloxane graft.

Examples of the siloxane surfactant include polydimethylsiloxane-graft-(meth)acrylates, polydimethylsiloxane-graft-polyacrylate salts, and polydimethylsiloxane-grafted quaternary amines.

The polar parts in the hydrophilic part of the siloxane surfactant can contain polyethers such as polyethylene oxide (PEO) and a mixture of polyethylene oxide and propylene oxide polyether (PEO/PPO); monosaccharides and disaccharides; and a non-ionic group formed by a water-soluble heterocycle such as pyrrolidinone. The ratio of ethylene oxide to propylene oxide (EO/PO) can be varied in the mixture of polyethylene oxide and propylene oxide polyether.

The hydrophilic part of the siloxane surfactant can include a combination of an ionic part and a nonionic part. Examples of such a part include ionically end-functionalized or randomly functionalized polyethers or polyols. A siloxane having a nonionic part, that is, a nonionic siloxane surfactant is preferable for implementing the present invention.

The hydrophobic and hydrophilic parts in the structure of the siloxane surfactant may be arranged in the form of a diblock polymer (AB), a triblock polymer (ABA) (where "B" represents a siloxane moiety in a molecule), or a multi-block polymer. Alternatively, the siloxane surfactant may contain a graft polymer.

The description of U.S. Pat. No. 6,841,616 also discloses a siloxane surfactant.

Examples of the siloxane-based anionic hydrocarbon surfactant include Noveon®, available from Lubrizol Advanced Materials, Inc., and SilSense™ PE-100 silicone and SilSense™ CA-1 silicone, which are available from Consumer Specialties.

Examples of the anionic hydrocarbon surfactant also include a sulfosuccinate surfactant, Lankropol® K8300, available from Akzo Nobel Surface Chemistry LLC.

Examples of the sulfosuccinate hydrocarbon surfactant include diisodecyl sodium sulfosuccinate (such as Emulsogen® SB10, available from Clariant AG) and diisotridecyl sodium sulfosuccinate (such as Polirol® TR/LNA, available from Cesalpinia Chemicals SpA).

Examples of the hydrocarbon surfactant also include PolyFox® surfactant (such as PolyFox™ PF-156A and PolyFox™ PF-136A), available from Omnova Solutions, Inc.

Examples of the hydrocarbon surfactant also include a surfactant represented by Formula (1) below (which will be hereinafter referred to as surfactant (1)):

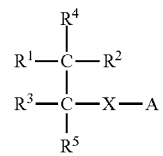

wherein $R^1$ to $R^5$ each represents H or a monovalent substituent, where at least one of $R^1$ and $R^3$ represents a group represented by formula: —Y—$R^6$, and at least one of $R^2$ and $R^5$ represents a group represented by formula: —X-A or a group represented by formula: —Y—$R^6$; X is the same or different at each occurrence and represents a divalent linking group or a bond; A is the same or different at each occurrence and represents —COOM, —$SO_3$M, or —$OSO_3$M (where M is H, a metal atom, $NR^7_4$, an imidazolium optionally having a substituent, a pyridinium optionally having a substituent, or a phosphonium optionally having a substituent, and $R^7$ is H or an organic group); Y is the same or different at each occurrence and represents a bond or a divalent linking group selected from the group consisting of —S(=O)$_2$—, —O—, —COO—, —OCO—, —CONR$^8$—, and —NR$^8$CO—; $R^8$ represents H or an organic group; $R^6$ is the same or different at each occurrence and represents an alkyl group having two or more carbon atoms and optionally containing at least one selected from the group consisting of a carbonyl group, an ester group, an amide group, and a sulfonyl group between carbon-carbon atoms; and any two of $R^1$ to $R^5$ may be bonded together to form a ring.

The surfactant (1) will be described.

In the formula, $R^1$ to $R^5$ each represents H or a monovalent substituent, where at least one of $R^1$ and $R^3$ represents a group represented by formula: —Y—$R^6$, and at least one of $R^2$ and $R^5$ represents a group represented by formula: —X-A or a group represented by formula: —Y—$R^6$. Any two of $R^1$ to $R^5$ may be bonded together to form a ring.

The substituent optionally contained in the alkyl group as $R^1$ is preferably a halogen atom, a linear or branched alkyl group having 1 to 10 carbon atoms or a cyclic alkyl group having 3 to 10 carbon atoms, or a hydroxy group, particularly preferably a methyl group or an ethyl group.

The alkyl group serving as $R^1$ is preferably free from carbonyl groups.

In the alkyl group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

$R^1$ is preferably a linear or branched alkyl group optionally having a substituent and having 1 to 10 carbon atoms or a cyclic alkyl group optionally having a substituent and having 3 to 10 carbon atoms, more preferably a linear or branched alkyl group free from carbonyl groups and having 1 to 10 carbon atoms or a cyclic alkyl group free from carbonyl groups and having 3 to 10 carbon atoms, further preferably a linear or branched alkyl group having no substituents and having 1 to 10 carbon atoms, furthermore preferably a linear or branched alkyl group having no substituents and having 1 to 3 carbon atoms, particularly preferably a methyl group (—$CH_3$) or an ethyl group (—$C_2H_5$), most preferably a methyl group (—$CH_3$).

The monovalent substituent is preferably a group represented by the formula: —Y—$R^6$, a group represented by the formula: —X-A, —H, a $C_{1-20}$ alkyl group optionally having a substituent, —$NH_2$, —$NHR^9$ (where $R^9$ is an organic group), —OH, —$COOR^9$ (where $R^9$ is an organic group), or —$OR^9$ (where $R^9$ is an organic group). The number of carbon atoms in the alkyl group is preferably 1 to 10.

$R^9$ is preferably a $C_{1-10}$ alkyl group or a $C_{1-10}$ alkylcarbonyl group, more preferably a $C_{1-4}$ alkyl group or a $C_{1-4}$ alkylcarbonyl group.

In the formula, X is the same or different at each occurrence and represents a divalent linking group or a bond.

When $R^6$ does not contain any one of carbonyl groups, ester groups, amide groups, and sulfonyl groups, X is preferably a divalent linking group containing at least one selected from the group consisting of carbonyl groups, ester groups, amide groups, and sulfonyl groups.

X is preferably a divalent linking group containing at least one bond selected from the group consisting of —CO—, —S(=O)$_2$—, —O—, —COO—, —OCO—, —S(=O)$_2$O—, —O—S(=O)$_2$—, —$CONR^8$—, and —$NR^8CO$—, a $C_{1-10}$ alkylene group, or a bond. $R^8$ represents H or an organic group.

$R^8$ is preferably H or a $C_{1-10}$ organic group, more preferably H or a $C_{1-4}$ organic group, further preferably H.

In the formula, A is the same or different at each occurrence and represents —COOM, —$SO_3M$, or —$OSO_3M$ (where M is H, a metal atom, $NR^7_4$, an imidazolium optionally having a substituent, a pyridinium optionally having a substituent, or a phosphonium optionally having a substituent, $R^7$s are each H or an organic group, and four $R^7$s may be the same as or different from each other).

$R^7$ is preferably H or a $C_{1-10}$ organic group, more preferably H or a $C_{1-4}$ organic group.

Examples of the metal atom include monovalent or divalent metal atoms such as alkali metals (Group 1) and alkaline earth metals (Group 2), and the metal atom is preferably Na, K, or Li.

M is preferably H, a metal atom, or $NR^7_4$, more preferably H, an alkali metal (Group 1), an alkaline earth metal (Group 2), or $NR^7_4$, further preferably H, Na, K, Li, or $NH_4$, furthermore preferably Na, K, or $NH_4$, particularly preferably Na or $NH_4$, most preferably $NH_4$.

In the formula, Y is the same or different at each occurrence and represents a divalent linking group selected from the group consisting of —S(=O)$_2$—, —O—, —COO—, —OCO—, —$CONR^8$—, and —$NR^8CO$—, or a bond, and $R^8$ represents H or an organic group.

Y is preferably a bond or a divalent linking group selected from the group consisting of —O—, —COO—, —OCO—, —$CONR^8$—, and —$NR^8CO$—, more preferably a bond or a divalent linking group selected from the group consisting of —COO— and —OCO—.

$R^8$ is preferably H or a $C_{1-10}$ organic group, more preferably H or a $C_{1-4}$ organic group, further preferably H.

In the formula, $R^6$ is the same or different at each occurrence and represents an alkyl group having two or more carbon atoms and optionally containing at least one selected from the group consisting of a carbonyl group, an ester group, an amide group, and a sulfonyl group between carbon-carbon atoms. The number of carbon atoms in the organic group in $R^6$ is preferably 2 to 20, more preferably 2 to 10.

The alkyl group in $R^6$ can contain one or two or more of at least one group selected from the group consisting of a carbonyl group, an ester group, an amide group, and a sulfonyl group between carbon-carbon atoms but does not contain such a group at the ends of the alkyl group. In the alkyl group in $R^6$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

$R^6$ is preferably
a group represented by the formula: —$R^{10}$—CO—$R^{11}$,
a group represented by the formula: —$R^{10}$—COO—$R^{11}$,
a group represented by the formula: —$R^{11}$,
a group represented by the formula: —$R^{10}$—$NR^8CO$—$R^{11}$, or
a group represented by the formula: —$R^{10}$—$CONR^8$—$R^{11}$, wherein $R^8$ represents H or an organic group, $R^{10}$ represents an alkylene group, and $R^{11}$ represents an alkyl group optionally having a substituent.

$R^6$ is more preferably a group represented by the formula: —$R^{10}$—CO—$R^{11}$.

$R^8$ is preferably H or a $C_{1-10}$ organic group, more preferably H or a $C_{1-4}$ organic group, further preferably H.

The number of carbon atoms in the alkylene group in $R^{10}$ is preferably one or more, more preferably three or more, and is preferably 20 or less, more preferably 12 or less, further preferably 10 or less, particularly preferably 8 or less. Further, the number of carbon atoms in the alkylene group in $R^{10}$ is preferably 1 to 20, more preferably 1 to 10, further preferably 3 to 10.

The number of carbon atoms in the alkyl group in $R^{11}$ may be 1 to 20 and is preferably 1 to 15, more preferably 1 to 12, further preferably 1 to 10, furthermore preferably 1 to 8, especially preferably 1 to 6, still furthermore preferably 1 to 3, particularly preferably 1 or 2, most preferably 1. Further, the alkyl group in $R^{11}$ preferably consists only of primary carbons, secondary carbons, and tertiary carbons, particularly preferably consists only of primary carbons and secondary carbons. That is, $R^{11}$ is preferably a methyl group, an ethyl group, a n-propyl group, or an isopropyl group, most preferably a methyl group.

The surfactant (1) is preferably a compound represented by Formula (1-1), a compound represented by Formula (1-2), or a compound represented by Formula (1-3), more preferably a compound represented by Formula (1-1) or a compound represented by Formula (1-2).

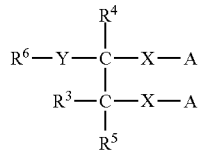

Formula (1-1)

wherein $R^3$ to $R^6$, X, A, and Y are defined as mentioned above.

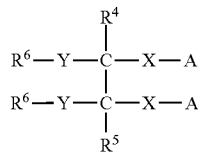

Formula (1-2)

wherein $R^4$ to $R^6$, X, A, and Y are defined as mentioned above.

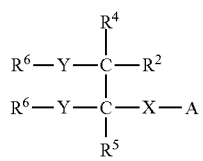

Formula (1-3)

wherein $R^2$, $R^4$ to $R^6$, X, A, and Y are defined as mentioned above.

The group represented by the formula: —X-A is preferably

—COOM,
—$R^{12}$COOM,
—SO$_3$M,
—OSO$_3$M,
—$R^{12}$SO$_3$M,
—$R^{12}$OSO$_3$M,
—OCO—$R^{12}$—COOM,
—OCO—$R^{12}$—SO$_3$M,
—OCO—$R^{12}$—OSO$_3$M
—COO—$R^{12}$—COOM,
—COO—$R^{12}$—SO$_3$M,
—COO—$R^{12}$—OSO$_3$M,
—CONR$^8$—$R^{12}$—COOM,
—CONR$^8$—$R^{12}$—SO$_3$M,
—CONR$^8$—$R^{12}$—OSO$_3$M,
—NR$^8$CO—$R^{12}$—COOM,
—NR$^8$CO—$R^{12}$—SO$_3$M,
—NR$^8$CO—$R^{12}$—OSO$_3$M,
—OS(=O)$_2$—$R^{12}$—COOM,
—OS(=O)$_2$—$R^{12}$—SO$_3$M, or
—OS(=O)$_2$—$R^{12}$—OSO$_3$M wherein $R^8$ and M are defined as mentioned above, and $R^{12}$ is a $C_{1-10}$ alkylene group.

In the alkylene group in $R^{12}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkylene group free from halogen atoms such as fluorine atoms and chlorine atoms.

The group represented by the formula: —Y—$R^6$ is preferably
a group represented by the formula: —$R^{10}$—CO—$R^{11}$,
a group represented by the formula: —OCO—$R^{10}$—CO—$R^{11}$,
a group represented by the formula: —COO—$R^{10}$—CO—$R^{11}$,
a group represented by the formula: —OCO—$R^{10}$—COO—$R^{11}$,
a group represented by a group represented by the formula: —COO—$R^{11}$,
a group represented by the formula: —NR$^8$CO—$R^{10}$—CO—$R^{11}$, or
a group represented by the formula: —CONR$^8$—$R^{10}$—NR$^8$CO—$R^{11}$, wherein $R^8$, $R^{10}$, and $R^{11}$ are defined as mentioned above.

In the formula, $R^4$ and $R^5$ are preferably each independently H or a $C_{1-4}$ alkyl group.

In the alkyl group in $R^4$ and $R^5$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

$R^3$ in Formula (1-1) is preferably H or a $C_{1-20}$ alkyl group optionally having a substituent, more preferably H or a $C_{1-20}$ alkyl group having no substituents, further preferably H.

In the alkyl group in $R^3$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

$R^2$ in Formula (1-3) is preferably H, OH, or a $C_{1-20}$ alkyl group optionally having a substituent, more preferably H, OH, or a $C_{1-20}$ alkyl group having no substituents, further preferably H or OH.

In the alkyl group in $R^2$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The surfactant (1) can be suitably produced by a production method including: step (11) of obtaining a carboxylic acid halide represented by the formula:

wherein $R^6$ is defined as mentioned above, and Z is a halogen atom, by reacting a carboxylic acid represented by the formula:

wherein $R^6$ is defined as mentioned above, with a halogenating agent; and step (12) of obtaining a compound (12) represented by the formula:

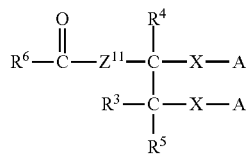

wherein $R^3$ to $R^6$, X, A, and $Z^{11}$ are defined as mentioned above, by reacting the carboxylic acid halide with a compound represented by the formula:

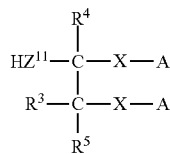

wherein $R^3$ to $R^5$, X, and A are defined as mentioned above, and $Z^{11}$ is —$CH_2O$—, —O—, or —NH—.

$R^3$ in the formula of the acid compound is preferably —H or a group represented by the formula: —$Z^{11}H$, wherein $Z^{11}$ is defined as mentioned above. When $R^3$ is a group represented by the formula: —$Z^{11}H$, this group reacts with the carboxylic acid halide in step (12), thereby generating a group represented by the formula: —$Z^{11}$—CO—$R^6$, wherein $R^6$ and $Z^{11}$ are defined as mentioned above.

Examples of the halogenating agent to be used in step (11) include oxalyl chloride, thionyl chloride, diethylaminosulfur trifluoride (DAST), Deoxo-Fluor (deoxyfluoro), and 1,1,2,2-tetrafluoro-N,N-dimethylethylamine (TFEDMA).

Z is preferably F or Cl, more preferably Cl.

For a reaction ratio of the carboxylic acid with the halogenating agent in step (11), the amount of the halogenating agent is preferably 0.6 to 5.0 mol, more preferably 0.8 to 2.0 mol, relative to 1 mol of the carboxylic acid, in consideration of yield improvement and waste reduction. Further, the amount is preferably 0.5 to 10 mol, more preferably 0.6 to 5.0 mol.

The reaction in step (11) can be performed in a solvent. Examples of the solvent include esters, ketones, aromatic hydrocarbons, ethers, nitrogen-containing polar organic compounds, halogenated hydrocarbons, nitriles, pyridines, or mixtures thereof.

Examples of the esters include ethyl acetate, butyl acetate, ethylene glycol monomethyl ether acetate, and propylene glycol monomethyl ether acetate (PGMEA, also known as 1-methoxy-2-acetoxypropane). Among these, ethyl acetate is preferable.

Examples of the ketones include acetone, methyl ethyl ketone, methyl isobutyl ketone, cyclohexanone, and diacetone alcohol. Among these, acetone is preferable.

Examples of the aromatic hydrocarbons include benzene, toluene, and xylenes. Among these, benzene and toluene are preferable.

Examples of the ethers include diethyl ether, tetrahydrofuran, dioxane, and diethylene glycol diethyl ether. Among these, diethyl ether and tetrahydrofuran are preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

Examples of the halogenated hydrocarbons include dichloromethane, dichloroethane, chloroform, chlorobenzene, and o-dichlorobenzene. Among these, dichloromethane and chloroform are preferable.

Examples of the nitriles include acetonitrile, propionitrile, butyronitrile, isobutyronitrile, and benzonitrile. Among these, acetonitrile is preferable.

The reaction temperature in step (11) is preferably 0 to 150° C., more preferably 20 to 100° C. Further, the reaction temperature is preferably –78 to 150° C., more preferably 0 to 100° C.

The reaction pressure in step (11) is preferably 0 to 5 MPa, more preferably 0.1 to 1.0 MPa.

The reaction time in step (11) is preferably 0.1 to 72 hours, more preferably 0.1 to 48 hours.

For a reaction ratio of the carboxylic acid halide with the acid compound in step (12), the amount of the acid compound is preferably 0.5 to 10 mol, more preferably 0.6 to 5.0 mol, further preferably 0.8 to 2.0 mol, relative to 1 mol of the carboxylic acid halide, in consideration of yield improvement and waste reduction.

The reaction in step (12) is preferably carried out in the presence of an acid. Examples of the acid include sulfuric acid, methanesulfonic acid, and p-toluenesulfonic acid. Among these, sulfuric acid is preferable.

The amount of the acid used in step (12) is preferably 0.00001 to 1.0 mol, more preferably 0.0001 to 1.0 mol, further preferably 0.00005 to 0.1 mol, particularly preferably 0.001 to 0.1 mol, relative to 1 mol of the carboxylic acid halide, in consideration of yield improvement and waste reduction.

The reaction temperature in step (12) is preferably 0 to 150° C., more preferably 20 to 100° C.

The reaction pressure in step (12) is preferably 0 to 5 MPa, more preferably 0.1 to 1.0 MPa.

The reaction time in step (12) is preferably 0.1 to 72 hours, more preferably 0.1 to 48 hours.

The surfactant (1) can be suitably produced also by a production method including: step (21) of obtaining a compound (21) represented by the formula:

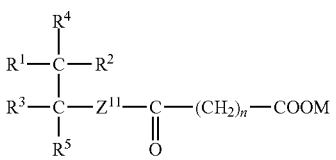

wherein $R^1$ to $R^5$, $Z^{11}$, M, and n are defined as mentioned above, by reacting a compound (20) represented by the formula:

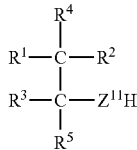

wherein $R^1$ to $R^5$ are defined as mentioned above, $Z^{11}$ is —CH$_2$O—, —O—, or —NH—, with an acid anhydride represented by the formula:

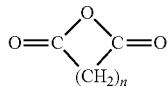

wherein n is an integer of 1 to 5.

$R^2$ in the formula of the compound (20) is preferably —H or a group represented by the formula: —$Z^{11}$H, wherein $Z^{11}$ is defined as mentioned above. When $R^2$ is a group represented by the formula: —$Z^{11}$H, this group reacts with the acid anhydride in step (21), thereby generating a group represented by the formula: —$Z^{11}$—CO—(CH$_2$)$_n$—COOM, wherein $Z^{11}$, M, and n are defined as mentioned above. The compound (20) may be hydrochloride, sulfate, or the like as long as it has a structure represented by the formula.

For a reaction ratio of the compound (20) with the acid anhydride in step (21), the amount of the acid anhydride is preferably 0.5 to 10 mol, more preferably 0.6 to 5.0 mol, further preferably 1.2 to 10 mol, particularly preferably 1.6 to 4.0 mol, relative to 1 mol of the compound (20), in consideration of yield improvement and waste reduction.

The reaction in step (21) can be performed in the presence of a base.

Examples of the base include amines, potassium hydroxides, sodium hydroxides, and potassium carbonates.

Examples of the amines include tertiary amines such as trimethylamine, triethylamine, tributylamine, N,N-dimethylaniline, dimethylbenzylamine, and N,N,N',N'-tetramethyl-1,8-naphthalene diamine, complex aromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Among these, pyridine or triethylamine is preferable.

The reaction temperature in step (21) is preferably 0 to 150° C., more preferably 20 to 80° C. Further, the reaction temperature is preferably −78 to 150° C., more preferably 0 to 100° C.

The reaction pressure in step (21) is preferably 0 to 5 MPa, more preferably 0.1 to 1 MPa.

The reaction time in step (21) is preferably 0.1 to 72 hours, more preferably 0.1 to 48 hours.

The surfactant (1) can be suitably produced also by a production method including: step (31) of obtaining a compound (31) represented by the formula:

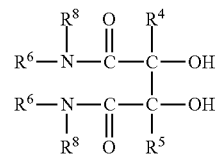

wherein $R^4$ to $R^6$ and $R^8$ are defined as mentioned above, by reacting a tartaric acid ester represented by the formula:

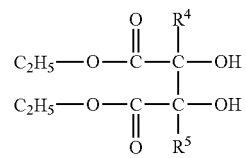

wherein $R^4$ and $R^5$ are defined as mentioned above, with an amine represented by the formula:

wherein $R^6$ and $R^8$ are defined as mentioned above; and step (32) of obtaining a compound (32) represented by the formula:

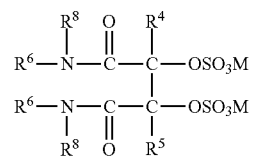

wherein $R^4$ to $R^6$, $R^8$, and M are defined as mentioned above, by reacting the compound (31) with a chlorosulfonic acid represented by the formula:

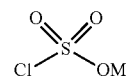

wherein M is defined as mentioned above.

For a reaction ratio of the tartaric acid ester with the amine in step (31), the amount of the amine is preferably 0.5 to 10 mol, more preferably 0.6 to 5.0 mol, further preferably 1.2 to 5 mol, particularly preferably 1.6 to 5.0 mol, relative to 1 mol of the tartaric acid ester, in consideration of yield improvement and waste reduction.

The reaction in step (31) can be performed in a solvent. The solvent is preferably an organic solvent, further preferably an alcohol, an ether, a halogenated hydrocarbon, a nitrogen-containing polar organic compound, or a nitrile.

Examples of the alcohol include methanol, ethanol, 1-propanol, and isopropanol.

Examples of the ether include tetrahydrofuran, dioxane, and diethylene glycol diethyl ether.

Examples of the halogenated hydrocarbon include dichloromethane, dichloroethane, chloroform, chlorobenzene, and o-dichlorobenzene.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone. Among these, N,N- dimethylformamide, N,N-dimethylacetamide, and N-methyl-2-pyrrolidone are preferable.

Examples of the nitrile include acetonitrile, propionitrile, butyronitrile, isobutyronitrile, and benzonitrile.

The reaction temperature in step (31) is preferably 0 to 150° C., more preferably 20 to 100° C.

The reaction pressure in step (31) is preferably 0 to 5 MPa, more preferably 0.1 to 1 MPa.

The reaction time in step (31) is preferably 0.1 to 72 hours, more preferably 0.1 to 48 hours.

For a reaction ratio of the compound (31) with the chlorosulfonic acid in step (32), the amount of the chlorosulfonic acid is preferably 1.0 to 50 mol, more preferably 1.6 to 20 mol, relative to 1 mol of the compound (31), in consideration of yield improvement and waste reduction.

The reaction in step (32) is preferably carried out in the presence of a base. Examples of the base include alkali metal hydroxides, alkaline earth metal hydroxides, and amines. Among these, amines are preferable.

Examples of the amines in step (32) include tertiary amines such as trimethylamine, triethylamine, tributylamine, N,N-dimethylaniline, dimethylbenzylamine, and N,N,N',N'-tetramethyl-1,8-naphthalene diamine, complex aromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Among these, triethylamine is preferable.

The amount of the base used in step (32) is preferably 0.1 to 50 mol, more preferably 1.0 to 20 mol, relative to 1 mol of the compound (31), in consideration of yield improvement and waste reduction.

The reaction in step (32) can be performed in a solvent. The solvent is preferably an organic solvent, more preferably a polar aprotic solvent, further preferably a nitrile, a halogenated hydrocarbon, a dimethylsulfoxide, a sulfolane, a nitrogen-containing polar organic compound, or an ether.

Examples of the nitrile include acetonitrile, propionitrile, butyronitrile, isobutyronitrile, and benzonitrile. Among these, acetonitrile is preferable.

Examples of the halogenated hydrocarbon include dichloromethane, dichloroethane, chloroform, chlorobenzene, and o-dichlorobenzene. Among these, dichloromethane and chloroform are preferable.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

Examples of the ether include diethyl ether, tetrahydrofuran, dioxane, and diethylene glycol diethyl ether. Among these, diethyl ether is preferable.

The reaction temperature in step (32) is preferably −78 to 150° C., more preferably −78 to 100° C., further preferably −20 to 100° C., particularly preferably 10 to 50° C.

The reaction pressure in step (32) is preferably 0 to 5 MPa, more preferably 0.1 to 1.0 Pa.

The reaction time in step (32) is preferably 0.1 to 72 hours, more preferably 0.1 to 48 hours.

The surfactant (1) can be suitably produced also by a production method including: step (41) of obtaining a compound (41) represented by the formula:

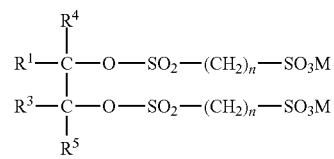

wherein $R^1$, $R^3$ to $R^5$, M, and n are defined as mentioned above, by reacting an alcohol represented by the formula:

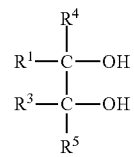

wherein $R^1$ and $R^3$ to $R^5$ are defined as mentioned above, with an acid anhydride represented by the formula:

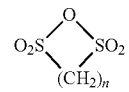

wherein n is an integer of 1 to 5.

For a reaction ratio of the alcohol with the acid anhydride in step (41), the amount of the acid anhydride is preferably 0.5 to 10 mol, more preferably 0.6 to 4.0 mol, further preferably 1.2 to 4.0 mol, particularly preferably 1.6 to 4.0 mol, relative to 1 mol of the alcohol, in consideration of yield improvement and waste reduction.

The reaction in step (41) can be performed in the presence of a base.

Examples of the base include amines, potassium hydroxides, sodium hydroxides, and potassium carbonates.

Examples of the amines include tertiary amines such as trimethylamine, triethylamine, tributylamine, N,N-dimethylaniline, dimethylbenzylamine, and N,N,N',N'-tetramethyl-1,8-naphthalene diamine, complex aromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Among these, pyridine or triethylamine is preferable.

The reaction temperature in step (41) is preferably −78 to 150° C., more preferably 0 to 150° C., further preferably 0 to 100° C., particularly preferably 20 to 80° C.

The reaction pressure in step (41) is preferably 0 to 5 MPa, more preferably 0.1 to 1 MPa.

The reaction time in step (41) is preferably 0.1 to 72 hours, more preferably 0.1 to 48 hours.

The surfactant (1) can be suitably produced also by a production method including: step (31) of obtaining the compound (31) represented by the formula:

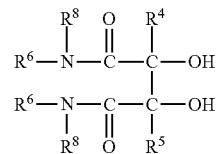

wherein $R^4$ to $R^6$ and $R^8$ are defined as mentioned above, by reacting a tartaric acid ester represented by the formula:

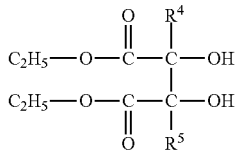

wherein $R^4$ and $R^5$ are defined as mentioned above, with an amine represented by the formula:

wherein $R^6$ and $R^8$ are defined as mentioned above; and step (51) of obtaining a compound (51) represented by the formula:

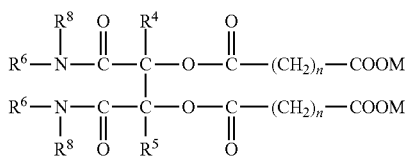

wherein $R^4$ to $R^6$, $R^1$, M, and n are defined as mentioned above, by reacting the compound (31) with an acid anhydride represented by the formula:

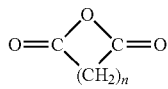

wherein n is an integer of 1 to 5.

For a reaction ratio of the compound (31) with the acid anhydride in step (51), the amount of the acid anhydride is preferably 0.5 to 10 mol, more preferably 0.6 to 4.0 mol, further preferably 1.2 to 4.0 mol, particularly preferably 1.6 to 4.0 mol, relative to 1 mol of the compound (31), in consideration of yield improvement and waste reduction.

The reaction in step (51) can be performed in the presence of a base.

Examples of the base include amines, potassium hydroxides, sodium hydroxides, and potassium carbonates.

Examples of the amines include tertiary amines such as trimethylamine, triethylamine, tributylamine, N,N-dimethylaniline, dimethylbenzylamine, and N,N,N',N'-tetramethyl-1,8-naphthalene diamine, complex aromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Among these, pyridine or triethylamine is preferable.

The reaction temperature in step (51) is preferably −78 to 150° C., more preferably 0 to 150° C., further preferably 0 to 100° C., particularly preferably 20 to 80° C.

The reaction pressure in step (51) is preferably 0 to 5 MPa, more preferably 0.1 to 1 MPa.

The reaction time in step (51) is preferably 0.1 to 72 hours, more preferably 0.1 to 48 hours.

The surfactant (1) can be suitably produced also by a production method including: step (61) of obtaining a compound (61) represented by the formula:

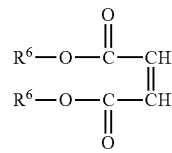

wherein $R^6$ is defined as mentioned above, by reacting an alcohol represented by the formula:

wherein $R^6$ is defined as mentioned above, with a fumarate halide; and step (62) of obtaining a compound (62) represented by the formula:

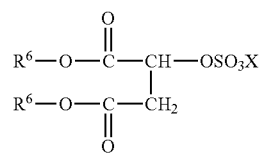

wherein $R^6$ and X are defined as mentioned above, by reacting the compound (61) with a sulfonating agent such as sodium bisulfite.

Examples of the fumarate halide to be used in step (61) include fumaryl chloride, fumaryl fluoride, and fumaryl bromide.

For a reaction ratio of the alcohol with the fumarate halide in step (61), the amount of the fumarate halide is preferably 0.1 to 10 mol, more preferably 0.1 to 2.0 mol, further preferably 0.1 to 2.0 mol, particularly preferably 0.2 to 0.7 mol, relative to 1 mol of the alcohol, in consideration of yield improvement and waste reduction.

The reaction in step (61) can be performed in a solvent. Examples of the solvent include esters, ketones, aromatic hydrocarbons, ethers, nitrogen-containing polar organic compounds, halogenated hydrocarbons, nitriles, pyridines, or mixtures thereof.

Examples of the esters include ethyl acetate, butyl acetate, ethylene glycol monomethyl ether acetate, and propylene glycol monomethyl ether acetate (PGMEA, also known as 1-methoxy-2-acetoxypropane). Among these, ethyl acetate is preferable.

Examples of the ketones include acetone, methyl ethyl ketone, methyl isobutyl ketone, cyclohexanone, and diacetone alcohol. Among these, acetone is preferable.

Examples of the aromatic hydrocarbons include benzene, toluene, and xylenes. Among these, benzene and toluene are preferable.

Examples of the ethers include diethyl ether, tetrahydrofuran, dioxane, and diethylene glycol diethyl ether. Among these, diethyl ether and tetrahydrofuran are preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

Examples of the halogenated hydrocarbons include dichloromethane, dichloroethane, chloroform, chlorobenzene, and o-dichlorobenzene. Among these, dichloromethane and chloroform are preferable.

Examples of the nitriles include acetonitrile, propionitrile, butyronitrile, isobutyronitrile, and benzonitrile. Among these, acetonitrile is preferable.

The reaction temperature in step (61) is preferably −78 to 200° C., more preferably −20 to 150° C.

The reaction pressure in step (61) is preferably 0 to 5.0 MPa, more preferably 0.1 to 1.0 MPa.

The reaction time in step (61) is preferably 0.1 to 72 hours, more preferably 0.1 to 48 hours.

In step (62), the compound (62) is generated by an addition reaction of the compound (61) having a double bond with the sulfonating agent such as sodium bisulfite.

For a reaction ratio of the compound (61) with the sulfonating agent in step (62), the amount of the sulfonating agent is preferably 0.5 to 20.0 mol, more preferably 0.6 to 10.0 mol, further preferably 0.8 to 10.0 mol, particularly preferably 1.2 to 10.0 mol, relative to 1 mol of the compound (61), in consideration of yield improvement and waste reduction.

The step (62) can be performed in a solvent. The solvent is preferably a water-soluble solvent, and examples thereof include water, alcohols, ethers, and nitriles.

Examples of the alcohol include methanol, ethanol, 1-propanol, and isopropanol.

Examples of the ether include tetrahydrofuran, dioxane, and diethylene glycol diethyl ether.

Examples of the nitriles include acetonitrile, propionitrile, butyronitrile, isobutyronitrile, and benzonitrile. Among these, acetonitrile is preferable.

The reaction temperature in step (62) is preferably −78 to 200° C., more preferably −20 to 150° C.

The reaction pressure in step (62) is preferably 0 to 5.0 MPa, more preferably 0.1 to 1.0 MPa.

The reaction time in step (62) is preferably 0.1 to 72 hours, more preferably 0.1 to 48 hours.

The surfactant (1) can be suitably produced also by a production method including: step (71) of obtaining a compound (71) represented by the formula:

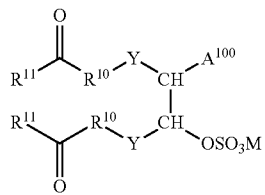

wherein $R^{10}$, $R^{11}$, and Y are defined as mentioned above, $A^{100}$ is —OH or —OSO$_3$M, and M is defined as mentioned above, by sulfate esterification of a compound (70) represented by the formula:

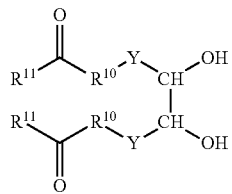

wherein $R^{10}$, $R^{11}$, and Y are defined as mentioned above.

The sulfate esterification in step (71) can be performed by reacting the compound (70) with a sulfating reagent.

Examples of the sulfating reagent include sulfur trioxide amine complexes such as sulfur trioxide pyridine complex, sulfur trioxide trimethylamine complex, and sulfur trioxide triethylamine complex, sulfur trioxide amide complexes such as sulfur trioxide dimethylformamide complex, sulfuric acid-dicyclohexylcarbodiimide, chlorosulfuric acid, concentrated sulfuric acid, and sulfamic acid. The amount of the sulfating reagent used is preferably 0.5 to 10 mol, more preferably 0.5 to 5 mol, further preferably 0.7 to 4 mol, relative to 1 mol of the compound (70). Adjusting the amount of the sulfating reagent used causes sulfate esterification of one or both of the two —OH groups contained in the compound (20).

The sulfate esterification in step (71) can be performed in a solvent. The solvent is preferably an organic solvent, and examples thereof include ethers, halogenated hydrocarbons, aromatic hydrocarbons, pyridines, dimethylsulfoxides, sulfolanes, and nitriles.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

The sulfate esterification temperature in step (71) is preferably −78 to 200° C., more preferably −20 to 150° C.

The sulfate esterification pressure in step (71) is preferably 0 to 10 MPa, more preferably 0.1 to 5 MPa.

The sulfate esterification time in step (71) is preferably 0.1 to 72 hours, more preferably 0.1 to 48 hours.

The compound (70) can be produced also by a production method including: step (101) of obtaining a compound (101) represented by the formula:

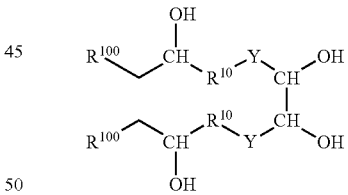

wherein $R^{10}$, $R^{100}$, and Y are defined as mentioned above, by hydroxylating a compound (100) represented by the formula:

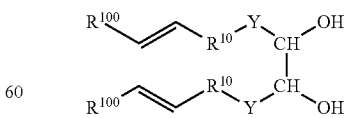

wherein $R^{10}$ and Y are defined as mentioned above, and $R^{100}$ is an alkyl group; and step (102) of obtaining the compound (70) by oxidizing the compound (101).

The alkyl group serving as $R^{100}$ forms $R^{11}$ above in the form of $R^{100}$—CH$_2$—.

The hydroxylation in step (101) can be performed, for example, by a method (1) of allowing iron (II) phthalocyanine (Fe(Pc)) and sodium borohydride to act on the compound (100) in an oxygen atmosphere, or a method (2) of allowing isopinocampheylborane (IpcBH$_2$) to act on the compound (100), followed by oxidizing an intermediate (dialkylborane) to be obtained.

In the method (1), the iron (II) phthalocyanine can be used in an amount equal to that of catalyst, such as an amount of 0.001 to 1.2 mol, relative to 1 mol of the compound (100).

In the method (1), sodium borohydride can be used in an amount of 0.5 to 20 mol, relative to 1 mol of the compound (100).

The reaction in the method (1) can be performed in a solvent. The solvent is preferably an organic solvent, and examples thereof include ethers, halogenated hydrocarbons, aromatic hydrocarbons, nitriles, and nitrogen-containing polar organic compounds.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

The reaction temperature in the method (1) is preferably −78 to 200° C., more preferably 0 to 150° C.

The reaction pressure in the method (1) is preferably 0 to 5.0 MPa, more preferably 0.1 to 1.0 MPa.

The reaction time in the method (1) is preferably 0.1 to 72 hours, more preferably 0.1 to 48 hours.

In the method (2), isopinocampheylborane can be used in an amount of 0.1 to 10.0 mol, relative to 1 mol of the compound (100).

The reaction of the compound (100) with isopinocampheylborane can be performed in a solvent. The solvent is preferably an organic solvent, and examples thereof include ethers, halogenated hydrocarbons, and aromatic hydrocarbons.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The reaction temperature of the compound (100) with isopinocampheylborane is preferably −78 to 200° C., more preferably 0 to 150° C.

The reaction pressure of the compound (100) with isopinocampheylborane is preferably 0 to 5.0 MPa, more preferably 0.1 to 1.0 MPa.

The reaction time of the compound (100) with isopinocampheylborane is preferably 0.1 to 72 hours, more preferably 0.1 to 48 hours.

The oxidation in the method (2) can be performed by allowing an oxidant to act on the intermediate. Examples of the oxidant include hydrogen peroxide. The oxidant can be used in an amount of 0.7 to 10 mol relative to 1 mol of the intermediate.

The oxidation in the method (2) can be performed in a solvent. Examples of the solvent include water, methanol, and ethanol. Among these, water is preferable.

The oxidation temperature in the method (2) is preferably −78 to 150° C., more preferably 0 to 100° C., further preferably 10 to 80° C.

The oxidation pressure in the method (2) is preferably 0 to 5.0 MPa, more preferably 0.1 to 1.0 MPa.

The oxidation time in the method (2) is preferably 0.1 to 72 hours, more preferably 0.1 to 48 hours.

Examples of the method for oxidizing the compound (101) in step (102) include a method (a) of using Jones reagent (CrO$_3$/H$_2$SO$_4$) (Jones oxidation), a method (b) of using Dess-Martin Periodinane (DMP) (Dess-Martin oxidation), a method (c) of using pyridinium chlorochromate (PCC), a method (d) of allowing a bleach (about 5 to 6% NaOCl aqueous solution) to act in the presence of a nickel compound such as NiCl$_2$, and a method (e) of allowing a hydrogen receptor such as an aldehyde and a ketone to act in the presence of an aluminum catalyst such as Al(CH$_3$)$_3$ and Al[OCH(CH$_3$)$_2$]$_3$ (Oppenauer oxidation).

The oxidation in step (102) can be performed in a solvent. As the solvent, water and an organic solvent are preferable, and examples thereof include water, ketones, ethers, halogenated hydrocarbons, aromatic hydrocarbons, and nitriles.

Examples of the ketones include acetone, methyl ethyl ketone, methyl isobutyl ketone, cyclohexanone, and diacetone alcohol. Among these, acetone is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

The oxidation temperature in step (102) is preferably −78 to 200° C. and can be appropriately selected corresponding to the method employed.

The oxidation pressure in step (102) is preferably 0 to 5.0 MPa and can be appropriately selected corresponding to the method employed.

The oxidation time in step (102) is preferably 0.1 to 72 hours and can be appropriately selected corresponding to the method employed.

The compound (70) can be produced also by a production method including: step (201) of obtaining the compound (70) by ozonolysis of a compound (200) represented by the formula:

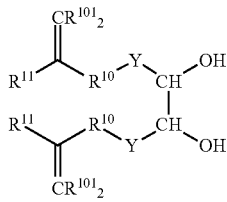

wherein $R^{10}$, $R^{11}$, and Y are defined as mentioned above, and $R^{101}$ is an organic group.

$R^{101}$s are each preferably an alkyl group having 1 to 20 carbon atoms. Four $R^{101}$s may be the same as or different from each other.

The ozonolysis in step (201) can be performed by allowing ozone to act on the compound (200), followed by post-treatment with a reductant.

The ozone can be generated by silent discharge in oxygen gas.

Examples of the reductant to be used for the post-treatment include zinc, dimethyl sulfide, thiourea, phosphines. Among these, phosphines are preferable.

The ozonolysis in step (201) can be performed in a solvent. The solvent is preferably water or an organic solvent. Examples thereof include water, alcohols, carboxylic acids, ethers, halogenated hydrocarbons, and aromatic hydrocarbons.

Examples of the alcohols include methanol, ethanol, 1-propanol, and isopropanol. Among these, methanol and ethanol are preferable.

Examples of the carboxylic acids include acetic acid and propionic acid. Among these, acetic acid is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The ozonolysis temperature in step (201) is preferably −78 to 200° C., more preferably 0 to 150° C.

The ozonolysis pressure in step (201) is preferably 0 to 5.0 MPa, more preferably 0.1 to 1.0 MPa.

The ozonolysis time in step (201) is preferably 0.1 to 72 hours, more preferably 0.1 to 48 hours.

The compound (70) can be produced also by a production method including: step (301) of obtaining a compound (301) represented by the formula:

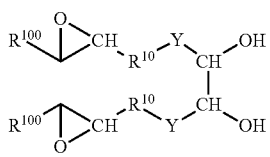

wherein $R^{10}$, $R^{100}$, and Y are defined as mentioned above, by epoxidizing a compound (300) represented by the formula:

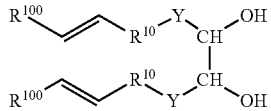

wherein $R^{10}$ and Y are defined as mentioned above, and $R^{100}$ is an alkyl group; step (302) of obtaining a compound (302) represented by the formula:

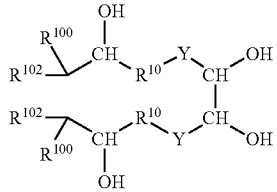

wherein $R^{10}$, $R^{100}$, $R^{102}$, and Y are defined as mentioned above, by reacting the compound (301) with a dialkylcopper lithium represented by:

wherein $R^{102}$ is an alkyl group; and step (303) of obtaining the compound (70) by oxidizing the compound (302).

The alkyl groups serving as $R^{100}$ and $R^{102}$ form $R^{11}$ above in the form of $R^{100}R^{102}$—CH—.

Two $R^{100}$s may be the same as or different from each other. Two $R^{102}$s may be the same as or different from each other.

The epoxidation in step (301) can be performed by allowing an epoxidizing agent to act on the compound (300).

Examples of the epoxidizing agent include peracids such as metachloroperbenzoic acid (m-CPBA), perbenzoic acid, hydrogen peroxide, and tert-butyl hydroperoxide, dimethyldioxirane, and methyltrifluoromethyldioxirane. Among these, peracids are preferable, and metachloroperbenzoic acid is more preferable.

The epoxidizing agent can be used in an amount of 0.5 to 10.0 mol relative to 1 mol of the compound (300).

The epoxidation in step (301) can be performed in a solvent. The solvent is preferably an organic solvent, and examples thereof include ketones, ethers, halogenated hydrocarbons, aromatic hydrocarbons, nitriles, pyridines, nitrogen-containing polar organic compounds, and dimethylsulfoxides. Among these dichloromethane is preferable.

Examples of the ketones include acetone, methyl ethyl ketone, methyl isobutyl ketone, cyclohexanone, and diacetone alcohol. Among these, acetone is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

Examples of the nitrogen-containing polar organic compounds include N,N-dimethylformamide, N,N-dimethylacetamide, N-methyl-2-pyrrolidone, 2-pyrrolidone, and 1,3- dimethyl-2-imidazolidinone. Among these, N,N-dimethylformamide, N,N-dimethylacetamide, and N-methyl-2-pyrrolidone are preferable.

The epoxidation temperature in step (301) is preferably −78 to 200° C., more preferably −40 to 150° C.

The epoxidation pressure in step (301) is preferably 0 to 5.0 MPa, more preferably 0.1 to 1.0 MPa.

The epoxidation time in step (301) is preferably 0.1 to 72 hours, more preferably 0.1 to 48 hours.

The dialkylcopper lithium can be used in step (302) in an amount of 0.5 to 10.0 mol relative to 1 mol of the compound (301).

The reaction in step (302) can be performed in a solvent. The solvent is preferably an organic solvent, and examples thereof include ethers, halogenated hydrocarbons, and aromatic hydrocarbons.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The reaction temperature in step (302) is preferably −78 to 200° C., more preferably −40 to 150° C.

The reaction pressure in step (302) is preferably 0 to 5.0 MPa, more preferably 0.1 to 1.0 MPa.

The reaction time in step (302) is preferably 0.1 to 72 hours, more preferably 0.1 to 48 hours.

Examples of the method for oxidizing the compound (302) in step (303) include a method (a) of using Jones reagent ($CrO_3/H_2SO_4$) (Jones oxidation), a method (b) of using Dess-Martin Periodinane (DMP) (Dess-Martin oxidation), a method (c) of using pyridinium chlorochromate (PCC), a method (d) of allowing a bleach (about 5 to 6% NaOCl aqueous solution) to act in the presence of a nickel compound such as $NiCl_2$, and a method (e) of allowing a hydrogen receptor such as an aldehyde and a ketone to act in the presence of an aluminum catalyst such as $Al(CH_3)_3$ and $Al[OCH(CH_3)_2]_3$ (Oppenauer oxidation).

The oxidation in step (303) can be performed in a solvent. As the solvent, water and an organic solvent are preferable, and examples thereof include water, ketones, alcohols, ethers, halogenated hydrocarbons, aromatic hydrocarbons, and nitriles.

Examples of the ketones include acetone, methyl ethyl ketone, methyl isobutyl ketone, cyclohexanone, and diacetone alcohol. Among these, acetone is preferable.

Examples of the alcohols include methanol, ethanol, 1-propanol, and isopropanol. Among these, methanol and ethanol are preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

The oxidation temperature in step (303) is preferably −78 to 200° C. and can be appropriately selected corresponding to the method employed.

The oxidation pressure in step (303) is preferably 0 to 5.0 MPa and can be appropriately selected corresponding to the method employed.

The oxidation time in step (303) is preferably 0.1 to 72 hours and can be appropriately selected corresponding to the method employed.

The compound (70) can be produced also by a production method including: step (401) of obtaining the compound (70) by oxidizing a compound (400) represented by the formula:

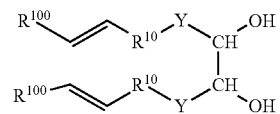

wherein $R^{10}$ and Y are defined as mentioned above, and $R^{100}$ is an alkyl group.

The oxidation in step (401) can be performed by allowing an oxidant to act on the compound (400) in the presence of water and a palladium compound.

Examples of the oxidant include monovalent or divalent copper salts such as copper chloride, copper acetate, copper cyanide, and copper trifluoromethanethiol, iron salts such as iron chloride, iron acetate, iron cyanide, iron trifluoromethanethiol, and hexacyanoiron, benzoquinones such as 1,4-benzoquinone, 2,3-dichloro-5,6-dicyano-1,4-benzoquinone, tetrachloro-1,2-benzoquinone, and tetrachloro-1,4-benzoquinone, $H_2O_2$, $MnO_2$, $KMnO_4$, $RuO_4$, m-chloroperbenzoic acid, and oxygen, or combinations thereof. Among these, copper salts, iron salts, and benzoquinones are preferable, and copper chloride, iron chloride, and 1,4-benzoquinone are more preferable.

The oxidant can be used in an amount of 0.001 to 10 mol relative to 1 mol of the compound (400).

The water can be used in an amount of 0.5 to 1000 mol relative to 1 mol of the compound (400).

Examples of the palladium compound include palladium dichloride. The palladium compound can be used in an amount equal to that of catalyst, such as an amount of 0.0001 to 1.0 mol relative to 1 mol of the compound (400).

The oxidation in step (401) can be performed in a solvent. Examples of the solvent include water, esters, aliphatic hydrocarbons, aromatic hydrocarbons, alcohols, carboxylic acids, ethers, halogenated hydrocarbons, nitrogen-containing polar organic compounds, nitriles, dimethylsulfoxides, sulfolanes.

Examples of the esters include ethyl acetate, butyl acetate, ethylene glycol monomethyl ether acetate, propylene and glycol monomethyl ether acetate (PGMEA, also known as 1-methoxy-2-acetoxypropane). Among these, ethyl acetate is preferable.

Examples of the aliphatic hydrocarbons include hexane, cyclohexane, heptane, octane, nonane, decane, undecane, dodecane, and petroleum spirit. Among these, cyclohexane and heptane are preferable.

Examples of the aromatic hydrocarbons include benzene, toluene, and xylenes. Among these, benzene and toluene are preferable.

Examples of the alcohols include methanol, ethanol, 1-propanol, and isopropanol.

Examples of the carboxylic acids include acetic acid and propionic acid. Among these, acetic acid is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

Examples of the nitriles include acetonitrile, propionitrile, butyronitrile, isobutyronitrile, and benzonitrile. Among these, acetonitrile is preferable.

The oxidation temperature in step (401) is preferably −78 to 200° C., more preferably −20 to 150° C.

The oxidation pressure in step (401) is preferably 0 to 10 MPa, more preferably 0.1 to 5.0 MPa.

The oxidation time in step (401) is preferably 0.1 to 72 hours, more preferably 0.1 to 48 hours.

The compound (100), the compound (300), and the compound (400) can be produced also by a production method including: step (501) of obtaining the compound (100) by allowing a reductant to act on an aldehyde represented by the formula:

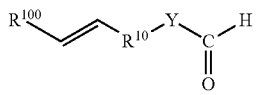

wherein $R^{10}$ and Y are defined as mentioned above, and $R^{100}$ is an alkyl group.

In step (501), the aldehyde is dimerized by a reductive coupling reaction, thereby generating the compound (100), the compound (300), and the compound (400). Examples of the reductant to be used in step (501) include samarium diiodide, titanium dichloride, vanadium trichloride, titanium tetrachloride, bis(cyclooctadiene)nickel, copper, magnesium, zinc, sodium, cerium trichloride, chromium oxide, and triphenyltin hydride. Such reductants may be used in combination. The amount of the reductant used is preferably 0.001 to 10 mol, more preferably 0.01 to 5 mol, further preferably 0.1 to 2 mol, relative to 1 mol of the aldehyde.

The reaction in step (501) can be performed in a solvent. The solvent is preferably an organic solvent, more preferably an ether, a halogenated hydrocarbon, a pyridine, a nitrile, or an aromatic hydrocarbon.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the nitriles include acetonitrile, propionitrile, butyronitrile, isobutyronitrile, and benzonitrile. Among these, acetonitrile is preferable.

Examples of the aromatic hydrocarbons include benzene, toluene, and xylenes. Among these, benzene and toluene are preferable.

The reaction in step (501) is preferably carried out in the presence of an alcohol. Examples of the alcohol include methanol, ethanol, and isopropanol.

The reaction temperature in step (501) is preferably −78 to 200° C., more preferably −20 to 100° C.

The reaction pressure in step (501) is preferably 0 to 5.0 MPa, more preferably 0.1 to 1.0 MPa.

The reaction time in step (501) is preferably 0.1 to 72 hours, more preferably 0.1 to 48 hours.

In any of the aforementioned production methods, the solvent may be distilled off, evaporated, or purified after the completion of each step, so as to enhance the purity of the compound to be obtained. Further, when the compound to be obtained is a compound in which M is H, such as —COOH, —SO$_3$H, and —OSO$_3$H, such a group can be converted into a salt form by contact with an alkali such as sodium carbonate and ammonia.

Examples of the hydrocarbon surfactant also include a hydrocarbon surfactant having one or more carbonyl groups (however, excluding carbonyl groups in carboxyl groups).

Further, the hydrocarbon surfactant having one or more carbonyl groups (however, excluding carbonyl groups in carboxyl groups) can be subjected to radical treatment or oxidation treatment. The radical treatment may be a treatment that generates radicals in the hydrocarbon surfactant having one or more carbonyl groups (however, excluding carbonyl groups in carboxyl groups) and is, for example, a treatment including: adding deionized water and a hydrocarbon surfactant into a reactor; sealing the reactor; replacing the inside of the system with nitrogen; raising the temperature and the pressure of the reactor; and thereafter introducing a polymerization initiator, followed by stirring for a certain time, decompression of the reactor to the atmospheric pressure, and cooling. The oxidation treatment is a treatment including adding an oxidant to the hydrocarbon surfactant having one or more carbonyl groups (however, excluding carbonyl groups in carboxyl groups). Examples of the oxidant include oxygen, ozone, hydrogen peroxide solution, manganese oxide (IV), potassium permanganate, potassium dichromate, nitric acid, and sulfur dioxide.

The hydrocarbon surfactant having one or more carbonyl groups (however, excluding carbonyl groups in carboxyl groups) is preferably a surfactant represented by the formula:

R—X wherein R is a fluorine-free organic group having one or more carbonyl groups (however, excluding carbonyl groups in carboxyl groups) and having 1 to 2000 carbon atoms, X is —OSO$_3$X$^1$, —COOX$^1$, or —SO$_3$X$^1$ (where X$^1$ is H, a metal atom, NR$^1_4$, an imidazolium optionally having a substituent, a pyridinium optionally having a substituent, or a phosphonium optionally having a substituent, and R's are each H or an organic group and may be the same as or different from each other). The number of carbon atoms in R is preferably 500 or less, more preferably 100 or less, further preferably 50 or less, furthermore preferably 30 or less.

The specific hydrocarbon surfactant is more preferably at least one selected from the group consisting of: a surfactant (a) represented by Formula (a) below:

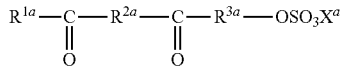

wherein $R^{1a}$ is a linear or branched alkyl group having one or more carbon atoms or a cyclic alkyl group having three or more carbon atoms, a hydrogen atom bonded to a carbon atom may be substituted with a monovalent organic group containing a hydroxy group or an ester bond, the alkyl group may contain a carbonyl group in the case of having two or more carbon atoms and may contain a monovalent or divalent heterocycle or may form a ring, in the case of having three or more carbon atoms, $R^{2a}$ and $R^{3a}$ are each independently a single bond or a divalent linking group, $R^{1a}$, $R^{2a}$, and $R^{3a}$ have 6 or more carbon atoms in total, $X^a$ is H, a metal atom, $NR^{4a}_4$, an imidazolium optionally having a substituent, a pyridinium optionally having a substituent, or a phosphonium optionally having a substituent, $R^{4a}$s are each H or an organic group and may be the same as or different from each other, and any two of $R^{1a}$, $R^{2a}$, and $R^{3a}$ may be bonded together to form a ring; a surfactant (b) represented by Formula (b) below:

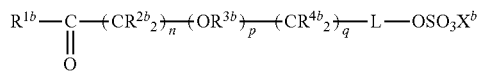

wherein $R^{1b}$ is a linear or branched alkyl group optionally having a substituent and having one or more carbon atoms or a cyclic alkyl group optionally having a substituent and having three or more carbon atoms, the alkyl group may contain a monovalent or divalent heterocycle or may form a ring, in the case of having three or more carbon atoms, $R^{2b}$s and $R^{4b}$s are each independently H or a substituent, $R^{3b}$ is an alkylene group optionally having a substituent and having 1 to 10 carbon atoms, n is an integer of 1 or more, p and q are each independently an integer of 0 or more, $X^b$ is H, a metal atom, $NR^{5b}_4$, an imidazolium optionally having a substituent, a pyridinium optionally having a substituent, or a phosphonium optionally having a substituent, $R^{5b}$s are each H or an organic group and may be the same as or different from each other, any two of $R^{1b}$, $R^{2b}$, $R^{3b}$, and $R^{4b}$ may be bonded together to form a ring, L is a single bond, —$CO_2$—B—*, —OCO—B—*, —$CONR^{6b}$—B—*, —$NR^{6b}CO$—B—*, or —CO— (however, excluding carbonyl groups contained in —$CO_2$—B—, —OCO—B—, —$CONR^{6b}$—B—, and —$NR^6CO$—B—), B is a single bond or an alkylene group optionally having a substituent and having 1 to 10 carbon atoms, $R^{6b}$ is H or an alkyl group optionally having a substituent and having 1 to 4 carbon atoms, and the symbol * represents the side bonded to —$OSO_3X^b$ in the formula; a surfactant (c) represented by Formula (c) below:

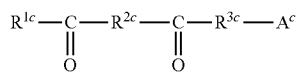

wherein $R^{1c}$ is a linear or branched alkyl group having one or more carbon atoms or a cyclic alkyl group having three or more carbon atoms, a hydrogen atom bonded to a carbon atom may be substituted with a monovalent organic group containing a hydroxy group or an ester bond, the alkyl group may contain a carbonyl group in the case of having two or more carbon atoms and may contain a monovalent or divalent heterocycle or may form a ring, in the case of having three or more carbon atoms, $R^{2c}$ and $R^{3c}$ are each independently a single bond or a divalent linking group, $R^{1c}$, $R^{2c}$, and $R^{3c}$ have 5 or more carbon atoms in total, $A^c$ is —$COOX^c$ or —$SO_3X^c$ (where $X^c$ is H, a metal atom, $NR^{4c}_4$, an imidazolium optionally having a substituent, a pyridinium optionally having a substituent, or a phosphonium optionally having a substituent, and $R^{4c}$s are each H or an organic group and may be the same as or different from each other), and any two of $R^{1c}$, $R^{2c}$, and $R^{3c}$ may be bonded together to form a ring; and a surfactant (d) represented by Formula (d) below:

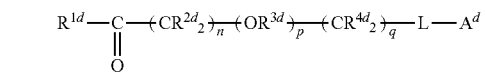

wherein $R^{1d}$ is a linear or branched alkyl group optionally having a substituent and having one or more carbon atoms or a cyclic alkyl group optionally having a substituent and having three or more carbon atoms, the alkyl group may contain a monovalent or divalent heterocycle or may form a ring, in the case of having three or more carbon atoms, $R^{2d}$s and $R^{4d}$s are each independently H or a substituent, $R^{3d}$ is an alkylene group optionally having a substituent and having 1 to 10 carbon atoms, n is an integer of 1 or more, p and q are each independently an integer of 1 or more, $A^d$ is —$SO_3X^d$ or —$COOX^d$ (where $X^d$ is H, a metal atom, $NR^{5d}_4$, an imidazolium optionally having a substituent, a pyridinium optionally having a substituent, or a phosphonium optionally having a substituent, and $R^{5d}$s are each H or an organic group and may be the same as or different from each other), any two of $R^{1d}$, $R^{2d}$, $R^{3d}$, and $R^{4d}$ may be bonded together to form a ring, L is a single bond, —$CO_2$—B—*, —OCO—B—*, —$CONR^{6d}$—B—*, —$NR^{6d}CO$—B—*, or —CO— (however, excluding carbonyl groups contained in —$CO_2$—B—, —OCO—B—, —$CONR^{6d}$—B—, and —$NR^{6d}CO$—B—), B is a single bond or an alkylene group optionally having a substituent and having 1 to 10 carbon atoms, $R^{6d}$ is H or an alkyl group optionally having a substituent and having 1 to 4 carbon atoms, and the symbol * represents the side bonded to $A^d$ in the formula.

The surfactant (a) will be described.

In Formula (a), $R^{1a}$ is a linear or branched alkyl group having one or more carbon atoms or a cyclic alkyl group having three or more carbon atoms.

The alkyl group may contain a carbonyl group (—C(═O)—) between two carbon atoms in the case of having three or more carbon atoms. Further, the alkyl group can also contain the carbonyl group at an end of the alkyl group in the case of having two or more carbon atoms. That is, acyl groups such as an acetyl group represented by $CH_3$—C(═O)— are also included in the alkyl group.

Further, the alkyl group can contain a monovalent or divalent heterocycle or can also form a ring in the case of having three or more carbon atoms. The heterocycle is preferably an unsaturated heterocycle, more preferably an oxygen-containing unsaturated heterocycle, and examples thereof include a furan ring. In $R^{1a}$, a divalent heterocycle may be inserted between two carbon atoms, a divalent heterocycle may be located at an end and bonded to —C(═O)—, or a monovalent heterocycle may be located at an end of the alkyl group.

In this description, "the number of carbon atoms" of the alkyl group includes the number of carbon atoms forming the carbonyl group and the number of carbon atoms forming the heterocycle. For example, a group represented by $CH_3$—C(═O)—$CH_2$— has 3 carbon atoms, a group represented by $CH_3$—C(═O)—$C_2H_4$—C(═O)—$C_2H_4$— has 7 carbon atoms, and a group represented by $CH_3$—C(═O)— has 2 carbon atoms.

In the alkyl group, a hydrogen atom bonded to a carbon atom may be substituted with a functional group, such as a monovalent organic group containing a hydroxy group (—OH) or an ester bond, but is preferably not substituted with any functional groups.

Examples of the monovalent organic group containing an ester bond include a group represented by the formula: —O—C(=O)—$R^{101a}$, wherein $R^{101a}$ is an alkyl group.

In the alkyl group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

In the formula, $R^{2a}$s and $R^{3a}$ are each independently a single bond or a divalent linking group.

$R^{2a}$s and $R^{3a}$ are preferably each independently a single bond, a linear or branched alkylene group having one or more carbon atoms, or a cyclic alkylene group having three or more carbon atoms.

The alkylene group forming $R^{2a}$s and $R^{3a}$ is preferably free from carbonyl groups.

In the alkylene group, a hydrogen atom bonded to a carbon atom may be substituted with a functional group, such as a monovalent organic group containing a hydroxy group (—OH) or an ester bond, but is preferably not substituted with any functional groups.

Examples of the monovalent organic group containing an ester bond include a group represented by the formula: —O—C(=O)—$R^{102a}$, wherein $R^{102a}$ is an alkyl group.

In the alkylene group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkylene group free from halogen atoms such as fluorine atoms and chlorine atoms.

$R^{1a}$, $R^{2a}$, and $R^{3a}$ have 6 or more carbon atoms in total. The total number of carbon atoms is preferably 8 or more, more preferably 9 or more, further preferably 10 or more, and is preferably 20 or less, more preferably 18 or less, further preferably 15 or less.

Any two of $R^{1a}$, $R^{2a}$, and $R^{3a}$ may be bonded together to form a ring.

In Formula (a), $X^a$ is H, a metal atom, $NR^{4a}4$, an imidazolium optionally having a substituent, a pyridinium optionally having a substituent, or a phosphonium optionally having a substituent, $R^{4a}$s are each H or an organic group, and four $R^{4a}$s may be the same as or different from each other. $R^{4a}$s are each preferably H or an organic group having 1 to 10 carbon atoms, more preferably H or an organic group having 1 to 4 carbon atoms. Examples of the metal atom include monovalent or divalent metal atoms such as alkali metals (Group 1) and alkaline earth metals (Group 2), and the metal atom is preferably Na, K, or Li.

$X^a$ is preferably H, an alkali metal (Group 1), an alkaline earth metal (Group 2), or $NR^{4a}4$, more preferably H, Na, K, Li, or $NH_4$ for the ease of dissolution in water, further preferably Na, K, or $NH_4$ for further ease of dissolution in water, particularly preferably Na or $NH_4$, most preferably $NH_4$ for the ease of removal. When $X^a$ is $NH_4$, the solubility of the surfactant into an aqueous medium is excellent, and metal components hardly remain in PTFE or the final product.

$R^{1a}$ is preferably a linear or branched alkyl group free from carbonyl groups and having 1 to 8 carbon atoms, a cyclic alkyl group free from carbonyl groups and having 3 to 8 carbon atoms, a linear or branched alkyl group containing 1 to 10 carbonyl groups and having 2 to 45 carbon atoms, a cyclic alkyl group containing a carbonyl group and having 3 to 45 carbon atoms, or an alkyl group having 3 to 45 carbon atoms and containing a monovalent or divalent heterocycle.

Further, $R^{1a}$ is more preferably a group represented by the following formula:

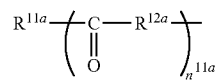

wherein $n^{11a}$ is an integer of 0 to 10, $R^{11a}$ is a linear or branched alkyl group having 1 to 5 carbon atoms or a cyclic alkyl group having 3 to 5 carbon atoms, $R^{12a}$s are each an alkylene group having 0 to 3 carbon atoms, and $R^{12a}$s may be the same as or different from each other when $n^{11a}$ is an integer of 2 to 10.

$n^{11a}$ is preferably an integer of 0 to 5, more preferably an integer of 0 to 3, further preferably an integer of 1 to 3.

The alkyl group serving as $R^{11a}$ is preferably free from carbonyl groups. In the alkyl group serving as $R^{11a}$, a hydrogen atom bonded to a carbon atom may be substituted with a functional group, such as a monovalent organic group containing a hydroxy group (—OH) or an ester bond, but the alkyl group is preferably not substituted with any functional groups.

Examples of the monovalent organic group containing an ester bond include a group represented by the formula: —O—C(=O)—$R^{103a}$, wherein $R^{103a}$ is an alkyl group.

In the alkyl group serving as $R^{11a}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

$R^{12a}$ is an alkylene group having 0 to 3 carbon atoms. The number of carbon atoms is preferably 1 to 3.

The alkylene group serving as $R^{12a}$ may be linear or branched.

The alkylene group serving as $R^{12a}$ is preferably free from carbonyl groups. $R^{12a}$ is more preferably an ethylene group (—$C_2H_4$—) or a propylene group (—$C_3H_6$—).

In the alkylene group serving as $R^{12a}$, a hydrogen atom bonded to a carbon atom may be substituted with a functional group such as a monovalent organic group containing a hydroxy group (—OH) or an ester bond, but the alkylene group is preferably not substituted with any functional groups.

Examples of the monovalent organic group containing an ester bond include a group represented by the formula: —O—C(=O)—$R^{104a}$, wherein $R^{104a}$ is an alkyl group.

In the alkylene group serving as $R^{12a}$, 75% or less of hydrogen atoms bonded to carbon atoms may be substituted with halogen atoms, 50% or less thereof may be substituted with halogen atoms, or 25% or less thereof may be substituted with halogen atoms, but the alkylene group is preferably a non-halogenated alkylene group free from halogen atoms such as fluorine atoms and chlorine atoms.

$R^{2a}$ and $R^{3a}$ are preferably each independently an alkylene group free from carbonyl groups and having one or more carbon atoms, more preferably an alkylene group free from carbonyl groups and having 1 to 3 carbon atoms, further preferably an ethylene group (—C$_2$H$_4$—) or a propylene group (—C$_3$H$_6$—).
Examples of the surfactant (a) can include the following surfactants. In each formula, X$^a$ is defined as mentioned above.
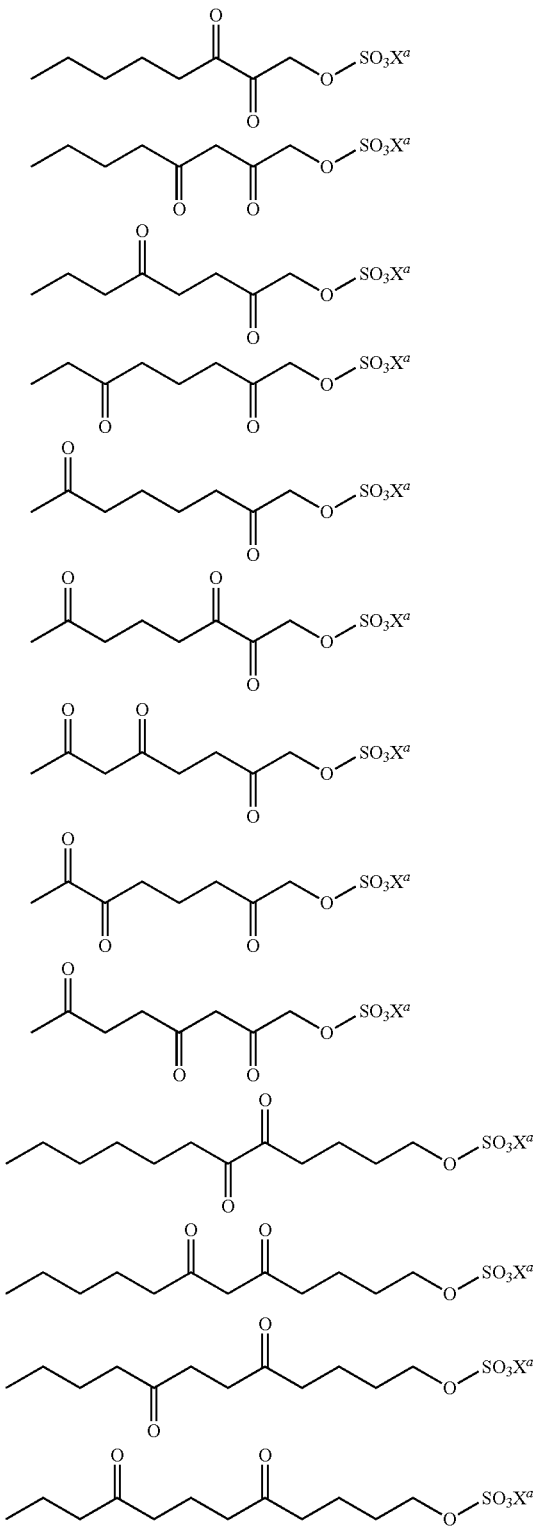
-continued
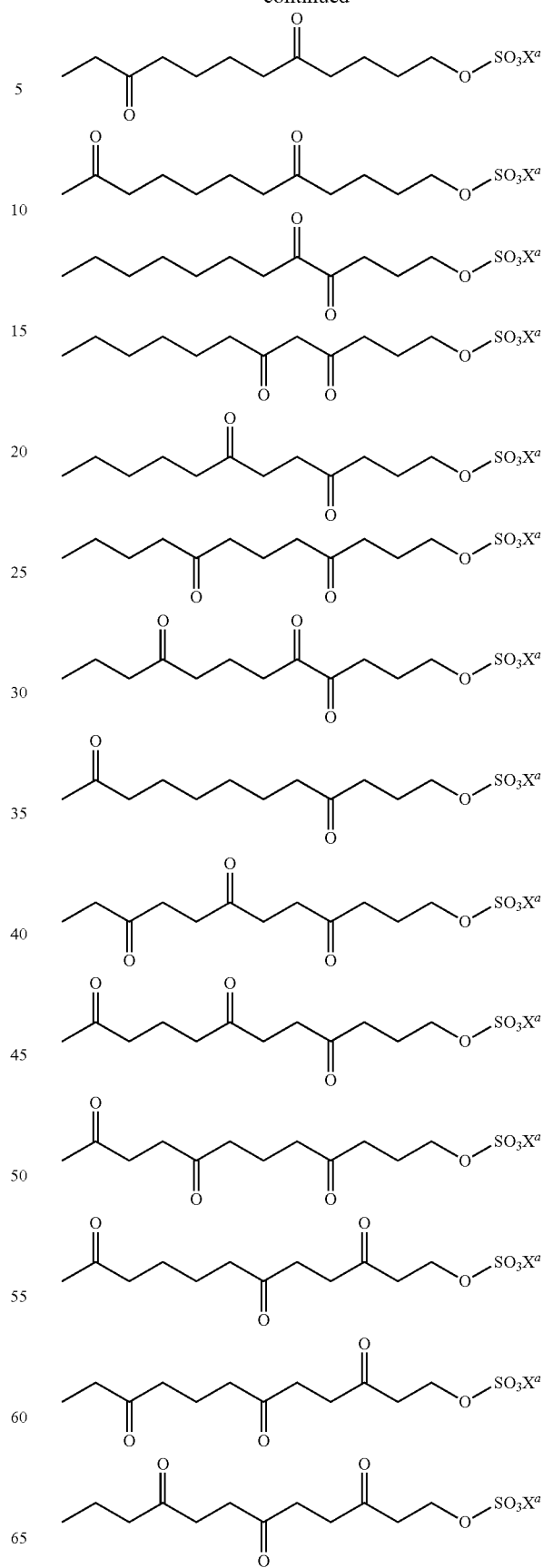

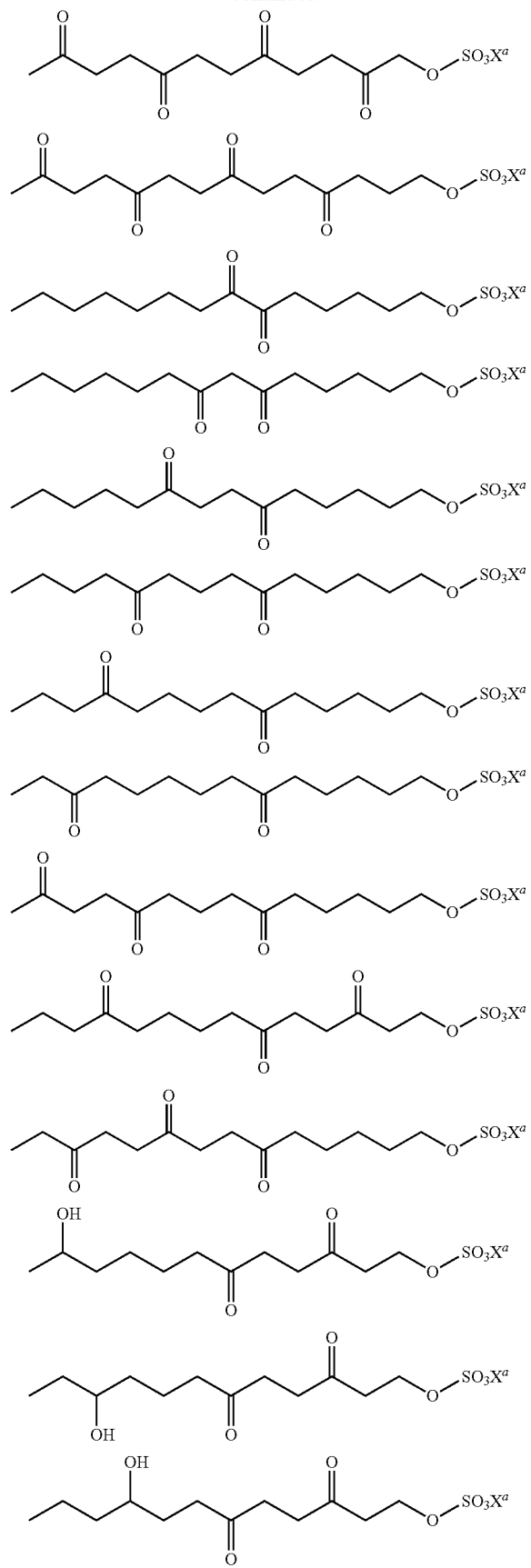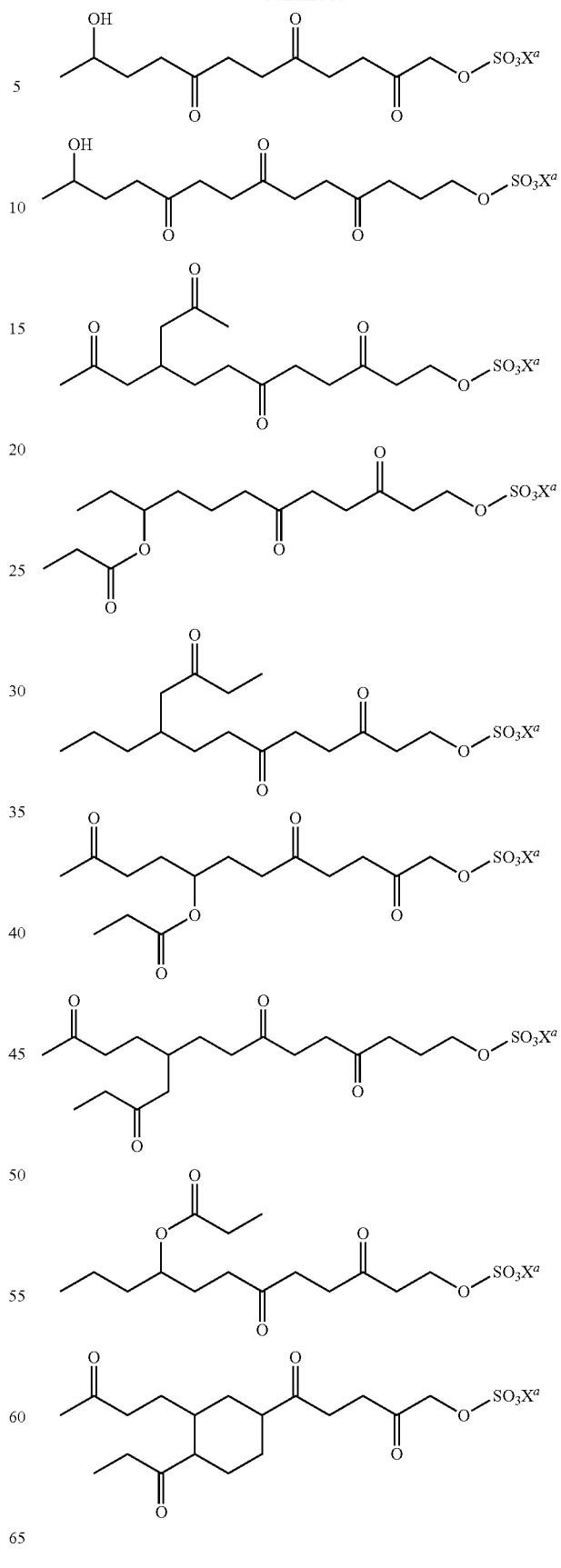

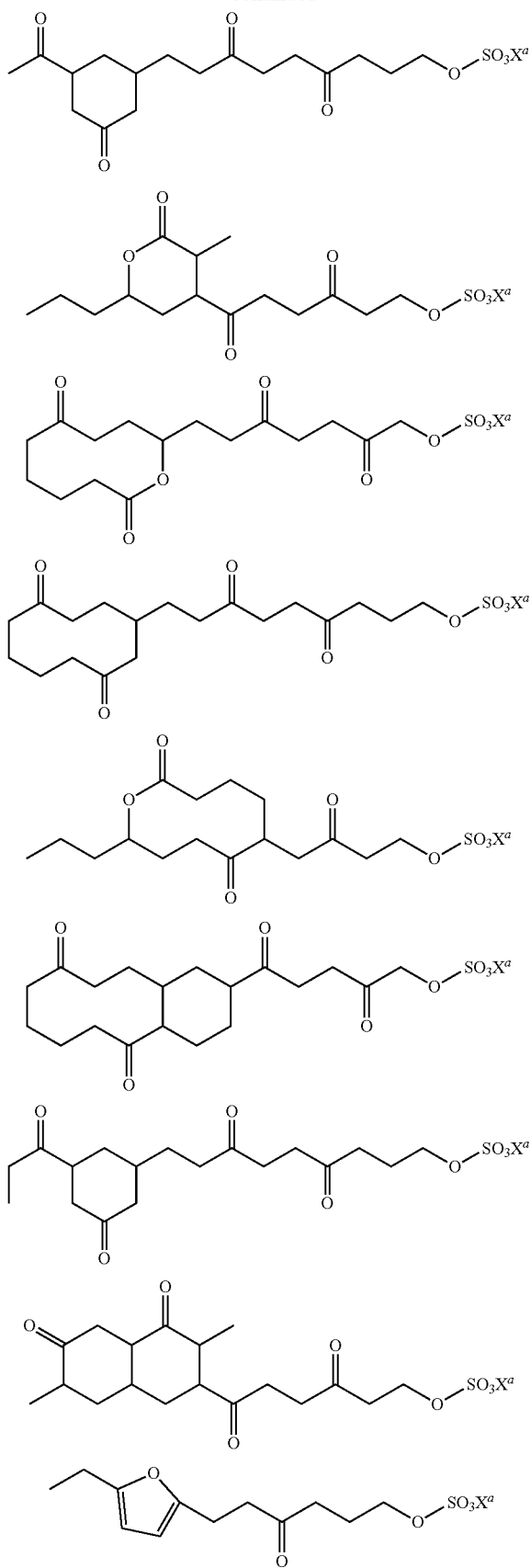
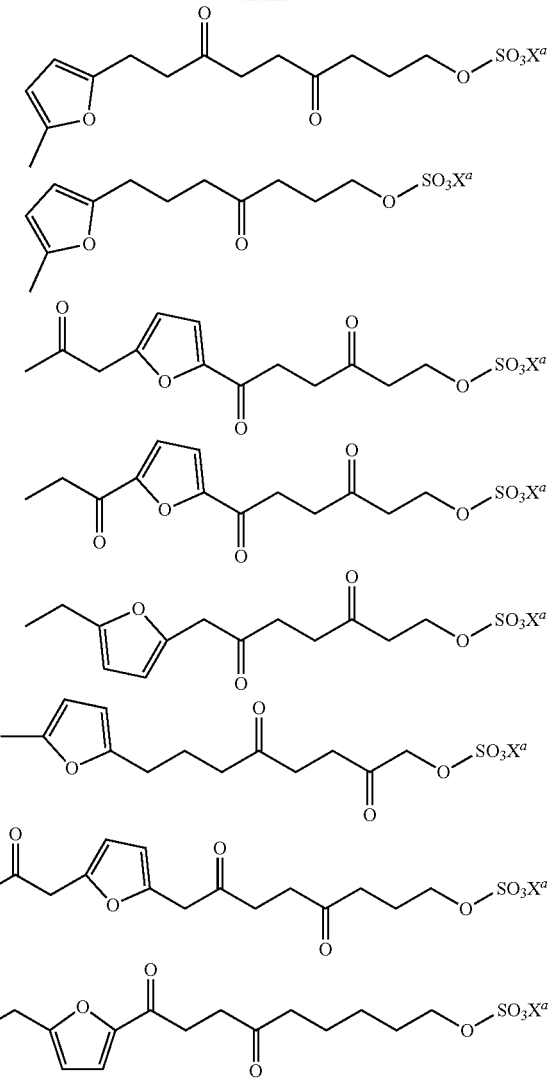
The surfactant (a) is a new compound and can be produced by the production methods described below as examples.
The surfactant (a) can be produced by a production method including: step (11a) of obtaining a compound (11a) represented by the formula:
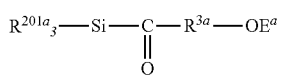
wherein $R^{3a}$, $R^{201a}$, and $E^a$ are defined as mentioned above, by reacting a compound (10a) represented by the formula:
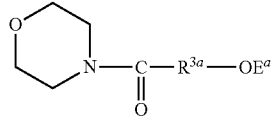

wherein $R^{3a}$ is defined as mentioned above, and $E^a$ is a leaving group, with lithium and a chlorosilane compound represented by the formula:

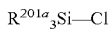

wherein $R^{201a}$s are each independently an alkyl group or an aryl group; step (12a) of obtaining a compound (12a) represented by the formula:

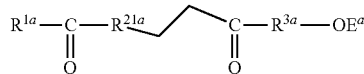

wherein $R^{1a}$, $R^{21a}$, $R^{3a}$, and $E^a$ are defined as mentioned above, by reacting the compound (11a) with an olefin represented by the formula:

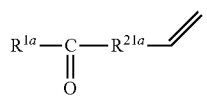

wherein $R^{1a}$ is defined as mentioned above, and $R^{21a}$ is a single bond or a divalent linking group; step (13a) of obtaining a compound (13a) represented by the formula:

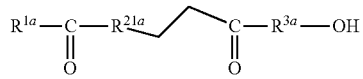

wherein $R^{1a}$, $R^{21a}$, and $R^{3a}$ are defined as mentioned above, by eliminating the leaving group contained in the compound (12a); and step (14a) of obtaining a compound (14a) represented by the formula:

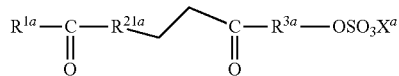

wherein $R^{1a}$, $R^{21a}$, $R^{3a}$, and $X^a$ are defined as mentioned above, by reacting the compound (13a) with a chlorosulfonic acid represented by the formula:

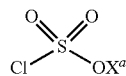

wherein $X^a$ is defined as mentioned above.

When $R^{1a}$ contains a furan ring, the furan ring may be opened, for example, using an acid and converted into a dicarbonyl derivative. Examples of the acid include acetic acid, hydrochloric acid, and p-toluene sulfone. Among these, acetic acid is preferable.

In step (11a), the compound (11a) is preferably obtained by reacting lithium with the chlorosilane compound beforehand to obtain a siloxylithium compound and thereafter reacting the siloxylithium compound with the compound (10a).

$E^a$ represents a leaving group. Examples of the leaving group include a tert-butyldimethylsilyl (TBS) group, a tri-ethylsilyl (TES) group, a triisopropylsilyl (TIPS) group, a tert-butyldiphenylsilyl (TBDPS) group, and a benzyl (Bn) group.

$R^{21a}$ is preferably a single bond or a linear or branched alkylene group having one or more carbon atoms.

Examples of the chlorosilane compound include:

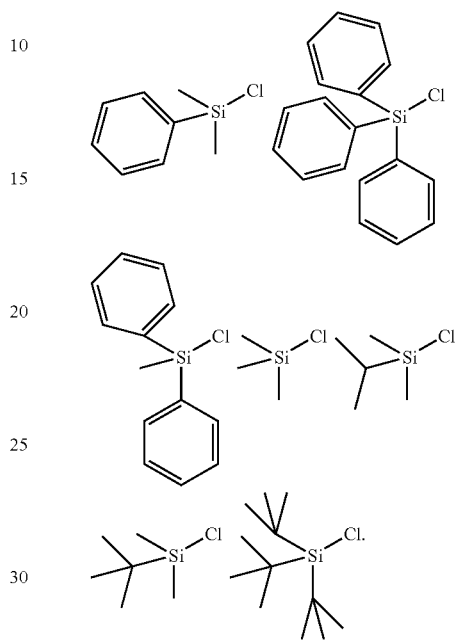

All the reactions in step (11a) can be carried out in a solvent. The solvent is preferably an organic solvent, more preferably a polar aprotic solvent, further preferably an ether. Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme (tetraethylene glycol dimethyl ether), and crown ether (15-crown-5,18-crown-6). Among these, tetrahydrofuran and diethyl ether are preferable.

The reaction temperature of lithium with the chlorosilane compound in step (11a) is preferably 10 to 40° C., more preferably 20 to 30° C.

The reaction temperature of the siloxylithium compound with the compound (10a) in step (11a) is preferably −100 to 0° C., more preferably −80 to −50° C.

The reaction pressure of lithium with the chlorosilane compound in step (11a) is preferably 0.1 to 5 MPa, more preferably 0.1 to 1 MPa.

The reaction pressure of the siloxylithium compound with the compound (10a) in step (11a) is preferably 0.1 to 5 MPa, more preferably 0.1 to 1 MPa.

The reaction time of lithium with the chlorosilane compound in step (11a) is preferably 0.1 to 72 hours, more preferably 6 to 10 hours.

The reaction time of the siloxylithium compound with the compound (10a) in step (11a) is preferably 0.1 to 72 hours, more preferably 1 to 2 hours.

For a reaction ratio of the compound (11a) with the olefin in step (12a), the amount of the olefin is preferably 1 to 2 mol, more preferably 1 to 1.1 mol, relative to 1 mol of the compound (11a), in consideration of yield improvement and waste reduction.

The reaction in step (12a) can be performed in a solvent in the presence of a thiazolium salt and a base.

Examples of the thiazolium salt include 3-ethyl-5-(2-hydroxyethyl)-4-methylthiazolium bromide and 3-benzyl-5-(2-hydroxyethyl)-4-methylthiazolium chloride.

Examples of the base include 1,8-diazabicyclo[5.4.0]-7-undecene and triethylamine.

The solvent is preferably an organic solvent, more preferably a polar aprotic solvent, further preferably an alcohol or an ether.

Examples of the alcohol include methanol, ethanol, 1-propanol, and isopropanol.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (12a) is preferably 40 to 60° C., more preferably 50 to 55° C.

The reaction pressure in step (12a) is preferably 0.1 to 5 MPa, more preferably 0.1 to 1 MPa.

The reaction time in step (12a) is preferably 0.1 to 72 hours, more preferably 6 to 10 hours.

The elimination reaction of the leaving group in step (13a) can be performed using a fluoride ion or an acid. Examples of the method for eliminating the leaving group include a method of using hydrofluoric acid, a method of using an amine complex of a hydrogen fluoride such as pyridine-nHF and triethylamine-nHF, a method of using an inorganic salt such as cesium fluoride, potassium fluoride, lithium borofluoride ($LiBF_4$), and ammonium fluoride, and a method of using an organic salt such as tetrabutylammonium fluoride (TBAF).

The elimination reaction of the leaving group in step (13a) can be performed in a solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (13a) is preferably 0 to 40° C., more preferably 0 to 20° C.

The reaction pressure in step (13a) is preferably 0.1 to 5 MPa, more preferably 0.1 to 1 MPa.

The reaction time in step (13a) is preferably 0.1 to 72 hours, more preferably 3 to 8 hours.

For a reaction ratio of the compound (13a) with the chlorosulfonic acid in step (14a), the amount of the chlorosulfonic acid is preferably 1 to 2 mol, more preferably 1 to 1.1 mol, relative to 1 mol of the compound (13a), in consideration of yield improvement and waste reduction.

The reaction in step (14a) is preferably carried out in the presence of a base. Examples of the base include alkali metal hydroxides, alkaline earth metal hydroxides, and amines. Among these, amines are preferable.

Examples of the amines in step (14a) include tertiary amines such as trimethylamine, triethylamine, tributylamine, N,N-dimethylaniline, dimethylbenzylamine, and N,N,N',N'-tetramethyl-1,8-naphthalene diamine, complex aromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Among these, triethylamine and pyridine are preferable.

The amount of the base used in step (14a) is preferably 1 to 2 mol, more preferably 1 to 1.1 mol, relative to 1 mol of the compound (13a), in consideration of yield improvement and waste reduction.

The reaction in step (14a) can be performed in a polar solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, diethyl ether is preferable.

The reaction temperature in step (14a) is preferably 0 to 40° C., more preferably 0 to 20° C.

The reaction pressure in step (14a) is preferably 0.1 to 5 MPa, more preferably 0.1 to 1 MPa.

The reaction time in step (14a) is preferably 0.1 to 72 hours, more preferably 3 to 12 hours.

When the reaction in step (14a) is carried out in a solvent, a solution containing the compound (14a) is obtained after the completion of the reaction. The compound (14a) with a high purity may be collected by adding water to the solution, followed by standing, so that the solution is separated into two phases and collecting the water phase, thereby distilling off the solvent. When the compound (14a) has a group represented by —$OSO_3H$ (that is, when X is H), use of an alkali aqueous solution such as a sodium bicarbonate aqueous solution and ammonia water instead of water enables conversion of —$OSO_3H$ into a sulfate group.

The solvent may be distilled off, evaporated, or purified after the completion of each step, so as to enhance the purity of the compound to be obtained.

The surfactant (a) can be produced also by a production method including: step (21a) of obtaining a compound (21a) represented by the formula:

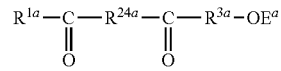

wherein $R^{1a}$, $R^{3a}$, and $E^a$ are defined as mentioned above, and $R^{24a}$ is a single bond or a divalent linking group, by reacting a ketone represented by the formula:

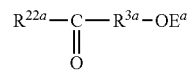

wherein $R^{3a}$ is defined as mentioned above, $R^{22a}$ is a monovalent organic group, and $E^a$ is a leaving group, with a carboxylic acid ester represented by the formula:

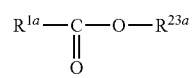

wherein $R^{1a}$ is defined as mentioned above, and $R^{23a}$ is a monovalent organic group; step (22a) of obtaining a compound (22a) represented by the formula:

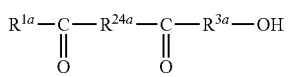

wherein $R^{1a}$, $R^{24a}$, and $R^{3a}$ are defined as mentioned above, by eliminating the leaving group contained in the compound (21a); and step (23a) of obtaining a compound (23a) represented by the formula:

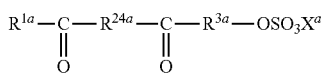

wherein $R^{1a}$, $R^{24a}$, $R^{3a}$, and $X^a$ are defined as mentioned above, by reacting the compound (22a) with a chlorosulfonic acid represented by the formula:

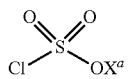

wherein $X^a$ is defined as mentioned above.

When $R^{1a}$ contains a furan ring, the furan ring may be opened, for example, using an acid and converted into a dicarbonyl derivative. Examples of the acid include acetic acid, hydrochloric acid, and p-toluene sulfone. Among these, acetic acid is preferable.

$E^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{22a}$ is preferably a linear or branched alkyl group having one or more carbon atoms, more preferably a methyl group.

$R^{23a}$ is preferably a linear or branched alkyl group having one or more carbon atoms, more preferably a methyl group.

$R^{24a}$ is preferably a linear or branched alkylene group having one or more carbon atoms, more preferably a methylene group (—$CH_2$—).

The reaction in step (21a) can be performed in a solvent in the presence of a base.

Examples of the base include sodium amide, sodium hydride, sodium methoxide, and sodium ethoxide.

The solvent is preferably an organic solvent, more preferably a polar aprotic solvent, further preferably an alcohol or an ether.

Examples of the alcohol include methanol, ethanol, 1-propanol, and isopropanol.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (21a) is preferably 0 to 40° C., more preferably 0 to 20° C.

The reaction pressure in step (21a) is preferably 0.1 to 5 MPa, more preferably 0.1 to 1 MPa.

The reaction time in step (21a) is preferably 0.1 to 72 hours, more preferably 3 to 8 hours.

The elimination reaction of the leaving group in step (22a) can be performed using a fluoride ion or an acid. Examples of the method for eliminating the leaving group include a method of using hydrofluoric acid, a method of using an amine complex of a hydrogen fluoride such as pyridine-nHF and triethylamine-nHF, a method of using an inorganic salt such as cesium fluoride, potassium fluoride, lithium borofluoride ($LiBF_4$), and ammonium fluoride, and a method of using an organic salt such as tetrabutylammonium fluoride (TBAF).

The elimination reaction of the leaving group in step (22a) can be performed in a solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (22a) is preferably 0 to 40° C., more preferably 0 to 20° C.

The reaction pressure in step (22a) is preferably 0.1 to 5 MPa, more preferably 0.1 to 1 MPa.

The reaction time in step (22a) is preferably 0.1 to 72 hours, more preferably 3 to 8 hours.

For a reaction ratio of the compound (22a) with the chlorosulfonic acid in step (23a), the amount of the chlorosulfonic acid is preferably 1 to 2 mol, more preferably 1 to 1.1 mol, relative to 1 mol of the compound (22a), in consideration of yield improvement and waste reduction.

The reaction in step (23a) is preferably carried out in the presence of a base. Examples of the base include alkali metal hydroxides, alkaline earth metal hydroxides, and amines. Among these, amines are preferable.

Examples of the amines in step (23a) include tertiary amines such as trimethylamine, triethylamine, tributylamine, N,N-dimethylaniline, dimethylbenzylamine, and N,N,N',N'-tetramethyl-1,8-naphthalene diamine, complex aromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Among these, triethylamine and pyridine are preferable.

The amount of the base used in step (23a) is preferably 1 to 2 mol, more preferably 1 to 1.1 mol, relative to 1 mol of the compound (22a), in consideration of yield improvement and waste reduction.

The reaction in step (23a) can be performed in a polar solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, diethyl ether is preferable.

The reaction temperature in step (23a) is preferably 0 to 40° C., more preferably 0 to 20° C.

The reaction pressure in step (23a) is preferably 0.1 to 5 MPa, more preferably 0.1 to 1 MPa.

The reaction time in step (23a) is preferably 0.1 to 72 hours, more preferably 3 to 12 hours.

When the reaction in step (23a) is carried out in a solvent, a solution containing the compound (23a) is obtained after the completion of the reaction. The compound (23a) with a high purity may be collected by adding water to the solution, followed by standing, so that the solution is separated into two phases and collecting the water phase, thereby distilling off the solvent. When the compound (23a) has a group represented by —OSO$_3$H (that is, when X is H), use of an alkali aqueous solution such as a sodium bicarbonate aqueous solution and ammonia water instead of water enables conversion of —OSO$_3$H into a sulfate group.

The solvent may be distilled off, evaporated, or purified after the completion of each step, so as to enhance the purity of the compound to be obtained.

The surfactant (a) can be produced also by a production method including: step (31a) of obtaining a compound (31a) represented by the formula:

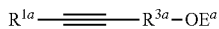

wherein $R^{1a}$, $R^{3a}$, and $E^a$ are defined as mentioned above, by reacting an alkyl halide represented by the formula: $Y^a$—$R^{3a}$-$OE^a$ wherein $R^{3a}$ is defined as mentioned above, $Y^a$ is a halogen atom, and $E^a$ is a leaving group, with a lithium acetylide represented by the formula:

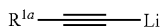

wherein $R^{1a}$ is defined as mentioned above; step (32a) of obtaining a compound (32a) represented by the formula:

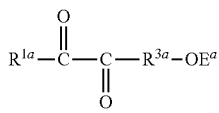

wherein $R^{1a}$, $R^{3a}$, and $E^a$ are defined as mentioned above, by oxidizing the compound (31a); step (33a) of obtaining a compound (33a) represented by the formula:

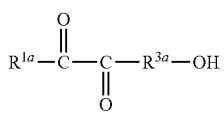

wherein $R^{1a}$ and $R^{3a}$ are defined as mentioned above, by eliminating the leaving group contained in the compound (32a); and step (34a) of obtaining a compound (34a) represented by the formula:

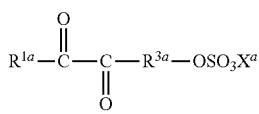

wherein $R^{1a}$, $R^{3a}$, and $X^a$ are defined as mentioned above, by reacting the compound (33a) with a chlorosulfonic acid represented by the formula:

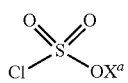

wherein $X^a$ is defined as mentioned above.

When $R^{1a}$ contains a furan ring, the furan ring may be opened, for example, using an acid and converted into a dicarbonyl derivative. Examples of the acid include acetic acid, hydrochloric acid, and p-toluene sulfone. Among these, acetic acid is preferable.

$E^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

For a reaction ratio of the alkyl halide with the lithium acetylide in step (31a), the amount of the lithium acetylide is preferably 1 to 2 mol, more preferably 1 to 1.2 mol, relative to 1 mol of the alkyl halide, in consideration of yield improvement and waste reduction.

The reaction in step (31a) can be performed in a solvent. The solvent is preferably hexane.

The reaction temperature in step (31a) is preferably −100 to −40° C., more preferably −80 to −50° C.

The reaction pressure in step (31a) is preferably 0.1 to 5 MPa, more preferably 0.1 to 1 MPa.

The reaction time in step (31a) is preferably 0.1 to 72 hours, more preferably 6 to 10 hours.

The oxidation in step (32a) can be performed in a nitrile solvent using a complex generated by treating [(Cn*)Ru$^{III}$(CF$_3$CO$_2$)$_3$]·H$_2$O, wherein Cn* represents 1,4,7-trimethyl-1,4,7-triazabicyclononane, with (NH$_4$)$_2$Ce(NO$_3$)$_6$ and trifluoroacetic acid and thereafter adding sodium perchlorate thereto.

After the completion of the oxidation, neutralization with an alkali may be carried out to extract the compound (32a) using an organic solvent such as an ether.

The reaction temperature in step (32a) is preferably 30 to 100° C., more preferably 40 to 90° C.

The reaction pressure in step (32a) is preferably 0.1 to 5 MPa, more preferably 0.1 to 1 MPa.

The reaction time in step (32a) is preferably 0.1 to 72 hours, more preferably 3 to 8 hours.

The elimination reaction of the leaving group in step (33a) can be performed using a fluoride ion or an acid. Examples of the method for eliminating the leaving group include a method of using hydrofluoric acid, a method of using an amine complex of a hydrogen fluoride such as pyridine-nHF and triethylamine-nHF, a method of using an inorganic salt such as cesium fluoride, potassium fluoride, lithium borofluoride (LiBF$_4$), and ammonium fluoride, and a method of using an organic salt such as tetrabutylammonium fluoride (TBAF).

The elimination reaction of the leaving group in step (33a) can be performed in a solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (33a) is preferably 0 to 40° C., more preferably 0 to 20° C.

The reaction pressure in step (33a) is preferably 0.1 to 5 MPa, more preferably 0.1 to 1 MPa.

The reaction time in step (33a) is preferably 0.1 to 72 hours, more preferably 3 to 8 hours.

For a reaction ratio of the compound (33a) with the chlorosulfonic acid in step (34a), the amount of the chlorosulfonic acid is preferably 1 to 2 mol, more preferably 1 to 1.1 mol, relative to 1 mol of the compound (33a), in consideration of yield improvement and waste reduction.

The reaction in step (34a) is preferably carried out in the presence of a base. Examples of the base include alkali metal hydroxides, alkaline earth metal hydroxides, and amines. Among these, amines are preferable.

Examples of the amines in step (34a) include tertiary amines such as trimethylamine, triethylamine, tributylamine, N,N-dimethylaniline, dimethylbenzylamine, and N,N,N',N'-tetramethyl-1,8-naphthalene diamine, complex aromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Among these, triethylamine and pyridine are preferable.

The amount of the base used in step (34a) is preferably 1 to 2 mol, more preferably 1 to 1.1 mol, relative to 1 mol of the compound (33a), in consideration of yield improvement and waste reduction.

The reaction in step (34a) can be performed in a polar solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, diethyl ether is preferable.

The reaction temperature in step (34a) is preferably 0 to 40° C., more preferably 0 to 20° C.

The reaction pressure in step (34a) is preferably 0.1 to 5 MPa, more preferably 0.1 to 1 MPa.

The reaction time in step (34a) is preferably 0.1 to 72 hours, more preferably 3 to 12 hours.

When the reaction in step (34a) is carried out in a solvent, a solution containing the compound (34a) is obtained after the completion of the reaction. The compound (34a) with a high purity may be collected by adding water to the solution, followed by standing, so that the solution is separated into two phases and collecting the water phase, thereby distilling off the solvent. When the compound (34a) has a group represented by —OSO$_3$H (that is, when X is H), use of an alkali aqueous solution such as a sodium bicarbonate aqueous solution and ammonia water instead of water enables conversion of —OSO$_3$H into a sulfate group.

The solvent may be distilled off, evaporated, or purified after the completion of each step, so as to enhance the purity of the compound to be obtained.

The surfactant (a) can be produced also by a production method including: step (41a) of obtaining a compound (41a) represented by the formula:

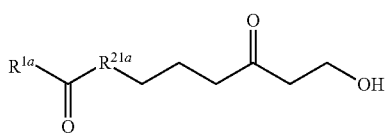

wherein $R^{1a}$ and $R^{21a}$ are defined as mentioned above, by reacting an alkene represented by the formula:

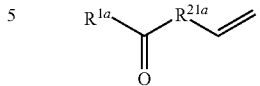

wherein $R^{1a}$ is defined as mentioned above, and $R^{21a}$ is a single bond or a divalent linking group, with an alkyne represented by the formula:

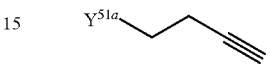

wherein $Y^{51a}$ is an alkoxyl group; and step (42a) of obtaining a compound (42a) represented by the formula:

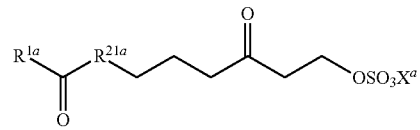

wherein $R^{1a}$, $R^{21a}$, and $X^a$ are defined as mentioned above, by reacting the compound (41a) with a chlorosulfonic acid represented by the formula:

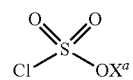

wherein $X^a$ is defined as mentioned above.

When $R^{1a}$ contains a furan ring, the furan ring may be opened, for example, using an acid and converted into a dicarbonyl derivative. Examples of the acid include acetic acid, hydrochloric acid, and p-toluene sulfone. Among these, acetic acid is preferable.

$R^{21a}$ is preferably a single bond or a linear or branched alkylene group having one or more carbon atoms.

For a reaction ratio of the alkene with the alkyne in step (41a), the amount of the alkene is preferably 0.5 to 2 mol, more preferably 0.6 to 1.2 mol, relative to 1 mol of the alkyne, in consideration of yield improvement and waste reduction.

The reaction in step (41a) is preferably carried out in the presence of a metal catalyst. Examples of the metal include ruthenium.

The amount of the metal catalyst used in step (41a) is preferably 0.01 to 0.4 mol, more preferably 0.05 to 0.1 mol, relative to 1 mol of the alkene, in consideration of yield improvement and waste reduction.

The reaction in step (41a) can be performed in a polar solvent. The solvent is preferably water, acetonitrile, dimethylacetamide, or dimethylformamide.

The reaction temperature in step (41a) is preferably 20 to 160° C., more preferably 40 to 140° C.

The reaction pressure in step (41a) is preferably 0.1 to 5 MPa, more preferably 0.1 to 1 MPa.

The reaction time in step (41a) is preferably 0.1 to 72 hours, more preferably 4 to 8 hours.

For a reaction ratio of the compound (41a) with the chlorosulfonic acid in step (42a), the amount of the chlorosulfonic acid is preferably 1 to 2 mol, more preferably 1 to 1.1 mol, relative to 1 mol of the compound (41a), in consideration of yield improvement and waste reduction.

The reaction in step (42a) is preferably carried out in the presence of a base. Examples of the base include alkali metal hydroxides, alkaline earth metal hydroxides, and amines. Among these, amines are preferable.

Examples of the amines in step (42a) include tertiary amines such as trimethylamine, triethylamine, tributylamine, N,N-dimethylaniline, dimethylbenzylamine, and N,N,N',N'-tetramethyl-1,8-naphthalene diamine, complex aromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Among these, triethylamine and pyridine are preferable.

The amount of the base used in step (42a) is preferably 1 to 2 mol, more preferably 1 to 1.1 mol, relative to 1 mol of the compound (41a), in consideration of yield improvement and waste reduction.

The reaction in step (42a) can be performed in a polar solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, diethyl ether is preferable.

The reaction temperature in step (42a) is preferably 0 to 40° C., more preferably 0 to 20° C.

The reaction pressure in step (42a) is preferably 0.1 to 5 MPa, more preferably 0.1 to 1 MPa.

The reaction time in step (42a) is preferably 0.1 to 72 hours, more preferably 3 to 12 hours.

When the reaction in step (42a) is carried out in a solvent, a solution containing the compound (42a) is obtained after the completion of the reaction. The compound (42a) with a high purity may be collected by adding water to the solution, followed by standing, so that the solution is separated into two phases and collecting the water phase, thereby distilling off the solvent. When the compound (42a) has a group represented by $-OSO_3H$ (that is, when X is H), use of an alkali aqueous solution such as a sodium bicarbonate aqueous solution and ammonia water instead of water enables conversion of $-OSO_3H$ into a sulfate group.

The solvent may be distilled off, evaporated, or purified after the completion of each step, so as to enhance the purity of the compound to be obtained.

Next, the surfactant (b) will be described.

In Formula (b), $R^{1b}$ is a linear or branched alkyl group optionally having a substituent and having one or more carbon atoms or a cyclic alkyl group optionally having a substituent and having three or more carbon atoms.

The alkyl group can contain a monovalent or divalent heterocycle or can also form a ring, in the case of having three or more carbon atoms. The heterocycle is preferably an unsaturated heterocycle, more preferably an oxygen-containing unsaturated heterocycle, and examples thereof include a furan ring. In $R^{1b}$, a divalent heterocycle may be inserted between two carbon atoms, a divalent heterocycle may be located at an end and bonded to $-C(=O)-$, or a monovalent heterocycle may be located at an end of the alkyl group.

In this description, "the number of carbon atoms" of the alkyl group includes the number of carbon atoms forming the heterocycle.

The substituent optionally contained in the alkyl group as $R^{1b}$ is preferably a halogen atom, a linear or branched alkyl group having 1 to 10 carbon atoms or a cyclic alkyl group having 3 to 10 carbon atoms, or a hydroxy group, particularly preferably a methyl group or an ethyl group.

The alkyl group serving as $R^{1b}$ is preferably free from carbonyl groups. In the alkyl group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms. The alkyl group preferably does not contain any substituents.

$R^{1b}$ is preferably a linear or branched alkyl group optionally having a substituent and having 1 to 10 carbon atoms or a cyclic alkyl group optionally having a substituent and having 3 to 10 carbon atoms, more preferably a linear or branched alkyl group free from carbonyl groups and having 1 to 10 carbon atoms or a cyclic alkyl group free from carbonyl groups and having 3 to 10 carbon atoms, further preferably a linear or branched alkyl group having 1 to 10 carbon atoms and having no substituents, furthermore preferably a linear or branched alkyl group having 1 to 3 carbon atoms and having no substituents, particularly preferably a methyl group ($-CH_3$) or an ethyl group ($-C_2H_5$), most preferably a methyl group ($-CH_3$).

In Formula (b), $R^{2b}$s and $R^{4b}$s are each independently H or a substituent. A plurality of $R^{2b}$s and a plurality of $R^{4b}$s may each be the same as or different from each other.

The substituent serving as each of $R^{2b}$ and $R^{4b}$ is preferably a halogen atom, a linear or branched alkyl group having 1 to 10 carbon atoms or a cyclic alkyl group having 3 to 10 carbon atoms, or a hydroxy group, particularly preferably a methyl group or an ethyl group.

The alkyl group serving as each of $R^{2b}$ and $R^{4b}$ is preferably free from carbonyl groups.

In the alkyl group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

The alkyl group serving as each of $R^{2b}$ and $R^{4b}$ is preferably a linear or branched alkyl group free from carbonyl groups and having 1 to 10 carbon atoms or a cyclic alkyl group free from carbonyl groups and having 3 to 10 carbon atoms, more preferably a linear or branched alkyl group free from carbonyl groups and having 1 to 10 carbon atoms, further preferably a linear or branched alkyl group having no substituents and having 1 to 3 carbon atoms, particularly preferably a methyl group ($-CH_3$) or an ethyl group ($-C_2H_5$).

$R^{2b}$s and $R^{4b}$s are preferably each independently H or a linear or branched alkyl group free from carbonyl groups and having 1 to 10 carbon atoms, more preferably H or a linear or branched alkyl group having no substituents and having 1 to 3 carbon atoms, furthermore preferably H, a methyl group ($-CH_3$) or an ethyl group ($-C_2H_5$), particularly preferably H.

In Formula (b), $R^{3b}$ is an alkylene group optionally having a substituent and having 1 to 10 carbon atoms. When a plurality of $R^{3b}$s are present, the plurality of $R^{3b}$s may be the same as or different from each other.

The alkylene group is preferably free from carbonyl groups.

In the alkylene group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkylene group preferably does not contain any substituents.

The alkylene group is preferably a linear or branched alkylene group optionally having a substituent and having 1 to 10 carbon atoms or a cyclic alkylene group optionally having a substituent and having 3 to 10 carbon atoms, preferably a linear or branched alkylene group free from carbonyl groups and having 1 to 10 carbon atoms or a cyclic alkylene group free from carbonyl groups and having 3 to 10 carbon atoms, more preferably a linear or branched alkylene group having no substituents and having 1 to 10 carbon atoms, further preferably a methylene group ($-CH_2-$), an ethylene group ($-C_2H_4-$), an isopropylene group ($-CH(CH_3)CH_2-$), or a propylene group ($-C_3H_6-$).

Any two of $R^{1b}$, $R^{2b}$, $R^{3b}$, and $R^{4b}$ may be bonded together to form a ring but preferably do not form a ring.

In Formula (b), n is an integer of 1 or more, n is preferably an integer of 1 to 40, more preferably an integer of 1 to 30, further preferably an integer of 5 to 25, particularly preferably an integer of 5 to 9 or 11 to 25.

In Formula (b), p and q are each independently an integer of 1 or more. p is preferably an integer of 0 to 10, more preferably 0 or 1. Preferably, q is an integer of 0 to 10, more preferably an integer of 0 to 5.

The sum of n, p, and q are preferably an integer of 5 or more. The sum of n, p, and q are more preferably an integer of 8 or more. The sum of n, p, and q are preferably an integer of 60 or less, more preferably an integer of 50 or less, further preferably an integer of 40 or less.

In Formula (b), $X^b$ is H, a metal atom, $NR^{5b}{}_4$, an imidazolium optionally having a substituent, a pyridinium optionally having a substituent, or a phosphonium optionally having a substituent, and $R^{5b}$s are each H or an organic group.

Four $R^{5b}$s may be the same as or different from each other. $R^{5b}$s are each preferably H or an organic group having 1 to 10 carbon atoms, more preferably H or an organic group having 1 to 4 carbon atoms. Examples of the metal atom include monovalent or divalent metal atoms such as alkali metals (Group 1) and alkaline earth metals (Group 2), and the metal atom is preferably Na, K, or Li. $X^b$ may be a metal atom or $NR^{5b}{}_4$ (where $R^{5b}$s are each as mentioned above).

$X^b$ is preferably H, an alkali metal (Group 1), an alkaline earth metal (Group 2), or $NR^{5b}{}_4$, more preferably H, Na, K, Li, or $NH_4$, for the ease of dissolution in water, further preferably Na, K, or $NH_4$ for further ease of dissolution in water, particularly preferably Na or $NH_4$, most preferably $NH_4$ for the ease of removal. When $X^b$ is $NH_4$, the solubility of the surfactant into an aqueous medium is excellent, and metal components hardly remain in PTFE or the final product.

In Formula (b), L is a single bond, $-CO_2-B-*$, $-OCO-B-*$, $-CONR^{6b}-B-*$, $-NR^{6b}CO-B-*$, or $-CO-$ (however, excluding carbonyl groups contained in $-CO_2-B-$, $-OCO-B-$, $-CONR^{6b}-B-$, and $-NR^{6b}CO-B-$), B is a single bond or an alkylene group optionally having a substituent and having 1 to 10 carbon atoms, and $R^{6b}$ is H or an alkyl group optionally having a substituent and having 1 to 4 carbon atoms. The alkylene group more preferably has 1 to 5 carbon atoms. Further, the $R^6$ is more preferably H or a methyl group. The symbol * represents the side bonded to $-OSO_3X^b$ in the formula.

L is preferably a single bond.

The surfactant (b) is preferably a compound represented by the following formula:

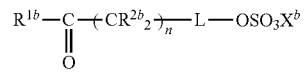

wherein $R^{1b}$, $R^{2b}$, L, n, and $X^b$ are defined as mentioned above.

The surfactant (b) preferably has an integral value of the total peak intensity of 10% or more, which is observed in a chemical shift region of 2.0 to 5.0 ppm in $^1$H-NMR spectrum.

The surfactant (b) preferably has an integral value of the total peak intensity falling within the aforementioned range, which is observed in a chemical shift region of 2.0 to 5.0 ppm in $^1$H-NMR spectrum. In this case, the surfactant preferably has a ketone structure in a molecule.

In the surfactant (b), the integral value is more preferably 15 or more and is preferably 95 or less, more preferably 80 or less, further preferably 70 or less.

The integral value is measured in a heavy water solvent at room temperature. The heavy water is adjusted to 4.79 ppm.

Examples of the surfactant (b) include $CH_3C(O)CH_2CH_2CH_2CH_2CH_2CH_2CH_2CH_2CH_2OSO_3Na$, $CH_3C(O)CH_2CH_2CH_2CH_2CH_2CH_2CH_2CH_2OSO_3Na$, $CH_3C(O)CH_2CH_2CH_2CH_2CH_2CH_2CH_2OSO_3Na$, $CH_3C(O)CH_2CH_2CH_2CH_2CH_2CH_2OSO_3Na$, $CH_3C(O)CH_2CH_2CH_2CH_2CH_2OSO_3Na$, $CH_3C(O)CH_2CH_2CH_2CH_2OSO_3Na$, $(CH_3)_3CC(O)CH_2CH_2CH_2CH_2CH_2CH_2CH_2CH_2CH_2OSO_3Na$, $(CH_3)_2CHC(O)CH_2CH_2CH_2CH_2CH_2CH_2CH_2CH_2CH_2OSO_3Na$, $(CH_2)_5CHC(O)CH_2CH_2CH_2CH_2CH_2CH_2CH_2CH_2CH_2OSO_3Na$, $CH_3CH_2C(O)CH_2CH_2CH_2CH_2CH_2CH_2CH_2CH_2OSO_3Na$, $CH_3CH_2CH_2C(O)CH_2CH_2CH_2CH_2CH_2CH_2CH_2OSO_3Na$, $CH_3CH_2CH_2CH_2C(O)CH_2CH_2CH_2CH_2CH_2CH_2OSO_3Na$, $CH_3CH_2CH_2CH_2CH_2C(O)CH_2CH_2CH_2CH_2CH_2OSO_3Na$, $CH_3CH_2CH_2CH_2CH_2CH_2C(O)CH_2CH_2CH_2CH_2OSO_3Na$, $CH_3CH_2CH_2CH_2CH_2CH_2CH_2C(O)CH_2CH_2CH_2OSO_3Na$, $CH_3CH_2CH_2CH_2CH_2CH_2CH_2CH_2C(O)CH_2CH_2OSO_3Na$, $CH_3CH_2CH_2CH_2CH_2CH_2CH_2CH_2CH_2C(O)CH_2OSO_3Na$, $CH_3C(O)CH_2CH_2CH_2CH_2CH_2CH_2CH_2CH_2OCH_2CH_2OSO_3Na$, $CH_3C(O)CH_2CH_2CH_2CH_2CH_2CH_2CH_2CH_2C(O)NHCH_2OSO_3Na$, $CH_3C(O)CH_2CH_2CH_2CH_2CH_2CH_2CH_2CH_2NHC(O)CH_2OSO_3Na$, $CH_3C(O)CH_2CH_2CH_2CH_2CH_2CH_2CH_2CH_2CH_2C(O)OSO_3Na$, $CH_3C(O)CH_2CH_2CH_2CH_2CH_2CH_2CH_2CH_2CH_2C(O)OCH_2OSO_3Na$, $CH_3C(O)CH_2CH_2CH_2CH_2CH_2CH_2CH_2CH_2OC(O)CH_2OSO_3Na$, $CH_3C(O)CH_2CH_2CH_2CH_2CH_2CH_2CH_2CH_2OSO_3H$, $CH_3C(O)CH_2CH_2CH_2CH_2CH_2CH_2CH_2CH_2OSO_3Li$, $CH_3C(O)CH_2CH_2CH_2CH_2CH_2CH_2CH_2CH_2OSO_3K$, $CH_3C(O)$ CH₂CH₂CH₂CH₂CH₂CH₂CH₂CH₂CH₂OSO₃NH₄, CH₃C(O)CH₂CH₂CH₂CH₂CH₂CH₂CH₂CH(CH₃)₂OSO₃Na, CH₃C(O)CH₂CH₂CH₂CH₂CH₂CH₂CH₂CH₂CH₂CH₂CH₂CH₂CH₂CH₂CH₂CH₂OSO₃Na, CH₃C(O)CH₂CH₂CH₂CH₂CH₂CH₂CH₂CH₂CH₂CH₂CH₂CH₂CH₂CH₂OSO₃Na, CH₃C(O)CH₂CH₂CH₂CH₂CH₂CH₂CH₂CH₂CH₂CH₂CH₂CH₂CH₂OSO₃Na, CH₃C(O)CH₂CH₂CH₂CH₂CH₂CH₂CH₂CH₂CH₂CH₂CH₂CH₂OSO₃Na, CH₃C(O)CH₂CH₂CH₂CH₂CH₂CH₂CH₂CH₂CH₂CH₂CH₂OSO₃Na, CH₃C(O)CH₂CH₂CH₂CH₂CH₂CH₂CH₂CH₂CH₂CH₂OSO₃Na, CH₃C(O)CH₂CH₂CH₂CH₂CH₂CH₂CH₂CH₂CH₂OSO₃Na, CH₃C(O)CH₂CH₂CH₂CH₂CH₂CH₂CH₂CH₂CH₂CH₂OSO₃Na, (CH₃)₃CC(O)CH₂CH₂CH₂CH₂CH₂CH₂CH₂CH₂CH₂CH₂CH₂CH₂CH₂CH₂CH₂CH₂OSO₃Na, (CH₃)₂CHC(O)CH₂CH₂CH₂CH₂CH₂CH₂CH₂CH₂CH₂CH₂CH₂CH₂CH₂CH₂CH₂OSO₃Na, (CH₂)₅CHC(O)CH₂CH₂CH₂CH₂CH₂CH₂CH₂CH₂CH₂CH₂CH₂CH₂CH₂CH₂OSO₃Na, CH₃CH₂C(O)CH₂CH₂CH₂CH₂CH₂CH₂CH₂CH₂CH₂CH₂CH₂CH₂OSO₃Na, CH₃CH₂CH₂CH₂C(O)CH₂CH₂CH₂CH₂CH₂CH₂CH₂CH₂OSO₃Na, CH₃CH₂CH₂CH₂CH₂C(O)CH₂CH₂CH₂CH₂CH₂CH₂OSO₃Na, CH₃CH₂CH₂CH₂CH₂CH₂CH₂CH₂CH₂OSO₃Na, CH₃CH₂CH₂CH₂CH₂CH₂CH₂CH₂CH₂C(O)CH₂CH₂CH₂CH₂CH₂CH₂CH₂OSO₃Na, CH₃CH₂CH₂CH₂CH₂CH₂CH₂CH₂CH₂CH₂CH₂CH₂C(O)CH₂CH₂CH₂CH₂OSO₃Na, CH₃CH₂C(O)CH₂CH₂CH₂CH₂CH₂CH₂CH₂CH₂CH₂CH₂CH₂OCH₂CH₂OSO₃Na, CH₃CH₂C(O)CH₂CH₂CH₂CH₂CH₂CH₂CH₂CH₂CH₂CH₂CH₂CH₂CH₂C(O)NHCH₂CH₂O SO₃Na, CH₃CH₂C(O)CH₂CH₂CH₂CH₂CH₂CH₂CH₂CH₂CH₂NHC(O)CH₂CH₂O SO₃Na, CH₃CH₂C(O)CH₂CH₂CH₂CH₂CH₂CH₂CH₂CH₂CH₂C(O)OCH₂CH₂OS O₃Na, CH₃CH₂C(O)CH₂CH₂CH₂CH₂CH₂CH₂CH₂CH₂CH₂OC(O)CH₂CH₂OS O₃Na, CH₃CH₂C(O)CH₂CH₂CH₂CH₂CH₂CH₂CH₂CH₂CH₂CH₂CH₂C(O)OSO₃Na, CH₃CH₂C(O)CH₂CH₂CH₂CH₂CH₂CH₂CH₂CH₂CH₂CH₂OSO₃H, CH₃CH₂C(O)CH₂CH₂CH₂CH₂CH₂CH₂CH₂CH₂CH₂CH₂CH₂OSO₃Li, CH₃CH₂C(O)CH₂CH₂CH₂CH₂CH₂CH₂CH₂CH₂CH₂CH₂OSO₃K, CH₃CH₂C(O)CH₂CH₂CH₂CH₂CH₂CH₂CH₂CH₂CH₂CH₂CH₂OSO₃NH₄, and CH₃C(O)CH₂CH₂CH₂CH₂CH₂CH₂CH₂CH₂CH₂CH₂CH₂CH₂CH₂CH₂CH₂CH₂OS O₃Na.

The surfactant (b) is a new compound and can be produced by the production methods described below as examples.

The surfactant (b) can be produced by a production method including: step (11b) of obtaining a compound (11b) represented by the following formula:

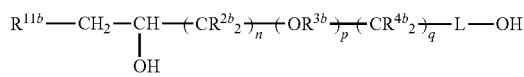

wherein L, $R^{2b}$ to $R^{4b}$, $R^{11b}$, n, p, and q are defined as mentioned above, by hydroxylating a compound (10b) represented by the following formula:

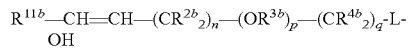

wherein $R^{2b}$ to $R^{4b}$, n, p, and q are defined as mentioned above, $R^{11b}$ is H, a linear or branched alkyl group optionally having a substituent and having one or more carbon atoms, or a cyclic alkyl group optionally having a substituent and having three or more carbon atoms and may contain a monovalent or divalent heterocycle or may form a ring, in the case of having three or more carbon atoms, L is a single bond, —CO₂—B—*, —OCO—B—*, —CONR$^{6b}$—B—*, —NR$^{6b}$CO—B—*, or —CO— (however, excluding carbonyl groups contained in —CO₂—B—, —OCO—B—, —CONR$^{6b}$—B—, and —NR$^{6b}$CO—B—), B is a single bond or an alkylene group optionally having a substituent and having 1 to 10 carbon atoms, $R^{6b}$ is H or an alkyl group optionally having a substituent and having 1 to 4 carbon atoms, and the symbol * represents the side bonded to —OH in the formula; step (12b) of obtaining a compound (12b) represented by the following formula:

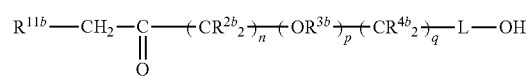

wherein L, $R^{2b}$ to $R^{4b}$, $R^{11b}$, n, p, and q are defined as mentioned above, by oxidizing the compound (11b); and step (13b) of obtaining a compound (13b) represented by the following formula:

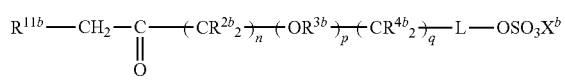

wherein L, $R^{2b}$ to $R^{4b}$, $R^{11b}$, n, p, q, and $X^b$ are defined as mentioned above, by sulfate esterification of the compound (12b)

The alkyl group serving as $R^{11b}$ is preferably free from carbonyl groups.

In the alkyl group serving as $R^{11b}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

$R^{11b}$ is preferably H, a linear or branched alkyl group optionally having a substituent and having 1 to 9 carbon atoms, or a cyclic alkyl group optionally having a substituent and having 3 to 9 carbon atoms, more preferably H, a linear or branched alkyl group free from carbonyl groups and having 1 to 9 carbon atoms, or a cyclic alkyl group free from carbonyl groups and having 3 to 9 carbon atoms, further preferably H or a linear or branched alkyl group having 1 to 9 carbon atoms and having no substituents, furthermore preferably H, a methyl group (—CH₃), or an ethyl group (—C₂H₅), particularly preferably H or a methyl group (—CH₃), most preferably H.

The hydroxylation in step (11b) can be performed, for example, by a method (1) of allowing iron (II) phthalocyanine (Fe(Pc)) and sodium borohydride to act on the compound (10b) in an oxygen atmosphere, or a method (2) of allowing isopinocampheylborane (IpcBH$_2$) to act on the compound (10b), followed by oxidizing an intermediate (dialkylborane) to be obtained.

In the method (1), the iron (II) phthalocyanine can be used in an amount equal to that of catalyst, such as an amount of 0.001 to 1.2 mol, relative to 1 mol of the compound (10b).

In the method (1), sodium borohydride can be used in an amount of 0.5 to 20 mol, relative to 1 mol of the compound (10b).

The reaction in the method (1) can be performed in a solvent. The solvent is preferably an organic solvent, and examples thereof include ethers, halogenated hydrocarbons, aromatic hydrocarbons, nitriles, and nitrogen-containing polar organic compounds.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

The reaction temperature in the method (1) is preferably −78 to 200° C., more preferably 0 to 150° C.

The reaction pressure in the method (1) is preferably 0 to 5.0 MPa, more preferably 0.1 to 1.0 MPa.

The reaction time in the method (1) is preferably 0.1 to 72 hours, more preferably 0.1 to 48 hours.

In the method (2), isopinocampheylborane can be used in an amount of 1.0 to 10.0 mol, relative to 1 mol of the compound (10b).

The reaction of the compound (10b) with isopinocampheylborane can be performed in a solvent. The solvent is preferably an organic solvent, and examples thereof include ethers, halogenated hydrocarbons, and aromatic hydrocarbons.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The reaction temperature of the compound (10b) with isopinocampheylborane is preferably −78 to 200° C., more preferably 0 to 150° C.

The reaction pressure of the compound (10b) with isopinocampheylborane is preferably 0 to 5.0 MPa, more preferably 0.1 to 1.0 MPa.

The reaction time of the compound (10b) with isopinocampheylborane is preferably 0.1 to 72 hours, more preferably 0.1 to 48 hours.

The oxidation in the method (2) can be performed by allowing an oxidant to act on the intermediate. Examples of the oxidant include hydrogen peroxide. The oxidant can be used in an amount of 0.7 to 10 mol relative to 1 mol of the intermediate.

The oxidation in the method (2) can be performed in a solvent. Examples of the solvent include water, methanol, and ethanol. Among these, water is preferable.

The oxidation temperature in the method (2) is preferably 0 to 100° C., more preferably 0 to 80° C.

The oxidation pressure in the method (2) is preferably 0 to 5.0 MPa, more preferably 0.1 to 1.0 MPa.

The oxidation time in the method (2) is preferably 0.1 to 72 hours, more preferably 0.1 to 48 hours.

Examples of the method for oxidizing the compound (11b) in step (12b) include a method (a) of using Jones reagent ($CrO_3/H_2SO_4$) (Jones oxidation), a method (b) of using Dess-Martin Periodinane (DMP) (Dess-Martin oxidation), a method (c) of using pyridinium chlorochromate (PCC), a method (d) of allowing a bleach (about 5 to 6% NaOCl aqueous solution) to act in the presence of a nickel compound such as $NiCl_2$, and a method (e) of allowing a hydrogen receptor such as an aldehyde and a ketone to act in the presence of an aluminum catalyst such as $Al(CH_3)_3$ and $Al[OCH(CH_3)_2]_3$ (Oppenauer oxidation).

The oxidation in step (12b) can be performed in a solvent. As the solvent, water and an organic solvent are preferable, and examples thereof include water, ketones, ethers, halogenated hydrocarbons, aromatic hydrocarbons, and nitriles.

Examples of the ketones include acetone, methyl ethyl ketone, methyl isobutyl ketone, cyclohexanone, and diacetone alcohol. Among these, acetone is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

The oxidation temperature in step (12b) is preferably −78 to 200° C. and can be appropriately selected corresponding to the method employed.

The oxidation pressure in step (12b) is preferably 0 to 5.0 MPa and can be appropriately selected corresponding to the method employed.

The oxidation time in step (12b) is preferably 0.1 to 72 hours and can be appropriately selected corresponding to the method employed.

The sulfate esterification in step (13b) can be performed by reacting the compound (12b) with a sulfating reagent.

Examples of the sulfating reagent include sulfur trioxide amine complexes such as sulfur trioxide pyridine complex, sulfur trioxide trimethylamine complex, and sulfur trioxide triethylamine complex, sulfur trioxide amide complexes such as sulfur trioxide dimethylformamide complex, sulfuric acid-dicyclohexylcarbodiimide, chlorosulfuric acid, concentrated sulfuric acid, and sulfamic acid. The amount of the sulfating reagent used is preferably 0.5 to 10 mol, more preferably 0.5 to 5 mol, further preferably 0.7 to 4 mol, relative to 1 mol of the compound (12b).

The sulfate esterification in step (13b) can be performed in a solvent. The solvent is preferably an organic solvent, and examples thereof include ethers, halogenated hydrocarbons, aromatic hydrocarbons, pyridines, dimethylsulfoxides, sulfolanes, and nitriles.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

The sulfate esterification temperature in step (13b) is preferably −78 to 200° C., more preferably −20 to 150° C.

The sulfate esterification pressure in step (13b) is preferably 0 to 10 MPa, more preferably 0.1 to 5 MPa.

The sulfate esterification time in step (13b) is preferably 0.1 to 72 hours, more preferably 0.1 to 48 hours.

The surfactant (b) can be produced also by a production method including: step (21b) of obtaining a compound (21b) represented by the following formula:

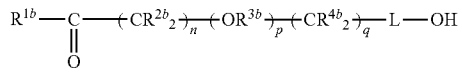

wherein L, $R^{1b}$ to $R^{4b}$, n, p, and q are defined as mentioned above, by ozonolysis of a compound (20b) represented by the following formula:

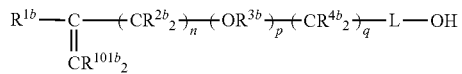

wherein L, $R^{1b}$ to $R^{4b}$, n, p, and q are defined as mentioned above, and $R^{101b}$ is an organic group; and step (22b) of obtaining a compound (22b) represented by the following formula:

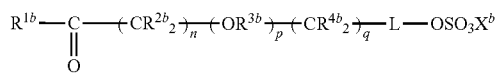

wherein L, $R^{1b}$ to $R^{4b}$, n, p, q, and $X^b$ are defined as mentioned above, by sulfate esterification of the compound (21b)

$R^{101b}$s are each preferably an alkyl group having 1 to 20 carbon atoms. Two $R^{101b}$s may be the same as or different from each other.

The ozonolysis in step (21b) can be performed by allowing ozone to act on the compound (20b), followed by post-treatment with a reductant.

The ozone can be generated by silent discharge in oxygen gas.

Examples of the reductant to be used for the post-treatment include zinc, dimethyl sulfide, thiourea, phosphines. Among these, phosphines are preferable.

The ozonolysis in step (21b) can be performed in a solvent. The solvent is preferably water or an organic solvent. Examples thereof include water, alcohols, carboxylic acids, ethers, halogenated hydrocarbons, and aromatic hydrocarbons.

Examples of the alcohols include methanol, ethanol, 1-propanol, and isopropanol. Among these, methanol and ethanol are preferable.

Examples of the carboxylic acids include acetic acid and propionic acid. Among these, acetic acid is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The ozonolysis temperature in step (21b) is preferably −78 to 200° C., more preferably 0 to 150° C.

The ozonolysis pressure in step (21b) is preferably 0 to 5.0 MPa, more preferably 0.1 to 1.0 MPa.

The ozonolysis time in step (21b) is preferably 0.1 to 72 hours, more preferably 0.1 to 48 hours.

The sulfate esterification in step (22b) can be performed by reacting the compound (21b) with a sulfating reagent, and the same conditions as in the sulfate esterification in step (13b) can be employed therefor.

The surfactant (b) can be produced also by a production method including: step (31b) of obtaining a compound (31b) represented by the following formula:

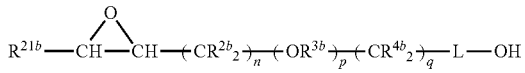

wherein L, $R^{2b}$ to $R^{4b}$, $R^{21b}$, n, p, and q are defined as mentioned above, by epoxidizing a compound (30b) represented by the following formula:

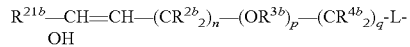

wherein L, $R^{2b}$ to $R^{4b}$, n, p, and q are defined as mentioned above, $R^{21b}$ is H, a linear or branched alkyl group optionally having a substituent and having one or more carbon atoms, or a cyclic alkyl group optionally having a substituent and having three or more carbon atoms and may contain a monovalent or divalent heterocycle or may form a ring, in the case of having three or more carbon atoms; step (32b) of obtaining a compound (32b) represented by the following formula:

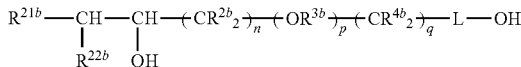

wherein L, $R^{2b}$ to $R^{4b}$, $R^{21b}$, $R^{22b}$, n, p, and q are defined as mentioned above, by reacting the compound (31b) with a dialkylcopper lithium represented by:

wherein R$^{22b}$s are each a linear or branched alkyl group optionally having a substituent and having one or more carbon atoms or a cyclic alkyl group optionally having a substituent and having three or more carbon atoms and may contain a monovalent or divalent heterocycle or may form a ring, in the case of having three or more carbon atoms; step (33b) of obtaining a compound (33b) represented by the following formula:

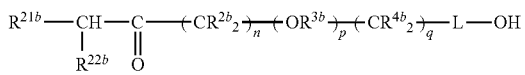

wherein L, R$^{2b}$ to R$^{4b}$, R$^{21b}$, R$^{22b}$, n, p, and q are defined as mentioned above, by oxidizing the compound (32b); and step (34b) of obtaining a compound (34b) represented by the following formula:

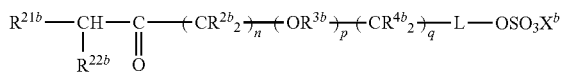

wherein L, R$^{2b}$ to R$^{4b}$, R$^{21b}$, R$^{22b}$, n, p, q, and X$^b$ are defined as mentioned above, by sulfate esterification of the compound (33b).

The alkyl group serving as R$^{21b}$ is preferably free from carbonyl groups.

In the alkyl group serving as R$^{21b}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

R$^{21b}$ is preferably H, a linear or branched alkyl group optionally having a substituent and having 1 to 8 carbon atoms, or a cyclic alkyl group optionally having a substituent and having 3 to 8 carbon atoms, more preferably H, a linear or branched alkyl group free from carbonyl groups and having 1 to 8 carbon atoms, or a cyclic alkyl group free from carbonyl groups and having 3 to 8 carbon atoms, further preferably H or a linear or branched alkyl group having no substituents and having 1 to 8 carbon atoms, particularly preferably H or a methyl group (—CH$_3$), most preferably H.

The alkyl group serving as each R$^{22b}$ is preferably free from carbonyl groups.

In the alkyl group serving as each R$^{22b}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

R$^{22b}$s are each preferably a linear or branched alkyl group optionally having a substituent and having 1 to 9 carbon atoms or a cyclic alkyl group optionally having a substituent and having 3 to 9 carbon atoms, more preferably a linear or branched alkyl group free from carbonyl groups and having 1 to 9 carbon atoms or a cyclic alkyl group free from carbonyl groups and having 3 to 9 carbon atoms, further preferably a linear or branched alkyl group having 1 to 9 carbon atoms and having no substituents, particularly preferably a methyl group (—CH$_3$) or an ethyl group (—C$_2$H$_5$), most preferably a methyl group (—CH$_3$).

Two R$^{22b}$s may be the same as or different from each other.

R$^{21b}$ and R$^{22b}$s preferably have 1 to 7 carbon atoms, more preferably 1 to 2, most preferably 1, in total.

The epoxidation in step (31b) can be performed by allowing an epoxidizing agent to act on the compound (30b).

Examples of the epoxidizing agent include peracids such as metachloroperbenzoic acid (m-CPBA), perbenzoic acid, hydrogen peroxide, and tert-butyl hydroperoxide, dimethyldioxirane, and methyltrifluoromethyldioxirane. Among these, peracids are preferable, and metachloroperbenzoic acid is more preferable. The epoxidizing agent can be used in an amount of 0.5 to 10.0 mol relative to 1 mol of the compound (30b).

The epoxidation in step (31b) can be performed in a solvent. The solvent is preferably an organic solvent, and examples thereof include ketones, ethers, halogenated hydrocarbons, aromatic hydrocarbons, nitriles, pyridines, nitrogen-containing polar organic compounds, and dimethylsulfoxides. Among these, dichloromethane is preferable.

Examples of the ketones include acetone, methyl ethyl ketone, methyl isobutyl ketone, cyclohexanone, and diacetone alcohol. Among these, acetone is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

The epoxidation temperature in step (31b) is preferably −78 to 200° C., more preferably −40 to 150° C.

The epoxidation pressure in step (31b) is preferably 0 to 5.0 MPa, more preferably 0.1 to 1.0 MPa.

The epoxidation time in step (31b) is preferably 0.1 to 72 hours, more preferably 0.1 to 48 hours.

The dialkylcopper lithium can be used in step (32b) in an amount of 0.5 to 10.0 mol relative to 1 mol of the compound (31b).

The reaction in step (32b) can be performed in a solvent. The solvent is preferably an organic solvent, and examples thereof include ethers, halogenated hydrocarbons, and aromatic hydrocarbons.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The reaction temperature in step (32b) is preferably −78 to 200° C., more preferably −40 to 150° C.

The reaction pressure in step (32b) is preferably 0 to 5.0 MPa, more preferably 0.1 to 1.0 MPa.

The reaction time in step (32b) is preferably 0.1 to 72 hours, more preferably 0.1 to 48 hours.

Examples of the method for oxidizing the compound (32b) in step (33b) include a method (a) of using Jones reagent ($CrO_3/H_2SO_4$) (Jones oxidation), a method (b) of using Dess-Martin Periodinane (DMP) (Dess-Martin oxidation), a method (c) of using pyridinium chlorochromate (PCC), a method (d) of allowing a bleach (about 5 to 6% NaOCl aqueous solution) to act in the presence of a nickel compound such as $NiCl_2$, and a method (e) of allowing a hydrogen receptor such as an aldehyde and a ketone to act in the presence of an aluminum catalyst such as $Al(CH_3)_3$ and $Al[OCH(CH_3)_2]_3$ (Oppenauer oxidation).

The oxidation in step (33b) can be performed in a solvent. As the solvent, water and an organic solvent are preferable, and examples thereof include water, ketones, alcohols, ethers, halogenated hydrocarbons, aromatic hydrocarbons, and nitriles.

Examples of the ketones include acetone, methyl ethyl ketone, methyl isobutyl ketone, cyclohexanone, and diacetone alcohol. Among these, acetone is preferable.

Examples of the alcohols include methanol, ethanol, 1-propanol, and isopropanol. Among these, methanol and ethanol are preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

The oxidation temperature in step (33b) is preferably −78 to 200° C. and can be appropriately selected corresponding to the method employed.

The oxidation pressure in step (33b) is preferably 0 to 5.0 MPa and can be appropriately selected corresponding to the method employed.

The oxidation time in step (33b) is preferably 0.1 to 72 hours and can be appropriately selected corresponding to the method employed.

The sulfate esterification in step (34b) can be performed by reacting the compound (33b) with a sulfating reagent, and the same conditions as in the sulfate esterification in step (13b) can be employed therefor.

The surfactant (b) can be produced also by a production method including: step (41b) of obtaining a compound (41b) represented by the following formula:

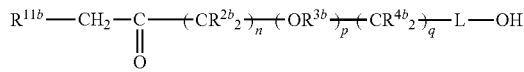

wherein L, $R^{2b}$ to $R^{4b}$, $R^{11b}$, n, p, and q are defined as mentioned above, by oxidizing the compound (10b) represented by the following formula:

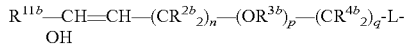

wherein L, $R^{2b}$ to $R^{4b}$, $R^{11b}$, n, p, and q are defined as mentioned above; and step (42b) of obtaining a compound (42b) represented by the following formula:

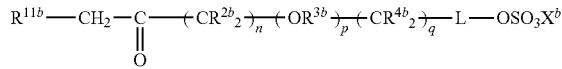

wherein L, $R^{2b}$ to $R^{4b}$, $R^{11b}$, n, p, q, and $X^b$ are defined as mentioned above, by sulfate esterification of the compound (41b)

The oxidation in step (41b) can be performed by allowing an oxidant to act on the compound (10b) in the presence of water and a palladium compound.

Examples of the oxidant include monovalent or divalent copper salts such as copper chloride, copper acetate, copper cyanide, and copper trifluoromethanethiol, iron salts such as iron chloride, iron acetate, iron cyanide, iron trifluoromethanethiol, and hexacyanoiron, benzoquinones such as 1,4-benzoquinone, 2,3-dichloro-5,6-dicyano-1,4-benzoquinone, tetrachloro-1,2-benzoquinone, and tetrachloro-1,4-benzoquinone, $H_2O_2$, $MnO_2$, $KMnO_4$, $RuO_4$, m-chloroperbenzoic acid, and oxygen. Among these, copper salts, iron salts, and benzoquinones are preferable, and copper chloride, iron chloride, and 1,4-benzoquinone are more preferable.

The oxidant can be used in an amount of 0.001 to 10 mol, relative to 1 mol of the compound (10b).

The water can be used in an amount of 0.5 to 1000 mol, relative to 1 mol of the compound (10b).

Examples of the palladium compound include palladium dichloride. The palladium compound can be used in an amount equal to that of catalyst, such as an amount of 0.0001 to 1.0 mol, relative to 1 mol of the compound (10b).

The oxidation in step (41b) can be performed in a solvent. Examples of the solvent include water, esters, aliphatic hydrocarbons, aromatic hydrocarbons, alcohols, carboxylic acids, ethers, halogenated hydrocarbons, nitrogen-containing polar organic compounds, nitriles, dimethylsulfoxides, and sulfolanes.

Examples of the esters include ethyl acetate, butyl acetate, ethylene glycol monomethyl ether acetate, and propylene glycol monomethyl ether acetate (PGMEA, also known as 1-methoxy-2-acetoxypropane). Among these, ethyl acetate is preferable.

Examples of the aliphatic hydrocarbons include hexane, cyclohexane, heptane, octane, nonane, decane, undecane, dodecane, and petroleum spirit. Among these, cyclohexane and heptane are preferable.

Examples of the aromatic hydrocarbons include benzene, toluene, and xylenes. Among these, benzene and toluene are preferable.

Examples of the alcohol include methanol, ethanol, 1-propanol, and isopropanol.

Examples of the carboxylic acids include acetic acid and propionic acid. Among these, acetic acid is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

Examples of the nitriles include acetonitrile, propionitrile, butyronitrile, isobutyronitrile, and benzonitrile. Among these, acetonitrile is preferable.

The oxidation temperature in step (41b) is preferably −78 to 200° C., more preferably −20 to 150° C.

The oxidation pressure in step (41b) is preferably 0 to 10 MPa, more preferably 0.1 to 5.0 MPa.

The oxidation time in step (41b) is preferably 0.1 to 72 hours, more preferably 0.1 to 48 hours.

The sulfate esterification in step (42b) can be performed by reacting the compound (41b) with a sulfating reagent, and the same conditions as in the sulfate esterification in step (13b) can be employed therefor.

The surfactant (b) can be produced also by a production method including: step (51) of obtaining the compound (51) represented by the following formula:

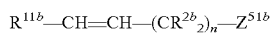

wherein $R^{2b}$, $R^{11b}$, and n are defined as mentioned above, and $Z^{51b}$ is a halogen atom, by reacting a compound (50) represented by the following formula:

wherein $R^{2b}$, $R^{11b}$, and n are defined as mentioned above, with a halogenating agent; step (52) of obtaining a compound (52) represented by the following formula:

wherein L, $R^{2b}$, $R^{3b}$, $R^{11b}$, and n are defined as mentioned above, by reacting the compound (51) with an alkylene glycol represented by:

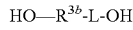

wherein L and $R^{3b}$ are defined as mentioned above; step (53) of obtaining a compound (53) represented by the following formula:

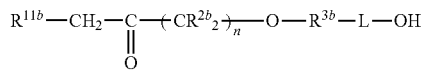

wherein L, $R^{2b}$, $R^{3b}$, $R^{11b}$, and n are defined as mentioned above, by oxidizing the compound (52); and step (54) of obtaining a compound (54) represented by the following formula:

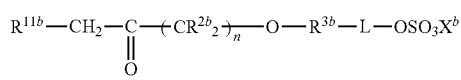

wherein L, $R^{2b}$, $R^{3b}$, $R^{11b}$, n, and $X^b$ are defined as mentioned above, by sulfate esterification of the compound (53).

$Z^{51b}$ is preferably F, Cl, Br, or I, more preferably Br.

Examples of the halogenating agent to be used in step (51) include N-bromosuccinimide and N-chlorosuccinimide.

The halogenating agent can be used in an amount of 0.5 to 10.0 mol, relative to 1 mol of the compound (50).

The reaction in step (51) can be performed in the presence of phosphines such as triphenylphosphine.

The phosphines can be used in an amount of 0.5 to 10.0 mol, relative to 1 mol of the compound (50).

The reaction in step (51) can be performed in a solvent. The solvent is preferably an organic solvent, and examples thereof include ethers, halogenated hydrocarbons, and aromatic hydrocarbons.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The reaction temperature in step (51) is preferably −78 to 200° C., more preferably −40 to 150° C.

The reaction pressure in step (51) is preferably 0 to 5.0 MPa, more preferably 0.1 to 1.0 MPa.

The reaction time in step (51) is preferably 0.1 to 72 hours, more preferably 0.1 to 48 hours.

In step (52), the alkylene glycol can be used in an amount of 0.5 to 10.0 mol, relative to 1 mol of the compound (51).

The reaction in step (52) can be performed in the presence of a base. Examples of the base include sodium hydride, sodium hydroxide, and potassium hydroxide.

The base can be used in an amount of 0.5 to 10.0 mol, relative to 1 mol of the compound (51).

The reaction in step (52) can be performed in a solvent. The solvent is preferably an organic solvent, and examples thereof include nitrogen-containing polar organic compounds, ethers, halogenated hydrocarbons, and aromatic hydrocarbons.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The reaction temperature in step (52) is preferably −78 to 200° C., more preferably −40 to 150° C.

The reaction pressure in step (52) is preferably 0 to 5.0 MPa, more preferably 0.1 to 1.0 MPa.

The reaction time in step (52) is preferably 0.1 to 72 hours, more preferably 0.1 to 48 hours.

The oxidation in step (53) can be performed by allowing an oxidant to act on the compound (52) in the presence of water and a palladium compound, and the same conditions as in the oxidation in step (41) can be employed therefor.

The sulfate esterification in step (54) can be performed by reacting the compound (53) with a sulfating reagent, and the same conditions as in the sulfate esterification in step (13) can be employed therefor.

In any of the aforementioned production methods, the solvent may be distilled off, evaporated, or purified after the completion of each step, so as to enhance the purity of the compound to be obtained. Further, when the compound to be obtained has a group represented by —OSO$_3$H (that is, when $X^b$ is H), —OSO$_3$H can be converted into a sulfate group by contact with an alkali such as sodium carbonate and ammonia.

Among the methods for producing the surfactant (b), the production method including steps (41b) and (42b) is preferable.

The surfactant (c) will be described.

In Formula (c), $R^{1c}$ is a linear or branched alkyl group having one or more carbon atoms or a cyclic alkyl group having three or more carbon atoms.

The alkyl group may contain a carbonyl group (—C(=O)—) between two carbon atoms in the case of having three or more carbon atoms. Further, the alkyl group can also contain the carbonyl group at an end of the alkyl group in the case of having two or more carbon atoms. That is, acyl groups such as an acetyl group represented by CH$_3$—C(=O)— are also included in the alkyl group.

Further, the alkyl group can contain a monovalent or divalent heterocycle or can also form a ring in the case of having three or more carbon atoms. The heterocycle is preferably an unsaturated heterocycle, more preferably an oxygen-containing unsaturated heterocycle, and examples thereof include a furan ring. In $R^{1c}$, a divalent heterocycle may be inserted between two carbon atoms, a divalent heterocycle may be located at an end and bonded to —C(=O)—, or a monovalent heterocycle may be located at an end of the alkyl group.

In this description, "the number of carbon atoms" of the alkyl group includes the number of carbon atoms forming the carbonyl group and the number of carbon atoms forming the heterocycle. For example, a group represented by CH$_3$—C(=O)—CH$_2$— has 3 carbon atoms, a group represented by CH$_3$—C(=O)—C$_2$H$_4$—C(=O)—C$_2$H$_4$— has 7 carbon atoms, and a group represented by CH$_3$—C(=O)— has 2 carbon atoms.

In the alkyl group, a hydrogen atom bonded to a carbon atom may be substituted with a functional group, such as a monovalent organic group containing a hydroxy group (—OH) or an ester bond, but is preferably not substituted with any functional groups.

Examples of the monovalent organic group containing an ester bond include a group represented by the formula: —O—C(=O)—R$^{101c}$, wherein R$^{101c}$ is an alkyl group.

In the alkyl group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

In the formula(c), $R^{2c}$s and $R^{3c}$ are each independently a single bond or a divalent linking group.

$R^{2c}$s and $R^{3c}$ are preferably each independently a single bond, a linear or branched alkylene group having one or more carbon atoms, or a cyclic alkylene group having three or more carbon atoms.

The alkylene group forming $R^{2c}$s and $R^{3c}$ is preferably free from carbonyl groups.

In the alkylene group, a hydrogen atom bonded to a carbon atom may be substituted with a functional group, such as a monovalent organic group containing a hydroxy group (—OH) or an ester bond, but is preferably not substituted with any functional groups.

Examples of the monovalent organic group containing an ester bond include a group represented by the formula: —O—C(=O)—R$^{102c}$, wherein R$^{102c}$ is an alkyl group.

In the alkylene group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkylene group free from halogen atoms such as fluorine atoms and chlorine atoms.

$R^{1c}$, $R^{2c}$, and $R^{3c}$ have 5 or more carbon atoms in total. The total number of carbon atoms is preferably 7 or more, more preferably 9 or more, and is preferably 20 or less, more preferably 18 or less, further preferably 15 or less.

Any two of $R^{1c}$, $R^{2c}$, and $R^{3c}$ may be bonded together to form a ring.

In Formula (c), $A^c$ is —COOX$^c$ or —SO$_3$X$^c$ (where X$^c$ is H, a metal atom, NR$^{4c}_4$, an imidazolium optionally having a substituent, a pyridinium optionally having a substituent, or a phosphonium optionally having a substituent, and R$^{4c}$s are each H or an organic group and may be the same as or different from each other). R$^{4c}$s are each preferably H or an organic group having 1 to 10 carbon atoms, more preferably H or an organic group having 1 to 4 carbon atoms. Examples of the metal atom include monovalent or divalent metal atoms such as alkali metals (Group 1) and alkaline earth metals (Group 2), and the metal atom is preferably Na, K, or Li.

X$^c$ is preferably H, an alkali metal (Group 1), an alkaline earth metal (Group 2), or NR$^{4c}_4$, more preferably H, Na, K, Li, or NH$_4$ for the ease of dissolution in water, further preferably Na, K, or NH$_4$ for further ease of dissolution in water, particularly preferably Na or NH$_4$, most preferably NH$_4$ for the ease of removal. When X$^c$ is NH$_4$, the solubility of the surfactant into an aqueous medium is excellent, and metal components hardly remain in PTFE or the final product.

$R^{1c}$ is preferably a linear or branched alkyl group free from carbonyl groups and having 1 to 8 carbon atoms, a cyclic alkyl group free from carbonyl groups and having 3 to 8 carbon atoms, a linear or branched alkyl group containing 1 to 10 carbonyl groups and having 2 to 45 carbon atoms, a cyclic alkyl group containing a carbonyl group and having 3 to 45 carbon atoms, or an alkyl group having 3 to 45 carbon atoms and containing a monovalent or divalent heterocycle.

Further, $R^{1c}$ is more preferably a group represented by the following formula:

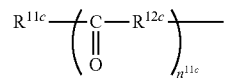

wherein $n^{11c}$ is an integer of 0 to 10, $R^{11c}$ is a linear or branched alkyl group having 1 to 5 carbon atoms or a cyclic alkyl group having 3 to 5 carbon atoms, $R^{12c}$s are each an alkylene group having 0 to 3 carbon atoms, and $R^{12c}$s may be the same as or different from each other when $n^{11c}$ is an integer of 2 to 10.

$n^{11c}$ is preferably an integer of 0 to 5, more preferably an integer of 0 to 3, further preferably an integer of 1 to 3.

The alkyl group serving as $R^{11c}$ is preferably free from carbonyl groups. In the alkyl group serving as $R^{11c}$, a hydrogen atom bonded to a carbon atom may be substituted with a functional group, such as a monovalent organic group containing a hydroxy group (—OH) or an ester bond, but the alkyl group is preferably not substituted with any functional groups. Examples of the monovalent organic group containing an ester bond include a group represented by the formula: —O—C(=O)—$R^{103c}$, wherein $R^{103c}$ is an alkyl group. In the alkyl group serving as $R^{11c}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

$R^{12c}$ is an alkylene group having 0 to 3 carbon atoms. The number of carbon atoms is preferably 1 to 3. The alkylene group serving as $R^{12c}$ may be linear or branched. The alkylene group serving as $R^{12c}$ is preferably free from carbonyl groups. $R^{12c}$ is more preferably an ethylene group (—$C_2H_4$—) or a propylene group (—$C_3H_6$—). In the alkylene group serving as $R^{12c}$, a hydrogen atom bonded to a carbon atom may be substituted with a functional group such as a monovalent organic group containing a hydroxy group (—OH) or an ester bond, but the alkylene group is preferably not substituted with any functional groups. Examples of the monovalent organic group containing an ester bond include a group represented by the formula: —O—C(=O)—$R^{104c}$, wherein $R^{104c}$ is an alkyl group. In the alkylene group serving as $R^{12c}$, 75% or less of hydrogen atoms bonded to carbon atoms may be substituted with halogen atoms, 50% or less thereof may be substituted with halogen atoms, or 25% or less thereof may be substituted with halogen atoms, but the alkylene group is preferably a non-halogenated alkylene group free from halogen atoms such as fluorine atoms and chlorine atoms.

$R^{2c}$ and $R^{3c}$ are preferably each independently an alkylene group free from carbonyl groups and having one or more carbon atoms, more preferably an alkylene group free from carbonyl groups and having 1 to 3 carbon atoms, further preferably an ethylene group (—$C_2H_4$—) or a propylene group (—$C_3H_6$—).

Examples of the surfactant (c) can include the following surfactants. In each formula, $A^c$ is defined as mentioned above.

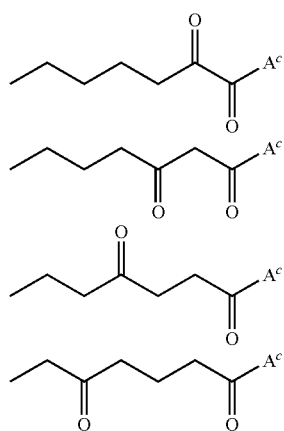

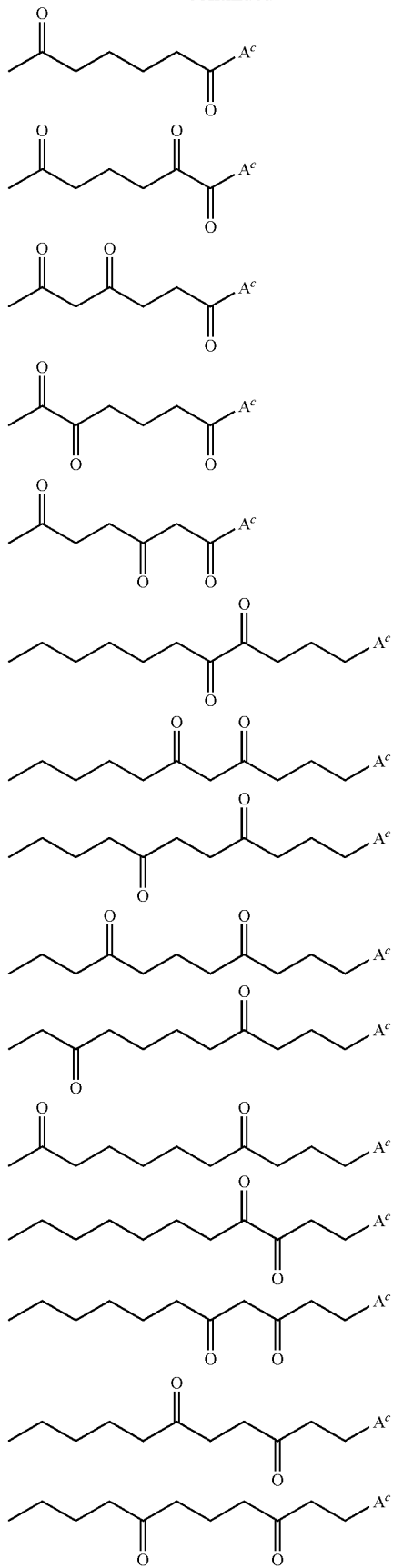

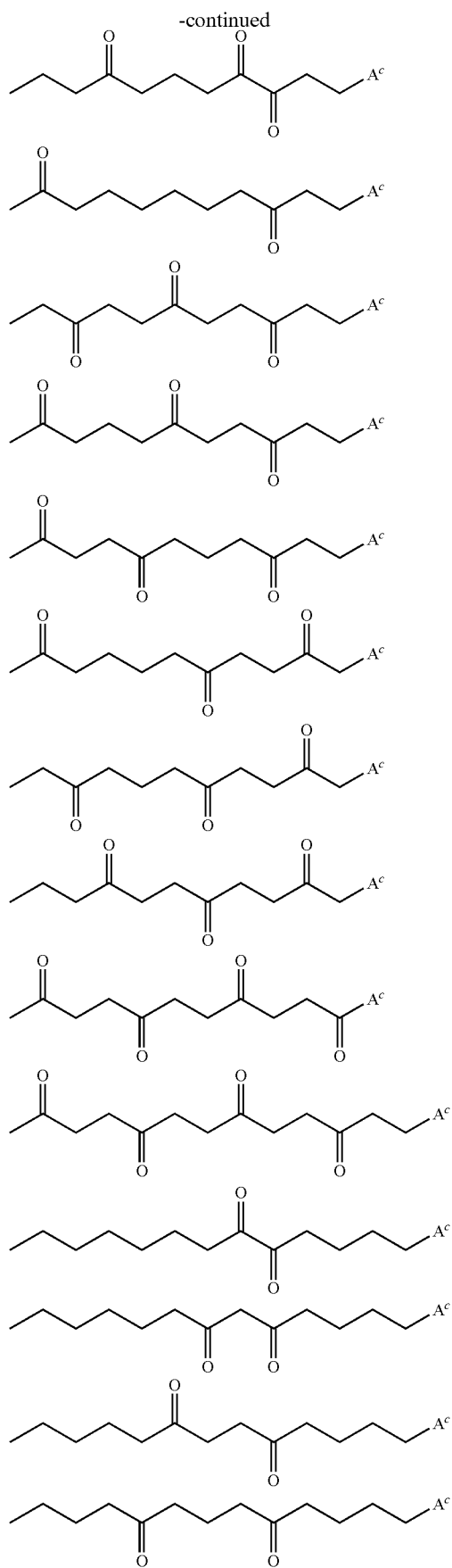
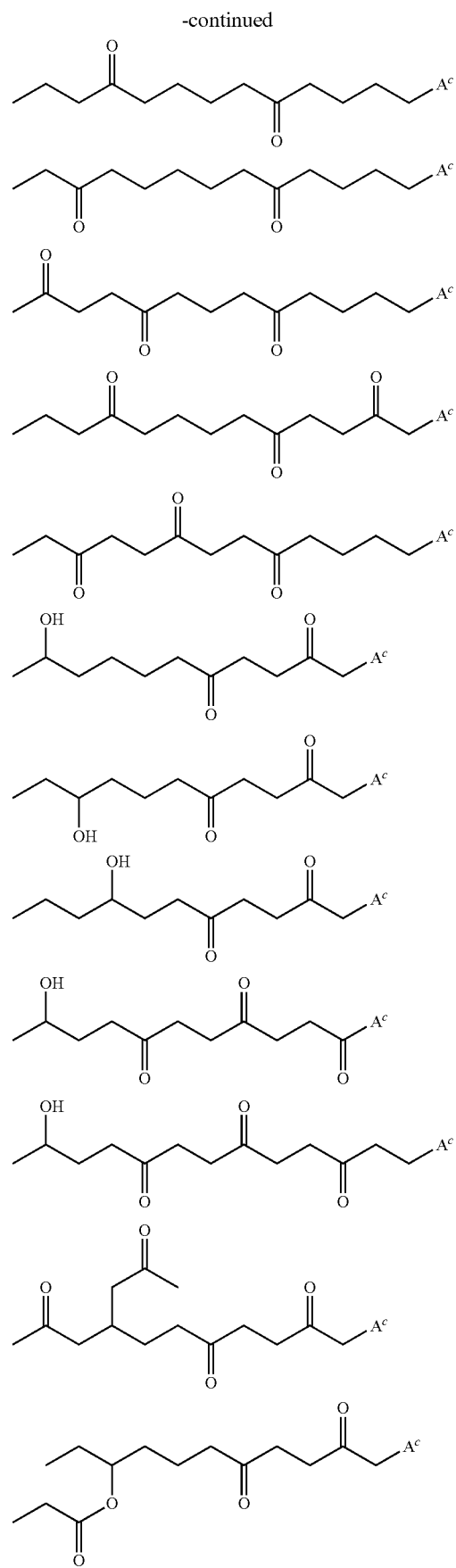

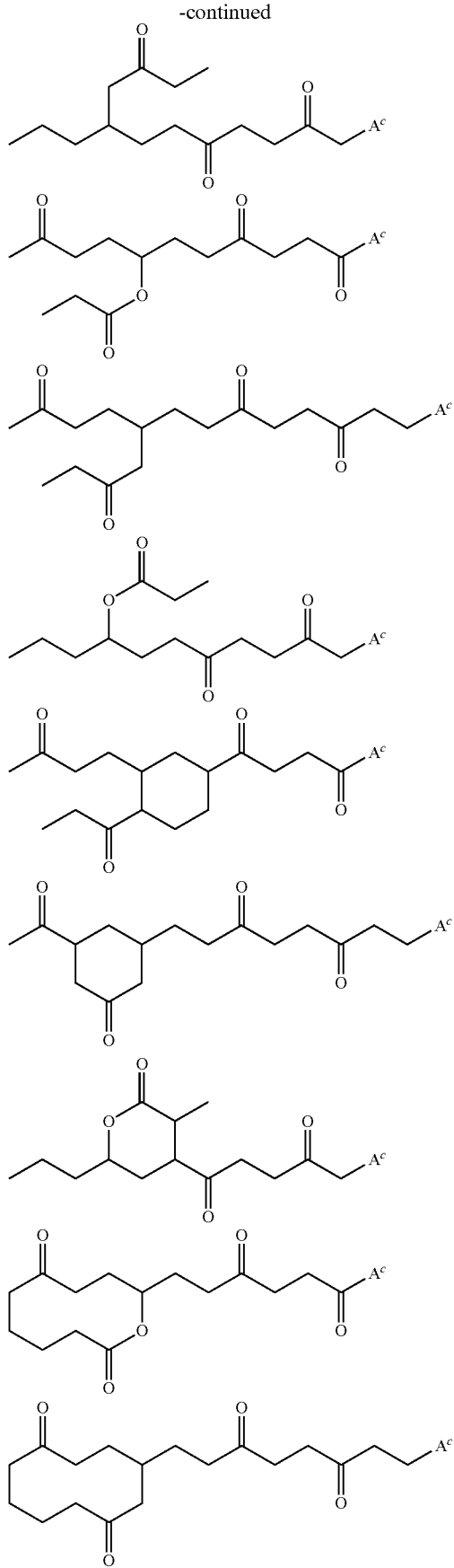
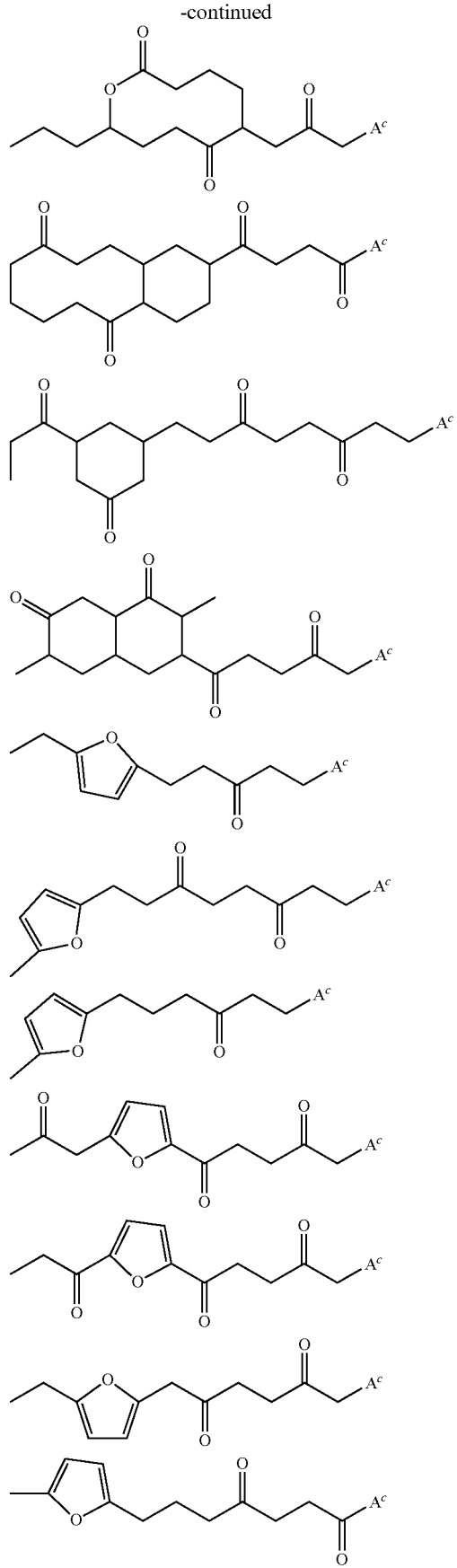

-continued

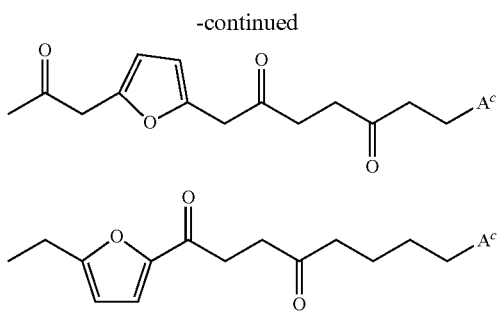

The surfactant (c) is a new compound and can be produced by the production methods described below as examples.

The surfactant (c) can be suitably produced by a production method including: step (11c) of obtaining a compound (11c) represented by the formula:

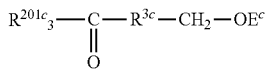

wherein $R^{3c}$, $R^{201c}$, and $E^c$ are defined as mentioned above, by reacting a compound (10c) represented by the formula:

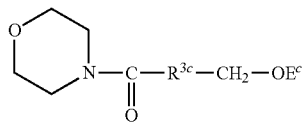

wherein $R^{3c}$ is defined as mentioned above, and $E^c$ is a leaving group, with lithium and a chlorosilane compound represented by the formula:

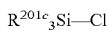

wherein $R^{210c}$s are each independently an alkyl group or an aryl group; step (12c) of obtaining a compound (12c) represented by the formula:

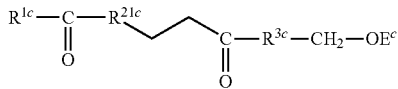

wherein $R^{1c}$, $R^{21c}$, $R^{3c}$, and $E^c$ are defined as mentioned above, by reacting the compound (11c) with an olefin represented by the formula:

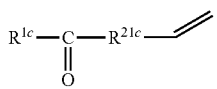

wherein $R^{1c}$ is defined as mentioned above, and $R^{21c}$ is a single bond or a divalent linking group; step (13c) of obtaining a compound (13c) represented by the formula:

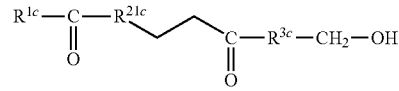

wherein $R^{1c}$, $R^{21c}$ and $R^{3c}$ are defined as mentioned above by eliminating the leaving group contained in the compound (12c); and step (14c) of obtaining a compound (14c) represented by the formula:

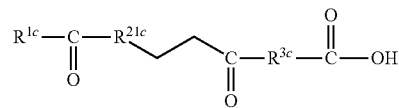

wherein $R^{1c}$, $R^{21}$, and $R^{3c}$ are defined as mentioned above, by oxidizing the compound (13c).

When $R^{1c}$ contains a furan ring, the furan ring may be opened, for example, using an acid and converted into a dicarbonyl derivative. Examples of the acid include acetic acid, hydrochloric acid, and p-toluene sulfone. Among these, acetic acid is preferable.

In step (11c), the compound (11c) is preferably obtained by reacting lithium with the chlorosilane compound in advance to obtain a siloxylithium compound and thereafter reacting the siloxylithium compound with the compound (10c).

$E^c$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{21c}$ is preferably a single bond or a linear or branched alkylene group having one or more carbon atoms.

Examples of the chlorosilane compound include:

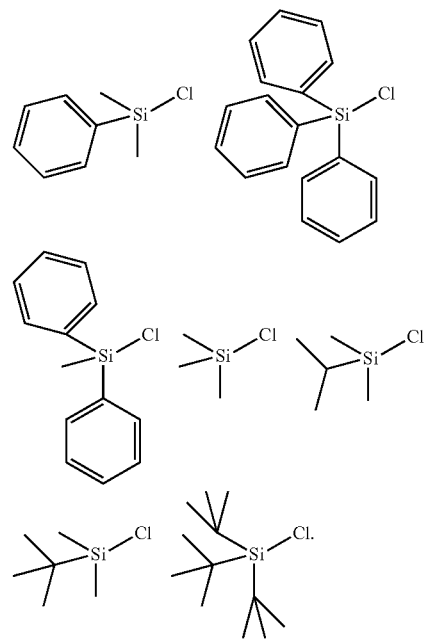

All the reactions in step (11c) can be carried out in a solvent. The solvent is preferably an organic solvent, more preferably a polar aprotic solvent, further preferably an ether.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme (tetraethylene glycol dimethyl ether), and crown ether (15-crown-5, 18-crown-6). Among these, tetrahydrofuran and diethyl ether are preferable.

The reaction temperature of lithium with the chlorosilane compound in step (11c) is preferably −78 to 100° C., more preferably 10 to 40° C.

The reaction temperature of the siloxylithium compound with the compound (10c) in step (11c) is preferably −100 to 0° C., more preferably −80 to −50° C.

The reaction pressure of lithium with the chlorosilane compound in step (11c) is preferably 0.1 to 5 MPa, more preferably 0.1 to 1 MPa.

The reaction pressure of the siloxylithium compound with the compound (10c) in step (11c) is preferably 0.1 to 5 MPa, more preferably 0.1 to 1 MPa.

The reaction time of lithium with the chlorosilane compound in step (11c) is preferably 0.1 to 72 hours, more preferably 6 to 10 hours.

The reaction time of the siloxylithium compound with the compound (10c) in step (11c) is preferably 0.1 to 72 hours, more preferably 1 to 2 hours.

For a reaction ratio of the compound (11c) with the olefin in step (12c), the amount of the olefin is preferably 1 to 2 mol, more preferably 1 to 1.1 mol, relative to 1 mol of the compound (11c), in consideration of yield improvement and waste reduction.

The reaction in step (12c) can be performed in a solvent in the presence of a thiazolium salt and a base.

Examples of the thiazolium salt include 3-ethyl-5-(2-hydroxyethyl)-4-methylthiazolium bromide and 3-benzyl-5-(2-hydroxyethyl)-4-methylthiazolium chloride.

Examples of the base include 1,8-diazabicyclo[5.4.0]-7-undecene and triethylamine.

The solvent is preferably an organic solvent, more preferably a polar aprotic solvent, further preferably an alcohol or an ether.

Examples of the alcohol include methanol, ethanol, 1-propanol, and isopropanol.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (12c) is preferably 40 to 60° C., more preferably 50 to 55° C.

The reaction pressure in step (12c) is preferably 0.1 to 5 MPa, more preferably 0.1 to 1 MPa.

The reaction time in step (12c) is preferably 0.1 to 72 hours, more preferably 6 to 10 hours.

The elimination reaction of the leaving group in step (13c) can be performed using a fluoride ion or an acid. Examples of the method for eliminating the leaving group include a method of using hydrofluoric acid, a method of using an amine complex of a hydrogen fluoride such as pyridine-nHF and triethylamine-nHF, a method of using an inorganic salt such as cesium fluoride, potassium fluoride, lithium borofluoride (LiBF$_4$), and ammonium fluoride, and a method of using an organic salt such as tetrabutylammonium fluoride (TBAF).

The elimination reaction of the leaving group in step (13c) can be performed in a polar solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (13c) is preferably 0 to 40° C., more preferably 0 to 20° C.

The reaction pressure in step (13c) is preferably 0.1 to 5 MPa, more preferably 0.1 to 1 MPa.

The reaction time in step (13c) is preferably 0.1 to 72 hours, more preferably 3 to 8 hours.

The oxidation in step (14c) can be performed in a solvent in the presence of sodium chlorite.

Examples of the solvent that can be used include water and alcohols such as methanol, ethanol, 1-propanol, isopropanol, 1-butanol, and tert-butyl alcohol. The buffer to be used may be a disodium hydrogen phosphate solution.

The compound (14c) may be brought into contact with an alkali to convert —COOH into a salt form. Examples of the alkali include sodium hydroxide, potassium hydroxide, lithium hydroxide, and ammonia. Use of an ammonia aqueous solution is preferable.

The solvent may be distilled off, evaporated, or purified after the completion of each step, so as to enhance the purity of the compound to be obtained.

The surfactant (c) can be suitably produced by a production method including: step (21c) of obtaining a compound (21c) represented by the formula:

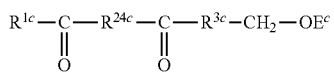

wherein $R^{1c}$, $R^{3c}$, and $E^c$ are defined as mentioned above, and $R^{24c}$ is a single bond or a divalent linking group, by reacting a ketone represented by the formula:

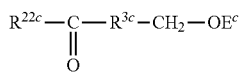

wherein $R^{3c}$ is defined as mentioned above, $R^{22c}$ is a monovalent organic group, and $E^c$ is a leaving group, with a carboxylic acid ester represented by the formula:

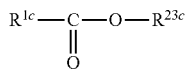

wherein $R^{1c}$ is defined as mentioned above, and $R^{23c}$ is a monovalent organic group; step (22c) of obtaining a compound (22c) represented by the formula:

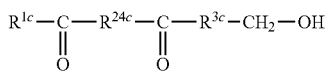

wherein $R^{1c}$, $R^{24c}$, and $R^{3c}$ are defined as mentioned above, by eliminating the leaving group contained in the compound (21c); and step (23c) of obtaining a compound (23c) represented by the formula:

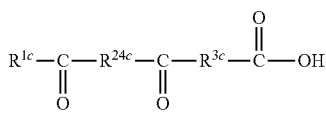

wherein $R^{1c}$, $R^{24c}$, and $R^{3c}$ are defined as mentioned above, by oxidizing the compound (22c).

When $R^{1c}$ contains a furan ring, the furan ring may be opened, for example, using an acid and converted into a dicarbonyl derivative. Examples of the acid include acetic acid, hydrochloric acid, and p-toluene sulfone. Among these, acetic acid is preferable.

$E^c$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{22c}$ is preferably a linear or branched alkyl group having one or more carbon atoms, more preferably a methyl group.

$R^{23c}$ is preferably a linear or branched alkyl group having one or more carbon atoms, more preferably a methyl group.

$R^{24c}$ is preferably a linear or branched alkylene group having one or more carbon atoms, more preferably a methylene group ($—CH_2—$).

The reaction in step (21c) can be performed in a solvent in the presence of a base.

Examples of the base include sodium amide, sodium hydride, sodium methoxide, and sodium ethoxide.

The solvent is preferably an organic solvent, more preferably a polar aprotic solvent, further preferably an alcohol or an ether.

Examples of the alcohol include methanol, ethanol, 1-propanol, and isopropanol.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (21c) is preferably 0 to 40° C., more preferably 0 to 20° C.

The reaction pressure in step (21c) is preferably 0.1 to 5 MPa, more preferably 0.1 to 1 MPa.

The reaction time in step (21c) is preferably 0.1 to 72 hours, more preferably 3 to 8 hours.

The elimination reaction of the leaving group in step (22c) can be performed using a fluoride ion or an acid. Examples of the method for eliminating the leaving group include a method of using hydrofluoric acid, a method of using an amine complex of a hydrogen fluoride such as pyridine-nHF and triethylamine-nHF, a method of using an inorganic salt such as cesium fluoride, potassium fluoride, lithium borofluoride ($LiBF_4$), and ammonium fluoride, and a method of using an organic salt such as tetrabutylammonium fluoride (TBAF).

The elimination reaction of the leaving group in step (22c) can be performed in a solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (22c) is preferably 0 to 40° C., more preferably 0 to 20° C.

The reaction pressure in step (22c) is preferably 0.1 to 5 MPa, more preferably 0.1 to 1 MPa.

The reaction time in step (22c) is preferably 0.1 to 72 hours, more preferably 3 to 8 hours.

The oxidation in step (23c) can be performed in a solvent in the presence of sodium chlorite.

Examples of the solvent that can be used include alcohols and water. The buffer to be used may be a disodium hydrogen phosphate solution.

The compound (23c) may be brought into contact with an alkali to convert —COOH into a salt form. Examples of the alkali include sodium hydroxide, potassium hydroxide, lithium hydroxide, and ammonia. Use of an ammonia aqueous solution is preferable.

The solvent may be distilled off, evaporated, or purified after the completion of each step, so as to enhance the purity of the compound to be obtained.

The surfactant (c) can be suitably produced by a production method including: step (31c) of obtaining a compound (31c) represented by the formula:

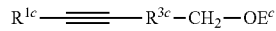

wherein $R^{1c}$, $R^{3c}$, and $E^c$ are defined as mentioned above, by reacting an alkyl halide represented by the formula:

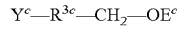

wherein $R^{3c}$ is defined as mentioned above, $Y^c$ is a halogen atom, and $E^c$ is a leaving group, with a lithium acetylide represented by the formula:

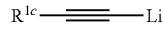

wherein $R^{1c}$ are defined as mentioned above; step (32c) of obtaining a compound (32c) represented by formula

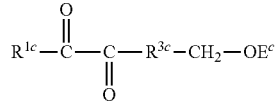

wherein $R^{1c}$, $R^{3c}$, and $E^c$ are defined as mentioned above, by oxidizing the compound (31c); step (33c) of obtaining a compound (33c) represented by the formula:

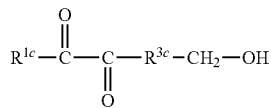

wherein $R^{1c}$ and $R^{3c}$ are defined as mentioned above, by eliminating the leaving group contained in the compound (32c); and step (34c) of obtaining a compound (34c) represented by the formula:

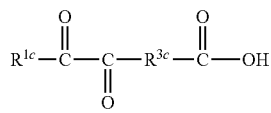

wherein $R^{1c}$ and $R^{3c}$ are defined as mentioned above, by oxidizing the compound (33c).

When $R^{1c}$ contains a furan ring, the furan ring may be opened, for example, using an acid and converted into a dicarbonyl derivative. Examples of the acid include acetic acid, hydrochloric acid, and p-toluene sulfone. Among these, acetic acid is preferable.

$E^c$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

For a reaction ratio of the alkyl halide with the lithium acetylide in step (31c), the amount of the lithium acetylide is preferably 1 to 2 mol, more preferably 1 to 1.2 mol, relative to 1 mol of the alkyl halide, in consideration of yield improvement and waste reduction.

The reaction in step (31c) can be performed in a solvent. The solvent is preferably hexane.

The reaction temperature in step (31c) is preferably −100 to −40° C., more preferably −80 to −50° C.

The reaction pressure in step (31c) is preferably 0.1 to 5 MPa, more preferably 0.1 to 1 MPa.

The reaction time in step (31c) is preferably 0.1 to 72 hours, more preferably 6 to 10 hours.

The oxidation in step (32c) can be performed in a nitrile solvent using a complex generated by treating [(Cn*)Ru$^{III}$(CF$_3$CO$_2$)$_3$]·H$_2$O, wherein Cn* represents 1,4,7-trimethyl-1,4,7-triazabicyclononane, with (NH$_4$)$_2$Ce(NO$_3$)$_6$ and trifluoroacetic acid and thereafter adding sodium perchlorate thereto.

After the completion of the oxidation, neutralization with an alkali may be carried out to extract the compound (32c) using an organic solvent such as an ether.

The reaction temperature in step (32c) is preferably 30 to 100° C., more preferably 40 to 90° C.

The reaction pressure in step (32c) is preferably 0.1 to 5 MPa, more preferably 0.1 to 1 MPa.

The reaction time in step (32c) is preferably 0.1 to 72 hours, more preferably 3 to 8 hours.

The elimination reaction of the leaving group in step (33c) can be performed using a fluoride ion or an acid. Examples of the method for eliminating the leaving group include a method of using hydrofluoric acid, a method of using an amine complex of a hydrogen fluoride such as pyridine-nHF and triethylamine-nHF, a method of using an inorganic salt such as cesium fluoride, potassium fluoride, lithium borofluoride (LiBF$_4$), and ammonium fluoride, and a method of using an organic salt such as tetrabutylammonium fluoride (TBAF).

The elimination reaction of the leaving group in step (33c) can be performed in a solvent. The solvent is preferably an organic solvent, more preferably a polar aprotic solvent, further preferably an ether.

Examples of the ether include ethyl methyl ether, diethyl ether, monoglyme (ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ether (15-crown-5, 18-crown-6). Among these, tetrahydrofuran and diethyl ether are preferable.

The reaction temperature in step (33c) is preferably 0 to 40° C., more preferably 0 to 20° C.

The reaction pressure in step (33c) is preferably 0.1 to 5 MPa, more preferably 0.1 to 1 MPa.

The reaction time in step (33c) is preferably 0.1 to 72 hours, more preferably 3 to 8 hours.

The oxidation in step (34c) can be performed in a solvent in the presence of sodium chlorite.

Examples of the solvent that can be used include alcohols and water. The buffer to be used may be a disodium hydrogen phosphate solution.

The compound (34c) may be brought into contact with an alkali to convert —COOH into a salt form. Examples of the alkali include sodium hydroxide, potassium hydroxide, lithium hydroxide, and ammonia. Use of an ammonia aqueous solution is preferable.

The solvent may be distilled off, evaporated, or purified after the completion of each step, so as to enhance the purity of the compound to be obtained.

The surfactant (c) can be suitably produced by a production method including: step (51c) of obtaining a compound (51c) represented by the formula:

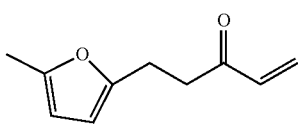

by reacting a divinyl ketone represented by the formula:

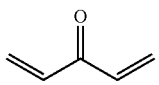

with a 2-methyl furan represented by the formula:

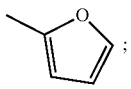;

step (52c) of obtaining a compound (52c) represented by the formula:

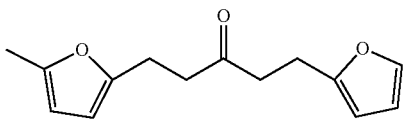 [SMILES: Cc1ccc(CCC(=O)CCc2ccco2)o1]

by reacting the compound (51c) with a furan represented by the formula:

step (53c) of obtaining a compound (53c) represented by the formula:

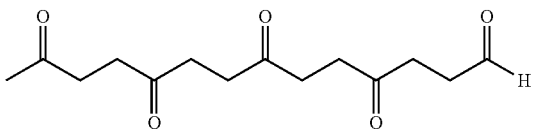 [SMILES: CC(=O)CCC(=O)CCC(=O)CCC(=O)CCC=O]

by heating the compound (52c) in the presence of an acid; and step (54c) of obtaining a compound (54c) represented by the formula:

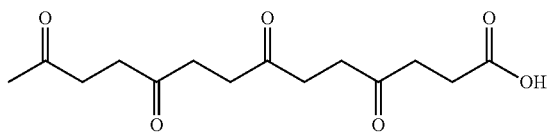 [SMILES: CC(=O)CCC(=O)CCC(=O)CCC(=O)CCC(=O)O]

by oxidizing the compound (53c).

For a reaction ratio of the divinyl ketone with the 2-methyl furan in step (51c), the amount of the 2-methyl furan is preferably 0.5 to 1 mol, more preferably 0.6 to 0.9 mol, relative to 1 mol of the divinyl ketone, in consideration of yield improvement and waste reduction.

The reaction in step (51c) is preferably carried out in the presence of an acid. Examples of the acid include acetic acid, hydrochloric acid, and p-toluenesulfonic acid. Among these, acetic acid is preferable.

The amount of the acid used in step (51c) is preferably 0.1 to 2 mol, more preferably 0.1 to 1 mol, relative to 1 mol of the divinyl ketone, in consideration of yield improvement and waste reduction.

The reaction in step (51c) can be performed in a polar solvent. The solvent is preferably water or acetonitrile.

The reaction temperature in step (51c) is preferably 20 to 100° C., more preferably 40 to 100° C.

The reaction pressure in step (51c) is preferably 0.1 to 5 MPa, more preferably 0.1 to 1 MPa.

The reaction time in step (51c) is preferably 0.1 to 72 hours, more preferably 4 to 8 hours.

For a reaction ratio of the compound (51c) with the furan in step (52c), the amount of the furan is preferably 1 to 2 mol, more preferably 1 to 1.1 mol, relative to 1 mol of the compound (51c), in consideration of yield improvement and waste reduction.

The reaction in step (52c) is preferably carried out in the presence of an acid. Examples of the acid include acetic acid, hydrochloric acid, and p-toluene sulfone. Among these, acetic acid is preferable.

The amount of the acid used in step (52c) is preferably 0.1 to 2 mol, more preferably 0.1 to 1 mol, relative to 1 mol of the compound (51c), in consideration of yield improvement and waste reduction.

The reaction in step (52c) can be performed in a polar solvent. The solvent is preferably water.

The reaction temperature in step (52c) is preferably 20 to 100° C., more preferably 40 to 100° C.

The reaction pressure in step (52c) is preferably 0.1 to 5 MPa, more preferably 0.1 to 1 MPa.

The reaction time in step (52c) is preferably 0.1 to 72 hours, more preferably 4 to 8 hours.

In step (53c), the furan ring is opened by heating the compound (52c) in the presence of an acid.

The acid is preferably hydrochloric acid or sulfuric acid.

The reaction in step (53c) can be performed in a polar solvent. The solvent is preferably water.

The reaction temperature in step (53c) is preferably 50 to 100° C., more preferably 70 to 100° C.

The reaction pressure in step (53c) is preferably 0.1 to 5 MPa, more preferably 0.1 to 1 MPa.

The reaction time in step (53c) is preferably 0.1 to 72 hours, more preferably 1 to 12 hours.

The oxidation in step (54c) can be performed in a solvent in the presence of sodium chlorite.

Examples of the solvent that can be used include tert-butyl alcohol and water. The buffer to be used may be a disodium hydrogen phosphate solution.

The compound (54c) may brought into contact with an alkali to convert —COOH into a salt form. Examples of the alkali include sodium hydroxide, potassium hydroxide, lithium hydroxide, and ammonia. Use of an ammonia aqueous solution is preferable.

The solvent may be distilled off, evaporated, or purified after the completion of each step, so as to enhance the purity of the compound to be obtained.

The surfactant (c) can be suitably produced by a production method including: step (61c) of obtaining a compound (61c) represented by the formula:

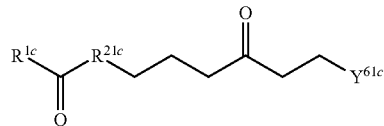

wherein $R^{1c}$, $R^{21c}$ and $Y^{61c}$ are defined as mentioned above, by reacting an alkene represented by the formula:

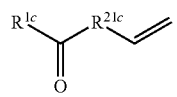

wherein $R^{1c}$ is defined as mentioned above, and $R^{21c}$ is a single bond or a divalent linking group, with an alkyne represented by the formula:

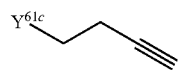

wherein $Y^{61c}$ is an alkyl ester group; and step (62c) of obtaining a compound (62c) represented by the formula:

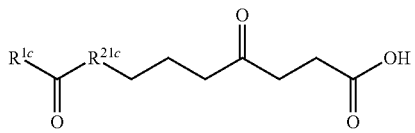

wherein $R^{1c}$ and $R^{21c}$ are defined as mentioned above, by allowing an alkali to act on the compound (61c) and then allowing an acid to act thereon.

When $R^{1c}$ contains a furan ring, the furan ring may be opened, for example, using an acid and converted into a dicarbonyl derivative. Examples of the acid include acetic acid, hydrochloric acid, and p-toluene sulfone. Among these, acetic acid is preferable.

$R^{21c}$ is preferably a single bond or a linear or branched alkylene group having one or more carbon atoms.

For a reaction ratio of the alkene with the alkyne in step (61c), the amount of the alkene is preferably 0.5 to 2 mol, more preferably 0.6 to 1.2 mol, relative to 1 mol of the alkyne, in consideration of yield improvement and waste reduction.

The reaction in step (61c) is preferably carried out in the presence of a metal catalyst. Examples of the metal include ruthenium.

The amount of the metal catalyst used in step (61c) is preferably 0.01 to 0.4 mol, more preferably 0.05 to 0.1 mol, relative to 1 mol of the alkene, in consideration of yield improvement and waste reduction.

The reaction in step (61c) can be performed in a polar solvent. The solvent is preferably water, acetonitrile, dimethylacetamide, or dimethylformamide.

The reaction temperature in step (61c) is preferably 20 to 160° C., more preferably 40 to 140° C.

The reaction pressure in step (61c) is preferably 0.1 to 5 MPa, more preferably 0.1 to 1.0 MPa.

The reaction time in step (61c) is preferably 0.1 to 72 hours, more preferably 4 to 8 hours.

For a reaction ratio of the compound (61c) with the alkali in step (62c), the amount of the alkali is preferably 0.6 to 2 mol, more preferably 0.8 to 1.1 mol, relative to 1 mol of the compound (61c), in consideration of yield improvement and waste reduction.

The amount of the acid used in step (62c) is preferably 1.0 to 20.0 mol, more preferably 1.0 to 10.0 mol, relative to 1 mol of the compound (61c), in consideration of yield improvement and waste reduction.

The reaction in step (62c) can be performed in a polar solvent. The solvent is preferably water.

The reaction temperature in step (62c) is preferably 0 to 100° C., more preferably 20 to 100° C.

The reaction pressure in step (62c) is preferably 0.1 to 5 MPa, more preferably 0.1 to 1 MPa.

The reaction time in step (62c) is preferably 0.1 to 72 hours, more preferably 4 to 8 hours.

The compound (62c) may brought into contact with an alkali to convert —COOH into a salt form. Examples of the alkali include sodium hydroxide, potassium hydroxide, lithium hydroxide, and ammonia. Use of an ammonia aqueous solution is preferable.

The solvent may be distilled off, evaporated, or purified after the completion of each step, so as to enhance the purity of the compound to be obtained.

The surfactant (d) will be described.

In Formula (d), $R^{1d}$ is a linear or branched alkyl group optionally having a substituent and having one or more carbon atoms or a cyclic alkyl group optionally having a substituent and having three or more carbon atoms.

The alkyl group can contain a monovalent or divalent heterocycle or can also form a ring, in the case of having three or more carbon atoms. The heterocycle is preferably an unsaturated heterocycle, more preferably an oxygen-containing unsaturated heterocycle, and examples thereof include a furan ring. In $R^{1d}$, a divalent heterocycle may be inserted between two carbon atoms, a divalent heterocycle may be located at an end and bonded to —C(=O)—, or a monovalent heterocycle may be located at an end of the alkyl group.

In this description, "the number of carbon atoms" of the alkyl group includes the number of carbon atoms forming the heterocycle.

The substituent optionally contained in the alkyl group as $R^{1d}$ is preferably a halogen atom, a linear or branched alkyl group having 1 to 10 carbon atoms or a cyclic alkyl group having 3 to 10 carbon atoms, or a hydroxy group, particularly preferably a methyl group or an ethyl group.

The alkyl group serving as $R^{1d}$ is preferably free from carbonyl groups. In the alkyl group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms. The alkyl group preferably does not contain any substituents.

$R^{1d}$ is preferably a linear or branched alkyl group optionally having a substituent and having 1 to 10 carbon atoms or a cyclic alkyl group optionally having a substituent and having 3 to 10 carbon atoms, more preferably a linear or branched alkyl group free from carbonyl groups and having 1 to 10 carbon atoms or a cyclic alkyl group free from carbonyl groups and having 3 to 10 carbon atoms, further preferably a linear or branched alkyl group having 1 to 10 carbon atoms and having no substituents, furthermore preferably a linear or branched alkyl group having 1 to 3 carbon atoms and having no substituents, particularly preferably a methyl group (—$CH_3$) or an ethyl group (—$C_2H_5$), most preferably a methyl group (—$CH_3$).

In Formula (d), $R^{2d}$s and $R^{4d}$s are each independently H or a substituent. A plurality of $R^{2d}$s and a plurality of $R^{4d}$s may each be the same as or different from each other.

The substituent serving as each of $R^{2d}$ and $R^{4d}$ is preferably a halogen atom, a linear or branched alkyl group having 1 to 10 carbon atoms or a cyclic alkyl group having 3 to 10 carbon atoms, or a hydroxy group, particularly preferably a methyl group or an ethyl group.

The alkyl group serving as each of $R^{2d}$ and $R^{4d}$ is preferably free from carbonyl groups.

In the alkyl group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

The alkyl group serving as each of $R^{2d}$ and $R^{4d}$ is preferably a linear or branched alkyl group free from carbonyl groups and having 1 to 10 carbon atoms or a cyclic alkyl group free from carbonyl groups and having 3 to 10 carbon atoms, more preferably a linear or branched alkyl group free from carbonyl groups and having 1 to 10 carbon atoms, further preferably a linear or branched alkyl group having 1 to 3 carbon atoms and having no substituents, particularly preferably a methyl group (—CH$_3$) or an ethyl group (—C$_2$H$_5$).

$R^{2d}$s and $R^{4d}$s are preferably each independently H or a linear or branched alkyl group free from carbonyl groups and having 1 to 10 carbon atoms, more preferably H or a linear or branched alkyl group having 1 to 3 carbon atoms and having no substituents, furthermore preferably H, a methyl group (—CH$_3$) or an ethyl group (—C$_2$H$_5$), particularly preferably H.

In Formula (d), $R^{3d}$ is an alkylene group optionally having a substituent and having 1 to 10 carbon atoms. When a plurality of $R^{3d}$s are present, the plurality of $R^{3d}$s may be the same as or different from each other.

The alkylene group is preferably free from carbonyl groups.

In the alkylene group, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkylene group preferably does not contain any substituents.

The alkylene group is preferably a linear or branched alkylene group optionally having a substituent and having 1 to 10 carbon atoms or a cyclic alkylene group optionally having a substituent and having 3 to 10 carbon atoms, preferably a linear or branched alkylene group free from carbonyl groups and having 1 to 10 carbon atoms or a cyclic alkylene group free from carbonyl groups and having 3 to 10 carbon atoms, more preferably a linear or branched alkylene group having 1 to 10 carbon atoms and having no substituents, further preferably a methylene group (—CH$_2$—), an ethylene group (—C$_2$H$_4$—), an isopropylene group (—CH(CH$_3$)CH$_2$—), or a propylene group (—C$_3$H$_6$—).

Any two of $R^{1d}$, $R^{2d}$, $R^{3d}$, and $R^{4d}$ may be bonded together to form a ring.

In Formula (d), n is an integer of 1 or more, preferably an integer of 1 to 40, more preferably an integer of 1 to 30, further preferably an integer of 5 to 25.

In Formula (d), p and q are each independently an integer of 1 or more. p is preferably an integer of 0 to 10, more preferably 0 or 1. Preferably, q is an integer of 0 to 10, more preferably an integer of 0 to 5.

The sum of n, p, and q is preferably an integer of 6 or more. The sum of n, p, and q is more preferably an integer of 8 or more. The sum of n, p, and q is also preferably an integer of 60 or less, more preferably an integer of 50 or less, further preferably an integer of 40 or less.

In Formula (d), $A^d$ is —SO$_3$X$^d$ or —COOX$^d$ (where X$^d$ is H, a metal atom, NR$^{5d}$$_4$, an imidazolium optionally having a substituent, a pyridinium optionally having a substituent, or a phosphonium optionally having a substituent, and R$^{5d}$s are each H or an organic group and may be the same as or different from each other). R$^{5d}$s are each preferably H or an organic group having 1 to 10 carbon atoms, more preferably H or an organic group having 1 to 4 carbon atoms. Examples of the metal atom include monovalent or divalent metal atoms such as alkali metals (Group 1) and alkaline earth metals (Group 2), and the metal atom is preferably Na, K, or Li. X$^d$ may be a metal atom or NR$^{5d}$$_4$ (where R$^{5d}$s are each as mentioned above).

X$^d$ is preferably H, an alkali metal (Group 1), an alkaline earth metal (Group 2), or NR$^{5d}$$_4$, more preferably H, Na, K, Li, or NH$_4$ for the ease of dissolution in water, further preferably Na, K, or NH$_4$ for further ease of dissolution in water, particularly preferably Na or NH$_4$, most preferably NH$_4$ for the ease of removal. When X$^d$ is NH$_4$, the solubility of the surfactant into an aqueous medium is excellent, and metal components hardly remain in PTFE or the final product.

In Formula (d), L is a single bond, —CO$_2$—B—*, —OCO—B—*, —CONR$^{6d}$—B—*, —NR$^{6d}$CO—B—*, or —CO— (however, excluding carbonyl groups contained in —CO$_2$—B—, —OCO—B—, —CONR$^{6d}$—B—, and —NR$^{6d}$CO—B—), B is a single bond or an alkylene group optionally having a substituent and having 1 to 10 carbon atoms, and R$^{6d}$ is H or an alkyl group optionally having a substituent and having 1 to 4 carbon atoms. The alkylene group more preferably has 1 to 5 carbon atoms. Further, R$^{6d}$ above is more preferably H or a methyl group. The symbol * represents the side bonded to A$^d$ in the formula.

L is preferably a single bond.

The surfactant preferably has an integral value of the total peak intensity of 10 or more, which is observed in a chemical shift region of 2.0 to 5.0 ppm in $^1$H-NMR spectrum.

The surfactant preferably has an integral value of the total peak intensity falling within the aforementioned range, which is observed in a chemical shift region of 2.0 to 5.0 ppm in $^1$H-NMR spectrum. In this case, the surfactant preferably has a ketone structure in a molecule.

In the surfactant, the integral value is more preferably 15 or more and is preferably 95 or less, more preferably 80 or less, further preferably 70 or less.

The integral value is measured in a heavy water solvent at room temperature. The heavy water is adjusted to 4.79 ppm.

Examples of the surfactant (d) include CH$_3$C(O)CH$_2$CH$_2$CH$_2$CH$_2$CH$_2$CH$_2$CH$_2$COOK, CH$_3$C(O)CH$_2$CH$_2$CH$_2$CH$_2$CH$_2$CH$_2$COONa, CH$_3$C(O)CH$_2$CH$_2$CH$_2$CH$_2$CH$_2$COONa, CH$_3$C(O)CH$_2$CH$_2$CH$_2$CH$_2$COONa, CH$_3$C(O)CH$_2$CH$_2$CH$_2$COONa, CH$_3$C(O)CH$_2$CH$_2$CH$_2$COONa, CH$_3$C(O)CH$_2$CH$_2$CH$_2$CH$_2$CH$_2$CH$_2$CH$_2$CH$_2$CH$_2$CH$_2$CH$_2$COONa, CH$_3$C(O)CH$_2$CH$_2$CH$_2$CH$_2$CH$_2$CH$_2$CH$_2$CH$_2$CH$_2$CH$_2$CH$_2$CH$_2$COONa, (CH$_3$)$_3$CC(O)CH$_2$CH$_2$CH$_2$CH$_2$CH$_2$CH$_2$CH$_2$COONa, (CH$_3$)$_2$CHC(O)CH$_2$CH$_2$CH$_2$CH$_2$CH$_2$CH$_2$CH$_2$COONa, (CH$_2$)$_5$CHC(O)CH$_2$CH$_2$CH$_2$CH$_2$CH$_2$CH$_2$CH$_2$COONa, CH$_3$CH$_2$C(O)CH$_2$CH$_2$CH$_2$CH$_2$CH$_2$CH$_2$CH$_2$COONa, CH$_3$CH$_2$CH$_2$C(O)CH$_2$CH$_2$CH$_2$CH$_2$CH$_2$CH$_2$COONa, CH$_3$CH$_2$CH$_2$CH$_2$C(O)CH$_2$CH$_2$CH$_2$CH$_2$CH$_2$COONa, CH$_3$CH$_2$CH$_2$CH$_2$CH$_2$C(O)CH$_2$CH$_2$CH$_2$CH$_2$COONa, CH$_3$CH$_2$CH$_2$CH$_2$CH$_2$CH$_2$C(O)CH$_2$CH$_2$CH$_2$COONa, CH$_3$CH$_2$CH$_2$CH$_2$CH$_2$CH$_2$CH$_2$C(O)CH$_2$CH$_2$COONa, CH$_3$CH$_2$CH$_2$CH$_2$CH$_2$CH$_2$CH$_2$CH$_2$C(O)CH$_2$COONa, CH$_3$C(O)CH$_2$CH$_2$CH$_2$CH$_2$CH$_2$CH$_2$CH$_2$OCH$_2$COONa, CH$_3$C(O)CH$_2$CH$_2$CH$_2$CH$_2$CH$_2$CH$_2$CH$_2$C(O)NHCH$_2$COOK, CH$_3$C(O)CH$_2$CH$_2$CH$_2$CH$_2$CH$_2$CH$_2$CH$_2$NHC(O)CH$_2$COOK, CH$_3$C(O)CH$_2$CH$_2$CH$_2$CH$_2$CH$_2$CH$_2$CH$_2$CH$_2$C(O)OCH$_2$COONa, CH$_3$C(O)

CH₂CH₂CH₂CH₂CH₂CH₂CH₂CH₂OC(O)CH₂COONa, CH₃C(O)CH₂CH₂CH₂CH₂CH₂CH₂CH₂CH₂C(O)COONa, CH₃C(O)CH₂CH₂CH₂CH₂CH₂CH₂CH₂CH₂C(O)COOH, CH₃C(O)CH₂CH₂CH₂CH₂CH₂CH₂CH₂CH₂C(O)COOLi, CH₃C(O)CH₂CH₂CH₂CH₂CH₂CH₂CH₂CH₂C(O)COONH₄, CH₃C(O)CH₂CH₂CH₂CH₂CH₂CH₂CH₂CH₂C(O)COONa, CH₃C(O)CH₂CH₂CH₂CH₂CH₂CH₂CH₂CH₂C(CH₃)₂COOK, CH₃C(O)CH₂CH₂CH₂CH₂CH₂CH₂CH₂CH₂CH₂SO₃Na, CH₃C(O)CH₂CH₂CH₂CH₂CH₂CH₂CH₂CH₂SO₃Na, CH₃C(O)CH₂CH₂CH₂CH₂CH₂CH₂CH₂SO₃Na, CH₃C(O)CH₂CH₂CH₂CH₂CH₂CH₂SO₃Na, CH₃C(O)CH₂CH₂CH₂CH₂CH₂SO₃Na, CH₃C(O)CH₂CH₂CH₂CH₂SO₃Na, CH₃C(O)CH₂CH₂CH₂CH₂CH₂CH₂CH₂CH₂CH₂CH₂CH₂CH₂SO₃Na, CH₃C(O)CH₂CH₂CH₂CH₂CH₂CH₂CH₂CH₂CH₂CH₂CH₂SO₃Na, CH₃C(O)CH₂CH₂CH₂CH₂CH₂CH₂CH₂CH₂CH₂CH₂SO₃Na, (CH₃)₃CC(O)CH₂CH₂CH₂CH₂CH₂CH₂CH₂CH₂SO₃Na, (CH₃)₂CHC(O)CH₂CH₂CH₂CH₂CH₂CH₂CH₂CH₂SO₃Na, (CH₂)₅CHC(O)CH₂CH₂CH₂CH₂CH₂CH₂CH₂CH₂SO₃Na, CH₃C(O)CH₂CH₂CH₂CH₂CH₂CH₂CH₂CH₂SO₃Na, CH₃C(O)CH₂CH₂CH₂CH₂CH₂CH₂CH₂SO₃Na, CH₃C(O)CH₂CH₂CH₂CH₂CH₂CH₂SO₃Na, CH₃C(O)CH₂CH₂CH₂CH₂CH₂SO₃Na, CH₃C(O)CH₂CH₂CH₂CH₂SO₃Na, CH₃C(O)CH₂CH₂CH₂SO₃Na, CH₃C(O)CH₂CH₂CH₂SO₃Na, CH₃C(O)CH₂CH₂SO₃Na, CH₃C(O)CH₂SO₃Na, CH₃C(O)CH₂CH₂CH₂CH₂CH₂CH₂CH₂CH₂OCH₂CH₂CH₂SO₃Na, CH₃C(O)CH₂CH₂CH₂CH₂CH₂CH₂CH₂CH₂C(O)NHCH₂SO₃Na, CH₃C(O)CH₂CH₂CH₂CH₂CH₂CH₂CH₂CH₂NHC(O)CH₂SO₃Na, CH₃C(O)CH₂CH₂CH₂CH₂CH₂CH₂CH₂CH₂CH₂C(O)SO₃Na, CH₃C(O)CH₂CH₂CH₂CH₂CH₂CH₂CH₂CH₂CH₂C(O)OCH₂SO₃Na, CH₃C(O)CH₂CH₂CH₂CH₂CH₂CH₂CH₂CH₂CH₂OC(O)CH₂SO₃Na, CH₃C(O)CH₂CH₂CH₂CH₂CH₂CH₂CH₂CH₂CH₂SO₃H, CH₃C(O)CH₂CH₂CH₂CH₂CH₂CH₂CH₂CH₂CH₂SO₃K, CH₃C(O)CH₂CH₂CH₂CH₂CH₂CH₂CH₂CH₂CH₂SO₃Li, CH₃C(O)CH₂CH₂CH₂CH₂CH₂CH₂CH₂CH₂CH₂SO₃NH₄, and CH₃C(O)CH₂CH₂CH₂CH₂CH₂CH₂CH₂C(CH₃)₂SO₃Na.

The surfactant (d) is a new compound and can be produced by the production methods described below as examples.

The surfactant (d) can be suitably produced by a production method including: step (11d) of obtaining a compound (11d) represented by the following formula:

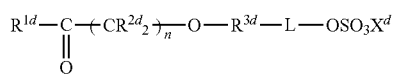

wherein $R^{1d}$ to $R^{3d}$, n, and $X^d$ are defined as mentioned above, L is a single bond, —CO₂—B—*, —OCO—B—*, —CONR$^{6d}$—B—*, —NR$^{6d}$CO—B—*, or —CO— (however, excluding carbonyl groups contained in —CO₂—B—, —OCO—B—, —CONR$^{6d}$—B—, and —NR$^{6d}$CO—B—), B is a single bond or an alkylene group optionally having a substituent and having 1 to 10 carbon atoms, R$^{6d}$ is H or an alkyl group optionally having a substituent and having 1 to 4 carbon atoms, and the symbol * represents the side bonded to —OSO₃X$^d$ in the formula, by reacting a compound (10d) represented by the following formula:

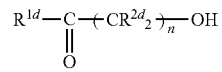

wherein $R^{1d}$, $R^{2d}$, and n are defined as mentioned above, with a sultone represented by the following formula:

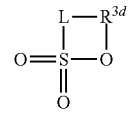

wherein $R^{3d}$ is defined as mentioned above, L is a single bond, —CO₂—B—*, —OCO—B—*, —CONR$^{6d}$—B—*, —NR$^{6d}$CO—B—*, or —CO— (however, excluding carbonyl groups contained in —CO₂—B—, —OCO—B—, —CONR$^{6d}$—B—, and —NR$^{6d}$CO—B—), B is a single bond or an alkylene group optionally having a substituent and having 1 to 10 carbon atoms, R$^{6d}$ is H or an alkyl group optionally having a substituent and having 1 to 4 carbon atoms, and the symbol * represents the side bonded to —S(=O)₂— in the formula.

The reaction in step (11d) can be performed in the presence of a base.

Examples of the base include sodium hydride, sodium hydroxide, potassium hydroxide, and triethylamine. The base can be used in an amount of 0.5 to 20 mol, relative to 1 mol of the compound (10d).

The reaction in step (11d) can be performed in a solvent. The solvent is preferably an organic solvent, more preferably a polar aprotic solvent. Examples of the organic solvent include ethers, aromatic compounds, nitriles, and halogenated hydrocarbons.

Examples of the ethers include diethyl ether, tetrahydrofuran, dioxane, and diethylene glycol diethyl ether. Among these, diethyl ether and tetrahydrofuran are preferable.

Examples of the aromatic compounds include benzene, toluene, and xylenes. Among these, benzene is preferable.

Examples of the nitriles include acetonitrile, propionitrile, butyronitrile, isobutyronitrile, and benzonitrile. Among these, acetonitrile is preferable. Examples of the halogenated hydrocarbons include dichloromethane, dichloroethane, chloroform, chlorobenzene, and o-dichlorobenzene. Among these, dichloromethane and chloroform are preferable.

The reaction temperature in step (11d) is preferably −78 to 150° C., more preferably −20 to 100° C.

The reaction pressure in step (11d) is preferably 0 to 10 MPa, more preferably 0 to 1.0 MPa.

The reaction time in step (11d) is preferably 0.1 to 72 hours, more preferably 0.1 to 48 hours.

The surfactant (d) can be suitably produced by a production method including: step (21d) of obtaining a compound (21d) represented by the following formula:

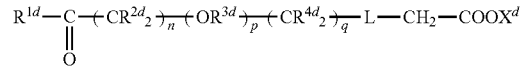

wherein $R^{1d}$ to $R^{4d}$, n, p, q, and $X^d$ are defined as mentioned above, L is a single bond, —CO₂—B—*, —OCO—B—*, —CONR$^{6d}$—B—*, —NR$^{6d}$CO—B—*, or —CO— (however, excluding carbonyl groups contained in —CO$_2$—B—, —OCO—B—, —CONR$^{6d}$—B—, and —NR$^{6d}$CO—B—), B is a single bond or an alkylene group optionally having a substituent and having 1 to 10 carbon atoms, R$^{6d}$ is H or an alkyl group optionally having a substituent and having 1 to 4 carbon atoms, and the symbol * represents the side bonded to —CH$_2$—COOX$^d$ in the formula, by oxidizing a compound (20d) represented by the following formula:

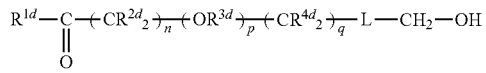

wherein R$^{1d}$ to R$^{4d}$, n, p, and q are defined as mentioned above, L is a single bond, —CO$_2$—B—*, —OCO—B—*, —CONR$^{6d}$—B—*, —NR$^{6d}$CO—B—*, or —CO— (however, excluding carbonyl groups contained in —CO$_2$—B—, —OCO—B—, —CONR$^{6d}$—B—, and —NR$^{6d}$CO—B—), B is a single bond or an alkylene group optionally having a substituent and having 1 to 10 carbon atoms, R$^{6d}$ is H or an alkyl group optionally having a substituent and having 1 to 4 carbon atoms, and the symbol * represents the side bonded to —CH$_2$—OH in the formula.

The oxidation in step (21d) can be performed by allowing a nitrosating agent to act on the compound (20d).

Examples of the nitrosating agent that can be used include sodium nitrite, nitrosyl sulfate, and isoamyl nitrite.

The nitrosating agent can be used in an amount of 0.5 to 10 mol, relative to 1 mol of the compound (20d).

The oxidation in step (21d) can be performed in a solvent. Examples of the solvent that can be used include trifluoroacetic acid and acetonitrile.

The oxidation temperature in step (21d) is preferably −78 to 200° C., more preferably −20 to 100° C.

The oxidation pressure in step (21d) is preferably 0 to 10 MPa, more preferably 0 to 1.0 MPa.

The oxidation time in step (21d) is preferably 0.1 to 72 hours, more preferably 0.1 to 24 hours.

The compound (10d) and the compound (20d) can be produced also by a production method including: step (101d) of obtaining a compound (101d) represented by the following formula:

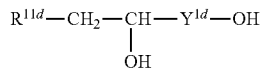

wherein R$^{11d}$ and Y$^{1d}$ are defined as mentioned above, by hydroxylating a compound (100d) represented by the following formula:

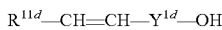

wherein R$^{11d}$ is H, a linear or branched alkyl group optionally having a substituent and having one or more carbon atoms, or a cyclic alkyl group optionally having a substituent and having three or more carbon atoms and may contain a monovalent or divalent heterocycle or may form a ring, in the case of having three or more carbon atoms, Y$^{1d}$ is —(CR$^{2d}_2$)$_n$— or —(CR$^{2d}_2$)$_n$—(OR$^{3d}$)$_p$—(CR$^{4d}_2$) q-L-CH$_2$—, wherein R$^{2d}$ to R$^{4d}$, n, L, p, and q are defined as mentioned above, L is a single bond, —CO$_2$—B—*, —OCO—B—*, —CONR$^{6d}$—B—*, —NR$^{6d}$CO—B—*, or —CO— (however, excluding carbonyl groups contained in —CO$_2$—B—, —OCO—B—, —CONR$^{6d}$—B—, and —NR$^{6d}$CO—B—), B is a single bond or an alkylene group optionally having a substituent and having 1 to 10 carbon atoms, R$^{6d}$ is H or an alkyl group optionally having a substituent and having 1 to 4 carbon atoms, and the symbol * represents the side bonded to —CH$_2$— in the formula; and step (102d) of obtaining a compound (102d) represented by the following formula:

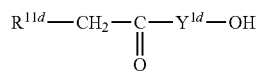

wherein R$^{11d}$ and Y$^{1d}$ are defined as mentioned above, by oxidizing the compound (101d).

The alkyl group serving as R$^{11d}$ is preferably free from carbonyl groups.

In the alkyl group serving as R$^{11d}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

R$^{11d}$ is preferably H, a linear or branched alkyl group optionally having a substituent and having 1 to 9 carbon atoms, or a cyclic alkyl group optionally having a substituent and having 3 to 9 carbon atoms, more preferably H, a linear or branched alkyl group free from carbonyl groups and having 1 to 9 carbon atoms, or a cyclic alkyl group free from carbonyl groups and having 3 to 9 carbon atoms, further preferably H or a linear or branched alkyl group having 1 to 9 carbon atoms and having no substituents, furthermore preferably H, a methyl group (—CH$_3$), or an ethyl group (—C$_2$H$_5$), particularly preferably H or a methyl group (—CH$_3$), most preferably H.

The hydroxylation in step (101d) can be performed, for example, by a method (1d) of allowing iron (II) phthalocyanine (Fe(Pc)) and sodium borohydride to act on the compound (100d) in an oxygen atmosphere, or a method (2d) of allowing isopinocampheylborane (IpcBH$_2$) to act on the compound (100d), followed by oxidizing an intermediate (dialkylborane) to be obtained.

In the method (1d), the iron (II) phthalocyanine can be used in an amount equal to that of catalyst, such as an amount of 0.001 to 1.2 mol, relative to 1 mol of the compound (100d).

In the method (1d), sodium borohydride can be used in an amount of 0.5 to 20 mol, relative to 1 mol of the compound (100d).

The reaction in the method (1d) can be performed in a solvent. The solvent is preferably an organic solvent, and examples thereof include ethers, halogenated hydrocarbons, aromatic hydrocarbons, nitriles, and nitrogen-containing polar organic compounds.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

The reaction temperature in the method (1d) is preferably −78 to 200° C., more preferably 0 to 150° C.

The reaction pressure in the method (1d) is preferably 0 to 5.0 MPa, more preferably 0.1 to 1.0 MPa.

The reaction time in the method (1d) is preferably 0.1 to 72 hours, more preferably 0.1 to 48 hours.

In the method (2d), isopinocampheylborane can be used in an amount of 1.0 to 10.0 mol, relative to 1 mol of the compound (100d).

The reaction of the compound (100d) with isopinocampheylborane can be performed in a solvent. The solvent is preferably an organic solvent, and examples thereof include ethers, halogenated hydrocarbons, and aromatic hydrocarbons.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The reaction temperature of the compound (100d) with isopinocampheylborane is preferably −78 to 200° C., more preferably 0 to 150° C.

The reaction pressure of the compound (100d) with isopinocampheylborane is preferably 0 to 5.0 MPa, more preferably 0.1 to 1.0 MPa.

The reaction time of the compound (100d) with isopinocampheylborane is preferably 0.1 to 72 hours, more preferably 0.1 to 48 hours.

The oxidation in the method (2d) can be performed by allowing an oxidant to act on the intermediate. Examples of the oxidant include hydrogen peroxide. The oxidant can be used in an amount of 0.7 to 10 mol relative to 1 mol of the intermediate.

The oxidation in the method (2d) can be performed in a solvent. Examples of the solvent include water, methanol, and ethanol. Among these, water is preferable.

The oxidation temperature in the method (2d) is preferably 0 to 100° C., more preferably 0 to 80° C.

The oxidation pressure in the method (2d) is preferably 0 to 5.0 MPa, more preferably 0.1 to 1.0 MPa.

The oxidation time in the method (2d) is preferably 0.1 to 72 hours, more preferably 0.1 to 48 hours.

Examples of the method for oxidizing the compound (101d) in step (102d) include a method (a) of using Jones reagent ($CrO_3/H_2SO_4$) (Jones oxidation), a method (d) of using Dess-Martin Periodinane (DMP) (Dess-Martin oxidation), a method (c) of using pyridinium chlorochromate (PCC), a method (d) of allowing a bleach (about 5 to 6% NaOCl aqueous solution) to act in the presence of a nickel compound such as $NiCl_2$, and a method (e) of allowing a hydrogen receptor such as an aldehyde and a ketone to act in the presence of an aluminum catalyst such as $Al(CH_3)_3$ and $Al[OCH(CH_3)_2]_3$ (Oppenauer oxidation).

The oxidation in step (102d) can be performed in a solvent. As the solvent, water and an organic solvent are preferable, and examples thereof include water, ketones, ethers, halogenated hydrocarbons, aromatic hydrocarbons, and nitriles.

Examples of the ketones include acetone, methyl ethyl ketone, methyl isobutyl ketone, cyclohexanone, and diacetone alcohol. Among these, acetone is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

The oxidation temperature in step (102d) is preferably −78 to 200° C. and can be appropriately selected corresponding to the method employed.

The oxidation pressure in step (102d) is preferably 0 to 5.0 MPa and can be appropriately selected corresponding to the method employed.

The oxidation time in step (102d) is preferably 0.1 to 72 hours and can be appropriately selected corresponding to the method employed.

The compound (10d) and the compound (20d) can be produced also by a production method including: step (201d) of obtaining a compound (201d) represented by the following formula:

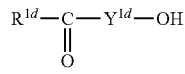

wherein $R^{1d}$ and $Y^{1d}$ are defined as mentioned above, by ozonolysis of a compound (200d) represented by the following formula:

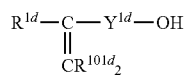

wherein $R^{1d}$ and $Y^{1d}$ are defined as mentioned above, and $R^{101d}$s are each an organic group.

$R^{101d}$s are each preferably an alkyl group having 1 to 20 carbon atoms. Two $R^{101d}$s may be the same as or different from each other.

The ozonolysis in step (201d) can be performed by allowing ozone to act on the compound (200d), followed by post-treatment with a reductant.

The ozone can be generated by silent discharge in oxygen gas.

Examples of the reductant to be used for the post-treatment include zinc, dimethyl sulfide, thiourea, phosphines. Among these, phosphines are preferable.

The ozonolysis in step (201d) can be performed in a solvent. The solvent is preferably water or an organic solvent.

Examples thereof include water, alcohols, carboxylic acids, ethers, halogenated hydrocarbons, and aromatic hydrocarbons.

Examples of the alcohols include methanol, ethanol, 1-propanol, and isopropanol. Among these, methanol and ethanol are preferable.

Examples of the carboxylic acids include acetic acid and propionic acid. Among these, acetic acid is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The ozonolysis temperature in step (201d) is preferably −78 to 200° C., more preferably 0 to 150° C.

The ozonolysis pressure in step (201d) is preferably 0 to 5.0 MPa, more preferably 0.1 to 1.0 MPa.

The ozonolysis time in step (201d) is preferably 0.1 to 72 hours, more preferably 0.1 to 48 hours.

The compound (10d) and the compound (20d) can be produced also by a production method including: step (301d) of obtaining a compound (301d) represented by the following formula:

$$R^{21d}-\overset{O}{\overset{\diagup\diagdown}{CH-CH}}-Y^{1d}-OH$$

wherein $R^{21d}$ and $Y^{1d}$ are defined as mentioned above, by epoxidizing a compound (300d) represented by the following formula:

$$R^{21d}-CH=CH-Y^{1d}-OH$$

wherein $Y^{1d}$ is defined as mentioned above, $R^{21d}$ is H, a linear or branched alkyl group optionally having a substituent and having one or more carbon atoms, or a cyclic alkyl group optionally having a substituent and having three or more carbon atoms and may contain a monovalent or divalent heterocycle or may form a ring, in the case of having three or more carbon atoms; step (302d) of obtaining a compound (302d) represented by the following formula:

$$R^{21d}-\underset{R^{22d}}{\underset{|}{CH}}-\underset{OH}{\underset{|}{CH}}-Y^{1d}-OH$$

wherein $R^{21d}$, $R^{22d}$ and $Y^{1d}$ are defined as mentioned above, by reacting the compound (301d) with a dialkylcopper lithium represented by:

$$R^{22d}{}_2CuLi$$

wherein $R^{22d}$s are each a linear or branched alkyl group optionally having a substituent and having one or more carbon atoms or a cyclic alkyl group optionally having a substituent and having three or more carbon atoms and may contain a monovalent or divalent heterocycle or may form a ring, in the case of having three or more carbon atoms; and step (303d) of obtaining a compound (303d) represented by the following formula:

$$R^{21d}-\underset{R^{22d}}{\underset{|}{CH}}-\underset{O}{\overset{\|}{C}}-Y^{1d}-OH$$

wherein $R^{21d}$, $R^{22d}$, and $Y^{1d}$ are defined as mentioned above, by oxidizing the compound (302d).

The alkyl group serving as $R^{21d}$ is preferably free from carbonyl groups.

In the alkyl group serving as $R^{21d}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

$R^{21d}$ is preferably H, a linear or branched alkyl group optionally having a substituent and having 1 to 8 carbon atoms, or a cyclic alkyl group optionally having a substituent and having 3 to 8 carbon atoms, more preferably H, a linear or branched alkyl group free from carbonyl groups and having 1 to 8 carbon atoms, or a cyclic alkyl group free from carbonyl groups and having 3 to 8 carbon atoms, further preferably H or a linear or branched alkyl group having 1 to 8 carbon atoms and having no substituents, particularly preferably H or a methyl group (—CH₃), most preferably H.

The alkyl group serving as each $R^{22d}$ is preferably free from carbonyl groups.

In the alkyl group serving as each $R^{22d}$, 75% or less of hydrogen atoms bonded to carbon atoms may be substituted with halogen atoms, 50% or less thereof may be substituted with halogen atoms, or 25% or less thereof may be substituted with halogen atoms, but the alkyl group is preferably a non-halogenated alkyl group free from halogen atoms such as fluorine atoms and chlorine atoms.

The alkyl group preferably does not contain any substituents.

$R^{22d}$s are each preferably a linear or branched alkyl group optionally having a substituent and having 1 to 9 carbon atoms or a cyclic alkyl group optionally having a substituent and having 3 to 9 carbon atoms, more preferably a linear or branched alkyl group free from carbonyl groups and having 1 to 9 carbon atoms or a cyclic alkyl group free from carbonyl groups and having 3 to 9 carbon atoms, further preferably a linear or branched alkyl group having 1 to 9 carbon atoms and having no substituents, particularly preferably a methyl group (—CH₃) or an ethyl group (—C₂H₅), most preferably a methyl group (—CH₃).

Two $R^{22d}$s may be the same as or different from each other.

$R^{21d}$ and $R^{22d}$s preferably have 1 to 7 carbon atoms, more preferably 1 to 2, most preferably 1, in total.

The epoxidation in step (301d) can be performed by allowing an epoxidizing agent to act on the compound (300d).

Examples of the epoxidizing agent include peracids such as metachloroperbenzoic acid (m-CPBA), perbenzoic acid, hydrogen peroxide, and tert-butyl hydroperoxide, dimethyldioxirane, and methyltrifluoromethyldioxirane. Among these, peracids are preferable, and metachloroperbenzoic acid is more preferable. The epoxidizing agent can be used in an amount of 0.5 to 10.0 mol relative to 1 mol of the compound (300d).

The epoxidation in step (301d) can be performed in a solvent. The solvent is preferably an organic solvent, and examples thereof include ketones, ethers, halogenated hydrocarbons, aromatic hydrocarbons, nitriles, pyridines, nitrogen-containing polar organic compounds, and dimethylsulfoxides. Among these, dichloromethane is preferable.

Examples of the ketones include acetone, methyl ethyl ketone, methyl isobutyl ketone, cyclohexanone, and diacetone alcohol. Among these, acetone is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

The epoxidation temperature in step (301d) is preferably −78 to 200° C., more preferably −40 to 150° C.

The epoxidation pressure in step (301d) is preferably 0 to 5.0 MPa, more preferably 0.1 to 1.0 MPa.

The epoxidation time in step (301d) is preferably 0.1 to 72 hours, more preferably 0.1 to 48 hours.

The dialkylcopper lithium can be used in step (302d) in an amount of 0.5 to 10.0 mol relative to 1 mol of the compound (301d).

The reaction in step (302d) can be performed in a solvent. The solvent is preferably an organic solvent, and examples thereof include ethers, halogenated hydrocarbons, and aromatic hydrocarbons.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

The reaction temperature in step (302d) is preferably −78 to 200° C., more preferably −40 to 150° C.

The reaction pressure in step (302d) is preferably 0 to 5.0 MPa, more preferably 0.1 to 1.0 MPa.

The reaction time in step (302d) is preferably 0.1 to 72 hours, more preferably 0.1 to 48 hours.

Examples of the method for oxidizing the compound (302d) in step (303d) include a method (a) of using Jones reagent ($CrO_3/H_2SO_4$) (Jones oxidation), a method (d) of using Dess-Martin Periodinane (DMP) (Dess-Martin oxidation), a method (c) of using pyridinium chlorochromate (PCC), a method (d) of allowing a bleach (about 5 to 6% NaOCl aqueous solution) to act in the presence of a nickel compound such as $NiCl_2$, and a method (e) of allowing a hydrogen receptor such as an aldehyde and a ketone to act in the presence of an aluminum catalyst such as $Al(CH_3)_3$ and $Al[OCH(CH_3)_2]_3$ (Oppenauer oxidation).

The oxidation in step (303d) can be performed in a solvent. As the solvent, water and an organic solvent are preferable, and examples thereof include water, ketones, alcohols, ethers, halogenated hydrocarbons, aromatic hydrocarbons, and nitriles.

Examples of the ketones include acetone, methyl ethyl ketone, methyl isobutyl ketone, cyclohexanone, and diacetone alcohol. Among these, acetone is preferable.

Examples of the alcohols include methanol, ethanol, 1-propanol, and isopropanol. Among these, methanol and ethanol are preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the aromatic hydrocarbons include benzene, toluene, and xylenes. Among these, benzene and toluene are preferable.

Examples of the nitriles include acetonitrile, propionitrile, butyronitrile, isobutyronitrile, and benzonitrile. Among these, acetonitrile is preferable.

The oxidation temperature in step (303d) is preferably −78 to 200° C. and can be appropriately selected corresponding to the method employed.

The oxidation pressure in step (303d) is preferably 0 to 5.0 MPa and can be appropriately selected corresponding to the method employed.

The oxidation time in step (303d) is preferably 0.1 to 72 hours and can be appropriately selected corresponding to the method employed.

The compound (10d) and the compound (20d) can be produced also by a production method including: step (401d) of obtaining a compound (401d) represented by the following formula:

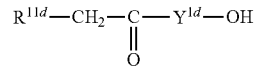

wherein $R^{11d}$ and $Y^{1d}$ are defined as mentioned above, by oxidizing a compound (100d) represented by the following formula:

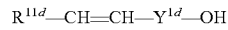

wherein $R^{11d}$ and $Y^{1d}$ are defined as mentioned above.

The oxidation in step (401d) can be performed by allowing an oxidant to act on the compound (100d) in the presence of water and a palladium compound.

Examples of the oxidant include monovalent or divalent copper salts such as copper chloride, copper acetate, copper cyanide, and copper trifluoromethanethiol, iron salts such as iron chloride, iron acetate, iron cyanide, iron trifluoromethanethiol, and hexacyanoiron, benzoquinones such as 1,4-benzoquinone, 2,3-dichloro-5,6-dicyano-1,4-benzoquinone, tetrachloro-1,2-benzoquinone, and tetrachloro-1,4-benzoquinone, $H_2O_2$, $MnO_2$, $KMnO_4$, $RuO_4$, m-chloroperbenzoic acid, and oxygen. Among these, copper salts, iron salts, and benzoquinones are preferable, and copper chloride, iron chloride, and 1,4-benzoquinone are more preferable.

The oxidant can be used in an amount of 0.001 to 10 mol, relative to 1 mol of the compound (100d).

The water can be used in an amount of 0.5 to 1000 mol, relative to 1 mol of the compound (100d).

Examples of the palladium compound include palladium dichloride. The palladium compound can be used in an amount equal to that of catalyst, such as an amount of 0.0001 to 1.0 mol, relative to 1 mol of the compound (100d).

The oxidation in step (401d) can be performed in a solvent. Examples of the solvent include water, esters, aliphatic hydrocarbons, aromatic hydrocarbons, alcohols, carboxylic acids, ethers, halogenated hydrocarbons, nitrogen-containing polar organic compounds, nitriles, dimethylsulfoxides, and sulfolanes.

Examples of the esters include ethyl acetate, butyl acetate, ethylene glycol monomethyl ether acetate, and propylene glycol monomethyl ether acetate (PGMEA, also known as 1-methoxy-2-acetoxypropane). Among these, ethyl acetate is preferable.

Examples of the aliphatic hydrocarbons include hexane, cyclohexane, heptane, octane, nonane, decane, undecane, dodecane, and petroleum spirit. Among these, cyclohexane and heptane are preferable.

Examples of the aromatic hydrocarbons include benzene, toluene, and xylenes. Among these, benzene and toluene are preferable.

Examples of the alcohol include methanol, ethanol, 1-propanol, and isopropanol.

Examples of the carboxylic acids include acetic acid and propionic acid. Among these, acetic acid is preferable.

Examples of the ethers include diethyl ether, tetrahydrofuran, dioxane, and diethylene glycol diethyl ether. Among these, diethyl ether and tetrahydrofuran are preferable.

Examples of the halogenated hydrocarbons include dichloromethane, dichloroethane, chloroform, chlorobenzene, and o-dichlorobenzene. Among these, dichloromethane and chloroform are preferable.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. Among these, N,N-dimethylformamide, N,N-dimethylacetamide, and N-methyl-2-pyrrolidone are preferable.

Examples of the nitriles include acetonitrile, propionitrile, butyronitrile, isobutyronitrile, and benzonitrile. Among these, acetonitrile is preferable.

The oxidation temperature in step (401d) is preferably −78 to 200° C., more preferably −20 to 150° C.

The oxidation pressure in step (401d) is preferably 0 to 10 MPa, more preferably 0.1 to 5.0 MPa.

The oxidation time in step (401d) is preferably 0.1 to 72 hours, more preferably 0.1 to 48 hours.

The surfactant (d) can be produced also by a production method including: step (31d) of obtaining a compound (31d) represented by the following formula:

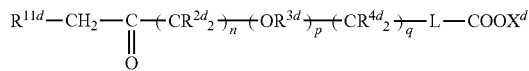

wherein $R^{2d}$ to $R^{4d}$, L, $R^{11d}$, n, p, q, and $X^d$ are defined as mentioned above, by oxidizing a compound (30d) represented by the following formula:

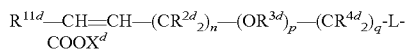

wherein $R^{2d}$ to $R^{4d}$, $R^{11d}$, n, p, q, and $X^d$ are defined as mentioned above, L is a single bond, —CO$_2$—B—*, —OCO—B—*, —CONR$^{6d}$—B—*, —NR$^{6d}$CO—B—*, or —CO— (however, excluding carbonyl groups contained in —CO$_2$—B—, —OCO—B—, —CONR$^{6d}$—B—, and —NR$^{6d}$CO—B—), B is a single bond or an alkylene group optionally having a substituent and having 1 to 10 carbon atoms, $R^{6d}$ is H or an alkyl group optionally having a substituent and having 1 to 4 carbon atoms, the alkylene group is more preferably has 1 to 5 carbon atoms, $R^{6d}$ is more preferably H or a methyl group, and the symbol * represents the side bonded to —COO$X^d$ in the formula.

The oxidation in step (31d) can be performed by allowing an oxidant to act on the compound (30d) in the presence of water and a palladium compound, and the same conditions as in the oxidation in step (401d) can be employed therefor.

In any of the aforementioned production methods, the solvent may be distilled off, evaporated, or purified after the completion of each step, so as to enhance the purity of the compound to be obtained. Further, when the compound to be obtained is a compound in which $X^d$ is H, such as —SO$_3$H and —COOH, such a group can be converted into a salt form by contact with an alkali such as sodium carbonate and ammonia.

In the production methods of the present invention, two or more of the aforementioned hydrocarbon surfactants may be used at the same time.

The present invention is also a composition containing PTFE and substantially free from a compound represented by Formula (3) below:

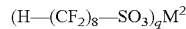      Formula (3):

wherein $M^2$ is H, a metal atom, $NR^5_4$ (where $R^5$s are optionally the same or different and are each H or an organic group having 1 to 10 carbon atoms), an imidazolium optionally having a substituent, a pyridinium optionally having a substituent, or a phosphonium optionally having a substituent, and q is 1 or 2.

Examples of the PTFE include PTFEs such as homo PTFE and modified PTFE described in the method for producing an aqueous dispersion of purified PTFE.

The composition substantially free from the compound represented by Formula (3) above and the composition containing a specific amount of a compound represented by Formula (4), (4'), (5), (5'), (6), (6'), or (7), which will be described below, are preferably obtained by fluorinating a PTFE obtained by polymerization using a hydrocarbon surfactant. The larger the fluorination time and the amount added, the more the compound represented by Formula (3), (4), (4'), (5), (5'), (6), (6'), or (7) can be reduced. The fluorination is preferably performed at a high temperature, and the amount of the fluorine radical source added is preferably large. For example, the fluorination is preferably performed over 100° C., and the amount of the fluorine radical source added is preferably 0.5 parts by weight or more per 100 parts by weight of PTFE in terms of fluorine atoms.

The composition of the present invention is substantially free from the compound represented by Formula (3).

To be substantially free from the compound represented by Formula (3), for example, may mean to contain the compound represented by Formula (3) in an amount of 1000 ppb or less with respect to PTFE. The content of the compound represented by Formula (3) is preferably 500 ppb or less, more preferably 100 ppb or less, further preferably 25 ppb or less, particularly preferably 15 ppb or less, furthermore preferably 10 ppb or less, with respect to PTFE. The lower limit is not limited but may be 0 ppb, 0.1 ppb, or 1 ppb.

When the composition of the present invention is an aqueous dispersion, the quantitation limit, as determined by measuring the content of the compound represented by Formula (3) according to the later-described method, is about 10 to 100 ppb but can be reduced by concentration. The concentration may be repeated multiple times.

One aspect of the present invention may be a composition that is an aqueous dispersion or a composition that is powder. The aqueous dispersion may be an aqueous dispersion after polymerization or may be an aqueous dispersion that is processed after polymerization. For example, a nonionic surfactant or the like may be added thereto for the mechanical stability or the storage stability.

The aqueous dispersion is a dispersion system using an aqueous medium as a dispersion medium and the PTFE as a dispersoid. The aqueous medium is not limited as long as it is a liquid containing water. For example, the aqueous medium may be a liquid containing an organic solvent such as alcohols, ethers, ketones, and paraffin waxes in addition to water.

When a PTFE is produced using a hydrocarbon surfactant, the aqueous dispersion to be obtained may contain a compound represented by Formula (4), (4'), (5), or (5') below in some cases. One aspect of the present invention is a composition containing a compound represented by Formula (4), (4'), (5), or (5') below in an amount falling within the following range.

Further, a nonionic surfactant may be added to the aqueous dispersion for enhancing the stability. The nonionic surfactant is not limited, and a conventionally known nonionic surfactant can be employed.

One aspect of the present invention is a composition containing a compound represented by Formula (4) below in an amount of 1000 ppb or less with respect to PTFE and 1%/PTFE or more of a nonionic surfactant with respect to PTFE. For example, the upper limit of the content of the nonionic surfactant is preferably 40%/PTFE, more preferably 30%/PTFE, further preferably 20%/PTFE. The content of the compound represented by Formula (4) is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

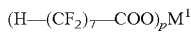    Formula (4):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (4') below in an amount of 1000 ppb or less with respect to PTFE and 1%/PTFE or more of a nonionic surfactant. For example, the upper limit of the content of the nonionic surfactant is preferably 40%/PTFE, more preferably 30%/PTFE, further preferably 20%/PTFE. The content of the compound represented by Formula (4') is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

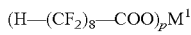    Formula (4'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing: at least any one of a compound represented by Formula (4) below and a compound represented by Formula (4') below, wherein the content of the compound represented by Formula (4) is 1000 ppb or less with respect to PTFE, and the content of the compound represented by Formula (4') is 1000 ppb or less with respect to PTFE; and a nonionic surfactant in an amount of 1%/PTFE or more. For example, the upper limit of the content of the nonionic surfactant is preferably 40%/PTFE, more preferably 30%/PTFE, further preferably 20%/PTFE. The content of the compound represented by Formula (4) is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (4) is not limited but may be 0 ppb, 0.1 ppb, or 1 ppb. The content of the compound represented by Formula (4') is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (4') is not limited but may be 0 ppb, 0.1 ppb, or 1 ppb:

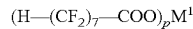    Formula (4):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and

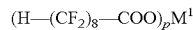    Formula (4'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (5) below in an amount of 1000 ppb or less with respect to PTFE and 1%/PTFE or more of a nonionic surfactant. For example, the upper limit of the content of the nonionic surfactant is preferably 40%/PTFE, more preferably 30%/PTFE, further preferably 20%/PTFE. The content of the compound represented by Formula (5) is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

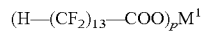    Formula (5):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (5') below in an amount of 1000 ppb or less with respect to PTFE and 1%/PTFE or more of a nonionic surfactant. For example, the upper limit of the content of the nonionic surfactant is preferably 40%/PTFE, more preferably 30%/PTFE, further preferably 20%/PTFE. The content of the compound represented by Formula (5') is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

$(H-(CF_2)_{14}-COO)_pM^1$  Formula (5'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing: at least any one of a compound represented by Formula (5) below and a compound represented by Formula (5') below, wherein the content of the compound represented by Formula (5) is 1000 ppb or less with respect to PTFE, and the content of the compound represented by Formula (5') is 1000 ppb or less with respect to PTFE; and a nonionic surfactant in an amount of 1%/PTFE or more. For example, the upper limit of the content of the nonionic surfactant is preferably 40%/PTFE, more preferably 30%/PTFE, further preferably 20%/PTFE. The content of the compound represented by Formula (5) is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (5) is not limited but may be 0 ppb, 0.1 ppb, or 1 ppb. The content of the compound represented by Formula (5') is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (5') is not limited but may be 0 ppb, 0.1 ppb, or 1 ppb:

$(H-(CF_2)_{13}-COO)_pM^1$  Formula (5):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and $(H-(CF_2)_{14}-COO)_pM^1$  Formula (5'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (6) below in an amount of 1000 ppb or less with respect to PTFE and 1%/PTFE or more of a nonionic surfactant. For example, the upper limit of the content of the nonionic surfactant is preferably 40%/PTFE, more preferably 30%/PTFE, further preferably 20%/PTFE. The content of the compound represented by Formula (6) is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

$(H-(CF_2)_{17}-COO)_pM^1$  Formula (6):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (6') below in an amount of 1000 ppb or less with respect to PTFE and 1%/PTFE or more of a nonionic surfactant. For example, the upper limit of the content of the nonionic surfactant is preferably 40%/PTFE, more preferably 30%/PTFE, further preferably 20%/PTFE. The content of the compound represented by Formula (6') is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

$(H-(CF_2)_{18}-COO)_pM^1$  Formula (6'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing: at least any one of a compound represented by Formula (6) below and a compound represented by Formula (6') below, wherein the content of the compound represented by Formula (6) is 1000 ppb or less with respect to PTFE, and the content of the compound represented by Formula (6') is 1000 ppb or less with respect to PTFE; and a nonionic surfactant in an amount of 1%/PTFE or more. For example, the upper limit of the content of the nonionic surfactant is preferably 40%/PTFE, more preferably 30%/PTFE, further preferably 20%/PTFE. The content of the compound represented by Formula (6) is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (6) is not limited but may be 0 ppb, 0.1 ppb, or 1 ppb. The content of the compound represented by Formula (6') is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (6') is not limited but may be 0 ppb, 0.1 ppb, or 1 ppb:

$(H-(CF_2)_{17}-COO)_pM^1$  Formula (6):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and $(H-(CF_2)_{18}-COO)_pM^1$  Formula (6'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

When a PTFE is produced using a hydrocarbon surfactant, the PTFE powder to be obtained may contain a compound represented by Formula (1), (2), (3), (4), (4'), (5), (5'), (6), or (6') below in some cases. When the composition of the present invention is powder, the content of the compound represented by Formula (1), (2), (3), (4), (4'), (5), (5'), (6), or (6') preferably falls within the following range.

One aspect of the present invention is a composition containing a compound represented by Formula (4) below in an amount of 1000 ppb or less with respect to PTFE. The content of the compound represented by Formula (4) is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

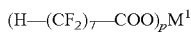  Formula (4):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (4') below in an amount of 1000 ppb or less with respect to PTFE. The content of the compound represented by Formula (4') is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

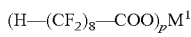  Formula (4'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing at least any one of a compound represented by Formula (4) below and a compound represented by Formula (4') below, wherein the content of the compound represented by Formula (4) is 1000 ppb or less with respect to PTFE, and the content of the compound represented by Formula (4') is 1000 ppb or less with respect to PTFE. The content of the compound represented by Formula (4) is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (4) is not limited but may be 0 ppb or 1 ppb. The content of the compound represented by Formula (4') is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (4') is not limited but may be 0 ppb, 0.1 ppb, or 1 ppb:

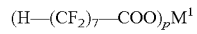  Formula (4):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and

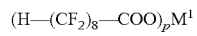  Formula (4'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (5) below in an amount of 1000 ppb or less with respect to PTFE. The content of the compound represented by Formula (5) is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

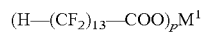  Formula (5):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (5') below in an amount of 1000 ppb or less with respect to PTFE. The content of the compound represented by Formula (5') is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

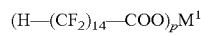  Formula (5'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing at least any one of a compound represented by Formula (5) below and a compound represented by Formula (5') below, wherein the content of the compound represented by Formula (5) is 1000 ppb or less with respect to PTFE, and the content of the compound represented by Formula (5') is 25 ppb or less with respect to PTFE. The content of the compound represented by Formula (5) is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (5) is not limited but may be 0 ppb, 0.1 ppb, or 1 ppb. The content of the compound represented by Formula (5') is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (5') is not limited but may be 0 ppb, 0.1 ppb, or 1 ppb:

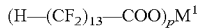  Formula (5):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and

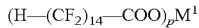  Formula (5'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (6) below in an amount of 1000 ppb or less with respect to PTFE. The content of the compound represented by Formula (6) is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

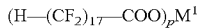  Formula (6):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (6') below in an amount of 1000 ppb or less with respect to PTFE. The content of the compound represented by Formula (6') is more preferably 500 ppb or less, further preferably 100 ppb or less, particularly preferably 25 ppb or less, furthermore preferably 15 ppb or less, furthermore preferably 10 ppb or less. The lower limit is not limited but may be 0.1 ppb or 1 ppb:

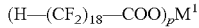  Formula (6'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing at least any one of a compound represented by Formula (6) below and a compound represented by Formula (6') below, wherein the content of the compound represented by Formula (6) is 1000 ppb or less with respect to PTFE, and the content of the compound represented by Formula (6') is 1000 ppb or less with respect to PTFE. The content of the compound represented by Formula (6) is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (6) is not limited but may be 0 ppb, 0.1 ppb, or 1 ppb. The content of the compound represented by Formula (6') is more preferably 500 ppb or less, further preferably 100 ppb or less, particularly preferably 25 ppb or less, furthermore preferably 15 ppb or less, furthermore preferably 10 ppb or less. The lower limit of the content of the compound represented by Formula (6') is not limited but may be 0 ppb, 0.1 ppb, or 1 ppb:

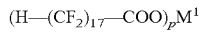  Formula (6):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and

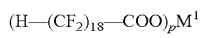  Formula (6'):

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

One aspect of the present invention is a composition containing a compound represented by Formula (2) below, wherein the content of the compound when n is 4 is 1000 ppb or less with respect to PTFE, the content of the compound when n is 5 is 1000 ppb or less with respect to PTFE, the content of the compound when n is 6 is 1000 ppb or less with respect to PTFE, the content of the compound when n is 7 is 1000 ppb or less with respect to PTFE, the content of the compound when n is 8 is 1000 ppb or less with respect to PTFE, the content of the compound when n is 9 is 1000 ppb or less with respect to PTFE, the content of the compound when n is 10 is 1000 ppb or less with respect to PTFE, the content of the compound when n is 11 is 1000 ppb or less with respect to PTFE, the content of the compound when n is 12 is 1000 ppb or less with respect to PTFE, the content of the compound when n is 13 is 1000 ppb or less with respect to PTFE, the content of the compound when n is 14 is 1000 ppb or less with respect to PTFE, the content of the compound when n is 15 is 1000 ppb or less with respect to PTFE, the content of the compound when n is 16 is 1000 ppb or less with respect to PTFE, the content of the compound when n is 17 is 1000 ppb or less with respect to PTFE, the content of the compound when n is 18 is 1000 ppb or less with respect to PTFE, the content of the compound when n is 19 is 1000 ppb or less with respect to PTFE, and the content of the compound when n is 20 is 1000 ppb or less with respect to PTFE:

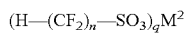  Formula (2):

wherein n is 4 to 20, $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2.

The content of the compound when n is 4 to 20 is more preferably 500 ppb or less, further preferably 100 ppb or less, particularly preferably 25 ppb or less, furthermore preferably 15 ppb or less, furthermore preferably 10 ppb or less, in each case. The lower limit is not limited but may be 0 ppb, 0.1 ppb, or 1 ppb. In the composition of the present invention, the content of the compound represented by Formula (2) may be 0 ppb in any case.

One aspect of the present invention is a composition containing a compound represented by Formula (1) below, wherein the content of the compound when m is 3 is 1000 ppb or less with respect to PTFE, the content of the compound when m is 4 is 1000 ppb or less with respect to PTFE, the content of the compound when m is 5 is 1000 ppb or less with respect to PTFE, the content of the compound when m is 6 is 1000 ppb or less with respect to PTFE, the content of the compound when m is 7 is 1000 ppb or less with respect to PTFE, the content of the compound when m is 8 is 1000 ppb or less with respect to PTFE, the content of the compound when m is 9 is 1000 ppb or less with respect to PTFE, the content of the compound when m is 10 is 1000 ppb or less with respect to PTFE, the content of the compound when m is 11 is 1000 ppb or less with respect to PTFE, the content of the compound when m is 12 is 1000 ppb or less with respect to PTFE, the content of the compound when m is 13 is 1000 ppb or less with respect to PTFE, the content of the compound when m is 14 is 1000 ppb or less with respect to PTFE, the content of the compound when m is 15 is 1000 ppb or less with respect to PTFE, the content of the compound when m is 16 is 1000 ppb or less with respect to PTFE, the content of the compound when m is 17 is 1000 ppb or less with respect to PTFE, the content of the compound when m is 18 is 1000 ppb or less with respect to PTFE, and the content of the compound when m is 19 is 1000 ppb or less with respect to PTFE:

$$(H-(CF_2)_m-COO)_p M^1 \quad \text{Formula (1):}$$

wherein m is 3 to 19, $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

The content of the compound when m is 3 to 19 is more preferably 500 ppb or less, further preferably 100 ppb or less, particularly preferably 25 ppb or less, furthermore preferably 15 ppb or less, furthermore preferably 10 ppb or less, in each case. The lower limit is not limited but may be 0 ppb, 0.1 ppb, or 1 ppb. One aspect of the present invention is a composition containing the compound represented by Formula (1) above of any case.

The composition of the present invention may further contain a compound represented by Formula (7) below in an amount of 1000 ppb or less with respect to PTFE:

$$(F-(CF_2)_7-COO)_p M^1 \quad \text{Formula (7):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

The composition containing the compound represented by Formula (7) is obtained by fluorinating a PTFE obtained by polymerization using a hydrocarbon surfactant. As the fluorination temperature increases, the fluorination time increases, or the amount of the fluorine radical source added increases, the content of the compound represented by Formula (7) can be reduced. Further, another step such as heating may be performed after the fluorination. The compound represented by Formula (7) can be reduced also by heating or the like after the fluorination.

The content of the compound represented by Formula (7) is preferably 500 ppm or less, more preferably 100 ppb or less, further preferably 25 ppb or less, particularly preferably 5 ppb or less, with respect to PTFE. The lower limit is not limited but may be 0 ppb, 0.1 ppb, or 1 ppb.

The ranges of the content of the compound represented by Formula (7) can be combined with all the amount ranges described above for the compounds represented by Formulas (3), (4), (4'), (5), (5'), (6), and (6').

In the composition of the present invention, the content of the compound represented by Formula (3) may be 1000 ppb or less, the content of the compound represented by Formula (4) or (4') may be 1000 ppb or less, and the content of the compound represented by Formula (7) may be 1000 ppb or less, with respect to PTFE. Preferably, the content of the compound represented by Formula (3) is 500 ppb or less, the content of the compound represented by Formula (4) or (4') is 500 ppb or less, and the compound represented by Formula (7) is 500 ppb or less. Further preferably, the content of the compound represented by Formula (3) is 100 ppb or less, the content of the compound represented by Formula (4) or (4') is 100 ppb or less, and the compound represented by Formula (7) is 100 ppb or less. Particularly preferably, the content of the compound represented by Formula (3) is 25 ppb or less, the content of the compound represented by Formula (4) or (4') is 25 ppb or less, and the compound represented by Formula (7) is 25 ppb or less.

One aspect of the present invention is a composition that is powder. When the composition of the present invention is powder, the average particle size of the powder is preferably 0.5 to 2000 μm. The lower limit of the average particle size is more preferably 1 μm, and the upper limit thereof is more preferably 1000 μm, further preferably 800 μm. In this description, the average particle size is a particle size corresponding to 50% of the particle size distribution integration obtained by measuring the particle size distribution at a pressure of 0.1 MPa in a measurement time of 3 seconds, using a laser diffraction particle size distribution analyzer (manufactured by Japan Laser Corporation), without using a cascade, in the case of a low molecular weight PTFE.

Further, the average particle size is a value measured according to JIS K6891, in the case of a high molecular weight PTFE.

In the powder, the color tone L* after firing is preferably 25 or more, more preferably 50 or more, further preferably 70 or more, particularly preferably 80 or more.

The sample for measuring the color tone L* is obtained by forming 4.0 g of the PTFE powder into a disk-shaped PTFE molded body with an inner diameter of 28.6 mm and a thickness of about 4 mm.

The color tone L* of the powder is measured using a colorimeter (CIELAB color scale) according to JIS Z8781-4.

The firing is carried out by heating in an electric furnace heated to 385° C. for 10 minutes.

The composition of the present invention is powder, and the color tone change rate ΔL* before and after the fluorination is preferably 70% or more, more preferably 80% or more, further preferably 90% or more.

The color tone change rate ΔL* is defined by the following formula:

$$\Delta L^*(\%) = (L^*_t - L^*_i)/(L^*_{Std} - L^*_i) \times 100$$

wherein $L^*_i$ is the initial color tone and is a measured value of L* in the CIELAB scale for the PTFE before the fluorination, $L^*_t$ is a color tone after the treatment and is a measured value of L* in the CIELAB scale for the PTFE after the fluorination, and $L^*_{Std}$ is 87.3

The fluorination is carried out by continuously pouring a mixed gas (fluorine/nitrogen (volume ratio)=20/80) obtained by diluting a fluorine gas ($F_2$) as a fluorine radical source with nitrogen gas into a reactor heated to 150° C. or more under the atmospheric pressure at a flow rate of about 50 cc/min for 480 minutes (8 hours).

In Formula (1), (2), (3), (4), (4'), (5), (5'), (6), or (6') above, four $R^5$s may be the same as or different from each other. $R^5$ is preferably H or an organic group having 1 to 10 carbon atoms, more preferably H or an organic group having 1 to 4 carbon atoms.

In the composition of the present invention, the content of the compound represented by Formula (1), (2), (3), (4), (4'), (5), (5'), (6), or (6') is a value measured using liquid chromatography mass spectrometry as described in Examples below.

In the composition of the present invention, the PTFE is preferably obtained by polymerization using a hydrocarbon surfactant. The polymerization may be performed by the aforementioned method of obtaining a PTFE aqueous dispersion.

The composition of the present invention may contain a hydrocarbon surfactant, and examples of the hydrocarbon surfactant are as described above.

Other than the PTFE and the hydrocarbon surfactant, conventionally known additives such as pigments and fillers can be added to the composition. Such additives may be used within a range that does not inhibit the effects of the present invention.

The composition of the present invention can be produced using a hydrocarbon surfactant having a carbonyl group or using a hydrocarbon surfactant having a carbonyl group in combination with a specific polymerization initiator.

Examples of the hydrocarbon surfactant having a carbonyl group include carboxylate among the aforementioned hydrocarbon surfactants.

Examples of the specific polymerization initiator include water-soluble radical polymerization initiators and redox initiators.

The water-soluble radical polymerization initiators may be known water-soluble peroxides, and examples thereof include ammonium salts such as persulfates and percarbonates, potassium salts, sodium salts, t-butyl permaleate, and t-butyl hydroperoxide. The amount used may be 0.1 to 20 times with respect to the peroxides.

Further, a redox initiator combining an oxidant with a reductant is preferably used as a polymerization initiator, for example, in the case of polymerization at a low temperature of 30° C. or less. Examples of the oxidant include persulfate, organic peroxide, potassium permanganate, manganese triacetate, and cerium ammonium nitrate.

Examples of the reductant include bromate, diimine, and oxalic acid. Examples of the persulfates include ammonium persulfate and potassium persulfate. Copper salts or iron salts are also preferably added to the combination of the redox initiator for increasing the degradation rate of the initiator.

Examples of the copper salts include copper (II) sulfate, and examples of the iron salts include iron (II) sulfate.

Examples of the redox initiator include potassium permanganate/oxalic acid, manganese triacetate/oxalic acid, cerium ammonium nitrate/oxalic acid, and bromate. Potassium permanganate/oxalic acid is preferable. In the case of using a redox initiator, polymerization may be started by putting either the oxidant or the reductant into a polymerization tank in advance and then adding the other thereto continuously or intermittently. For example, in the case of using potassium permanganate/oxalic acid, it is preferable that oxalic acid be put into a polymerization tank, and then potassium permanganate be added thereto continuously.

Further, when performing the fluorination, the composition of the present invention can be produced without employing the combination of the hydrocarbon surfactant having a carbonyl group with the specific polymerization initiator.

The composition of the present invention can be obtained by drying a PTFE obtained by polymerization using a hydrocarbon surfactant and thereafter performing a fluorination step thereon.

In particular, a composition with a content of the compound represented by Formula (1), (2), (3), (4), (4'), (5), (5'), (6), or (6') of 25 ppb or less can be obtained by this method.

The present invention is also a molded body comprising the aforementioned composition. Further, the molded body is preferably a stretched body. The molded body and the stretched body of the present invention can be produced by the aforementioned method for producing a PTFE molded body or the like. Examples of the stretched body include threads, tubes, tapes, and films (such as uniaxially stretched films and biaxially stretched films), but there is no limitation to these examples.

The molded body and the stretched body of the present invention are composed of the aforementioned composition. In the case of forming a molded body and a stretched body, particularly, a stretched body, the aforementioned composition is preferably the following composition (PTFE composition).

The present invention also relates to an extruded body composed of the aforementioned PTFE composition. The PTFE extrudate is preferably obtained by paste extrusion. The paste extrusion molding is preferably performed by mixing PTFE powder with an extrusion aid. The shape formed by the paste extrusion molding is not limited, but examples thereof include shapes of rods, bars (beads), tapes, tubes, and wire coatings. The PTFE molded body obtained by paste molding can be dried to remove the extrusion aid. The drying of the extrusion aid can be appropriately selected corresponding to the boiling point of the extrusion aid used and can be performed within a temperature range of 100 to 250° C.

The PTFE composition of the present invention has stretchability and non-melt processability and is useful also as a raw material for a stretched body (porous material). An excellent stretched body can be obtained by stretching the PTFE of the present invention. For example, a stretched body can be obtained by paste extrusion of powder of the PTFE composition of the present invention mixed with an extrusion aid, followed by rolling, as required, removal of the extrusion aid by drying, and thereafter stretching in at least one direction. The PTFE composition of the present invention is easily fibrillated by stretching, thereby forming a stretched body composed of nodules and fibers. This stretched body is also a porous material having a high porosity.

The present invention also relates to a stretched body composed of the aforementioned PTFE composition.

The stretched body of the present invention can be produced by paste extrusion and rolling of the aforementioned PTFE composition, followed by unfiring or semi-firing, and stretching in at least one direction (preferably, roll-stretching in the rolling direction and then stretching in the width direction using a tenter). The stretching conditions to be employed are preferably a speed of 5 to 1000%/second and a stretch ratio of 500% or more. The PTFE is easily fibrillated by stretching, thereby forming a stretched body composed of nodules and fibers. The porosity of the stretched body is not limited but is generally preferably within the range of 50 to 99%, more preferably within the range of 70 to 98%. The stretched body of the present invention may consist only of the PTFE composition, or may contain the PTFE composition and the aforementioned pigments or fillers, but preferably consists only of the PTFE composition.

The stretched body of the present invention preferably has a film, tube, fiber, or rod shape.

In the case of being a film (stretched film or porous film), the stretched body of the present invention can be stretched by a known PTFE stretching method.

Preferably, a uniaxially stretched film can be obtained by roll-stretching a sheet-like or rod-like paste extrudate in the extrusion direction.

A biaxially stretched film can be obtained by stretching it further in the width direction with a tenter or the like.

Semi-firing is also preferably performed before stretching.

The stretched body of the present invention is a porous material having a high porosity and can be suitably used as a filter medium for various precision filtrations such as air filters and chemical filters, or a support member for polymer electrolyte membranes.

Further, the stretched body of the present invention is useful also as a material for products used in the textile field, the medical field, the electrochemical field, the field of sealing materials, the field of air filtration, the field of ventilation/internal pressure adjustment, the field of liquid filtration, and the field of general consumer materials.

Specific applications are shown below as examples.
Electrochemical Field

Examples of applications include dielectric material prepregs, EMI shielding materials, and heat transfer materials. More specifically, examples thereof include print wiring boards, electromagnetic shielding materials, electrically insulating heat transfer materials, and insulating materials.
Field of Sealing Materials Examples of applications include gaskets, packings, pump diaphragms, pump tubes, and sealing materials for aircrafts.

Field of air filtration Examples of applications include ULPA filters (for semiconductor production), HEPA filters (for hospitals and semiconductor production), cylinder cartridge filters (for industrial use), bag filters (for industrial use), heat resistant bag filters (for exhaust gas treatment), heat resistant pleated filters (for exhaust gas treatment), SINBRAN filters (for industrial use), catalyst filters (for exhaust gas treatment), filters with adsorbent (built in HDDs), ventilated filters with adsorbent (built in HDDs), ventilated filters (built in HDDs and for other applications), vacuum cleaner filters (for vacuum cleaners), general-purpose multilayer felt materials, GT cartridge filters (for compatible products for GT), and cooling filters (for electronic equipment housings).

Field of ventilation/internal pressure adjustment Examples of applications include materials for freeze drying such as containers for freeze drying, automotive ventilation materials for electronic circuits and lamps, container applications such as container caps, protective ventilation applications for electronic devices including small terminals such as tablet terminals and mobile phone terminals, and medical ventilation applications.

Field of Liquid Filtration

Examples of applications include semiconductor liquid filtration filters (for semiconductor production), hydrophilic PTFE filters (for semiconductor production), chemical filters (for chemical processing), pure water production line filters (for pure water production), and backwash liquid filtration filters (for industrial wastewater treatment).
Field of General Consumer Materials Examples of applications include clothes, cable guides (movable wires for motorcycles), clothes for motorcycles, cast liners (medical supporters), vacuum cleaner filters, bagpipes (instruments), cables (such as signal cables for guitars), and strings (for stringed instruments).
Textile Field Examples of applications include PTFE fibers (fiber materials), sewing threads (textiles), weaving yarns (textiles), and ropes.
Medical Field Examples of applications include in-vivo implants (stretched products), artificial blood vessels, catheters, generally surgery (tissue reinforcing materials), head and neck products (dura substitutes), oral health (tissue regenerative medicine), and orthopedics (bandages).

EXAMPLES

Next, the present invention will be described by way of experimental examples, but the present invention is not limited only to such experimental examples.

The numerical values in the experimental examples were measured by the following methods.
Average Primary Particle Size (Nm)

The PTFE aqueous dispersion is diluted with water to a solid content of 0.15 mass %, and the transmittance of projected light at 550 nm with respect to the unit length of the diluted latex obtained and the number-based, length-average particle size determined by measuring a particle size along a specified direction from a transmission electron micrograph were measured, to plot a calibration curve. Using the calibration curve, the average primary particle size of the PTFE particles in the PTFE aqueous dispersion was determined from the actual transmittance of projected light at 550 nm through each sample.
Solid Content of PTFE (Mass %)

1 g of the PTFE aqueous dispersion was dried in an air dryer under conditions of 150° C. and 60 minutes, and a value expressing the mass ratio of heating residue as a percentage with respect to a mass (1 g) of the aqueous dispersion was employed.
Standard Specific Gravity (SSG)

Using each sample formed according to ASTM D4895-89, the standard specific gravity was measured by the water replacement method according to ASTM D-792.
Content of Specific Compound Containing Fluorine The content of the specific compound containing fluorine was measured using liquid chromatography mass spectrometry under the following conditions.
[Method for Measuring Content of Compound Represented by Formula (1)]
Extraction from Powder 10 g (12.6 mL) of methanol was added to 1 g of the powder, followed by ultrasonic treatment for 60 minutes, to extract a supernatant containing the compound represented by Formula (1).
Extraction from Aqueous Dispersion The solid content of the aqueous dispersion was measured, and the aqueous dispersion in an amount corresponding to 0.5 g of the PTFE solid content was weighed into a 100-mL screw tube. Thereafter, water and methanol were added thereto, so as to yield 40 g (43.14 mL) of an extraction solvent with water/methanol=50/50 vol % including water contained in the aqueous dispersion. Thereafter, the solution was shaken well until coagulation occurred. The solid content was removed, and the liquid phase was centrifuged at 4000 rpm for 1 hour, to extract a supernatant containing the compound represented by Formula (1).

Extraction from Molded Body (Such as Extruded Beads and Stretched Beads)

10 g (12.6 mL) of methanol was added to 0.1 g of the molded body, followed by ultrasonic treatment for 60 minutes, to extract a supernatant containing the compound represented by Formula (1).

Measurement of Content of Compound Represented by Formula (1) Contained in Extract The content of the compound represented by Formula (1) in the extract was determined in terms of perfluorooctanoic acid.

Calibration Curve of Perfluorooctanoic Acid

Five levels of methanol standard solutions of perfluorooctanoic acid having known concentrations of 1 ng/mL to 100 ng/mL were prepared and measured using a liquid chromatograph mass spectrometer (LC-MS ACQUITY UPLC/TQD, Waters Corporation). Using first-order approximation, a and b were determined by Relational Expression (1) from the concentration of each sample and the integral value of the peaks.

$$A = a \times X + b \quad (1)$$

A: Peak area of perfluorooctanoic acid
X: Concentration of perfluorooctanoic acid (ng/mL)

Configuration of Measurement Device and LC-MS Measurement Conditions

TABLE 1

| | LC part |
|---|---|
| Device | Acquity UPLC, manufactured by Waters Corporation |
| Column | Acquity UPLC BEH C18 1.7 mm (2.1 × 50 mm), manufactured by Waters Corporation |
| Mobile phases | A $CH_3CN$<br>B 20 mM $CH_3COONH_4/H_2O$<br>0→1.5 min   A:B = 10:90<br>1.5→8.5 min   A:B = 10:90 → A:B = 90:10 Linear gradient<br>8.5→10 min   A:B = 90:10 |
| Flow rate | 0.4 mL/min |
| Column temperature | 40° C. |
| Sample injection volume | 5 µL |
| | MS part |
| Device | TQ Detector |
| Measurement mode | MRM(Muttiple Reaction Monitoring) |
| Ionization method | Electrospray ionization Negative mode |

MRM Measurement Parameters

TABLE 2

| Compound | Precursor | Product |
|---|---|---|
| Perfluorooctanoic acid | 413 | 369 |

Content of Compound Represented by Formula (1) Having 4 or More and 20 or Less Carbon Atoms in Extract The compound represented by Formula (1) having 4 or more and 20 or less carbon atoms was measured using a liquid chromatograph mass spectrometer. The peak area of the compound represented by Formula (1) with each carbon number in the liquid phase extracted was determined by MRM.

MRM Measurement Parameters

TABLE 3

| Compound | The number of carbon atoms | Precursor | Product |
|---|---|---|---|
| $(H-(CF_2)_3-COO)M$ | 4 | 195 | 131 |
| $(H-(CF_2)_4-COO)M$ | 5 | 245 | 181 |
| $(H-(CF_2)_5-COO)M$ | 6 | 295 | 231 |
| $(H-(CF_2)_6-COO)M$ | 7 | 345 | 281 |
| $(H-(CF_2)_7-COO)M$ | 8 | 395 | 331 |
| $(H-(CF_2)_8-COO)M$ | 9 | 445 | 381 |
| $(H-(CF_2)_9-COO)M$ | 10 | 495 | 431 |
| $(H-(CF_2)_{10}-COO)M$ | 11 | 545 | 481 |
| $(H-(CF_2)_{11}-COO)M$ | 12 | 595 | 531 |
| $(H-(CF_2)_{12}-COO)M$ | 13 | 645 | 581 |
| $(H-(CF_2)_{13}-COO)M$ | 14 | 695 | 631 |
| $(H-(CF_2)_{14}-COO)M$ | 15 | 745 | 681 |
| $(H-(CF_2)_{15}-COO)M$ | 16 | 795 | 731 |
| $(H-(CF_2)_{16}-COO)M$ | 17 | 845 | 781 |
| $(H-(CF_2)_{17}-COO)M$ | 18 | 895 | 831 |
| $(H-(CF_2)_{18}-COO)M$ | 19 | 945 | 881 |
| $(H-(CF_2)_{19}-COO)M$ | 20 | 995 | 931 |

The content of the compound represented by Formula (1) having (m+1) carbon atoms in the extract was calculated using Formula (3) below. In Formula (3), a and b were determined from Formula (1).

$$XCm = ((ACm-b)/a) \times ((50 \times m + 45)/413) \quad (3)$$

XCm: Content (ng/mL) of compound represented by Formula (1) having (m+1) carbon atoms in extraction solution ACm: Peak area of compound represented by Formula (1) having (m+1) carbon atoms in extraction solution The quantitation limit in this measurement was 1 ng/mL.

Content of Compound Represented by Formula (1) Having (m+1) Carbon Atoms in Powder The content of the compound represented by Formula (1) having (m+1) carbon atoms in the powder was determined by Formula (4) below.

$$YCm = XCm \times 12.6 \quad (4)$$

YCm: Content (ppb to PTFE) of compound represented by Formula (1) having (m+1) carbon atoms in powder Content of Compound Represented by Formula (1) Having (m+1) Carbon Atoms in Aqueous Dispersion The content of the compound represented by Formula (1) having (m+1) carbon atoms in the aqueous dispersion was determined by Formula (5) below.

$$ZCm = XCm \times 86.3 \quad (5)$$

ZCm: Content (ppb to PTFE) of compound represented by Formula (1) having (m+1) carbon atoms in aqueous dispersion Content of compound represented by Formula (1) having (m+1) carbon atoms in molded body (such as extruded beads and stretched beads)

The content of the compound represented by Formula (1) having (m+1) carbon atoms in the molded body (such as extruded beads and stretched beads) was determined by Formula (6) below.

$$WCm = XCm \times 126 \quad (6)$$

WCm: Content (ppb to PTFE) of compound represented by Formula (1) having (m+1) carbon atoms in molded body (such as extruded beads and stretched beads)

[Method for Measuring Content of Compound Represented by Formula (2)]

Extraction from Powder 10 g (12.6 mL) of methanol was added to 1 g of the powder, followed by ultrasonic treatment for 60 minutes, to extract a supernatant containing the compound represented by Formula (2).

Extraction from Aqueous Dispersion

The solid content of the aqueous dispersion was measured, and the aqueous dispersion in an amount corresponding to 0.5 g of the PTFE solid content was weighed into a 100-mL screw tube. Thereafter, water and methanol were added thereto, so as to yield 40 g (43.14 mL) of an extraction solvent with water/methanol=50/50 vol % including water contained in the aqueous dispersion. Thereafter, the solution was shaken well until coagulation occurred. The solid content was removed, and the liquid phase was centrifuged at 4000 rpm for 1 hour, to extract a supernatant containing the compound represented by Formula (2).

Extraction from Molded Body (Such as Extruded Beads and Stretched Beads)

10 g (12.6 mL) of methanol was added to 0.1 g of the molded body, followed by ultrasonic treatment for 60 minutes, to extract a supernatant containing the compound represented by Formula (2).

Measurement of Content of Compound Represented by Formula (2) in Extract

The content of the compound represented by Formula (2) in the extract was determined in terms of perfluorooctanesulfonic acid.

Calibration Curve of Perfluorooctanesulfonic Acid

Five levels of methanol standard solutions of perfluorooctanesulfonic acid having known concentrations of 1 ng/mL to 100 ng/mL were prepared and measured using a liquid chromatograph mass spectrometer (LC-MS ACQUITY UPLC/TQD, Waters Corporation). Using first-order approximation, a and b were determined by Relational Expression (1) from the concentration of each sample and the integral value of the peaks.

$$A = a \times X + b \quad (1)$$

A: Peak area of perfluorooctanesulfonic acid
X: Concentration (ng/mL) of perfluorooctanesulfonic acid Configuration of Measurement Device and LC-MS Measurement Conditions

TABLE 4

| | LC part |
|---|---|
| Device | Acquity UPLC, manufactured by Waters Corporation |
| Column | Acquity UPLC BEH C18 1.7 mm (2.1 × 50 mm), manufactured by Waters Corporation |
| Mobile phases | A $CH_3CN$<br>B 20 mM $CH_3COONH_4/H_2O$<br>0→1.5 min  A:B = 10:90<br>1.5→8.5 min  A:B = 10:90 → A:B = 90:10<br>Linear gradient<br>8.5→10 min  A:B = 90:10 |

TABLE 4-continued

| | |
|---|---|
| Flow rate | 0.4 mL/min |
| Column temperature | 40° C. |
| Sample injection volume | 5 µL |

| | MS part |
|---|---|
| Device | TQ Detector |
| Measurement mode | MRM(Multiple Reaction Monitoring) |
| Ionization method | Electrospray ionization<br>Negative mode |

MRM Measurement Parameters

TABLE 5

| Compound | Precursor | Product |
|---|---|---|
| Perfluorooctanesulfonic acid | 499 | 99 |

Content of Compound Represented by Formula (2) Having 4 or More and 20 or Less Carbon Atoms in Extract The compound represented by Formula (2) having 4 or more and 20 or less carbon atoms was measured using a liquid chromatograph mass spectrometer. The peak area of the compound represented by Formula (2) with each carbon number in the liquid phase extracted was determined by MRM.

MRM Measurement Parameters

TABLE 6

| Compound | The number of carbon atoms | Precursor | Product |
|---|---|---|---|
| $(H-(CF_2)_4-SO_3)M$ | 4 | 281 | 99 |
| $(H-(CF_2)_5-SO_3)M$ | 5 | 331 | 99 |
| $(H-(CF_2)_6-SO_3)M$ | 6 | 381 | 99 |
| $(H-(CF_2)_7-SO_3)M$ | 7 | 431 | 99 |
| $(H-(CF_2)_8-SO_3)M$ | 8 | 481 | 99 |
| $(H-(CF_2)_9-SO_3)M$ | 9 | 531 | 99 |
| $(H-(CF_2)_{10}-SO_3)M$ | 10 | 581 | 99 |
| $(H-(CF_2)_{11}-SO_3)M$ | 11 | 631 | 99 |
| $(H-(CF_2)_{12}-SO_3)M$ | 12 | 681 | 99 |
| $(H-(CF_2)_{13}-SO_3)M$ | 13 | 731 | 99 |
| $(H-(CF_2)_{14}-SO_3)M$ | 14 | 781 | 99 |
| $(H-(CF_2)_{15}-SO_3)M$ | 15 | 831 | 99 |
| $(H-(CF_2)_{16}-SO_3)M$ | 16 | 881 | 99 |
| $(H-(CF_2)_{17}-SO_3)M$ | 17 | 931 | 99 |
| $(H-(CF_2)_{18}-SO_3)M$ | 18 | 981 | 99 |
| $(H-(CF_2)_{19}-SO_3)M$ | 19 | 1031 | 99 |
| $(H-(CF_2)_{20}-SO_3)M$ | 20 | 1081 | 99 |

The content of the compound represented by Formula (2) having n carbon atoms in the extract was calculated using Formula (3) below. In Formula (3), a and b were determined from Formula (1).

$$XSn = ((ASn - b)/a) \times ((50 \times n + 81)/499) \quad (3)$$

XSn: Content (ng/mL) of compound represented by Formula (2) having n carbon atoms in extraction solution ASn: Peak area of compound represented by Formula (2) having n carbon atoms in extraction solution The quantitation limit in this measurement was 1 ng/mL.

Content of Compound Represented by Formula (2) Having n Carbon Atoms in Powder

The content of the compound represented by Formula (2) having n carbon atoms in the powder was determined by Formula (4) below.

$$YSn = XSn \times 12.6 \quad (4)$$

YSn: Content (ppb to PTFE) of compound represented by Formula (2) having n carbon atoms in powder Content of Compound Represented by Formula (2) Having n Carbon Atoms in Aqueous Dispersion The content of the compound represented by Formula (2) having n carbon atoms in the aqueous dispersion was determined by Formula (5) below.

$$ZSn = XSn \times 86.3 \tag{5}$$

ZSn: Content (ppb to PTFE) of compound represented by Formula (2) having n carbon atoms in aqueous dispersion Content of compound represented by Formula (2) having n carbon atoms in molded body (such as extruded beads and stretched beads)

The content of the compound represented by Formula (2) having n carbon atoms in the molded body (such as extruded beads and stretched beads) was determined by Formula (6) below.

$$WSn = XSn \times 126 \tag{6}$$

WSn: Content (ppb to PTFE) of compound represented by Formula (2) having n carbon atoms in molded body (such as extruded beads and stretched beads)

[Method for Measuring Content of Compound Represented by Formula (7)]

Measurement of Content of Compound Represented by Formula (7) Contained in Extract $$(F-(CF_2)_7-COO)M \qquad \text{Formula (7):}$$

Extraction from Powder 10 g (12.6 mL) of methanol was added to 1 g of the powder, followed by ultrasonic treatment for 60 minutes, to extract a supernatant containing the compound represented by Formula (7).

Extraction from Aqueous Dispersion

The solid content of the aqueous dispersion was measured, and the aqueous dispersion in an amount corresponding to 0.5 g of the PTFE solid content was weighed into a 100-mL screw tube. Thereafter, water and methanol were added thereto, so as to yield 40 g (43.14 mL) of an extraction solvent with water/methanol=50/50 vol % including water contained in the aqueous dispersion. Thereafter, the solution was shaken well until coagulation occurred. The solid content was removed, and the liquid phase was centrifuged at 4000 rpm for 1 hour, to extract a supernatant containing the compound represented by Formula (7).

Extraction from Molded Body (Such as Extruded Beads and Stretched Beads)

10 g (12.6 mL) of methanol was added to 0.1 g of the molded body, followed by ultrasonic treatment for 60 minutes, to extract a supernatant containing the compound represented by Formula (7).

Measurement of Content of Compound Represented by Formula (7) in Extract

The content of the compound represented by Formula (7) in the extract was determined in terms of perfluorooctanoic acid.

Calibration Curve of Perfluorooctanoic Acid

Five levels of methanol standard solutions of perfluorooctanoic acid having known concentrations of 1 ng/mL to 100 ng/mL were prepared and measured using a liquid chromatograph mass spectrometer (LC-MS ACQUITY UPLC/TQD, Waters Corporation). Using first-order approximation, a and b were determined by Relational Expression (1) from the concentration of each sample and the integral value of the peaks.

$$A = a \times X + b \tag{1}$$

A: Peak area of perfluorooctanoic acid

X: concentration of perfluorooctanoic acid (ng/mL)

Configuration of Measurement Device and LC-MS Measurement Conditions

TABLE 7

| | LC part |
|---|---|
| Device | Acquity UPLC, manufactured by Waters Corporation |
| Column | Acquity UPLC BEH C18 1.7 mm (2.1 × 50 mm), manufactured by Waters Corporation |
| Mobile phases | A CH$_3$CN |
| | B 20 mM CH$_3$COONH$_4$/H$_2$O |
| | 0→1.5 min  A:B = 10:90 |
| | 1.5→8.5 min  A:B = 10:90 → A:B = 90:10 |
| | Linear gradient |
| | 8.5→10 min  A:B = 90:10 |
| Flow rate | 0.4 mL/min |
| Column temperature | 40° C. |
| Sample injection volume | 5 μL |
| | MS part |
| Device | TQ Detector |
| Measurement mode | MRM(Multiple Reaction Monitoring) |
| Ionization method | Electrospray ionization |
| | Negative mode |

MRM Measurement Parameters

TABLE 8

| Compound | Precursor | Product |
|---|---|---|
| Perfluorooctanoic acid | 413 | 369 |

Content of Compound Represented by Formula (7) in Extract

The compound represented by Formula (7) was measured using a liquid chromatograph mass spectrometer. The peak area of the compound represented by Formula (7) in the liquid phase extracted was determined by MRM.

MRM Measurement Parameters

TABLE 9

| Compound | Precursor | Product |
|---|---|---|
| (F—(CF$_2$)$_7$—COO)M | 413 | 369 |

The content of the compound represented by Formula (7) in the extract was calculated using Formula (3) below. In Formula (3), a and b were determined from Formula (1).

$$XPFO = (APFO - b)/a \tag{3}$$

XPFO: Content (ng/mL) of compound represented by Formula (7) in extraction solution APFO: Peak area of compound represented by Formula (7) in extraction solution The quantitation limit in this measurement was 1 ng/mL.

Content of Compound Represented by Formula (7) in Powder

The content of the compound represented by Formula (7) in the powder was determined by Formula (4) below.

$$YPFO = XPFO \times 12.6 \tag{4}$$

YPFO: Content (ppb to PTFE) of compound represented by Formula (7) in powder

Content of Compound Represented by Formula (7) in Aqueous Dispersion

The content of the compound represented by Formula (7) in the aqueous dispersion was determined by Formula (5) below.

$$ZPFO = XPFO \times 86.3 \quad (5)$$

ZPFO: Content (ppb to PTFE) of compound represented by Formula (7) in aqueous dispersion Content of compound represented by Formula (7) in molded body (such as extruded beads and stretched beads)

The content of the compound represented by Formula (7) in the molded body (such as extruded beads and stretched beads) was determined by Formula (6) below.

$$WPFO = XPFO \times 126 \quad (6)$$

WPFO: Content (ppb to PTFE) of compound represented by Formula (7) in molded body (such as extruded beads and stretched beads)

An amount (A) (parts by weight) of the fluorine radical source added per 100 parts by weight of PTFE was calculated according to the following formula.

$$A = (B/F) \times 100$$

$$B = C \times D \times E$$

$$C = 4.092 \times 10^{-5} \times G \times H$$

A: Amount (parts by weight) of fluorine radical source added per 100 parts by weight of PTFE
B: Total amount (g) of fluorine radical source added
C: Concentration (g/mL) of fluorine radical source in mixed gas
D: Flow rate (mL/min) of mixed gas
E: Fluorination time (min)
F: Amount (g) of sample loaded
G: Molecular weight (g/mol) of fluorine radical source
H: Proportion of fluorine radical source in mixed gas The constant [$4.092 \times 10^{-5}$] of C was calculated based on P (pressure: atm)/{R (gas constant)×T (temperature: K)×1000}=1/{0.082×298×1000}.

Synthesis Example 1

A mixture of 10-undecene-1-ol (16 g), 1,4-benzoquinone (10.2 g), DMF(160 mL), water (16 mL), and $PdCl_2$ (0.34 g) was heated and stirred at 90° C. for 12 hours.

Thereafter, the solvent was distilled off under reduced pressure. The residue obtained was purified by liquid separation and column chromatography, to obtain 11-hydroxyundecane-2-one (15.4 g).

The spectrum data of 11-hydroxyundecane-2-one obtained is shown below.

$^1$H-NMR ($CDCl_3$) δ ppm: 1.29-1.49 (m, 14H), 2.08 (s, 3H), 2.45 (J=7.6, t, 2H), 3.51 (J=6.5, t, 2H)

A mixture of 11-hydroxyundecane-2-one (13 g), sulfur trioxide triethylamine complex (13.9 g), and tetrahydrofuran (140 mL) was stirred at 50° C. for 12 hours. A sodium methoxide (3.8 g)/methanol (12 mL) solution was added dropwise to the reaction solution.

The precipitated solid was filtered under reduced pressure and washed with ethyl acetate, to obtain 10-oxoundecyl sodium sulfate (15.5 g) (which will be hereinafter referred to as surfactant A). The spectrum data of 10-oxoundecyl sodium sulfate obtained is shown below.

$^1$H-NMR ($CDCl_3$) δ ppm: 1.08 (J=6.8, m, 10H), 1.32 (m, 2H), 1.45 (m, 2H), 1.98 (s, 3H), 2.33 (J=7.6, t, 2H), 3.83 (J=6.5, t, 2H)

Synthesis Example 2

3500 g of deionized degassed water, 100 g of a paraffin wax, 0.122 g of the surfactant A were added to a SUS autoclave having an internal volume of 6 L, the reactor was sealed, and the inside of the system was purged with nitrogen to remove oxygen. The reactor was heated to 70° C., filled with TFE, and adjusted to 0.78 MPa. 0.070 g of ammonium persulfate (APS) was introduced therein as a polymerization initiator. TFE was introduced so that the reaction pressure was constantly 0.78 MPa. In the course of the reaction, the surfactant A was added 9 times in a total amount of 1.10 g. At the time when 425 g of TFE was introduced, stirring was stopped, and the reactor was depressurized to the atmospheric pressure. The aqueous dispersion was taken out of the reactor, followed by cooling. Thereafter, the paraffin wax was separated, to obtain a PTFE aqueous dispersion A.

The solid content of PTFE in the PTFE aqueous dispersion A obtained was 10.7 mass %. The average primary particle size of the PTFE particles contained in the PTFE aqueous dispersion A obtained was 178 nm. The content of each of the compounds represented by Formulas (1) and (2) in the PTFE aqueous dispersion A obtained was measured. Table 10 below shows the results.

Experimental Example 1

Deionized water was added to the PTFE aqueous dispersion A obtained in Synthesis Example 2, to adjust the specific gravity (25° C.) to 1.080. 2.5 L of the PTFE aqueous dispersion with the adjusted specific gravity was added to a glass coagulation tank equipped with an anchor type stirring blade and a baffle plate and having an internal capacity of 6 L, and the internal temperature was adjusted to 34° C. Immediately after the adjustment, 16 g of nitric acid (10%) was added thereto, and stirring was started at a stirring speed of 500 rpm, simultaneously. After the start of stirring, it was confirmed that the aqueous dispersion underwent a slurry state to form a wet PTFE powder, and then stirring was further continued for 1 minute.

Subsequently, the wet PTFE powder was filtered, the wet PTFE powder and 2.5 L of deionized water were introduced in the coagulation tank, the temperature was adjusted to 25° C., and an operation of washing the polymer powder at a stirring speed of 500 rpm was repeated twice. After the washing, the wet PTFE powder was filtered and left standing in a hot-air circulation dryer at 150° C. for 18 hours for drying, to obtain PTFE powder.

The SSG of the PTFE powder obtained was 2.175. This fact demonstrated that the PTFE obtained was a high-molecular weight PTFE.

The content of each of the compounds represented by Formulas (1) and (2) in the PTFE powder obtained was measured. Table 10 shows the results.

Experimental Example 2

30 g of the PTFE powder obtained in Experimental Example 1 was put into the reactor. The reactor was heated to 150° C. and purged with nitrogen for 1 hour to remove the air in the reactor. With the temperature maintained at 150° C., a mixed gas (fluorine/nitrogen (volume ratio)=20/80)

obtained by diluting a fluorine gas ($F_2$) as a fluorine radical source with nitrogen gas was continuously poured at a flow rate of about 50 mL/min for 480 minutes (8 hours) with an amount of the fluorine radical source added (that is, an amount of the fluorine gas) of 7.5 g. After the completion of the reaction, the inside of the system was immediately purged with nitrogen gas for 1 hour to remove the fluorine gas. It was confirmed that there was no fluorine gas in the inert gas by checking whether or not an indicator was colored by a starch/iodide test. The reaction container was cooled to room temperature, and the content of each of the compounds represented by Formulas (1) and (2) in the PTFE powder obtained was measured. Table 10 shows the results.

Experimental Example 3

The same operation as in Experimental Example 2 was performed except that the reaction temperature was changed to 200° C. in Experimental Example 2, and the content of each of the compounds represented by Formulas (1) and (2) in the PTFE powder obtained was measured. Table 10 below shows the results.

Synthesis Example 3

10-oxoundecane acid (1.8 g) was added to a 1.0 M KOH solution, and water was distilled off, to obtain potassium 10-oxoundecanoate (2.2 g).

The spectrum data of the potassium 10-oxoundecanoate (which will be hereinafter referred to as surfactant B) obtained is shown below.

$^1$H-NMR (CDCl$_3$) δ ppm: 1.04 (m, 8H), 1.30-1.32 (m, 4H), 1.89-2.01 (m, 5H), 2.27-2.33 (t, J=7.6, 4H)

Synthesis Example 4

550 g of deionized degassed water, 30 g of a paraffin wax, and 0.0145 g of the surfactant B were added to a glass autoclave having an internal volume of 1 L. The reactor was sealed, and the inside of the system was purged with nitrogen to remove oxygen. The reactor was heated to 70° C., filled with TFE, and adjusted to 0.78 MPa. 0.110 g of ammonium persulfate (APS) was introduced therein as a polymerization initiator. TFE was introduced so that the reaction pressure was constantly 0.78 MPa. At the time

TABLE 10

| | | | Synthesis Example 2 PTFE aqueous dispersion | Experimental Example 1 PTFE powder | Experimental Example 2 PTFE powder | Experimental Example 3 PTFE powder |
|---|---|---|---|---|---|---|
| Content of compound represented by Formula (2) | n = 4 | ppb/PTFE | Less than quantitation limit | 3.8E+01 | Less than quantitation limit | Less than quantitation limit |
| | n = 6 | ppb/PTFE | 5.5E+02 | 5.3E+02 | Less than quantitation limit | Less than quantitation limit |
| | n = 8 | ppb/PTFE | 6.5E+02 | 6.5E+02 | Less than quantitation limit | Less than quantitation limit |
| | n = 10 | ppb/PTFE | 5.2E+02 | 4.9E+02 | Less than quantitation limit | Less than quantitation limit |
| | n = 12 | ppb/PTFE | 2.5E+02 | 2.2E+02 | Less than quantitation limit | Less than quantitation limit |
| | n = 14 | ppb/PTFE | 1.0E+02 | 9.5E+01 | Less than quantitation limit | Less than quantitation limit |
| | n = 16 | ppb/PTFE | Less than quantitation limit | Less than quantitation limit | Less than quantitation limit | Less than quantitation limit |
| | n = 18 | ppb/PTFE | Less than quantitation limit | Less than quantitation limit | Less than quantitation limit | Less than quantitation limit |
| | n = 20 | ppb/PTFE | Less than quantitation limit | Less than quantitation limit | Less than quantitation limit | Less than quantitation limit |
| | Total | ppb/PTFE | 2.1E+03 | 2.0E+03 | Less than quantitation limit | Less than quantitation limit |
| Content of compound represented by Formula (1) | m = 3 | ppb/PTFE | 9.6E+03 | Less than quantitation limit | Less than quantitation limit | Less than quantitation limit |
| | m = 5 | ppb/PTFE | 1.7E+04 | Less than quantitation limit | Less than quantitation limit | Less than quantitation limit |
| | m = 7 | ppb/PTFE | 4.7E+04 | Less than quantitation limit | Less than quantitation limit | Less than quantitation limit |
| | m = 9 | ppb/PTFE | 2.6E+04 | 3.6E+02 | Less than quantitation limit | Less than quantitation limit |
| | m = 11 | ppb/PTFE | 6.2E+03 | 1.6E+03 | Less than quantitation limit | Less than quantitation limit |
| | m = 13 | ppb/PTFE | 5.7E+03 | 2.0E+03 | Less than quantitation limit | Less than quantitation limit |
| | m = 15 | ppb/PTFE | 7.4E+03 | 3.5E+03 | Less than quantitation limit | Less than quantitation limit |
| | m = 17 | ppb/PTFE | 6.6E+03 | 5.0E+03 | Less than quantitation limit | Less than quantitation limit |
| | m = 19 | ppb/PTFE | 5.3E+03 | 1.3E+03 | Less than quantitation limit | Less than quantitation limit |
| | Total | ppb/PTFE | 1.3E+05 | 1.4E+04 | Less than quantitation limit | Less than quantitation limit |

The peaks when n was 5, 7, 9, 11, 13, 15, 17, and 19 and when m was 4, 6, 8, 10, 12, 14, 16, and 18 were less than the quantitation limit.

The quantitation limit was 86 ppb in the case of the aqueous dispersion and was 13 ppb in the case of powder.

when 50 g of TFE was introduced, stirring was stopped, and the reactor was depressurized to the atmospheric pressure. The aqueous dispersion was taken out of the reactor, followed by cooling. Thereafter, the paraffin wax was separated, to obtain a PTFE aqueous dispersion B. The average particle size of the particles contained in the PTFE aqueous dispersion B obtained was 216 nm. Further, the solid content of the PTFE aqueous dispersion B obtained was 8.2 mass %.

The content of each of the compounds represented by Formulas (1) and (2) in the PTFE aqueous dispersion B obtained was measured. Table 11 below shows the results.

Experimental Example 4

Deionized water was added to the PTFE aqueous dispersion B obtained in Synthesis Example 4, to adjust the specific gravity (25° C.) to 1.080. 2.5 L of the PTFE aqueous dispersion with the adjusted specific gravity was added to a glass coagulation tank equipped with an anchor type stirring blade and a baffle plate and having an internal capacity of 6 L, and the internal temperature was adjusted to 34° C. Immediately after the adjustment, 16 g of nitric acid (10%) was added thereto, and stirring was started at a stirring speed of 500 rpm, simultaneously. After the start of stirring, it was confirmed that the aqueous dispersion underwent a slurry state to form a wet PTFE powder, and then stirring was further continued for 1 minute.

Subsequently, the wet PTFE powder was filtered, the wet PTFE powder and 2.5 L of deionized water were introduced in the coagulation tank, the temperature was adjusted to 25° C., and an operation of washing the polymer powder at a stirring speed of 500 rpm was repeated twice. After the washing, the wet PTFE powder was filtered and left standing in a hot-air circulation dryer at 150° C. for 18 hours for drying, to obtain PTFE powder.

The SSG of the PTFE powder obtained was 2.261. This fact demonstrated that the PTFE obtained was a high-molecular weight PTFE.

The content of each of the compounds represented by Formulas (1) and (2) in the PTFE powder obtained was measured. Table 11 below shows the results.

Experimental Example 5

The fluorination was performed under the same conditions as in Experimental Example 3 except that 30 g of the PTFE powder obtained in Experimental Example 4 was put into the reactor, and the content of each of the compounds represented by Formulas (1) and (2) in the PTFE powder obtained was measured. Table 11 below shows the results.

TABLE 11

| | | | Synthesis Example 4 PTFE aqueous dispersion | Experimental Example 4 PTFE powder | Experimental Example 5 PTFE powder |
|---|---|---|---|---|---|
| Content of compound represented by Formula (2) | n = 4 | ppb/PTFE | Less than quantitation limit | Less than quantitation limit | Less than quantitation limit |
| | n = 6 | ppb/PTFE | Less than quantitation limit | Less than quantitation limit | Less than quantitation limit |
| | n = 8 | ppb/PTFE | Less than quantitation limit | Less than quantitation limit | Less than quantitation limit |
| | n = 10 | ppb/PTFE | Less than quantitation limit | Less than quantitation limit | Less than quantitation limit |
| | n = 12 | ppb/PTFE | Less than quantitation limit | Less than quantitation limit | Less than quantitation limit |
| | n = 14 | ppb/PTFE | Less than quantitation limit | Less than quantitation limit | Less than quantitation limit |
| | n = 16 | ppb/PTFE | Less than quantitation limit | Less than quantitation limit | Less than quantitation limit |
| | n = 18 | ppb/PTFE | Less than quantitation limit | Less than quantitation limit | Less than quantitation limit |
| | n = 20 | ppb/PTFE | Less than quantitation limit | Less than quantitation limit | Less than quantitation limit |
| | Total | ppb/PTFE | Less than quantitation limit | Less than quantitation limit | Less than quantitation limit |
| Content of compound represented by Formula (1) | m = 3 | ppb/PTFE | 8.3E+04 | Less than quantitation limit | Less than quantitation limit |
| | m = 5 | ppb/PTFE | 9.3E+04 | Less than quantitation limit | Less than quantitation limit |
| | m = 7 | ppb/PTFE | 6.6E+04 | Less than quantitation limit | Less than quantitation limit |
| | m = 9 | ppb/PTFE | 9.0E+03 | Less than quantitation limit | Less than quantitation limit |
| | m = 11 | ppb/PTFE | 4.4E+02 | Less than quantitation limit | Less than quantitation limit |
| | m = 13 | ppb/PTFE | 1.1E+02 | Less than quantitation limit | Less than quantitation limit |
| | m = 15 | ppb/PTFE | 8.7E+01 | 1.7E+01 | Less than quantitation limit |
| | m = 17 | ppb/PTFE | 1.8E+03 | 3.9E+02 | Less than quantitation limit |
| | m = 19 | ppb/PTFE | 1.9E+03 | 4.1E+02 | Less than quantitation limit |
| | Total | ppb/PTFE | 2.5E+05 | 8.2E+02 | Less than quantitation limit |

The peaks when n was 5, 7, 9, 11, 13, 15, 17, and 19 and when m was 4, 6, 8, 10, 12, 14, 16, and 18 were less than the quantitation limit.

The quantitation limit was 86 ppb in the case of the aqueous dispersion and was 13 ppb in the case of the powder.

Experimental Examples 6 to 20

Each reaction was performed in the same manner as in Experimental Example 2 except that the temperature inside the reactor and the amount of the fluorine gas ($F_2$) as a fluorine radical source added were changed as shown in Tables 12 to 14. After the completion of the reaction, the inside of the system was immediately purged with nitrogen gas for 1 hour to remove the fluorine gas. It was confirmed that there was no fluorine gas in the inert gas by checking whether or not an indicator was colored by a starch/iodide test. The reaction container was cooled to room temperature, and the content of each of the compounds represented by Formulas (1), (2), and (7) in the PTFE powder obtained was measured. Tables 12 to 14 below show the results.

TABLE 12

| | | | Experimental Example 6 PTFE powder | Experimental Example 7 PTFE powder | Experimental Example 8 PTFE powder |
|---|---|---|---|---|---|
| | Temperature | ° C. | 80 | 80 | 100 |
| | Time | minutes | 30 | 120 | 15 |
| | Amount of fluorine radical source added per 100 parts by weight of PTFE | parts by weight | 1.6 | 6.3 | 0.8 |
| Content of compound represented by Formula (2) | n = 4 | ppb/PTFE | Less than quantitation limit | Less than quantitation limit | Less than quantitation limit |
| | n = 6 | ppb/PTFE | Less than quantitation limit | Less than quantitation limit | Less than quantitation limit |
| | n = 8 | ppb/PTFE | Less than quantitation limit | Less than quantitation limit | Less than quantitation limit |
| | n = 10 | ppb/PTFE | Less than quantitation limit | Less than quantitation limit | Less than quantitation limit |
| | n = 12 | ppb/PTFE | Less than quantitation limit | Less than quantitation limit | Less than quantitation limit |
| | n = 14 | ppb/PTFE | Less than quantitation limit | Less than quantitation limit | Less than quantitation limit |
| | n = 16 | ppb/PTFE | Less than quantitation limit | Less than quantitation limit | Less than quantitation limit |
| | n = 18 | ppb/PTFE | Less than quantitation limit | Less than quantitation limit | Less than quantitation limit |
| | n = 20 | ppb/PTFE | Less than quantitation limit | Less than quantitation limit | Less than quantitation limit |
| | Total | ppb/PTFE | Less than quantitation limit | Less than quantitation limit | Less than quantitation limit |
| Content of compound represented by Formula (1) | m = 3 | ppb/PTFE | Less than quantitation limit | Less than quantitation limit | Less than quantitation limit |
| | m = 5 | ppb/PTFE | Less than quantitation limit | Less than quantitation limit | Less than quantitation limit |
| | m = 7 | ppb/PTFE | Less than quantitation limit | Less than quantitation limit | Less than quantitation limit |
| | m = 9 | ppb/PTFE | Less than quantitation limit | Less than quantitation limit | Less than quantitation limit |
| | m = 11 | ppb/PTFE | Less than quantitation limit | Less than quantitation limit | Less than quantitation limit |
| | m = 13 | ppb/PTFE | Less than quantitation limit | Less than quantitation limit | Less than quantitation limit |
| | m = 15 | ppb/PTFE | Less than quantitation limit | Less than quantitation limit | Less than quantitation limit |
| | m = 17 | ppb/PTFE | Less than quantitation limit | Less than quantitation limit | Less than quantitation limit |
| | m = 19 | ppb/PTFE | Less than quantitation limit | Less than quantitation limit | Less than quantitation limit |
| | Total | ppb/PTFE | Less than quantitation limit | Less than quantitation limit | Less than quantitation limit |
| Content of compound represented by Formula (7) | | ppb/PTFE | 1.1.E+03 | 5.8.E+02 | 1.2.E+03 |

TABLE 12-continued

|  |  |  | Experimental Example 9 PTFE powder | Experimental Example 10 PTFE powder | Experimental Example 11 PTFE powder |
|---|---|---|---|---|---|
|  | Temperature | ° C. | 100 | 100 | 100 |
|  | Time | minutes | 30 | 120 | 480 |
|  | Amount of fluorine radical source added per 100 parts by weight of PTFE | parts by weight | 1.6 | 6.3 | 24.9 |
| Content of compound represented by Formula (2) | n = 4 | ppb/PTFE | Less than quantitation limit | Less than quantitation limit | Less than quantitation limit |
|  | n = 6 | ppb/PTFE | Less than quantitation limit | Less than quantitation limit | Less than quantitation limit |
|  | n = 8 | ppb/PTFE | Less than quantitation limit | Less than quantitation limit | Less than quantitation limit |
|  | n = 10 | ppb/PTFE | Less than quantitation limit | Less than quantitation limit | Less than quantitation limit |
|  | n = 12 | ppb/PTFE | Less than quantitation limit | Less than quantitation limit | Less than quantitation limit |
|  | n = 14 | ppb/PTFE | Less than quantitation limit | Less than quantitation limit | Less than quantitation limit |
|  | n = 16 | ppb/PTFE | Less than quantitation limit | Less than quantitation limit | Less than quantitation limit |
|  | n = 18 | ppb/PTFE | Less than quantitation limit | Less than quantitation limit | Less than quantitation limit |
|  | n = 20 | ppb/PTFE | Less than quantitation limit | Less than quantitation limit | Less than quantitation limit |
|  | Total | ppb/PTFE | Less than quantitation limit | Less than quantitation limit | Less than quantitation limit |
| Content of compound represented by Formula (1) | m = 3 | ppb/PTFE | Less than quantitation limit | Less than quantitation limit | Less than quantitation limit |
|  | m = 5 | ppb/PTFE | Less than quantitation limit | Less than quantitation limit | Less than quantitation limit |
|  | m = 7 | ppb/PTFE | Less than quantitation limit | Less than quantitation limit | Less than quantitation limit |
|  | m = 9 | ppb/PTFE | Less than quantitation limit | Less than quantitation limit | Less than quantitation limit |
|  | m = 11 | ppb/PTFE | Less than quantitation limit | Less than quantitation limit | Less than quantitation limit |
|  | m = 13 | ppb/PTFE | Less than quantitation limit | Less than quantitation limit | Less than quantitation limit |
|  | m = 15 | ppb/PTFE | Less than quantitation limit | Less than quantitation limit | Less than quantitation limit |
|  | m = 17 | ppb/PTFE | Less than quantitation limit | Less than quantitation limit | Less than quantitation limit |
|  | m = 19 | ppb/PTFE | Less than quantitation limit | Less than quantitation limit | Less than quantitation limit |
|  | Total | ppb/PTFE | Less than quantitation limit | Less than quantitation limit | Less than quantitation limit |
| Content of compound represented by Formula (7) |  | ppb/PTFE | 1.1.E+03 | — | 6.2.E+02 |

TABLE 13

|  |  |  | Experimental Example 12 PTFE powder | Experimental Example 13 PTFE powder |
|---|---|---|---|---|
|  | Temperature | ° C. | 120 | 120 |
|  | Time | minutes | 30 | 120 |
|  | Amount of fluorine radical source added per 100 parts by weight of PTFE | parts by weight | 1.6 | 6.3 |
| Content of compound represented by Formula (2) | n = 4 | ppb/PTFE | Less than quantitation limit | Less than quantitation limit |
|  | n = 6 | ppb/PTFE | Less than quantitation limit | Less than quantitation limit |
|  | n = 8 | ppb/PTFE | Less than quantitation limit | Less than quantitation limit |
|  | n = 10 | ppb/PTFE | Less than quantitation limit | Less than quantitation limit |
|  | n = 12 | ppb/PTFE | Less than quantitation limit | Less than quantitation limit |

TABLE 13-continued

|  |  |  | | |
|---|---|---|---|---|
|  | n = 14 | ppb/PTFE | Less than quantitation limit | Less than quantitation limit |
|  | n = 16 | ppb/PTFE | Less than quantitation limit | Less than quantitation limit |
|  | n = 18 | ppb/PTFE | Less than quantitation limit | Less than quantitation limit |
|  | n = 20 | ppb/PTFE | Less than quantitation limit | Less than quantitation limit |
|  | Total | ppb/PTFE | Less than quantitation limit | Less than quantitation limit |
| Content of compound represented by Formula (1) | m = 3 | ppb/PTFE | Less than quantitation limit | Less than quantitation limit |
|  | m = 5 | ppb/PTFE | Less than quantitation limit | Less than quantitation limit |
|  | m = 7 | ppb/PTFE | Less than quantitation limit | Less than quantitation limit |
|  | m = 9 | ppb/PTFE | Less than quantitation limit | Less than quantitation limit |
|  | m = 11 | ppb/PTFE | Less than quantitation limit | Less than quantitation limit |
|  | m = 13 | ppb/PTFE | Less than quantitation limit | Less than quantitation limit |
|  | m = 15 | ppb/PTFE | Less than quantitation limit | Less than quantitation limit |
|  | m = 17 | ppb/PTFE | Less than quantitation limit | Less than quantitation limit |
|  | m = 19 | ppb/PTFE | Less than quantitation limit | Less than quantitation limit |
|  | Total | ppb/PTFE | Less than quantitation limit | Less than quantitation limit |
| Content of compound represented by Formula (7) |  | ppb/PTFE | 3.0.E+02 | 3.7.E+02 |

|  |  |  | Experimental Example 14 PTFE powder | Experimental Example 15 PTFE powder |
|---|---|---|---|---|
|  | Temperature | ° C. | 120 | 120 |
|  | Time | minutes | 240 | 480 |
|  | Amount of fluorine radical source added per 100 parts by weight of PTFE | parts by weight | 12.6 | 24.9 |
| Content of compound represented by Formula (2) | n = 4 | ppb/PTFE | Less than quantitation limit | Less than quantitation limit |
|  | n = 6 | ppb/PTFE | Less than quantitation limit | Less than quantitation limit |
|  | n = 8 | ppb/PTFE | Less than quantitation limit | Less than quantitation limit |
|  | n = 10 | ppb/PTFE | Less than quantitation limit | Less than quantitation limit |
|  | n = 12 | ppb/PTFE | Less than quantitation limit | Less than quantitation limit |
|  | n = 14 | ppb/PTFE | Less than quantitation limit | Less than quantitation limit |
|  | n = 16 | ppb/PTFE | Less than quantitation limit | Less than quantitation limit |
|  | n = 18 | ppb/PTFE | Less than quantitation limit | Less than quantitation limit |
|  | n = 20 | ppb/PTFE | Less than quantitation limit | Less than quantitation limit |
|  | Total | ppb/PTFE | Less than quantitation limit | Less than quantitation limit |
| Content of compound represented by Formula (1) | m = 3 | ppb/PTFE | Less than quantitation limit | Less than quantitation limit |
|  | m = 5 | ppb/PTFE | Less than quantitation limit | Less than quantitation limit |
|  | m = 7 | ppb/PTFE | Less than quantitation limit | Less than quantitation limit |
|  | m = 9 | ppb/PTFE | Less than quantitation limit | Less than quantitation limit |
|  | m = 11 | ppb/PTFE | Less than quantitation limit | Less than quantitation limit |
|  | m = 13 | ppb/PTFE | Less than quantitation limit | Less than quantitation limit |
|  | m = 15 | ppb/PTFE | Less than quantitation limit | Less than quantitation limit |
|  | m = 17 | ppb/PTFE | Less than quantitation limit | Less than quantitation limit |

TABLE 13-continued

| | | | | |
|---|---|---|---|---|
| | m = 19 | ppb/PTFE | Less than quantitation limit | Less than quantitation limit |
| | Total | ppb/PTFE | Less than quantitation limit | Less than quantitation limit |
| Content of compound represented by Formula (7) | | ppb/PTFE | 3.3.E+02 | 1.8.E+02 |

TABLE 14

| | | | Experimental Example 16 PTFE powder | Experimental Example 17 PTFE powder | Experimental Example 18 PTFE powder |
|---|---|---|---|---|---|
| | Temperature | ° C. | 150 | 150 | 200 |
| | Time | minutes | 120 | 240 | 30 |
| | Amount of fluorine radical source added per 100 parts by weight of PTFE | parts by weight | 6.3 | 12.6 | 1.6 |
| Content of compound represented by Formula (2) | n = 4 | ppb/PTFE | Less than quantitation limit | Less than quantitation limit | Less than quantitation limit |
| | n = 6 | ppb/PTFE | Less than quantitation limit | Less than quantitation limit | Less than quantitation limit |
| | n = 8 | ppb/PTFE | Less than quantitation limit | Less than quantitation limit | Less than quantitation limit |
| | n = 10 | ppb/PTFE | Less than quantitation limit | Less than quantitation limit | Less than quantitation limit |
| | n = 12 | ppb/PTFE | Less than quantitation limit | Less than quantitation limit | Less than quantitation limit |
| | n = 14 | ppb/PTFE | Less than quantitation limit | Less than quantitation limit | Less than quantitation limit |
| | n = 16 | ppb/PTFE | Less than quantitation limit | Less than quantitation limit | Less than quantitation limit |
| | n = 18 | ppb/PTFE | Less than quantitation limit | Less than quantitation limit | Less than quantitation limit |
| | n = 20 | ppb/PTFE | Less than quantitation limit | Less than quantitation limit | Less than quantitation limit |
| | Total | ppb/PTFE | Less than quantitation limit | Less than quantitation limit | Less than quantitation limit |
| Content of compound represented by Formula (1) | m = 3 | ppb/PTFE | Less than quantitation limit | Less than quantitation limit | Less than quantitation limit |
| | m = 5 | ppb/PTFE | Less than quantitation limit | Less than quantitation limit | Less than quantitation limit |
| | m = 7 | ppb/PTFE | Less than quantitation limit | Less than quantitation limit | Less than quantitation limit |
| | m = 9 | ppb/PTFE | Less than quantitation limit | Less than quantitation limit | Less than quantitation limit |
| | m = 11 | ppb/PTFE | Less than quantitation limit | Less than quantitation limit | Less than quantitation limit |
| | m = 13 | ppb/PTFE | Less than quantitation limit | Less than quantitation limit | Less than quantitation limit |
| | m = 15 | ppb/PTFE | Less than quantitation limit | Less than quantitation limit | Less than quantitation limit |
| | m = 17 | ppb/PTFE | Less than quantitation limit | Less than quantitation limit | Less than quantitation limit |
| | m = 19 | ppb/PTFE | Less than quantitation limit | Less than quantitation limit | Less than quantitation limit |
| | Total | ppb/PTFE | Less than quantitation limit | Less than quantitation limit | Less than quantitation limit |
| Content of compound represented by Formula (7) | | ppb/PTFE | 5.0.E+01 | 6.0.E+01 | Less than quantitation limit |

TABLE 14-continued

|  |  |  | Experimental Example 19 PTFE powder | Experimental Example 20 PTFE powder |
|---|---|---|---|---|
|  | Temperature | ° C. | 200 | 200 |
|  | Time | minutes | 120 | 480 |
|  | Amount of fluorine radical source added per 100 parts by weight of PTFE | parts by weight | 6.3 | 24.9 |
| Content of compound represented by Formula (2) | n = 4 | ppb/PTFE | Less than quantitation limit | Less than quantitation limit |
|  | n = 6 | ppb/PTFE | Less than quantitation limit | Less than quantitation limit |
|  | n = 8 | ppb/PTFE | Less than quantitation limit | Less than quantitation limit |
|  | n = 10 | ppb/PTFE | Less than quantitation limit | Less than quantitation limit |
|  | n = 12 | ppb/PTFE | Less than quantitation limit | Less than quantitation limit |
|  | n = 14 | ppb/PTFE | Less than quantitation limit | Less than quantitation limit |
|  | n = 16 | ppb/PTFE | Less than quantitation limit | Less than quantitation limit |
|  | n = 18 | ppb/PTFE | Less than quantitation limit | Less than quantitation limit |
|  | n = 20 | ppb/PTFE | Less than quantitation limit | Less than quantitation limit |
|  | Total | ppb/PTFE | Less than quantitation limit | Less than quantitation limit |
| Content of compound represented by Formula (1) | m = 3 | ppb/PTFE | Less than quantitation limit | Less than quantitation limit |
|  | m = 5 | ppb/PTFE | Less than quantitation limit | Less than quantitation limit |
|  | m = 7 | ppb/PTFE | Less than quantitation limit | Less than quantitation limit |
|  | m = 9 | ppb/PTFE | Less than quantitation limit | Less than quantitation limit |
|  | m = 11 | ppb/PTFE | Less than quantitation limit | Less than quantitation limit |
|  | m = 13 | ppb/PTFE | Less than quantitation limit | Less than quantitation limit |
|  | m = 15 | ppb/PTFE | Less than quantitation limit | Less than quantitation limit |
|  | m = 17 | ppb/PTFE | Less than quantitation limit | Less than quantitation limit |
|  | m = 19 | ppb/PTFE | Less than quantitation limit | Less than quantitation limit |
|  | Total | ppb/PTFE | Less than quantitation limit | Less than quantitation limit |
| Content of compound represented by Formula (7) |  | ppb/PTFE | Less than quantitation limit | Less than quantitation limit |

Experimental Example 21

The PTFE powder obtained in Experimental Example 1 was subjected to paste extrusion molding according to the method described in Japanese Patent Application Laid-Open No. 2002-201217, to obtain extruded beads.

That is, 100 g of the PTFE powder obtained in Experimental Example 1 was left standing at room temperature for 2 hours or more, and thereafter 21.7 g of a lubricant (ISOPAR H, manufactured by Exxon Mobil Corporation) as an extrusion aid was mixed therewith for 3 minutes to obtain a mixture of PTFE powder.

The mixture of the PTFE powder obtained was left standing in a constant temperature bath at 25° C. for 2 hours and thereafter was subjected to paste extrusion molding under conditions of 25° C., Reduction ratio 100 (RR100, cylinder diameter: 25 mm, orifice diameter: 2.5 mm, orifice land length: 1.1 mm, and introduction angle: 30°), and an extrusion rate of 51 cm/minute, to obtain extruded PTFE beads containing the lubricant.

Then, the extruded PTFE beads containing the lubricant obtained was dried at 230° C. for 30 minutes, to remove the lubricant, thereby obtaining dried extruded PTFE beads.

Experimental Example 22

10 g of the extruded PTFE beads after drying obtained in Experimental Example 21 were fluorinated in the same manner as in Experimental Example 3 except that a mixed gas (fluorine/nitrogen (volume ratio)=20/80) obtained by diluting a fluorine gas ($F_2$) as a fluorine radical source with nitrogen gas was continuously poured at a flow rate of about 50 mL/min for 162 minutes, to obtain fluorinated extruded PTFE beads.

Example 23

The extruded PTFE beads after drying obtained in Experimental Example 21 were stretched according to the method described in Japanese Patent Application Laid-Open No. 2002-201217, to obtain stretched PTFE beads.

That is, the extruded PTFE beads after drying obtained in Experimental Example 21 were cut into a suitable length, and each end was fixed so that the distance between clamps was 5.1 cm, followed by heating at 300° C. in an air circulation furnace.

Subsequently, the beads were stretched at a stretching rate of 1000%/second so that the total stretch (stretch length) between the clamps was 2400%, to obtain stretched PTFE beads.

Experimental Example 24

0.5 g of the stretched PTFE beads after drying obtained in Experimental Example 23 were fluorinated in the same manner as in Experimental Example 3 except that a mixed gas (fluorine/nitrogen (volume ratio)=20/80) obtained by diluting a fluorine gas ($F_2$) as a fluorine radical source with nitrogen gas was continuously poured at a flow rate of about 50 mL/min for 7.2 minutes, to obtain fluorinated stretched PTFE beads.

The content of each of the compounds represented by Formulas (1), (2), and (7) in the extruded PTFE beads after drying obtained in Experimental Example 21, the fluorinated extruded PTFE beads obtained in Experimental Example 22, the stretched PTFE beads obtained in Experimental Example 23, and the fluorinated stretched PTFE beads obtained in Experimental Example 24 was measured. Table 15 shows the results.

TABLE 15

|  |  |  | Experimental Example 21 Dried extruded PTFE beads | Experimental Example 22 Fluorinated extruded PTFE beads |
|---|---|---|---|---|
| Fluorination conditions | Amount of fluorine radical source added per 100 parts by weight of PTFE | parts by weight | — | 25.2 |
| Content of compound represented by Formula (2) | n = 4 | ppb/PTFE | Less than quantitation limit | Less than quantitation limit |
|  | n = 6 | ppb/PTFE | 5.9.E+02 | Less than quantitation limit |
|  | n = 8 | ppb/PTFE | 9.9.E+02 | Less than quantitation limit |
|  | n = 10 | ppb/PTFE | 6.9.E+02 | Less than quantitation limit |
|  | n = 12 | ppb/PTFE | 2.8.E+02 | Less than quantitation limit |
|  | n = 14 | ppb/PTFE | Less than quantitation limit | Less than quantitation limit |
|  | n = 16 | ppb/PTFE | Less than quantitation limit | Less than quantitation limit |
|  | n = 18 | ppb/PTFE | Less than quantitation limit | Less than quantitation limit |
|  | n = 20 | ppb/PTFE | Less than quantitation limit | Less than quantitation limit |
|  | Total | ppb/PTFE | 2.5.E+03 | Less than quantitation limit |
| Content of compound represented by Formula (1) | m = 3 | ppb/PTFE | Less than quantitation limit | Less than quantitation limit |
|  | m = 5 | ppb/PTFE | Less than quantitation limit | Less than quantitation limit |
|  | m = 7 | ppb/PTFE | Less than quantitation limit | Less than quantitation limit |
|  | m = 9 | ppb/PTFE | Less than quantitation limit | Less than quantitation limit |
|  | m = 11 | ppb/PTFE | 2.0.E+02 | Less than quantitation limit |
|  | m = 13 | ppb/PTFE | Less than quantitation limit | Less than quantitation limit |
|  | m = 15 | ppb/PTFE | Less than quantitation limit | Less than quantitation limit |
|  | m = 17 | ppb/PTFE | Less than quantitation limit | Less than quantitation limit |
|  | m = 19 | ppb/PTFE | Less than quantitation limit | Less than quantitation limit |
|  | Total | ppb/PTFE | 2 0.E+02 | Less than quantitation limit |
| Content of compound represented by Formula (7) |  | ppb/PTFE | Less than quantitation limit | Less than quantitation limit |

TABLE 15-continued

| | | | Experimental Example 23 Stretched PTFE beads | Experimental Example 24 Fluorinated stretched PTFE beads |
|---|---|---|---|---|
| Fluorination conditions | Amount of fluorine radical source added per 100 parts by weight of PTFE | parts by weight | — | 22.4 |
| Content of compound represented by Formula (2) | n = 4 | ppb/PTFE | Less than quantitation limit | Less than quantitation limit |
| | n = 6 | ppb/PTFE | 3.8.E+02 | Less than quantitation limit |
| | n = 8 | ppb/PTFE | 7.1.E+02 | Less than quantitation limit |
| | n = 10 | ppb/PTFE | 6.1.E+02 | Less than quantitation limit |
| | n = 12 | ppb/PTFE | 4.3.E+02 | Less than quantitation limit |
| | n = 14 | ppb/PTFE | Less than quantitation limit | Less than quantitation limit |
| | n = 16 | ppb/PTFE | Less than quantitation limit | Less than quantitation limit |
| | n = 18 | ppb/PTFE | Less than quantitation limit | Less than quantitation limit |
| | n = 20 | ppb/PTFE | Less than quantitation limit | Less than quantitation limit |
| | Total | ppb/PTFE | 2.1.E+03 | Less than quantitation limit |
| Content of compound represented by Formula (1) | m = 3 | ppb/PTFE | Less than quantitation limit | Less than quantitation limit |
| | m = 5 | ppb/PTFE | Less than quantitation limit | Less than quantitation limit |
| | m = 7 | ppb/PTFE | Less than quantitation limit | Less than quantitation limit |
| | m = 9 | ppb/PTFE | Less than quantitation limit | Less than quantitation limit |
| | m = 11 | ppb/PTFE | 1.4.E+02 | Less than quantitation limit |
| | m = 13 | ppb/PTFE | Less than quantitation limit | Less than quantitation limit |
| | m = 15 | ppb/PTFE | Less than quantitation limit | Less than quantitation limit |
| | m = 17 | ppb/PTFE | Less than quantitation limit | Less than quantitation limit |
| | m = 19 | ppb/PTFE | Less than quantitation limit | Less than quantitation limit |
| | Total | ppb/PTFE | 1.4.E+02 | Less than quantitation limit |
| Content of compound represented by Formula (7) | | ppb/PTFE | Less than quantitation limit | Less than quantitation limit |

The quantitation limit was $1.3 \times 10^2$ ppb in the case of the molded body. The same applies to the following description.

Experimental Example 25

The fluorinated PTFE powder obtained in Experimental Example 3 was subjected to paste extrusion molding and drying in the same manner as in Experimental Example 21, to obtain dried extruded PTFE beads.

Experimental Example 26

The extruded PTFE beads after drying obtained in Experimental Example 25 (the extruded PTFE beads subjected to paste extrusion molding using the fluorinated powder) were stretched in the same manner as in Experimental Example 23, to obtain stretched PTFE beads.

Experimental Example 27

The fluorinated extruded PTFE beads obtained in Experimental Example 22 were stretched in the same manner as in Experimental Example 23, to obtain stretched PTFE beads.

Experimental Example 28

The PTFE powder obtained in Experimental Example 1 was left standing in a hot-air circulation dryer at 240° C. for 3 hours for heating, to obtain reheated PTFE powder.

Experimental Example 29

The extruded PTFE beads after drying obtained in Experimental Example 21 were left standing in a hot-air circulation dryer at 240° C. for 3 hours for heating, to obtain reheated extruded PTFE beads.

Experimental Example 30

The stretched PTFE beads obtained in Experimental Example 23 were left standing in a hot-air circulation dryer at 240° C. for 3 hours for heating, to obtain reheated stretched PTFE beads.

Experimental Example 31

PTFE powder was obtained in the same manner as in Experimental Example 1 except that the drying temperature of the wet PTFE powder was changed to 240° C.

The content of each of the compounds represented by Formulas (1), (2), and (7) in the dried extruded PTFE beads obtained in Experimental Example 25, the stretched PTFE beads obtained in Experimental Example 26, the stretched PTFE beads obtained in Experimental Example 27, the reheated PTFE powder obtained in Experimental Example 28, the reheated extruded PTFE beads obtained in Experimental Example 29, the reheated stretched PTFE beads obtained in Experimental Example 30, and the PTFE powder obtained in Experimental Example 31 was measured. Table 16 shows the results.

TABLE 16

|  |  |  | Experimental Example 25 Dried extruded PTFE beads | Experimental Example 26 Stretched PTFE beads | Experimental Example 27 Stretched PTFE beads | Experimental Example 28 Reheated PTFE powder |
|---|---|---|---|---|---|---|
| Fluorination conditions | Amount of fluorine radical source added per 100 parts by weight of PTFE | parts by weight | — | — | — | — |
| Content of compound represented by Formula (2) | $n = 4$ | ppb/PTFE | Less than quantitation limit | Less than quantitation limit | Less than quantitation limit | 3.4E+01 |
|  | $n = 6$ | ppb/PTFE | Less than quantitation limit | Less than quantitation limit | Less than quantitation limit | 5.3E+02 |
|  | $n = 8$ | ppb/PTFE | Less than quantitation limit | Less than quantitation limit | Less than quantitation limit | 6.4E+02 |
|  | $n = 10$ | ppb/PTFE | Less than quantitation limit | Less than quantitation limit | Less than quantitation limit | 4.9E+02 |
|  | $n = 12$ | ppb/PTFE | Less than quantitation limit | Less than quantitation limit | Less than quantitation limit | 2.1E+02 |
|  | $n = 14$ | ppb/PTFE | Less than quantitation limit | Less than quantitation limit | Less than quantitation limit | 8.3E+01 |
|  | $n = 16$ | ppb/PTFE | Less than quantitation limit | Less than quantitation limit | Less than quantitation limit | Less than quantitation limit |
|  | $n = 18$ | ppb/PTFE | Less than quantitation limit | Less than quantitation limit | Less than quantitation limit | Less than quantitation limit |
|  | $n = 20$ | ppb/PTFE | Less than quantitation limit | Less than quantitation limit | Less than quantitation limit | Less than quantitation limit |
|  | Total | ppb/PTFE | Less than quantitation limit | Less than quantitation limit | Less than quantitation limit | 2.0E+03 |
| Content of compound represented by Formula (1) | $m = 3$ | ppb/PTFE | Less than quantitation limit | Less than quantitation limit | Less than quantitation limit | Less than quantitation limit |
|  | $m = 5$ | ppb/PTFE | Less than quantitation limit | Less than quantitation limit | Less than quantitation limit | Less than quantitation limit |
|  | $m = 7$ | ppb/PTFE | Less than quantitation limit | Less than quantitation limit | Less than quantitation limit | Less than quantitation limit |
|  | $m = 9$ | ppb/PTFE | Less than quantitation limit | Less than quantitation limit | Less than quantitation limit | Less than quantitation limit |
|  | $m = 11$ | ppb/PTFE | Less than quantitation limit | Less than quantitation limit | Less than quantitation limit | Less than quantitation limit |
|  | $m = 13$ | ppb/PTFE | Less than quantitation limit | Less than quantitation limit | Less than quantitation limit | Less than quantitation limit |
|  | $m = 15$ | ppb/PTFE | Less than quantitation limit | Less than quantitation limit | Less than quantitation limit | Less than quantitation limit |
|  | $m = 17$ | ppb/PTFE | Less than quantitation limit | Less than quantitation limit | Less than quantitation limit | Less than quantitation limit |
|  | $m = 19$ | ppb/PTFE | Less than quantitation limit | Less than quantitation limit | Less than quantitation limit | Less than quantitation limit |
|  | Total | ppb/PTFE | Less than quantitation limit | Less than quantitation limit | Less than quantitation limit | Less than quantitation limit |
| Content of compound represented by Formula (7) |  | ppb/PTFE | Less than quantitation limit | Less than quantitation limit | Less than quantitation limit | Less than quantitation limit |

TABLE 16-continued

| | | | Experimental Example 29 Reheated extruded PTFE beads | Experimental Example 30 Reheated stretched PTFE beads | Experimental Example 31 PTFE powder |
|---|---|---|---|---|---|
| Fluorination conditions | Amount of fluorine radical source added per 100 parts by weight of PTFE | parts by weight | — | — | — |
| Content of compound represented by Formula (2) | n = 4 | ppb/PTFE | Less than quantitation limit | Less than quantitation limit | 3.6E+01 |
| | n = 6 | ppb/PTFE | 5.3E+02 | 3.3E+02 | 5.3E+02 |
| | n = 8 | ppb/PTFE | 8.4E+02 | 6.4E+02 | 6.4E+02 |
| | n = 10 | ppb/PTFE | 5.9E+02 | 5.9E+02 | 4.9E+02 |
| | n = 12 | ppb/PTFE | 2.2E+02 | 3.1E+02 | 2.2E+02 |
| | n = 14 | ppb/PTFE | Less than quantitation limit | Less than quantitation limit | 8.8E+01 |
| | n = 16 | ppb/PTFE | Less than quantitation limit | Less than quantitation limit | Less than quantitation limit |
| | n = 18 | ppb/PTFE | Less than quantitation limit | Less than quantitation limit | Less than quantitation limit |
| | n = 20 | ppb/PTFE | Less than quantitation limit | Less than quantitation limit | Less than quantitation limit |
| | Total | ppb/PTFE | 2.2E+03 | 1.9E+03 | 2.0E+03 |
| Content of compound represented by Formula (1) | m = 3 | ppb/PTFE | Less than quantitation limit | Less than quantitation limit | Less than quantitation limit |
| | m = 5 | ppb/PTFE | Less than quantitation limit | Less than quantitation limit | Less than quantitation limit |
| | m = 7 | ppb/PTFE | Less than quantitation limit | Less than quantitation limit | Less than quantitation limit |
| | m = 9 | ppb/PTFE | Less than quantitation limit | Less than quantitation limit | Less than quantitation limit |
| | m = 11 | ppb/PTFE | Less than quantitation limit | Less than quantitation limit | Less than quantitation limit |
| | m = 13 | ppb/PTFE | Less than quantitation limit | Less than quantitation limit | Less than quantitation limit |
| | m = 15 | ppb/PTFE | Less than quantitation limit | Less than quantitation limit | Less than quantitation limit |
| | m = 17 | ppb/PTFE | Less than quantitation limit | Less than quantitation limit | Less than quantitation limit |
| | m = 19 | ppb/PTFE | Less than quantitation limit | Less than quantitation limit | Less than quantitation limit |
| | Total | ppb/PTFE | Less than quantitation limit | Less than quantitation limit | Less than quantitation limit |
| Content of compound represented by Formula (7) | | ppb/PTFE | Less than quantitation limit | Less than quantitation limit | Less than quantitation limit |

Experimental Example 32

The PTFE powder obtained in Experimental Example 4 was subjected to paste extrusion molding and drying in the same manner as in Experimental Example 21, to obtain dried extruded PTFE beads.

Experimental Example 33

The extruded PTFE beads after drying obtained in Experimental Example 32 was fluorinated in the same manner as in Experimental Example 22, to obtain fluorinated extruded PTFE beads.

Experimental Example 34

The fluorinated PTFE powder obtained in Experimental Example 5 was subjected to paste extrusion molding and drying in the same manner as in Experimental Example 21, to obtain dried extruded PTFE beads.

Experimental Example 35

The PTFE powder obtained in Experimental Example 4 was left standing in a hot-air circulation dryer at 240° C. for 3 hours for heating, to obtain reheated PTFE powder.

Experimental Example 36

The reheated PTFE powder obtained in Experimental Example 35 was subjected to paste extrusion molding and drying in the same manner as in Experimental Example 21, to obtain dried extruded PTFE beads.

Experimental Example 37

The extruded PTFE beads after drying obtained in Experimental Example 32 were left standing in a hot-air circulation dryer at 240° C. for 3 hours for heating, to obtain reheated extruded PTFE beads.

Experimental Example 38

PTFE powder was obtained in the same manner as in Experimental Example 4 except that the drying temperature of the wet PTFE powder was changed to 240° C.

Experimental Example 39

The PTFE powder obtained in Experimental Example 38 was subjected to paste extrusion molding and drying in the same manner as in Experimental Example 21, to obtain dried extruded PTFE beads.

The content of each of the compounds represented by Formulas (1), (2), and (7) in the extruded PTFE beads after drying obtained in Experimental Example 32, the fluorinated extruded PTFE beads obtained in Experimental Example 33, the extruded PTFE beads obtained in Experimental Example 34, the reheated PTFE powder obtained in Experimental Example 35, the extruded PTFE beads obtained in Experimental Example 36, the reheated extruded PTFE beads obtained in Experimental Example 37, the PTFE powder obtained in Experimental Example 38, and the extruded PTFE beads after drying obtained in Experimental Example 39 was measured. Table 17 shows the results.

TABLE 17

| | | | Experimental Example 32 Dried extruded PTFE beads | Experimental Example 33 Fluorinated extruded PTFE beads | Experimental Example 34 Dried extruded PTFE beads | Experimental Example 35 Reheated PTFE powder |
|---|---|---|---|---|---|---|
| Fluorination conditions | Amount of fluorine source added per 100 parts by weight of PTFE | parts by weight | — | — | — | — |
| Content of compound represented by Formula (2) | n = 4 | ppb/PTFE | Less than quantitation limit | Less than quantitation limit | Less than quantitation limit | Less than quantitation limit |
| | n = 6 | ppb/PTFE | Less than quantitation limit | Less than quantitation limit | Less than quantitation limit | Less than quantitation limit |
| | n = 8 | ppb/PTFE | Less than quantitation limit | Less than quantitation limit | Less than quantitation limit | Less than quantitation limit |
| | n = 10 | ppb/PTFE | Less than quantitation limit | Less than quantitation limit | Less than quantitation limit | Less than quantitation limit |
| | n = 12 | ppb/PTFE | Less than quantitation limit | Less than quantitation limit | Less than quantitation limit | Less than quantitation limit |
| | n = 14 | ppb/PTFE | Less than quantitation limit | Less than quantitation limit | Less than quantitation limit | Less than quantitation limit |
| | n = 16 | ppb/PTFE | Less than quantitation limit | Less than quantitation limit | Less than quantitation limit | Less than quantitation limit |
| | n = 18 | ppb/PTFE | Less than quantitation limit | Less than quantitation limit | Less than quantitation limit | Less than quantitation limit |
| | n = 20 | ppb/PTFE | Less than quantitation limit | Less than quantitation limit | Less than quantitation limit | Less than quantitation limit |
| | Total | ppb/PTFE | Less than quantitation limit | Less than quantitation limit | Less than quantitation limit | Less than quantitation limit |
| Content of compound represented by Formula (1) | m = 3 | ppb/PTFE | Less than quantitation limit | Less than quantitation limit | Less than quantitation limit | Less than quantitation limit |
| | m = 5 | ppb/PTFE | Less than quantitation limit | Less than quantitation limit | Less than quantitation limit | Less than quantitation limit |
| | m = 7 | ppb/PTFE | Less than quantitation limit | Less than quantitation limit | Less than quantitation limit | Less than quantitation limit |
| | m = 9 | ppb/PTFE | Less than quantitation limit | Less than quantitation limit | Less than quantitation limit | Less than quantitation limit |
| | m = 11 | ppb/PTFE | Less than quantitation limit | Less than quantitation limit | Less than quantitation limit | Less than quantitation limit |
| | m = 13 | ppb/PTFE | Less than quantitation limit | Less than quantitation limit | Less than quantitation limit | Less than quantitation limit |
| | m = 15 | ppb/PTFE | Less than quantitation limit | Less than quantitation limit | Less than quantitation limit | Less than quantitation limit |
| | m = 17 | ppb/PTFE | Less than quantitation limit | Less than quantitation limit | Less than quantitation limit | Less than quantitation limit |
| | m = 19 | ppb/PTFE | Less than quantitation limit | Less than quantitation limit | Less than quantitation limit | Less than quantitation limit |
| | Total | ppb/PTFE | Less than quantitation limit | Less than quantitation limit | Less than quantitation limit | Less than quantitation limit |
| Content of compound represented by Formula (7) | | ppb/PTFE | Less than quantitation limit | Less than quantitation limit | Less than quantitation limit | Less than quantitation limit |

TABLE 17-continued

| | | | Experimental Example 36 Dried extruded PTFE beads | Experimental Example 37 Reheated extruded PTFE beads | Experimental Example 38 PTFE powder | Experimental Example 39 Dried extruded PTFE beads |
|---|---|---|---|---|---|---|
| Fluorination conditions | Amount of fluorine radical source added per 100 parts by weight of PTFE | parts by weight | — | — | — | — |
| Content of compound represented by Formula (2) | n = 4 | ppb/PTFE | Less than quantitation limit | Less than quantitation limit | Less than quantitation limit | Less than quantitation limit |
| | n = 6 | ppb/PTFE | Less than quantitation limit | Less than quantitation limit | Less than quantitation limit | Less than quantitation limit |
| | n = 8 | ppb/PTFE | Less than quantitation limit | Less than quantitation limit | Less than quantitation limit | Less than quantitation limit |
| | n = 10 | ppb/PTFE | Less than quantitation limit | Less than quantitation limit | Less than quantitation limit | Less than quantitation limit |
| | n = 12 | ppb/PTFE | Less than quantitation limit | Less than quantitation limit | Less than quantitation limit | Less than quantitation limit |
| | n = 14 | ppb/PTFE | Less than quantitation limit | Less than quantitation limit | Less than quantitation limit | Less than quantitation limit |
| | n = 16 | ppb/PTFE | Less than quantitation limit | Less than quantitation limit | Less than quantitation limit | Less than quantitation limit |
| | n = 18 | ppb/PTFE | Less than quantitation limit | Less than quantitation limit | Less than quantitation limit | Less than quantitation limit |
| | n = 20 | ppb/PTFE | Less than quantitation limit | Less than quantitation limit | Less than quantitation limit | Less than quantitation limit |
| | Total | ppb/PTFE | Less than quantitation limit | Less than quantitation limit | Less than quantitation limit | Less than quantitation limit |
| Content of compound represented by Formula (1) | m = 3 | ppb/PTFE | Less than quantitation limit | Less than quantitation limit | Less than quantitation limit | Less than quantitation limit |
| | m = 5 | ppb/PTFE | Less than quantitation limit | Less than quantitation limit | Less than quantitation limit | Less than quantitation limit |
| | m = 7 | ppb/PTFE | Less than quantitation limit | Less than quantitation limit | Less than quantitation limit | Less than quantitation limit |
| | m = 9 | ppb/PTFE | Less than quantitation limit | Less than quantitation limit | Less than quantitation limit | Less than quantitation limit |
| | m = 11 | ppb/PTFE | Less than quantitation limit | Less than quantitation limit | Less than quantitation limit | Less than quantitation limit |
| | m = 13 | ppb/PTFE | Less than quantitation limit | Less than quantitation limit | Less than quantitation limit | Less than quantitation limit |
| | m = 15 | ppb/PTFE | Less than quantitation limit | Less than quantitation limit | Less than quantitation limit | Less than quantitation limit |
| | m = 17 | ppb/PTFE | Less than quantitation limit | Less than quantitation limit | Less than quantitation limit | Less than quantitation limit |
| | m = 19 | ppb/PTFE | Less than quantitation limit | Less than quantitation limit | Less than quantitation limit | Less than quantitation limit |
| | Total | ppb/PTFE | Less than quantitation limit | Less than quantitation limit | Less than quantitation limit | Less than quantitation limit |
| Content of compound represented by Formula (7) | | ppb/PTFE | Less than quantitation limit | Less than quantitation limit | Less than quantitation limit | Less than quantitation limit |

Reduction of Compound Represented by Formula (1) or (2) by Ion Exchange

PTFE Content (P) in PTFE Aqueous Dispersion Containing Nonionic Surfactant

The PTFE content (P) was determined, based on heating residue (Z) obtained by putting about 1 g of a sample (X) into an aluminum cup having a diameter of 5 cm, followed by drying at 110° C. for 1 hour and further drying at 300° C. for 1 hour, by the formula: P=Z/X×100 (mass %).

Content of Nonionic Surfactant (N) with Respect to PTFE in PTFE Aqueous Dispersion Containing Nonionic Surfactant The content of the nonionic surfactant (N) was calculated, based on heating residue (Y g) obtained by putting about 1 g of a sample (X g) into an aluminum cup having a diameter of 5 cm, followed by drying at 100° C. for 1 hour and heating residue (Z g) obtained by further heating the heating residue (Y g) at 300° C. for 1 hour, by the formula: N=[(Y−Z)/Z]×100 (%/PTFE).

Synthesis Example 5

588.6 g of deionized water and 70.0 g of the surfactant A were added to a glass reactor having an internal volume of 1 L and equipped with a stirrer, the reactor was sealed, and the inside of the system was purged with nitrogen to remove oxygen. The reactor was heated to 90° C. and pressurized to 0.4 MPa with nitrogen. 41.4 g of ammonium persulfate (APS) was introduced therein, followed by stirring for 3 hours. After the stirring was stopped, the reactor was depressurized to the atmospheric pressure, followed by cooling, to obtain a surfactant aqueous solution C.

Synthesis Example 6

3600 g of deionized degassed water, 180 g of a paraffin wax, and 0.540 g of the surfactant A were added to a SUS reactor having an internal volume of 6 L and equipped with a stirrer, the reactor was sealed, and the inside of the system was purged with nitrogen to remove oxygen. The reactor was heated to 90° C., filled with TFE, and adjusted to 2.70 MPa. As a polymerization initiator, 0.031 g of ammonium persulfate (APS) and 1.488 g of disuccinic acid peroxide (DSP) were introduced therein. TFE was introduced so that the reaction pressure was constantly 2.70 MPa. Simultaneously with the introduction of TFE, continuous introduction of the surfactant aqueous solution C was started. At the time when 1650 g of TFE was introduced, stirring was stopped, and the reactor was depressurized to the atmospheric pressure. 139 g of the surfactant aqueous solution C was introduced by the end of the reaction. The contents were taken out from the reactor, followed by cooling. Thereafter, the paraffin wax was separated, to obtain a PTFE aqueous dispersion C.

The solid content of the PTFE aqueous dispersion C obtained was 31.7 mass %, and the average primary particle size was 357 nm.

Experimental Example 40: Preparation Example of PTFE Aqueous Dispersion Containing Nonionic Surfactant A nonionic surfactant (T-Det A138, manufactured by Harcros Chemicals Inc.) was added to the PTFE aqueous dispersion obtained in Synthesis Example 6 in an amount corresponding to 10% with respect to PTFE and gradually dispersed with a resin rod, to obtain a PTFE aqueous dispersion D containing nonionic surfactant.

Experimental Example 41

100 g of the PTFE aqueous dispersion D obtained in Experimental Example 40 was put into a 200-mL beaker, and 18 g of an anion exchange resin (Amberjet IRA40020H, manufactured by Rohm and Haas Company) was added thereto, followed by stirring for 30 minutes using a stirrer with a strength such that aggregation did not occur. After standing for 3 hours, the ion exchange resin was removed using a mesh, to obtain an aqueous dispersion of purified PTFE.

Experimental Example 42

An anion exchange resin, Amberjet IRA40020H, was further added to the aqueous dispersion of purified PTFE obtained in Experimental Example 41 at the same ratio as in Experimental Example 41, and the same operation was performed, to obtain an aqueous dispersion of purified PTFE.

Experimental Example 43

A nonionic surfactant (T-Det A138, manufactured by Harcros Chemicals Inc.) was added to the aqueous dispersion of purified PTFE obtained in Experimental Example 41 in an amount of 15%/PTFE, followed by standing at 48° C. for 4 hours. Then, the mixture was separated into two phases of a supernatant phase substantially free from PTFE and a condensed phase. The supernatant phase was removed, to obtain the condensed phase (aqueous dispersion of purified PTFE).

Experimental Example 44

The same operation as in Experimental Example 43 was performed on the aqueous dispersion of purified PTFE obtained in Experimental Example 42, to obtain a condensed phase (aqueous dispersion of purified PTFE).

Experimental Example 45

After a nonionic surfactant and water were added to the condensed phase (aqueous dispersion of purified PTFE) obtained in Experimental Example 43, the PTFE content was adjusted to 25 mass %, and the content of the nonionic surfactant was adjusted to 15%/PTFE, followed by standing at 44° C. for 4 hours. Then, the mixture was separated into two phases of a supernatant phase substantially free from PTFE and a condensed phase. The supernatant phase was removed to obtain the condensed phase (aqueous dispersion of purified PTFE).

Experimental Example 46

The same operation as in Experimental Example 45 was performed on the condensed phase (aqueous dispersion of purified PTFE) obtained in Experimental Example 44, to obtain a condensed phase (aqueous dispersion of purified PTFE).

Experimental Example 47

The same operation as in Experimental Example 43 was performed except that the PTFE aqueous dispersion D obtained in Experimental Example 40 was adjusted to a pH of 10 using ammonia water, to obtain a condensed phase (aqueous dispersion of purified PTFE).

Experimental Example 48

The same operation as in Experimental Example 45 was performed on the condensed phase (aqueous dispersion of purified PTFE) obtained in Experimental Example 47, to obtain a condensed phase (aqueous dispersion of purified PTFE).

For the PTFE aqueous dispersion D obtained in Experimental Example 40 and the aqueous dispersions of purified PTFE obtained in Experimental Examples 41 to 48, the PTFE content (P) in each PTFE aqueous dispersion containing a nonionic surfactant, the content of the nonionic surfactant (N) in each PTFE aqueous dispersion containing a nonionic surfactant, and the content of each of the compounds represented by Formulas (1) and (2) in each PTFE aqueous dispersion was measured. Table 18 shows the measurement results.

TABLE 18

|  |  | Experimental Example 40 | Experimental Example 41 | Experimental Example 42 | Experimental Example 43 | Experimental Example 44 |
|---|---|---|---|---|---|---|
| PTFE content (P) of PTFE aqueous dispersion containing nonionic surfactant | mass % | 26.5 | 26.8 | 26.2 | 69.1 | 66.8 |
| Content of nonionic surfactant (N) in PTFE aqueous dispersion containing nonionic surfactant | %/PTFE | 10.0 | 10.0 | 10.0 | 2.3 | 2.7 |
| Content of compound represented by Formula (2) in PTFE aqueous dispersion — n = 4 | ppb/PTFE | 2.8E+03 | Less than quantitation limit | Less than quantitation limit | Less than quantitation limit | Less than quantitation limit |
| n = 6 | ppb/PTFE | 1.0E+04 | Less than quantitation limit | Less than quantitation limit | Less than quantitation limit | Less than quantitation limit |
| n = 8 | ppb/PTFE | 4.8E+03 | 5.8E+02 | Less than quantitation limit | 1.8E+02 | Less than quantitation limit |
| n = 10 | ppb/PTFE | 3.1E+03 | 2.3E+03 | 6.7E+02 | 1.2E+03 | 3.2E+02 |
| n = 12 | ppb/PTFE | 1.1E+03 | 5.4E+02 | 4.5E+02 | 2.0E+02 | 2.0E+02 |
| n = 14 | ppb/PTFE | Less than quantitation limit | Less than quantitation limit | Less than quantitation limit | Less than quantitation limit | Less than quantitation limit |
| n = 16 | ppb/PTFE | Less than quantitation limit | Less than quantitation limit | Less than quantitation limit | Less than quantitation limit | Less than quantitation limit |
| n = 18 | ppb/PTFE | Less than quantitation limit | Less than quantitation limit | Less than quantitation limit | Less than quantitation limit | Less than quantitation limit |
| n = 20 | ppb/PTFE | Less than quantitation limit | Less than quantitation limit | Less than quantitation limit | Less than quantitation limit | Less than quantitation limit |
| Total | ppb/PTFE | 2.2E+04 | 3.4E+03 | 1.1E+03 | 1.6E+03 | 5.3E+02 |
| Content of compound represented by Formula (1) in PTFE aqueous dispersion — m = 3 | ppb/PTFE | 5.2E+03 | 3.6E+02 | Less than quantitation limit | 1.7E+02 | Less than quantitation limit |
| m = 5 | ppb/PTFE | 7.8E+03 | 5.5E+02 | Less than quantitation limit | 2.6E+02 | Less than quantitation limit |
| m = 7 | ppb/PTFE | 1.8E+04 | 1.4E+03 | 1.8E+02 | 6.9E+02 | 8.7E+01 |
| m = 9 | ppb/PTFE | 1.8E+04 | 3.6E+03 | 8.8E+02 | 1.6E+03 | 3.0E+02 |
| m = 11 | ppb/PTFE | 1.8E+04 | 1.5E+04 | 1.2E+04 | 8.6E+03 | 2.8E+03 |
| m = 13 | ppb/PTFE | 6.8E+03 | 3.0E+03 | 8.6E+02 | 1.9E+03 | 2.9E+02 |
| m = 15 | ppb/PTFE | 8.1E+02 | 2.9E+02 | 8.9E+01 | 8.7E+01 | Less than quantitation |
| m = 17 | ppb/PTFE | Less than quantitation limit | Less than quantitation limit | Less than quantitation limit | Less than quantitation limit | Less than quantitation limit |
| m = 19 | ppb/PTFE | Less than quantitation limit | Less than quantitation limit | Less than quantitation limit | Less than quantitation limit | Less than quantitation limit |
| Total | ppb/PTFE | 7.4E+04 | 2.4E+04 | 1.4E+04 | 1.3E+04 | 3.5E+03 |

|  |  | Experimental Example 45 | Experimental Example 48 | Experimental Example 47 | Experimental Example 48 |
|---|---|---|---|---|---|
| PTFE content (P) of PTFE aqueous dispersion containing nonionic surfactant | mass % | 67.2 | 67.1 | 66.6 | 65.0 |
| Content of nonionic surfactant (N) in PTFE aqueous dispersion containing nonionic surfactant | %/PTFE | 3.0 | 2.9 | 2.8 | 3.0 |
| Content of compound represented by Formula (2) in PTFE aqueous dispersion — n = 4 | ppb/PTFE | Less than quantitation limit | Less than quantitation limit | 7.9E+02 | Less than quantitation limit |
| n = 6 | ppb/PTFE | Less than quantitation limit | Less than quantitation limit | 2.1E+02 | 2.1E+02 |
| n = 8 | ppb/PTFE | Less than quantitationlimit | Less than quantitation limit | 1.8E+03 | 8.9E+02 |
| n = 10 | ppb/PTFE | 1.0E+03 | 1.7E+02 | 1.1E+03 | 8.5E+02 |
| n = 12 | ppb/PTFE | 1.8E+02 | 1.5E+02 | 1.3E+02 | Less than quantitation limit |
| n = 14 | ppb/PTFE | Less than quantitation limit | Less than quantitation limit | Less than quantitation limit | Less than quantitation limit |
| n = 16 | ppb/PTFE | Less than quantitation limit | Less than quantitation limit | Less than quantitation limit | Less than quantitation limit |
| n = 18 | ppb/PTFE | Less than quantitation limit | Less than quantitation limit | Less than quantitation limit | Less than quantitation limit |
| n = 20 | ppb/PTFE | Less than quantitation limit | Less than quantitation limit | Less than quantitation limit | Less than quantitation limit |
| Total | ppb/PTFE | 1.2E+03 | 3.3E+02 | 4.0E+03 | 1.9E+03 |

TABLE 18-continued

| | | | | | | |
|---|---|---|---|---|---|---|
| Content of compound represented by Formula (1) in PTFE aqueous dispersion | m = 3 | ppb/PTFE | 1.4E+02 | Less than quantitation limit | 1.6E+03 | 2.6E+02 |
| | m = 5 | ppb/PTFE | 1.7E+02 | Less than quantitation limit | 1.9E+03 | 3.1E+02 |
| | m = 7 | ppb/PTFE | 6.1E+02 | Less than quantitation limit | 2.9E+03 | 1.6E+03 |
| | m = 9 | ppb/PTFE | 1.4E+03 | 1.8E+02 | 9.6E+03 | 7.2E+03 |
| | m = 11 | ppb/PTFE | 5.6E+03 | 9.8E+02 | 8.3E+03 | 8.0E+03 |
| | m = 13 | ppb/PTFE | 7.9E+02 | 1.6E+02 | 1.2E+02 | Less than quantitation limit |
| | m = 15 | ppb/PTFE | Less than quantitation limit | Less than quantitation limit | Less than quantitation limit | Less than quantitation limit |
| | m = 17 | ppb/PTFE | Less than quantitation limit | Less than quantitation limit | Less than quantitation limit | Less than quantitation limit |
| | m = 19 | ppb/PTFE | Less than quantitation limit | Less than quantitation limit | Less than quantitation limit | Less than quantitation limit |
| | Total | ppb/PTFE | 8.7E+03 | 1.3E+03 | 2.4E+04 | 1.7E+04 |

What is claimed is:

1. A composition comprising polytetrafluoroethylene and substantially free from a compound represented by Formula (3) below:

$$(H-(CF_2)_8-SO_3)_q M^2 \quad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, and wherein the composition further includes a compound represented by Formula (4) below in an amount up to 1000 ppb with respect to polytetrafluoroethylene; and a nonionic surfactant in an amount of 1%/polytetrafluoroethylene or more:

$$(H-(CF_2)_7-COO)_p M^1 \quad \text{Formula (4):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

2. A composition comprising polytetrafluoroethylene and substantially free from a compound represented by Formula (3) below:

$$(H-(CF_2)_8-SO_3)_q M^2 \quad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, and wherein the composition further includes at least any one of a compound represented by Formula (4) below in an amount up to 1000 ppb with respect to polytetrafluoroethylene and a compound represented by Formula (4') below in an amount up to 1000 ppb with respect to polytetrafluoroethylene, and a nonionic surfactant in an amount of 1%/polytetrafluoroethylene or more:

$$(H-(CF_2)_7-COO)_p M^1 \quad \text{Formula (4):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and $$(H-(CF_2)_8-COO)_p M^1 \quad \text{Formula (4'):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

3. A composition comprising polytetrafluoroethylene and substantially free from a compound represented by Formula (3) below:

$$(H-(CF_2)_8-SO_3)_q M^2 \quad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, and wherein the composition further includes a compound represented by Formula (5) below in an amount up to 1000 ppb with respect to polytetrafluoroethylene; and a nonionic surfactant in an amount of 1%/polytetrafluoroethylene or more:

$$(H-(CF_2)_{13}-COO)_p M^1 \quad \text{Formula (5):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

4. A composition comprising polytetrafluoroethylene and substantially free from a compound represented by Formula (3) below:

$$(H-(CF_2)_8-SO_3)_q M^2 \quad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, and wherein the composition further includes at least any one of a compound represented by Formula (5) below in an amount up to 1000 ppb with respect to polytetrafluoroethylene and a compound represented by Formula (5') below in an amount up to 1000 ppb with respect to polytetrafluoroethylene, and a nonionic surfactant in an amount of 1%/polytetrafluoroethylene or more:

$$(H-(CF_2)_{13}-COO)_p M^1 \qquad \text{Formula (5):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and $$(H-(CF_2)_{14}-COO)_p M^1 \qquad \text{Formula (5'):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

5. The composition according to claim 1, being an aqueous dispersion.

6. A composition comprising polytetrafluoroethylene and substantially free from a compound represented by Formula (3) below:

$$(H-(CF_2)_8-SO_3)_q M^2 \qquad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, wherein the composition further includes a compound represented by Formula (4) below in an amount up to 1000 ppb with respect to polytetrafluoroethylene:

$$(H-(CF_2)_7-COO)_p M^1 \qquad \text{Formula (4):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

7. A composition comprising polytetrafluoroethylene and substantially free from a compound represented by Formula (3) below:

$$(H-(CF_2)_8-SO_3)_q M^2 \qquad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, wherein the composition further includes at least any one of a compound represented by Formula (4) below in an amount up to 1000 ppb with respect to polytetrafluoroethylene and a compound represented by Formula (4') below in an amount up to 1000 ppb with respect to polytetrafluoroethylene:

$$(H-(CF_2)_7-COO)_p M^1 \qquad \text{Formula (4):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and $$(H-(CF_2)_8-COO)_p M^1 \qquad \text{Formula (4'):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

8. A composition comprising polytetrafluoroethylene and substantially free from a compound represented by Formula (3) below:

$$(H-(CF_2)_8-SO_3)_q M^2 \qquad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, wherein the composition further includes a compound represented by Formula (5) below in an amount up to 1000 ppb with respect to polytetrafluoroethylene:

$$(H-(CF_2)_{13}-COO)_p M^1 \qquad \text{Formula (5):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

9. A composition comprising polytetrafluoroethylene and substantially free from a compound represented by Formula (3) below:

$$(H-(CF_2)_8-SO_3)_q M^2 \qquad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, wherein the composition further includes at least any one of a compound represented by Formula (5) below in an amount up to 1000 ppb with respect to polytetrafluoroethylene and a compound represented by Formula (5') below in an amount up to 1000 ppb with respect to polytetrafluoroethylene, $$(H-(CF_2)_{13}-COO)_p M^1 \qquad \text{Formula (5):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and $$(H-(CF_2)_{14}-COO)_p M^1 \qquad \text{Formula (5'):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

10. A composition comprising polytetrafluoroethylene and substantially free from a compound represented by Formula (3) below:

$$(H-(CF_2)_8-SO_3)_q M^2 \qquad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, wherein the composition further includes a compound represented by Formula (4) below in an amount up to 25 ppb with respect to polytetrafluoroethylene:

$$(H-(CF_2)_7-COO)_p M^1 \qquad \text{Formula (4):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

11. A composition comprising polytetrafluoroethylene and substantially free from a compound represented by Formula (3) below:

$$(H-(CF_2)_8-SO_3)_q M^2 \qquad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, wherein the composition further includes at least any one of a compound represented by Formula (4) below in an amount up to 25 ppb with respect to polytetrafluoroethylene and a compound represented by Formula (4') below in an amount up to 25 ppb with respect to polytetrafluoroethylene, $$(H-(CF_2)_7-COO)_p M^1 \qquad \text{Formula (4):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and $$(H-(CF_2)_8-COO)_p M^1 \qquad \text{Formula (4'):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

12. A composition comprising polytetrafluoroethylene and substantially free from a compound represented by Formula (3) below:

$$(H-(CF_2)_8-SO_3)_q M^2 \qquad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, wherein the composition further includes a compound represented by Formula (5) below in an amount up to 25 ppb with respect to polytetrafluoroethylene:

$$(H-(CF_2)_{13}-COO)_p M^1 \qquad \text{Formula (5):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

13. A composition comprising polytetrafluoroethylene and substantially free from a compound represented by Formula (3) below:

$$(H-(CF_2)_8-SO_3)_q M^2 \qquad \text{Formula (3):}$$

wherein $M^2$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and q is 1 or 2, wherein the composition further includes at least any one of a compound represented by Formula (5) below in an amount up to 25 ppb with respect to polytetrafluoroethylene and a compound represented by Formula (5') below in an amount up to 25 ppb with respect to polytetrafluoroethylene, $$(H-(CF_2)_{13}-COO)_p M^1 \qquad \text{Formula (5):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2; and $$(H-(CF_2)_{14}-COO)_p M^1 \qquad \text{Formula (5'):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

14. The composition according to claim 6, further comprising a compound represented by Formula (7) below in an amount of 1000 ppb or less with respect to polytetrafluoroethylene:

$$(F-(CF_2)_7-COO)_p M^1 \qquad \text{Formula (7):}$$

wherein $M^1$ is H, a metal atom, $NR^5_4$ (where $R^5$s may be the same as or different from each other and are each H or an organic group having 1 to 10 carbon atoms), an imidazolium optionally having a substituent, a pyridinium optionally having a substituent, or a phosphonium optionally having a substituent, and p is 1 or 2.

15. The composition according to claim 1, wherein the polytetrafluoroethylene is obtained by polymerization using a hydrocarbon surfactant.

16. The composition according to claim 6, being powder.

17. A molded body comprising the composition according to claim 16.

18. The molded body according to claim 17, being a stretched body.

19. The composition according to claim 1, wherein the content of the compound represented by Formula (3) is 1000 ppb or less with respect to polytetrafluoroethylene.

20. The composition according to claim 1, wherein the content of the compound represented by Formula (3) is 25 ppb or less with respect to polytetrafluoroethylene.

21. The composition according to claim 6, wherein the content of the compound represented by Formula (3) is 1000 ppb or less with respect to polytetrafluoroethylene.

22. The composition according to claim 6, wherein the content of the compound represented by Formula (3) is 25 ppb or less with respect to polytetrafluoroethylene.

* * * * *